(12) United States Patent
Casado et al.

(10) Patent No.: US 9,049,153 B2
(45) Date of Patent: ***Jun. 2, 2015

(54) LOGICAL PACKET PROCESSING PIPELINE THAT RETAINS STATE INFORMATION TO EFFECTUATE EFFICIENT PROCESSING OF PACKETS

(75) Inventors: Martin Casado, Portola Valley, CA (US); Teemu Koponen, San Francisco, CA (US); Pankaj Thakkar, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 13/218,464

(22) Filed: Aug. 26, 2011

(65) Prior Publication Data

US 2013/0058342 A1    Mar. 7, 2013

Related U.S. Application Data

(63) Continuation of application No. 13/177,535, filed on Jul. 6, 2011, and a continuation-in-part of application (Continued)

(51) Int. Cl.
*H04L 12/26* (2006.01)
*H04L 12/54* (2013.01)
(Continued)

(52) U.S. Cl.
CPC ............. *H04L 49/70* (2013.01); *G06F 11/07* (2013.01); *H04L 49/1546* (2013.01); *H04L 45/586* (2013.01); *H04L 12/5696* (2013.01); *H04L 41/0893* (2013.01); *H04L 49/3063* (2013.01);

(Continued)

(58) Field of Classification Search
USPC ............. 370/235, 392, 397, 409, 428, 469; 709/201, 236, 238, 246; 712/28, 225
See application file for complete search history.

(56) References Cited

U.S. PATENT DOCUMENTS 5,265,092 A    11/1993    Soloway et al.
5,504,921 A    4/1996     Dev et al.
(Continued)

FOREIGN PATENT DOCUMENTS

EP    1653688         5/2006
JP    2002-141905     5/2002
(Continued)

OTHER PUBLICATIONS

Updated portions of prosecution history of U.S. Appl. No. 12/286,098, May 7, 2013, Casado, Martin, et al.
(Continued)

*Primary Examiner* — Alpus H Hsu
(74) *Attorney, Agent, or Firm* — Adeli LLP

(57) ABSTRACT

Some embodiments provide a method of processing a packet through a logical switching element implemented by several managed switching elements. The method receives a packet for processing through a processing pipeline of the logical switching element. The method processes the packet through the processing pipeline. The method stores state information in the packet for indicating that the packet has been processed through the processing pipeline in order to prevent other managed switching elements from processing the packet through the processing pipeline. The method forwards the processed packet to a managed switching element of the several managed switching elements.

24 Claims, 57 Drawing Sheets

Related U.S. Application Data

No. 13/177,536, filed on Jul. 6, 2011, and a continuation-in-part of application No. 13/177,538, filed on Jul. 6, 2011.

(60) Provisional application No. 61/361,912, filed on Jul. 6, 2010, provisional application No. 61/361,913, filed on Jul. 6, 2010, provisional application No. 61/429,753, filed on Jan. 4, 2011, provisional application No. 61/429,754, filed on Jan. 4, 2011, provisional application No. 61/466,453, filed on Mar. 22, 2011, provisional application No. 61/482,205, filed on May 3, 2011, provisional application No. 61/482,615, filed on May 4, 2011, provisional application No. 61/482,616, filed on May 4, 2011, provisional application No. 61/501,743, filed on Jun. 27, 2011, provisional application No. 61/501,785, filed on Jun. 28, 2011, provisional application No. 61/505,100, filed on Jul. 6, 2011, provisional application No. 61/505,102, filed on Jul. 6, 2011, provisional application No. 61/505,103, filed on Jul. 6, 2011.

(51) Int. Cl.
  *G06F 9/38*      (2006.01)
  *G06F 15/16*     (2006.01)
  *H04L 12/931*    (2013.01)
  *H04L 12/933*    (2013.01)
  *H04L 12/713*    (2013.01)
  *H04L 12/24*     (2006.01)
  *H04L 12/935*    (2013.01)
  *G06F 15/173*    (2006.01)
  *G06F 11/07*     (2006.01)

(52) U.S. Cl.
  CPC ...... *G06F 15/17312* (2013.01); *H04L 12/5689* (2013.01); *H04L 41/0896* (2013.01)

(56) References Cited

U.S. PATENT DOCUMENTS

| | | | |
|---|---|---|---|
| 5,550,816 | A | 8/1996 | Hardwick et al. |
| 5,729,685 | A | 3/1998 | Chatwani et al. |
| 5,751,967 | A | 5/1998 | Raab et al. |
| 5,796,936 | A | 8/1998 | Watabe et al. |
| 5,926,463 | A | 7/1999 | Ahearn et al. |
| 6,006,275 | A | 12/1999 | Picazo, Jr. et al. |
| 6,055,243 | A | 4/2000 | Vincent et al. |
| 6,104,699 | A | 8/2000 | Holender et al. |
| 6,104,700 | A | 8/2000 | Haddock et al. |
| 6,219,699 | B1 | 4/2001 | McCloghrie et al. |
| 6,272,621 | B1 * | 8/2001 | Key et al. ............ 712/200 |
| 6,359,909 | B1 | 3/2002 | Ito et al. |
| 6,377,998 | B2 * | 4/2002 | Noll et al. ............ 709/236 |
| 6,456,624 | B1 | 9/2002 | Eccles et al. |
| 6,512,745 | B1 | 1/2003 | Abe et al. |
| 6,513,108 | B1 * | 1/2003 | Kerr et al. ............ 712/19 |
| 6,539,432 | B1 * | 3/2003 | Taguchi et al. ........ 709/227 |
| 6,654,353 | B1 | 11/2003 | Tokura et al. |
| 6,680,934 | B1 | 1/2004 | Cain |
| 6,697,338 | B1 | 2/2004 | Breitbart et al. |
| 6,728,777 | B1 | 4/2004 | Lee et al. |
| 6,785,843 | B1 | 8/2004 | McRae et al. |
| 6,912,221 | B1 | 6/2005 | Zadikian et al. |
| 6,941,487 | B1 | 9/2005 | Balakrishnan et al. |
| 6,959,002 | B2 | 10/2005 | Wynne et al. |
| 6,963,585 | B1 | 11/2005 | Le Pennec et al. |
| 6,999,454 | B1 | 2/2006 | Crump |
| 7,042,912 | B2 | 5/2006 | Ashwood Smith et al. |
| 7,046,630 | B2 | 5/2006 | Abe et al. |
| 7,126,923 | B1 | 10/2006 | Yang et al. |
| 7,158,972 | B2 | 1/2007 | Marsland |
| 7,197,561 | B1 | 3/2007 | Lovy et al. |
| 7,209,439 | B2 | 4/2007 | Rawlins et al. |
| 7,263,290 | B2 * | 8/2007 | Fortin et al. ............ 398/58 |
| 7,283,473 | B2 | 10/2007 | Arndt et al. |
| 7,286,490 | B2 | 10/2007 | Saleh et al. |
| 7,339,929 | B2 | 3/2008 | Zelig et al. |
| 7,342,916 | B2 | 3/2008 | Das et al. |
| 7,343,410 | B2 | 3/2008 | Mercier et al. |
| 7,359,971 | B2 | 4/2008 | Jorgensen |
| 7,391,771 | B2 | 6/2008 | Orava et al. |
| 7,415,463 | B2 | 8/2008 | Testa |
| 7,450,598 | B2 | 11/2008 | Chen et al. |
| 7,463,579 | B2 | 12/2008 | Lapuh et al. |
| 7,478,173 | B1 | 1/2009 | Delco |
| 7,483,370 | B1 | 1/2009 | Dayal et al. |
| 7,555,002 | B2 | 6/2009 | Arndt et al. |
| 7,587,492 | B2 | 9/2009 | Dyck et al. |
| 7,590,669 | B2 | 9/2009 | Yip et al. |
| 7,606,260 | B2 | 10/2009 | Oguchi et al. |
| 7,643,488 | B2 | 1/2010 | Khanna et al. |
| 7,649,851 | B2 | 1/2010 | Takashige et al. |
| 7,710,874 | B2 | 5/2010 | Balakrishnan et al. |
| 7,764,599 | B2 | 7/2010 | Doi et al. |
| 7,783,856 | B2 | 8/2010 | Hashimoto et al. |
| 7,792,099 | B2 | 9/2010 | Yasukawa et al. |
| 7,792,987 | B1 | 9/2010 | Vohra et al. |
| 7,802,251 | B2 | 9/2010 | Kitamura |
| 7,808,919 | B2 | 10/2010 | Nadeau et al. |
| 7,808,929 | B2 | 10/2010 | Wong et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,856,549 | B2 | 12/2010 | Wheeler |
| 7,885,276 | B1 | 2/2011 | Lin |
| 7,895,412 | B1 * | 2/2011 | Kerr et al. ............ 712/14 |
| 7,912,955 | B1 | 3/2011 | Machiraju et al. |
| 7,936,770 | B1 | 5/2011 | Frattura et al. |
| 7,937,438 | B1 | 5/2011 | Miller et al. |
| 7,948,986 | B1 | 5/2011 | Ghosh et al. |
| 7,953,865 | B1 | 5/2011 | Miller et al. |
| 7,970,917 | B2 | 6/2011 | Nakano et al. |
| 7,991,859 | B1 | 8/2011 | Miller et al. |
| 7,995,483 | B1 | 8/2011 | Bayar et al. |
| 8,027,354 | B1 | 9/2011 | Portolani et al. |
| 8,031,633 | B2 | 10/2011 | Bueno et al. |
| 8,032,899 | B2 | 10/2011 | Archer et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,089,871 | B2 | 1/2012 | Iloglu et al. |
| 8,089,904 | B2 | 1/2012 | Balasubramaniam et al. |
| 8,089,964 | B2 | 1/2012 | Lo et al. |
| 8,130,648 | B2 | 3/2012 | Kwan et al. |
| 8,131,852 | B1 | 3/2012 | Miller et al. |
| 8,146,148 | B2 | 3/2012 | Cheriton |
| 8,149,734 | B2 | 4/2012 | Lu |
| 8,149,737 | B2 | 4/2012 | Metke et al. |
| 8,155,028 | B2 * | 4/2012 | Abu-Hamdeh et al. ....... 370/254 |
| 8,160,069 | B2 | 4/2012 | Jacobson et al. |
| 8,161,152 | B2 | 4/2012 | Ogielski et al. |
| 8,166,201 | B2 | 4/2012 | Richardson et al. |
| 8,166,205 | B2 | 4/2012 | Farinacci et al. |
| 8,199,750 | B1 | 6/2012 | Schultz et al. |
| 8,223,668 | B2 | 7/2012 | Allan et al. |
| 8,224,931 | B1 | 7/2012 | Brandwine et al. |
| 8,224,971 | B1 | 7/2012 | Miller et al. |
| 8,265,075 | B2 | 9/2012 | Pandey |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,345,650 | B2 * | 1/2013 | Foxworthy et al. .......... 370/338 |
| 8,351,418 | B2 | 1/2013 | Zhao et al. |
| 8,571,031 | B2 * | 10/2013 | Davies et al. .......... 370/392 |
| 8,611,351 | B2 | 12/2013 | Gooch et al. |
| 8,611,352 | B2 * | 12/2013 | Mizrahi et al. .......... 370/392 |
| 8,612,627 | B1 | 12/2013 | Brandwine |
| 8,625,594 | B2 * | 1/2014 | Safrai et al. .......... 370/392 |
| 8,625,603 | B1 | 1/2014 | Ramakrishnan et al. |

(56) References Cited

U.S. PATENT DOCUMENTS

| | | |
|---|---|---|
| 8,625,616 B2 | 1/2014 | Vobbilisetty et al. |
| 8,644,188 B1 | 2/2014 | Brandwine et al. |
| 8,650,618 B2 | 2/2014 | Asati et al. |
| 8,717,895 B2 | 5/2014 | Koponen et al. |
| 8,718,070 B2 | 5/2014 | Koponen et al. |
| 8,743,888 B2 | 6/2014 | Casado et al. |
| 8,743,889 B2 | 6/2014 | Koponen et al. |
| 8,750,119 B2 | 6/2014 | Lambeth et al. |
| 8,750,164 B2 | 6/2014 | Casado et al. |
| 8,761,036 B2 | 6/2014 | Fulton et al. |
| 8,775,594 B2 | 7/2014 | Koponen et al. |
| 8,798,056 B2 | 8/2014 | Ganga |
| 8,817,620 B2 | 8/2014 | Koponen et al. |
| 8,817,621 B2 | 8/2014 | Casado et al. |
| 8,830,823 B2 | 9/2014 | Koponen et al. |
| 8,837,493 B2 | 9/2014 | Casado et al. |
| 8,842,679 B2 | 9/2014 | Koponen et al. |
| 8,880,468 B2 | 11/2014 | Koponen et al. |
| 2001/0043614 A1 | 11/2001 | Viswanadham et al. |
| 2002/0034189 A1 | 3/2002 | Haddock et al. |
| 2002/0093952 A1 | 7/2002 | Gonda |
| 2002/0194369 A1 | 12/2002 | Rawlins et al. |
| 2003/0009552 A1 | 1/2003 | Benfield et al. |
| 2003/0014391 A1 | 1/2003 | Evans et al. |
| 2003/0026258 A1 | 2/2003 | Takatani et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0204768 A1 | 10/2003 | Fee |
| 2004/0047286 A1 | 3/2004 | Larsen et al. |
| 2004/0054680 A1 | 3/2004 | Kelley et al. |
| 2004/0054793 A1 | 3/2004 | Coleman |
| 2004/0062209 A1 | 4/2004 | Goldman et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0210889 A1 | 10/2004 | Childress et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0053079 A1 | 3/2005 | Havala |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0201398 A1 | 9/2005 | Naik et al. |
| 2005/0232230 A1 | 10/2005 | Nagami et al. |
| 2006/0026225 A1 | 2/2006 | Canali et al. |
| 2006/0028999 A1 | 2/2006 | Iakobashvilli et al. |
| 2006/0031432 A1* | 2/2006 | Patrick et al. ............ 709/220 |
| 2006/0037075 A1 | 2/2006 | Frattura et al. |
| 2006/0056412 A1 | 3/2006 | Page |
| 2006/0092976 A1 | 5/2006 | Lakshman et al. |
| 2006/0174087 A1 | 8/2006 | Hashimoto et al. |
| 2006/0178898 A1 | 8/2006 | Habibi |
| 2006/0184653 A1 | 8/2006 | van Riel |
| 2006/0184937 A1 | 8/2006 | Abels et al. |
| 2006/0193266 A1 | 8/2006 | Siddha et al. |
| 2006/0221961 A1 | 10/2006 | Basso et al. |
| 2006/0245438 A1 | 11/2006 | Sajassi et al. |
| 2006/0248179 A1 | 11/2006 | Short et al. |
| 2006/0282895 A1 | 12/2006 | Rentzis et al. |
| 2006/0291388 A1 | 12/2006 | Amdahl et al. |
| 2007/0028239 A1 | 2/2007 | Dyck et al. |
| 2007/0050763 A1 | 3/2007 | Kagan et al. |
| 2007/0156919 A1 | 7/2007 | Potti et al. |
| 2007/0174429 A1 | 7/2007 | Mazzaferri et al. |
| 2007/0220358 A1 | 9/2007 | Goodill et al. |
| 2007/0234302 A1 | 10/2007 | Suzuki et al. |
| 2007/0239987 A1 | 10/2007 | Hoole et al. |
| 2007/0240160 A1 | 10/2007 | Paterson-Jones et al. |
| 2007/0245082 A1 | 10/2007 | Margolus et al. |
| 2007/0250608 A1 | 10/2007 | Watt |
| 2007/0260721 A1 | 11/2007 | Bose et al. |
| 2007/0266433 A1 | 11/2007 | Moore |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0049646 A1 | 2/2008 | Lu |
| 2008/0052206 A1 | 2/2008 | Edwards et al. |
| 2008/0059556 A1 | 3/2008 | Greenspan et al. |
| 2008/0163207 A1 | 7/2008 | Reumann et al. |
| 2008/0189769 A1 | 8/2008 | Casado et al. |
| 2008/0196100 A1 | 8/2008 | Madhavan et al. |
| 2008/0212496 A1 | 9/2008 | Zou |
| 2008/0212963 A1 | 9/2008 | Fortin et al. |
| 2008/0225780 A1 | 9/2008 | McCormick et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0279196 A1 | 11/2008 | Friskney et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0089625 A1 | 4/2009 | Kannappan et al. |
| 2009/0097495 A1 | 4/2009 | Palacharla et al. |
| 2009/0122710 A1 | 5/2009 | Bar-Tor et al. |
| 2009/0138577 A1 | 5/2009 | Casado et al. |
| 2009/0144220 A1 | 6/2009 | Feng et al. |
| 2009/0150527 A1 | 6/2009 | Tripathi et al. |
| 2009/0161547 A1 | 6/2009 | Riddle et al. |
| 2009/0222924 A1 | 9/2009 | Droz et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0292858 A1 | 11/2009 | Lambeth et al. |
| 2009/0296726 A1 | 12/2009 | Snively et al. |
| 2009/0303880 A1 | 12/2009 | Maltz et al. |
| 2010/0046531 A1 | 2/2010 | Louati et al. |
| 2010/0061231 A1 | 3/2010 | Harmatos et al. |
| 2010/0082799 A1 | 4/2010 | DeHaan et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0157888 A1 | 6/2010 | Aggarwal et al. |
| 2010/0157889 A1 | 6/2010 | Aggarwal et al. |
| 2010/0165874 A1 | 7/2010 | Brown et al. |
| 2010/0165877 A1 | 7/2010 | Shukla et al. |
| 2010/0169467 A1 | 7/2010 | Shukla et al. |
| 2010/0191612 A1 | 7/2010 | Raleigh |
| 2010/0191846 A1 | 7/2010 | Raleigh |
| 2010/0192207 A1 | 7/2010 | Raleigh |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0284402 A1 | 11/2010 | Narayanan |
| 2010/0290485 A1 | 11/2010 | Martini et al. |
| 2011/0004698 A1* | 1/2011 | Wu .......................... 709/235 |
| 2011/0004876 A1* | 1/2011 | Wu et al. ................. 718/1 |
| 2011/0004877 A1* | 1/2011 | Wu .......................... 718/1 |
| 2011/0004913 A1 | 1/2011 | Nagarajan et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |

(56) References Cited

U.S. PATENT DOCUMENTS

| | | | |
|---|---|---|---|
| 2011/0206053 | A1 | 8/2011 | Henry et al. |
| 2011/0261825 | A1 | 10/2011 | Ichino |
| 2011/0261828 | A1 | 10/2011 | Smith |
| 2011/0268118 | A1* | 11/2011 | Schlansker et al. ............ 370/392 |
| 2011/0271007 | A1 | 11/2011 | Wang et al. |
| 2011/0299413 | A1 | 12/2011 | Chatwani et al. |
| 2011/0310899 | A1 | 12/2011 | Alkhatib et al. |
| 2011/0318011 | A1 | 12/2011 | Brassil |
| 2012/0014386 | A1 | 1/2012 | Xiong et al. |
| 2012/0063360 | A1 | 3/2012 | Muramoto et al. |
| 2012/0096211 | A1 | 4/2012 | Davis et al. |
| 2012/0099602 | A1 | 4/2012 | Nagapudi et al. |
| 2012/0120964 | A1 | 5/2012 | Koponen et al. |
| 2012/0147898 | A1 | 6/2012 | Koponen et al. |
| 2012/0158993 | A1* | 6/2012 | McNamee et al. ............ 709/238 |
| 2012/0207018 | A1 | 8/2012 | Goldenberg et al. |
| 2012/0246637 | A1 | 9/2012 | Kreeger et al. |
| 2013/0058208 | A1 | 3/2013 | Pfaff et al. |
| 2013/0058215 | A1 | 3/2013 | Koponen et al. |
| 2013/0058225 | A1 | 3/2013 | Casado et al. |
| 2013/0058226 | A1 | 3/2013 | Casado et al. |
| 2013/0058228 | A1 | 3/2013 | Koponen et al. |
| 2013/0058229 | A1 | 3/2013 | Casado et al. |
| 2013/0058250 | A1 | 3/2013 | Casado et al. |
| 2013/0058251 | A1 | 3/2013 | Koponen et al. |
| 2013/0058252 | A1 | 3/2013 | Casado et al. |
| 2013/0058255 | A1 | 3/2013 | Casado et al. |
| 2013/0058331 | A1 | 3/2013 | Thakkar et al. |
| 2013/0058334 | A1 | 3/2013 | Koponen et al. |
| 2013/0058335 | A1 | 3/2013 | Koponen et al. |
| 2013/0058339 | A1 | 3/2013 | Casado et al. |
| 2013/0058340 | A1 | 3/2013 | Lambeth et al. |
| 2013/0058341 | A1 | 3/2013 | Fulton et al. |
| 2013/0058343 | A1 | 3/2013 | Casado et al. |
| 2013/0058344 | A1 | 3/2013 | Casado et al. |
| 2013/0058348 | A1 | 3/2013 | Koponen et al. |
| 2013/0058350 | A1 | 3/2013 | Fulton |
| 2013/0058351 | A1 | 3/2013 | Casado et al. |
| 2013/0058353 | A1 | 3/2013 | Koponen et al. |
| 2013/0058354 | A1 | 3/2013 | Casado et al. |
| 2013/0058356 | A1 | 3/2013 | Koponen et al. |
| 2013/0058357 | A1 | 3/2013 | Koponen et al. |
| 2013/0058358 | A1 | 3/2013 | Fulton et al. |
| 2013/0060736 | A1 | 3/2013 | Casado et al. |
| 2013/0060737 | A1 | 3/2013 | Koponen et al. |
| 2013/0060738 | A1 | 3/2013 | Koponen et al. |
| 2013/0060817 | A1 | 3/2013 | Koponen et al. |
| 2013/0060818 | A1 | 3/2013 | Lambeth et al. |
| 2013/0060819 | A1 | 3/2013 | Lambeth et al. |
| 2013/0060922 | A1 | 3/2013 | Koponen et al. |
| 2013/0060929 | A1 | 3/2013 | Koponen et al. |
| 2013/0060940 | A1 | 3/2013 | Koponen et al. |
| 2013/0073743 | A1 | 3/2013 | Ramasamy et al. |

FOREIGN PATENT DOCUMENTS

| | | |
|---|---|---|
| JP | 2003-069609 | 3/2003 |
| JP | 2003-124976 | 4/2003 |
| JP | 2003-318949 | 11/2003 |
| WO | WO 95/06989 | 3/1995 |
| WO | WO 2005/112390 | 11/2005 |
| WO | WO 2008/095010 | 8/2008 |
| WO | 2012/093429 | 7/2012 |

OTHER PUBLICATIONS

Updated portions of prosecution history of U.S. Appl. No. 13/177,529, May 31, 2013, Koponen, Teemu, et al.

Updated portions of prosecution history of U.S. Appl. No. 13/177,530, May 31, 2013, Koponen, Teemu, et al.

Updated portions of prosecution history of U.S. Appl. No. 13/177,531, May 2, 2013, Koponen, Teemu, et al.

Updated portions of prosecution history of U.S. Appl. No. 13/177,533, May 31, 2013, Koponen, Teemu, et al.

Updated portions of prosecution history of U.S. Appl. No. 13/177,537, May 20, 2013, Koponen, Teemu, et al.

Updated portions of prosecution history of U.S. Appl. No. 13/177,538, May 28, 2013, Koponen, Teemu, et al.

Updated portions of prosecution history of U.S. Appl. No. 13/177,539, May 31, 2013, Casado, Martin, et al.

Updated portons of prosecution history of U.S. Appl. No. 13/177,545, May 31, 2013, Fulton, Bryan J., et al.

WO 2009/042919 with International Search Report, Apr. 2, 2009, Nicira, Inc.

WO 2010/115060 with International Search Report, Oct. 7, 2010, Nicira, Inc.

Portions of prosecution history of commonly owned U.S. Appl. No. 12/286,098, including action(s) dated Nov. 7, 2012, Feb. 21, 2012, Nov. 8, 2011, Jun. 22, 2011, Mar. 24, 2011, Aug. 18, 2010, and May 5, 2010; and response(s)/amendment(s) filed Jun. 21, 2012, Oct. 24, 2011, Apr. 14, 2011, Mar. 14, 2011, Feb. 18, 2011, Jun. 4, 2010, and Sep. 24, 2009 (177 pages).

Portions of prosecution history of commonly owned U.S. Appl. No. 12/753,044, including action(s) dated Sep. 24, 2012, Jan. 24, 2012, and Nov. 8, 2011; and response(s)/amendment(s) filed Jul. 24, 2012, Dec. 8, 2011, and Mar. 31, 2011 (108 pages).

Adya, Atul, et al., "Cooperative Task Management without Manual Stack Management," Jun. 2002, 14 pages, Proceedings of the Usenix Annual Technical Conference, Monterey, CA, USA.

Andersen, David, et al., "Resilient Overlay Networks," Oct. 2001, 15 pages, 18th ACM Symp. On Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building a Fast, Virtualized Data Plane with Programmable Hardware," Aug. 17, 2009, pp. 1-8, VISA'09, Barcelona, Spain, ACM.

Author Unknown , "Cisco VN-Link: Virtualization-Aware Networking," Month Unknown, 2009, 10 pages, Cisco Systems, Inc.

Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown, "HP OpenView Enterprise Management Starter Solution," Jun. 2006, p. 1-4, Hewlett-Packard Development Company, HP.

Author Unknown, "HP OpenView Operations 8.0 for UNIX Developer's Toolkit," Month Unlknown, 2004, pp. 1-4, Hewlett-Packard Development Company, HP.

Author Unknown , "HP Web Jetadmin Integration into HP OpenView Network Node Manager," Feb. 2004, pp. 1-12, HP.

Author Unknown , "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown, "Intel 82599 10 Gigabit Ethernet Controller: Datasheet, Revision: 2.73," Dec. 2011, 930 pages, Intel Corporation.

Author Unknown , "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.

Author Unknown , "iSCSI SAN Configuration Guide: ESX Server 3.5, ESX Server 3i version 3.5, VirtualCenter 2.5," Revision Nov. 29, 2007, pp. 1-132, VMware, Inc., Palo Alto, CA, USA.

Author Unknown, "OpenFlow Switch Specification, Version 0.9.0 (Wire Protocol 0x98)," Jul. 20, 2009, pp. 1-36, Open Networking Foundation.

Author Unknown, OpenFlow Switch Specification, Version 1.0.0 (Wire Protocol 0x01), Dec. 31, 2009, pp. 1-42, Open Networking Foundation.

Author Unknown, "Private Network-Network Interface Specification Version 1.1 (PNNI 1.1)," The ATM Forum Technical Committee, Apr. 2002, 536 pages, The ATM Forum.

Author Unknown , "Single Root I/O Virtualization and Sharing Specification, Revision 1.0," Sep. 11, 2007, pp. 1-84, PCI-SIG.

(56) References Cited

OTHER PUBLICATIONS

Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation , Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Cooper, Brian F., et al., "PNUTS: Yahoors Hosted Data Serving Platform," VLDB'08, Aug. 24-30, 2008, pp. 1-12, ACM , Auckland, New Zealand.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)-Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Godfrey, P. Brighten, et al., "Pathlet Routing," SIGCOMM, Aug. 2009, pp. 1-6, ACM.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hamilton, James, et al., "Datacenter Networks Are in My Way," Principals of Amazon Series, Oct. 28, 2010, pp. 1-14.
Handley, Mark, et al., "Designing Extensible IP Router Software," Proc. of NSDI, May 2005, pp. 1-14.
Hinrichs, Timothy L., et al., "Practical Declarative Network Management," WREN'09, Aug. 21, 2009, pp. 1-10, Barcelona, Spain.
Hunt, Patrick, et al., "ZooKeeper: Wait-free Coordination for Internet-Scale Systems," Proc. Of Usenix Annual Technical Conference, Month Unknown, 2010, pp. 1-14.
Ioannidis, Sotiris, et al., "Implementing a Distributed Firewall," CCS'00, Month Unknown, 2000, pp. 1-10, ACM, Athens, Greece.
John, John P., et al., "Consensus Routing: The Internet as a Distributed System," Proc. Of NSDI , Apr. 2008, pp. 1-14.
Kamath, Daya, et. al., "Edge virtual Bridge Proposal, Version 0. Rev. 0.1," Apr. 23, 2010, pp. 1-72, IEEE.
Katz, D., et. al., "Bidirectional Forwarding Detection, draft-ietf-bfd-base-11.txt," Month Unknown, 2009, pp. 1-51, IETF Trust.
Keller, Eric, et al., "The 'Platform as a Service' Model for Networking," Month Unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. On Computer Systems, Aug. 2000, 34 pages, vol. 18, No. 3.
Koponen, Teemu, et al., "Onix: A Distributed Control Platform for Large-scale Production Networks," In Proc. OSDI, Oct. 2010, pp. 1-14.
Labovitz, Craig, et al., "Delayed Internet Routing Convergence," SIGCOMM '00, Month Unknown, 2000, pp. 175-187, Stockholm, Sweden.
Labovitz, Craig, et al., "Internet Routing Instability," ACM SIGCOMM '97, Month Unknown, 1997, pp. 1-12, Association for Computing Machinery, Inc.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, pp. 1-14, ACM, Portland, Oregon, USA.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. Of SIGCOMM, Aug. 17-21, 2009, pp. 1-12.
Partridge, Craig, et al., "A 50-Gb/s IP Router," IEEE/ACM Transactions on Networking Jun. 1998, pp. 237-248.
Pelissier, Joe, "Network Interface Virtualization Review," Jan. 2009, pp. 1-38.
Pelissier, Joe, "VNTag 101," May 2008, pp. 1-87.
Peterson, Larry L., et al., "OS Support for General-Purpose Routers," Month Unknown, 1999, 6 pages.
Pettit, Justin, et al., "Virtual Switching in an Era of Advanced Edges," Sep. 2010, 7 pages.
Pfaff, Ben., et al., "Extending Networking into the Virtualization Layer," Proc. Of HotNets, Oct. 2009, pp. 1-6.
Phan, Doantam, et al., "Visual Analysis of Network Flow Data with Timelines and Event Plots," Month Unknown, 2007, pp. 1-16, VizSEC.
Rosen, E., et al., "Applicant Statement for BGP/MPLS IP Virtual Private Networks (VPNs)," The Internet Society, RFC 4365, Feb. 2006, pp. 1-32.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.

(56) References Cited

OTHER PUBLICATIONS

Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," Proc. HotNets, Month Unknown, 2009, 6 pages.
Touch, J., et al., "Transparent Interconnection of Lots of Links (TRILL): Problem and Applicability Statement," May 2009, pp. 1-17, IETF Trust, RFC 5556.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANCS'06, Dec. 3-5, 2006, 10 pages, ACM, San Jose, California, USA.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Xie, Geoffrey G., et al., "On Static Reachability Analysis of IP Networks," Month Unknown, 2005, pp. 1-14.
Yang, L., et al., "Forwarding and Control Element Separation (ForCES) Framework," Apr. 2004, pp. 1-40, The Internet Society.
Yu, Minlan, et al., "Scalable Flow-Based Networking with DIFANE" in Proc. SIGCOMM Aug. 2010, 16 pages.
Updated portions of prosecution history of U.S. Appl. No. 12/753,044, Feb. 19, 2013, Casado, Martin, et al.
Portions of prosecution history of U.S. Appl. No. 13/177,529, Feb. 13, 2013, Koponen, Teemu, et al.
Portions of prosecution history of U.S. Appl. No. 13/177,530, Mar. 1, 2013, Koponen, Teemu, et al.
Portions of prosecution history of U.S. Appl. No. 13/177,531, Feb. 14, 2013, Koponen, Teemu, et al.
Portions of prosecution history of U.S. Appl. No. 13/177,532, Mar. 15, 2013, Casado, Martin, et al.
Portions of prosecution history of U.S. Appl. No. 13/177,533, Mar. 5, 2013, Koponen, Teemu, et al.
Portions of prosecution history of U.S. Appl. No. 13/177,534, Apr. 9, 2013, Casado, Martin, et al.
Portions of prosecution history of U.S. Appl. No. 13/177,535, Jan. 17, 2013, Casado, Martin, et al.
Portions of prosecution history of U.S. Appl. No. 13/177,536, May 15, 2012, Koponen, Teemu, et al.
Portions of prosecution history of U.S. Appl. No. 13/177,537, Dec. 19, 2012, Koponen, Teemu, et al.
Portions of prosecution history of U.S. Appl. No. 13/177,538, Nov. 28, 2012, Koponen, Teemu, et al.
Portions of prosecution history of U.S. Appl. No. 13/177,539, Mar. 6, 2013, Casado, Martin, et al.
Portions of prosecution history of U.S. Appl. No. 13/177,540, Mar. 15, 2013, Lambeth, W. Andrew, et al.
Portions of prosecution history of U.S. Appl. No. 13/177,543, Apr. 22, 2013, Koponen, Teemu, et al.
Portions of prosecution history of U.S. Appl. No. 13/177,545, Feb. 8, 2013, Fulton, Bryan J. et al.
Portions of prosecution history of U.S. Appl. No. 13/177,546, Sep. 26, 2011, Fulton, Bryan J., et al.
Portions of prosecution history of U.S. Appl. No. 13/218,433, Apr. 22, 2013, Koponen, Teemu, et al.
Author Unknown, "Packet Processing on Intel® Architecture," Month Unknown, 2013, 6 pages, available at http://www.intel.com/content/www/us/en/intelligent-systems/intel-technology/packet-processing-is-enhanced-with-software-from-intel-dpdk.html.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages. Brighton, UK.
Shenker, Scott, et al., "The Future of Networking, and the Past of Protocols," Dec. 2, 2011, 30 pages, USA.
Updated portions of prosecution history of U.S. Appl. No. 12/286,098, Jan. 29, 2014, Casado, Martin, et al.
Updated portions of prosecution history of U.S. Appl. No. 13/177,529, 0-21-2014, Koponen, Teemu, et al.
Updated portions of prosecution history of U.S. Appl. No. 13/177,537, Jan. 10, 2014, Koponen, Teemu, et al.
Updated portions of prosecution history of U.S. Appl. No. 13/177,543, Apr. 1, 2014, Koponen, Teemu, et al.
Updated portions of prosecution history of U.S. Appl. No. 13/218,433, Jan. 27, 2014, Koponen, Teemu, et al.
Updated portions of prosecution history of U.S. Appl. No. 13/177,532, Jan. 27, 2014, Casado, Martin, et al.
Updated portions of prosecution history of U.S. Appl. No. 13/177,534, Feb. 21, 2014, Casado, Martin, et al.
Updated portions of prosecution history of U.S. Appl. No. 13/177,540, Mar. 4, 2014, Lambeth, W. Andrew, et al.
Updated portions of prosecution history of U.S. Appl. No. 13/177,545, Jan. 17, 2014, Fulton, Bryan J., et al.
Updated portions of prosecution history of U.S. Appl. No. 13/177,533, Jan. 22, 2014, Koponen, Teemu, et al.
Updated portions of prosecution history of U.S. Appl. No. 13/177,531, Mar. 13, 2014, Koponen, Teemu, et al.
Updated portions of prosecution history of U.S. Appl. No. 13/177,530, Feb. 26, 2014, Koponen, Teemu, et al.
Updated portions of prosecution history of U.S. Appl. No. 13/177,539, Jan. 15, 2014, Casado, Martin, et al.
Updated portions of prosecution history of U.S. Appl. No. 13/177,535, Feb. 24, 2014, Casado, Martin, et al.
Updated portions of prosecution history of U.S. Appl. No. 13/177,538, Feb. 14, 2014, Koponen, Teemu, et al.
Updated portions of prosecution history of U.S. Appl. No. 13/177,536, Feb. 28, 2014, Koponen, Teemu, et al.
Al-Fares, Mohammad, et al., "A Scalable, Commodity Data Center Network Architecture," Aug. 17-22, 2008, pp. 63-74, Seattle, Washington, USA.
Author Unknown, "Cisco Nexis 1000V Series Switches," Jul. 29, 2010, 2 pages, Cisco Systems, Inc.
Author Unknown, "Open vSwitch, An Open Virtual Switch," Dec. 30, 2010, 2 pages, Cisco Systems, Inc.
Author Unknown, "VMare for Linus Networking Support," Nov. 17, 1999, pp. 1-5, VMWare, Inc.
Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown 2009, pp. 147-148, IEEE.
Portions of prosecution history of U.S. Appl. No. 13/177,541, filed Oct. 29, 2014, Koponen et al.
Updated portions of prosecution history of U.S. Appl. No. 12/286,098, filed Aug. 14, 2014, Casado et al.
Updated portions of prosecution history of U.S. Appl. No. 12/753,044, filed Oct. 9, 2014, Casado et al.
Updated portions of prosecution history of U.S. Appl. No. 13/177,529, filed May 6, 2014, Koponen et al.
Updated portions of prosecution history of U.S. Appl. No. 13/177,537, filed Oct. 2, 2014, Koponen et al.
Portions of prosecution history of U.S. Appl. No. 13/219,557, filed Sep. 22, 2014, Koponen et al.
Portions of prosecution history of U.S. Appl. No. 13/218,427, filed Sep. 30, 2014, Koponen et al.
Updated portions of prosecution history of U.S. Appl. No. 13/177,543, filed Aug. 14, 2014, Koponen et al.
Portions of prosecution history of U.S. Appl. No. 13/218,431, filed Sep. 10, 2014, Casado et al.
Updated portions of prosecution history of U.S. Appl. No. 13/218,433, filed Jun. 5, 2014, Koponen et al.
Portions of prosecution history of U.S. Appl. No. 13/219,562, filed Nov. 10, 2014, Lambeth et al.
Updated portions of prosecution history of U.S. Appl. No. 13/177,532, filed May 2, 2014, Casado et al.
Updated portions of prosecution history of U.S. Appl. No. 13/177,534, filed Aug. 1, 2014, Casado et al.

(56) References Cited

OTHER PUBLICATIONS

Updated portions of prosecution history of U.S. Appl. No. 13/177,540, filed May 8, 2014, Lambeth et al.
Updated portions of prosecution history of U.S. Appl. No. 13/177,545, filed Apr. 30, 2014, Fulton et al.
Updated portions of prosecution history of U.S. Appl. No. 13/177,546, filed Sep. 30, 2014, Fulton et al.
Updated portions of prosecution history of 13/177,533, filed Aug. 1, 2014, Koponen et al.
Updated portions of prosecution history of U.S. Appl. No. 13/177,531, filed Mar. 27, 2014, Koponen et al.
Updated portions of prosecution history of U.S. Appl. No. 13/177,530, filed Apr. 4, 2014, Koponen et al.
Updated portions of prosecution history of U.S. Appl. No. 13/177,539, filed Jul. 31, 2014 Casado et al.
Updated portions of prosecution history of U.S. Appl. No. 13/177,535, filed May 16, 2014, Casado et al.
Portions of prosecution history of U.S. Appl. No. 13/218,477, filed Sep. 19, 2014, Casado et al.
Portions of prosecution history of U.S. Appl. No. 13/218,472, filed Oct. 31, 2014, Koponen et al.
Portions of prosecution history of U.S. Appl. No. 13/218,471, filed Aug. 18, 2014, Casado et al.
Portions of prosecution history of U.S. Appl. No. 13/219,533, filed Sep. 22, 2014, Casado et al.
Portions of prosecution history of U.S. Appl. No. 13/218,470, filed Nov. 5, 2014, Casado et al.
Portions of prosecution history of U.S. Appl. No. 13/225,553, filed Nov. 6, 2014, Koponen et al.
Portions of prosecution history of U.S. Appl. No. 13/218,468, filed Nov. 10, 2014, Pfaff et al.
Portions of prosecution history of U.S. Appl. No. 13/218,467, filed Oct. 24, 2014, Casado et al.
Portions of prosecution history of U.S. Appl. No. 13/225,554, filed Oct. 20, 2014, Casado et al.
Portions of prosecution history of U.S. Appl. No. 13/543,784, filed Aug. 29, 2014, Koponen et al.
Updated portions of prosecution history of U.S. Appl. No. 13/177,538, filed Aug. 7, 2014, Koponen et al.
Updated portions of prosecution history of U.S. Appl. No. 13/177,536, filed Oct. 2, 2014, Koponen et al.
Portions of prosecution history of U.S. Appl. No. 13/219,578, filed Sep. 24, 2014, Lambeth et al.
Portions of prosecution history of U.S. Appl. No. 13/288,908, filed Aug. 19, 2014, Fulton.
Portions of prosecution history of U.S. Appl. No. 13/269,409, filed Aug. 15, 2014, Koponen et al.
Author Unknown, "OpenFlow Switch Specification," Version 1.1.0 Implemented (Wire Protocol 0x02), Feb. 28, 2011, 56 pages, available at http://archive.openflow.org/documents/openflow-spec-v1.1.0.pdf.

* cited by examiner

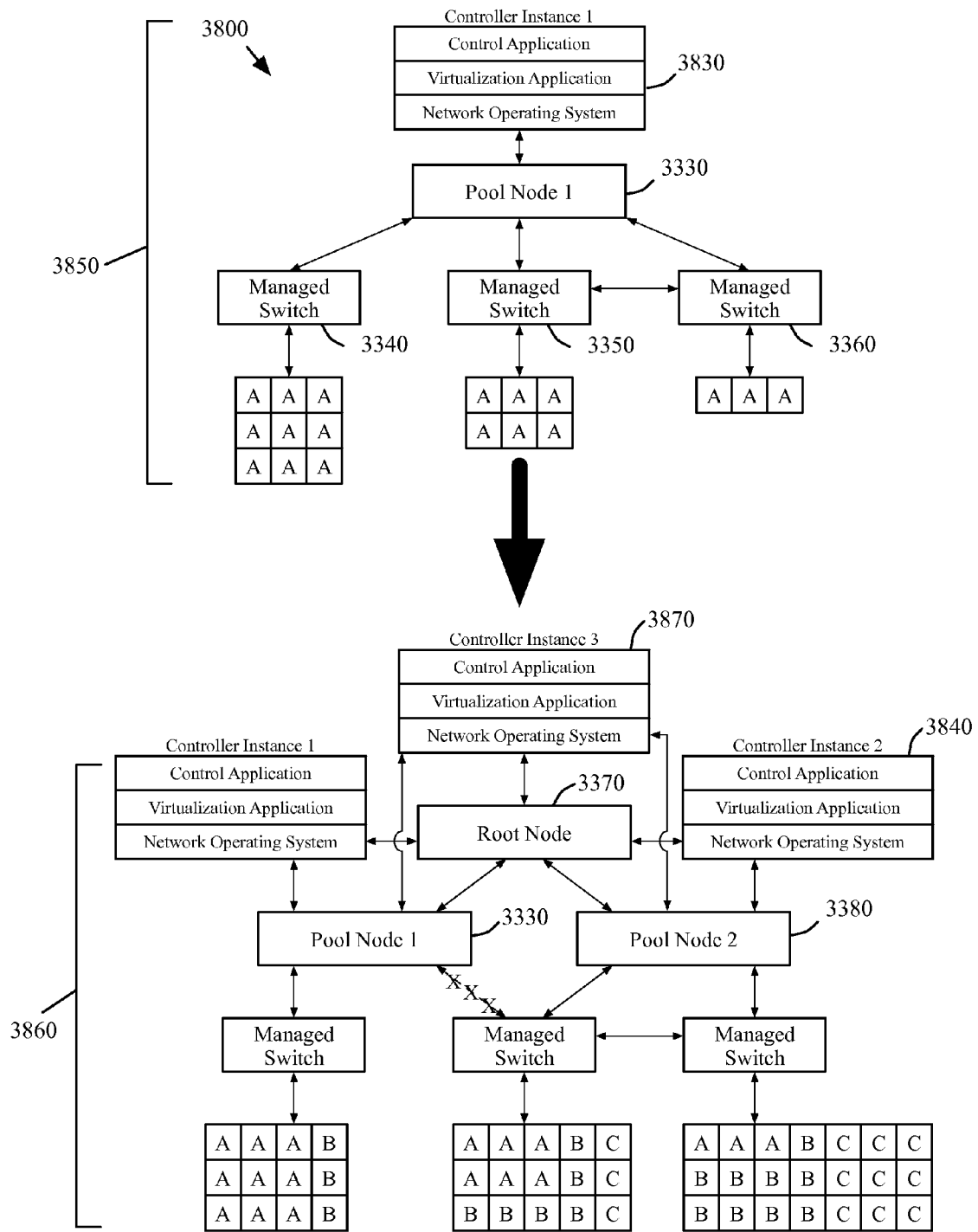

| # | Description | Flow Entry |
|---|---|---|
| 1 | receive (from VM 1 on Host 1): to VM 1 ingress context | cookie=0x1, priority=32768, in_port=1, actions=mod_vlan_vid:2057,resubmit:4000 |
| 2 | send to logical lookup context | cookie=0x3, priority=32768, in_port=4000,dl_vlan=2057, actions=mod_vlan_vid:2054,resubmit:4000 |
| 3 | ingress ACL lookup | cookie=0x6, priority=32768, in_port=4000,dl_vlan=2054, actions=mod_vlan_vid:2055,resubmit:4000 |
| 4 | logical lookup | cookie=0x8, priority=32768, in_port=4000,dl_vlan=2055,dl_dst=00:23:20:01:01:01, actions=mod_vlan_vid:2056,resubmit:4000 |
| 5 | logical lookup | cookie=0xc, priority=32768, in_port=4000,dl_vlan=2055,dl_dst=00:23:20:03:01:01, actions=mod_vlan_vid:2058,resubmit:4000 |
| 6 | logical lookup | cookie=0x4, priority=32768, in_port=4000,dl_vlan=2055,dl_dst=ff:ff:ff:ff:ff:ff, actions=mod_vlan_vid:2050,resubmit:4000 |
| 7 | send to (to VM 1 on Host 1): from VM 1 egress context | cookie=0x2, priority=32768, in_port=4000,dl_vlan=2056, actions=strip_vlan,output:1 |
| 8 | send to VM 2 egress context (tunnel to Host 2) | cookie=0xc, priority=32768, in_port=4000,dl_vlan=2058, actions=mod_vlan_vid:2058,output:3 |
| 9 | broadcast port | cookie=0x7, priority=32768, in_port=4000,dl_vlan=2050, actions=mod_vlan_vid:2056,resubmit:4000,mod_vlan_vid:2051,resubmit:4000 |
| 10 | broadcast shadow port (tunnel to pool node) | cookie=0x9, priority=32768, in_port=4000,dl_vlan=2051, actions=mod_vlan_vid:2050,output:2 |
| 11 | receive from Host 2 tunnel (for VM 1 egress context) | cookie=0xd, priority=32768, in_port=3,dl_vlan=2056, actions=mod_vlan_vid:2056,resubmit:4000 |
| 12 | receive from pool node tunnel (for VM 1 egress context) | cookie=0xa, priority=32768, in_port=2,dl_vlan=2056, actions=mod_vlan_vid:2056,resubmit:4000 |
| 13 | logical lookup: capture all unknown traffic to uplink context | cookie=0x5, priority=32766, in_port=4000,dl_vlan=2055, actions=mod_vlan_vid:2049,resubmit:4000 |
| 14 | tunnel to pool node | cookie=0xb, priority=32768, in_port=4000,dl_vlan=2049, actions=mod_vlan_vid:2049,output:2 |

*Figure 44*

LOGICAL PACKET PROCESSING PIPELINE THAT RETAINS STATE INFORMATION TO EFFECTUATE EFFICIENT PROCESSING OF PACKETS

CLAIM OF BENEFIT TO PRIOR APPLICATIONS

This application is a continuation application of U.S. patent application Ser. No. 13/177,535, filed on Jul. 6, 2011, now issued as U.S. Pat. No. 8,750,164. U.S. patent application Ser. No. 13/177,535 claims benefit to U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; and U.S. Provisional Patent Application 61/501,785, filed on Jun. 28, 2011. This application is a continuation in part application of U.S. patent application Ser. No. 13/177,536, filed on Jul. 6, 2011, now issued as U.S. Patent Publication 2013/0060940, and a continuation in part application of U.S. patent application Ser. No. 13/177,538, filed on Jul 6, 2011, now issued as U.S. Pat. No. 8,830,823. U.S. patent applications Ser. Nos. 13/177,536 and 13/177,538 claim benefit to U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; and U.S. Provisional Patent Application 61/501,785, filed on Jun. 28, 2011. This application claims the benefit of U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; U.S. Provisional Patent Application 61/501,785, filed on Jun. 28, 2011; U.S. Provisional Patent Application 61/505,100, filed on Jul. 6, 2011; U.S. Provisional Patent Application 61/505,102, filed on Jul. 6, 2011; and U.S. Provisional Patent Application 61/505,103, filed on Jul. 6, 2011. U.S. Provisional Patent Applications 61/361,912, 61/361,913, 61/429,753, 61/429,754, 61/466,453, 61/482,205, 61/482,615, 61/482,616, 61/501,743, and 61/501,785 are incorporated herein by reference.

BRIEF SUMMARY

Some embodiments of the invention provide a method for processing a packet through a logical datapath set that is implemented by several managed switching elements. In particular, the method of some embodiments uses state information to facilitate the processing of the packet through the logical datapath set. For example, in some embodiments, the method processes the packet through a processing pipeline of the logical datapath set. Then, the method stores state information in the packet to indicate that the packet has been processed through the processing pipeline. This way, any managed switching element that receives the packet can identify that the packet has been processed through the processing pipeline and, thus, forward the packet to its destination in the logical datapath set instead of reprocessing the packet through the processing pipeline.

In some embodiments, the packet's state information facilitates the distribution of logical processing among some or all of the managed switching elements. For instance, a first managed switching element of the several managed switching elements may process the packet through a first portion of the processing pipeline and store state information in the packet that indicates that the packet has been processed through the first portion of the processing pipeline. Based on the state information stored in the packet, a second managed switching element may process the packet through a second portion of the processing pipeline. In some cases, the first and second portions of the processing pipeline are different so that the second managed switching element does not process the packet through portions of the processing pipeline through which the first managed switching element processed the packet. In some embodiments, additional managed switching elements that receive the packet may continue processing the packet through portions of the processing pipeline that the packet has not been processed through until the packet has been processed through the entire processing pipeline.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 44 illustrates several example flow entries that implement a portion of a processing pipeline of some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Environment

The following section will describe the environment in which some embodiments of the inventions are implements. In the present application, switching elements and machines may be referred to as network elements. In addition, a network that is managed by one or more network controllers may be referred to as a managed network in the present application. In some embodiments, the managed network includes only managed switching elements (e.g., switching elements that are controlled by one or more network controllers) while, in other embodiments, the managed network includes managed switching elements as well as unmanaged switching elements (e.g., switching elements that are not controlled by a network controller).

Figure 1:
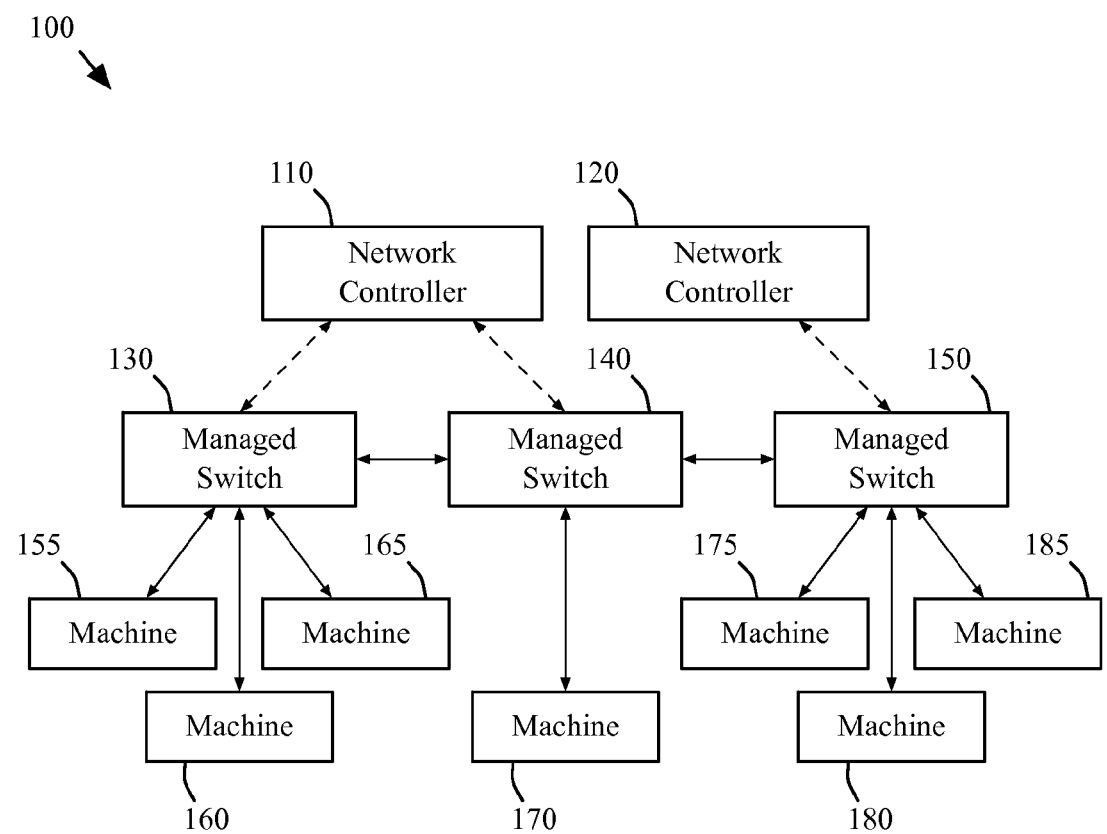
FIG. 1 conceptually illustrates a network architecture of some embodiments.

FIG. 1 conceptually illustrates a network architecture 100 of some embodiments. As shown, the network architecture 100 includes network controllers 110 and 120, managed switching elements 130-150, and machines 155-185.

In some embodiments, the managed switching elements 130-150 route network data (e.g., packets) between network elements in the network that are coupled to the managed switching elements 130-150. For instance, the managed switching element 130 routes network data between the machines 155-165 and the managed switching element 140. Similarly, the managed switching element 140 routes network data between the machine 170 and the managed switching elements 140 and 150, and the managed switching element 150 routes network data between the machines 175-185 and the managed switching element 150.

The managed switching elements 130-150 of some embodiments can be configured to route network data according to defined rules. In some embodiments, the managed switching elements 130-150 routes network data based on routing criteria defined in the rules. Examples of routing criteria include source media access control (MAC) address, destination MAC, packet type, source Internet Protocol (IP) address, destination IP address, source port, destination port, and/or virtual local area network (VLAN) identifier, among other routing criteria.

In some embodiments, the managed switching elements 130-150 can include standalone physical switching elements, software switching elements that operate within a computer, or any other type of switching element. For example, each of the managed switching elements 130-150 may be implemented as a hardware switching element, a software switching element, a virtual switching element, a network interface controller (NIC), or any other type of network element that can route network data. Moreover, the software or virtual switching elements may operate on a dedicated computer, or on a computer that performs non-switching operations.

The machines 155-185 send and receive network data between each other over the network. In some embodiments, the machines 155-185 are referred to as network hosts that are each assigned a network layer host addresses (e.g., IP address). Some embodiments refer to the machines 155-185 as end systems because the machines 155-185 are located at the edge of the network. In some embodiments, each of the machines 155-185 can be a desktop computer, a laptop computer, a smartphone, a virtual machine (VM) running on a computing device, a terminal, or any other type of network host.

In some embodiments, each of the network controllers 110 and 120 controls one or more managed switching elements 130-150 that are located at the edge of a network (e.g., edge switching elements or edge devices). In this example, the managed switching elements 130-150 are edge switching elements. That is, the managed switching elements 130-150 are switching elements that are located at or near the edge of the network. In some embodiments, an edge switching element is the last switching element before end machines (the machines 155-185 in this example) in a network. As indicated by dashed arrows in FIG. 1, the network controller 110 controls (i.e., manages) switching elements 130 and 140 and the network controller 120 controls switching element 150. In this application, a switching element that is controlled by a network controller of some embodiments may be referred to as a managed switching element.

In addition to controlling edge switching elements, the network controllers 110 and 120 of some embodiments also utilize and control non-edge switching elements (e.g., pool nodes, root nodes, and extenders, which are described in further detail below) that are inserted in the network to simplify and/or facilitate the operation of the managed edge switching elements. For instance, in some embodiments, the network controller 110 and 120 require the switching elements that the network controller 110 and 120 control to be interconnected in a hierarchical switching architecture that has several edge switching elements as the leaf nodes in the hierarchical switching architecture and one or more non-edge switching elements as the non-leaf nodes in this architecture. In some such embodiments, each edge switching element connects to one or more of the non-leaf switching elements, and uses such non-leaf switching elements to facilitate the communication of the edge switching element with other edge switching elements. Examples of such communications with an edge switching elements in some embodiments include (1) routing of a packet with an unknown destination address (e.g., unknown MAC address) to the non-leaf switching element so that the non-leaf switching element can route the packet to the appropriate edge switching element, (2) routing a multicast or broadcast packet to the non-leaf switching element so that the non-leaf switching element can distribute the multicast or broadcast packet to the desired destinations.

Some embodiments employ one level of non-leaf (non-edge) switching elements that connect to edge switching elements and in some cases to other non-leaf switching elements. Other embodiments, on the other hand, employ multiple levels of non-leaf switching elements, with each level of non-leaf switching elements after the first level serving as a mechanism to facilitate communication between lower level non-leaf switching elements and leaf switching elements. In some embodiments, the non-leaf switching elements are software switching elements that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switching elements are implemented, the network controllers 110 and 120 of some embodiments store switching state information regarding the leaf and non-leaf switching elements.

As mentioned above, the switching elements 130-150 of some embodiments route network data between network elements in the network. In some embodiments, the network controllers 110 and 120 configure the managed switching elements 130-150s' routing of network data between the network elements in the network. In this manner, the network controllers 110 and 120 can control the flow (i.e., specify the datapath) of network data between network elements.

For example, the network controller 110 might instruct the managed switching elements 130 and 140 to route network data from the machine 155 to the machine 170 (and vice versa) and to not route (e.g., drop) network data from other machines to the machines 155 and 170. In such case, the network controller 110 controls the flow of network data through the managed switching elements 130 and 140 such that network data transmitted to and from the machine 155 is only routed to the machine 170. Thus, the machines 155 and 170 cannot send and receive network data to and from the machines 160, 165, and 175-185.

In some embodiments, the network controllers 110 and 120 store physical network information and logical network information. The physical network information specifies the physical components in the managed network and how the physical components are physically connected one another in the managed network. For example, the physical network information may include the number of machines, managed switching elements, pool nodes, root nodes, and extenders (the latter three are described in further detail in the following sections), and how the components are physically connected to one another in the managed network. The logical network information may specify the logical connections between a set of physical components in the managed network (e.g., machines) and a mapping of the logical connections across the physical components of the managed network.

Some embodiments of the network controllers 110 and 120 implement a logical switching element across the managed switching elements 130-150 based on the physical network information and the logical switching element information described above. A logical switching element can be defined to function any number of different ways that a switching element might function. The network controllers 110 and 120 implement the defined logical switching element through control of the managed switching elements 130-150. In some embodiments, the network controllers 110 and 120 implement multiple logical switching elements across the managed switching elements 130-150. This allows multiple different logical switching elements to be implemented across the managed switching elements 130-150 without regard to the network topology of the network.

In some embodiments, a logical datapath set defines a logical switching element. A logical datapath set, in some embodiments, is a set of network datapaths through the managed switching elements 130-150 that implement the logical switching element and the logical switch's defined functionalities. In these embodiments, the network controllers 110 and 120 translate (e.g., maps) the defined logical datapath set into network configuration information for implementing the logical switching element. The network controllers 110 and 120 translate the defined logical datapath set into a corresponding set of data flows (i.e., datapaths) between network elements in the network, in some embodiments. In these instances, the network controllers 110 and 120 instruct the managed switching elements 130-150 to route network data according to the data flows and, thus, implement the functionalities of the defined logical switching element.

Different embodiments of the network controllers 110 and 120 are implemented differently. For example, some embodiments implement the network controllers 110 and 120 in software as instances of a software application. In these cases, the network controllers 110 and 120 may be executed on different types of computing devices, such as a desktop computer, a laptop computer, a smartphone, etc. In addition, the software application may be executed on a virtual machine that runs on a computing device in some embodiments. In some embodiments, the network controllers 110 and 120 are implemented in hardware (e.g., circuits).

Figure 2:
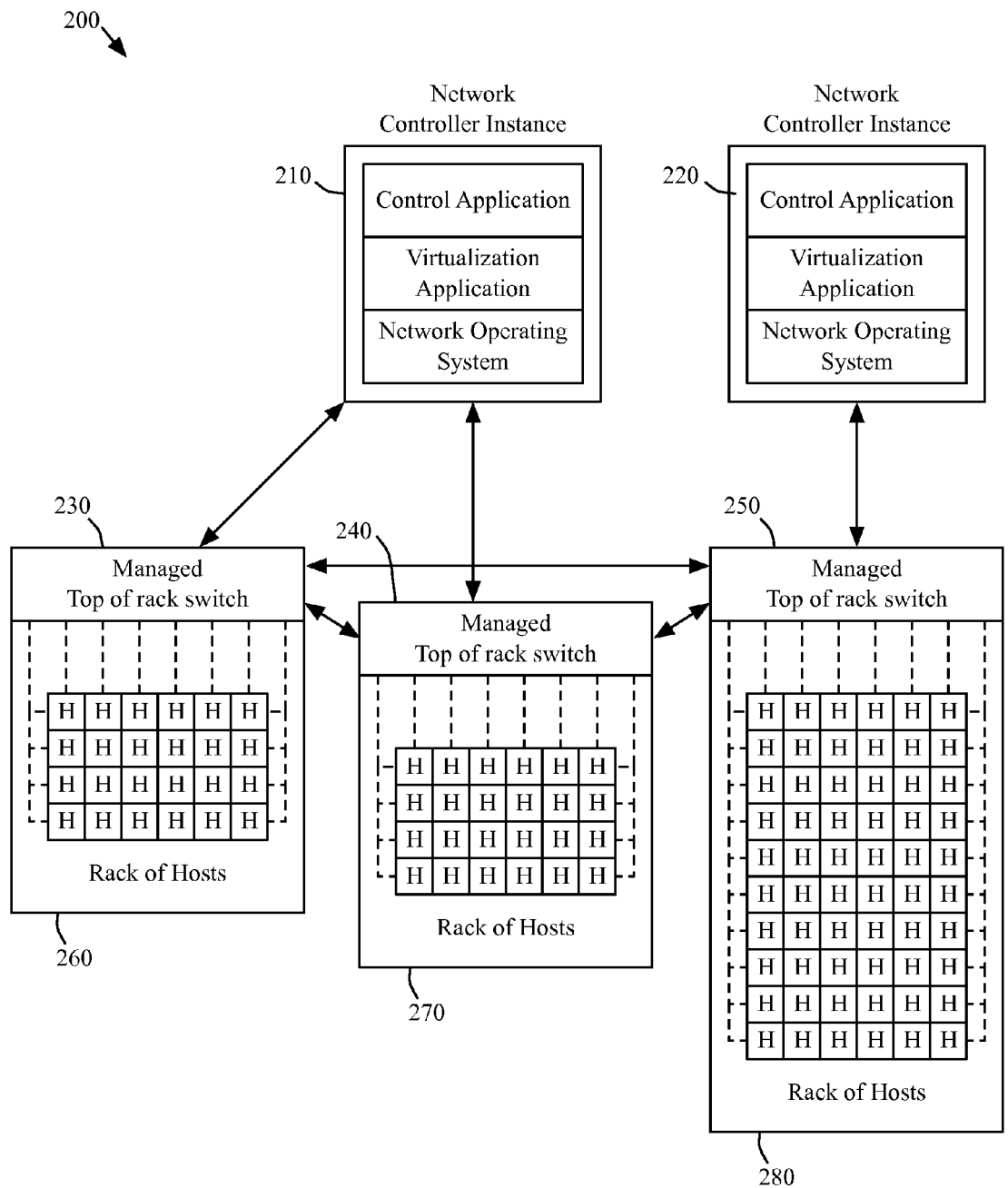
FIG. 2 conceptually illustrates a network control system of some embodiments that manages physical switching elements.

As mentioned above by reference to FIG. 1, the managed switching elements controlled by network controllers of some embodiments may be physical switching elements. FIG. 2 illustrates an example of a network control system that includes physical switching elements. This figure conceptually illustrates a network control system 200 of some embodiments for managing physical switching elements. Specifically, the network control system 200 manages network data in a data center that includes top of the rack (TOR) switching elements 230-250 and racks of hosts 260-280. Network controllers 210 and 220 manage the network by controlling the TOR switching elements 230-250.

A TOR switching element, in some embodiments, routes network data between hosts in the TOR switch's rack and network elements coupled to the TOR switching element. In the example illustrated in FIG. 2, the TOR switching element 230 routes network data between the rack of hosts 260 and TOR switching elements 240 and 250, the TOR switching element 240 routes network data between the rack of hosts 270 and TOR switching elements 230 and 250, and the TOR switching element 250 routes network data between the rack of hosts 280 and TOR switching elements 230 and 240.

As shown, each rack of hosts 260-280 includes multiple hosts. The hosts of some embodiments in the racks of hosts 260-280 are physical computing devices. In some embodiments, each host is a computing device that is assigned a network layer host address (e.g., IP address). The hosts of some embodiments send and receive network data to and from each other over the network.

As mentioned above, the network controller of some embodiments can be implemented in software as an instance of an application. As illustrated in FIG. 2, the network controllers 210 and 220 are instances of a software application. As shown, each of the network controllers 210 and 220 includes several software layers: a control application layer, a virtualization application layer, and a networking operating system layer.

In some embodiments, the control application layer receives user input that specifies a network switching element. The control application layer may receive the user input in any number of different interfaces, such as a graphical user interface (GUI), a command line interfaces, a web-based interface, a touchscreen interface, etc. In some embodiments, the user input specifies characteristics and behaviors of the network switching element, such as the number of switching element ports, access control lists (ACLs), network data forwarding, port security, or any other network switching element configuration options.

The control application layer of some embodiments defines a logical datapath set based on user input that specifies a network switching element. As noted above, a logical datapath set is a set of network datapaths through managed switching elements that are used to implement the user-specified network switching element. In other words, the logical datapath set is a logical representation of the network switching element and the network switch's specified characteristics and behaviors.

Some embodiments of the virtualization application layer translate the defined logical datapath set into network configuration information for implementing the logical network switching element across the managed switching elements in the network. For example, the virtualization application layer of some embodiments translates the defined logical datapath set into a corresponding set of data flows. In some of these cases, the virtualization application layer may take into account various factors (e.g., logical switching elements that are currently implemented across the managed switching elements, the current network topology of the network, etc.), in determining the corresponding set of data flows.

The network operating system layer of some embodiments configures the managed switching elements' routing of network data. In some embodiments, the network operating system instructs the managed switching elements to route network data according to the set of data flows determined by the virtualization application layer.

In some embodiments, the network operating system layer maintains several views of the network based on the current network topology. One view that the network operating system layer maintains is a logical view. The logical view of the network includes the different logical switching elements that are implemented across the managed switching elements, in some embodiments. Some embodiments of the network operating system layer maintain a managed view of the network. Such managed views include the different managed switching elements in the network (i.e., the switching elements in the network that the network controllers control). In some embodiments, the network operating system layer also maintains relationship data that relate the logical switching elements implemented across the managed switching elements to the managed switching elements.

While FIG. 2 (and other figures in this application) may show a set of managed switching elements managed by a network controller, some embodiments provide several network controllers (also referred to as a cluster of network controllers or a control cluster) for managing the set of managed switching elements. In other embodiments, different control clusters may manage different sets of managed switching elements. Employing a cluster of network controllers in such embodiments to manage a set of managed switches increases the scalability of the managed network and increases the redundancy and reliability of the managed network. In some embodiments, the network controllers in a control cluster share (e.g., through the network operating system layer of the network controllers) data related to the state of the managed network in order to synchronize the network controllers.

Figure 3:
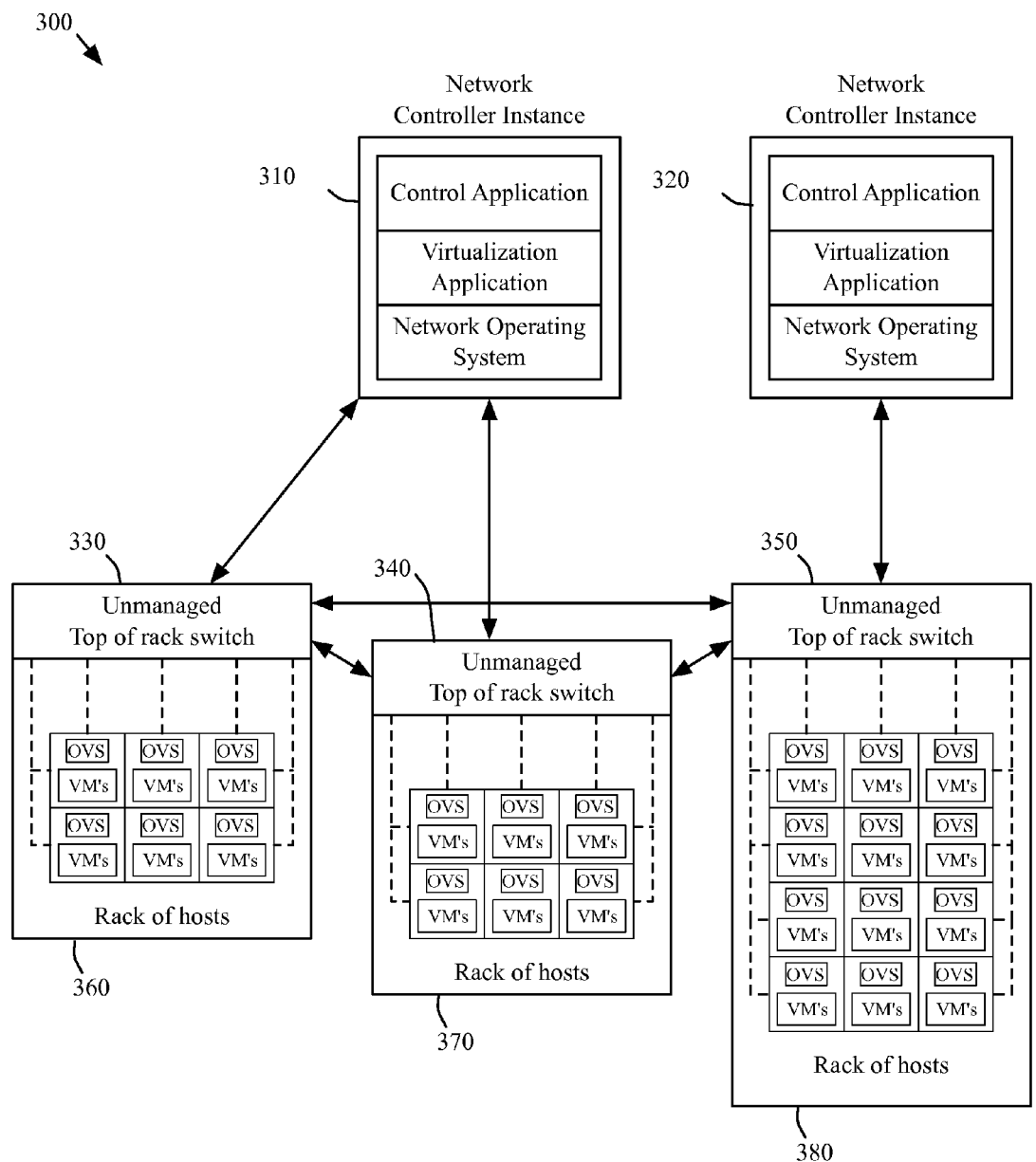
FIG. 3 conceptually illustrates a network control system of some embodiments for managing software switching elements.

FIG. 3 conceptually illustrates a network control system 300 of some embodiments for managing software switching elements. As shown, the network control system 300 includes network controllers 310 and 320, TOR switching elements 330-350, and racks of hosts 360-380.

The TOR switching elements 330-350 are similar to the TOR switching elements 230-250. The TOR switching elements 330-350 route network data between network elements in the network that are coupled to the TOR switching elements 330-350. In this example, the TOR switching element 330 routes network data between the rack of hosts 360 and TOR switching elements 340 and 350, the TOR switching element 340 routes network data between the rack of hosts 370 and TOR switching elements 330 and 350, and the TOR switching element 350 routes network data between the rack of hosts 380 and TOR switching elements 330 and 340. Since the TOR switching elements 330-350 are not managed switching elements, the network controllers 310 and 320 do not control these switching elements. Thus, the TOR switching elements 330-350 rely on the switching elements' pre-configured functionalities to route network data.

As illustrated in FIG. 3, each host in the racks of hosts 360-380 includes a software switching element (an open virtual switch (OVS) in this example) and several VMs. The VMs are virtual machines that are each assigned a set of network layer host addresses (e.g., a MAC address for network layer 2, an IP address for network layer 3, etc.) and can send and receive network data to and from other network elements over the network.

The OVSs of some embodiments route network traffic between network elements coupled to the OVSs. For example, in this example, each OVS routes network data between VMs that are running on the host on which the OVS is running, OVSs running on other hosts in the rack of hosts, and the TOR switching element of the rack.

By running a software switching element and several VMs on a host, the number of end machines or network hosts in the network may increase. Moreover, when a software switching element and several VMs are run on hosts in the racks of hosts 360-380, the network topology of the network is changed. In particular, the TOR switching elements 330-350 are no longer edge switching elements. Instead, the edge switching elements in this example are the software switching elements running on the hosts since these software switching elements are the last switching elements before end machines (i.e., VMs in this example) in the network.

The network controllers 310 and 320 perform similar functions as the network controllers 210 and 220, which described above by reference to FIG. 2, and also are for managing edge switching elements. As such, the network controllers 310 and 320 manage the OVSs that are running on the hosts in the rack of hosts 360-380.

Figure 4:
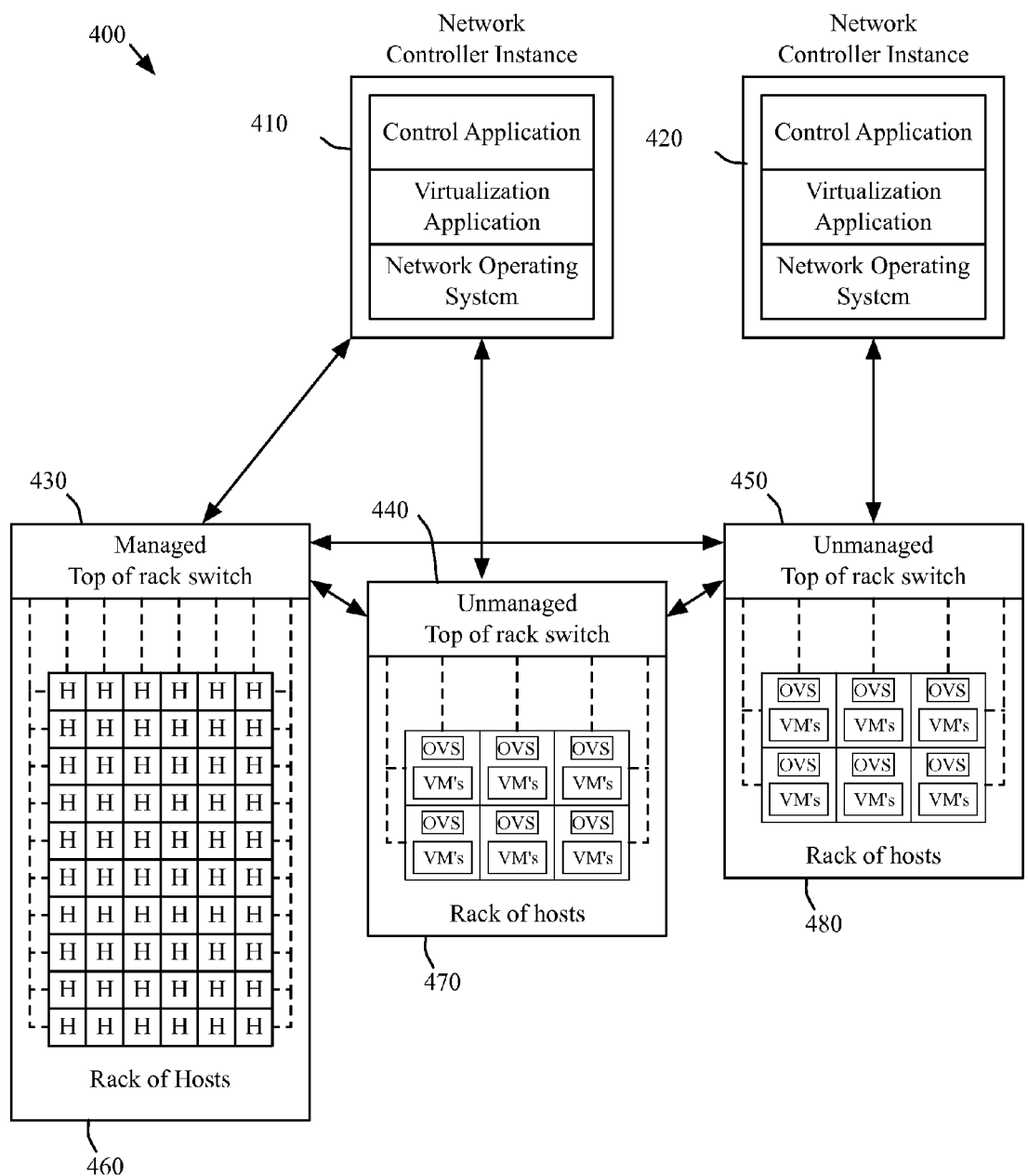
FIG. 4 conceptually illustrates a network control system of some embodiments for managing physical and software switching elements.

The above FIGS. 2 and 3 illustrate a network control system for managing physical switching elements and a network control system for managing software switching elements, respectively. However, the network control system of some embodiments can manage both physical switching elements and software switching elements. FIG. 4 illustrates an example of such a network control system. In particular, this figure conceptually illustrates a network control system 400 of some embodiments for managing TOR switching element 430 and OVSs running on hosts in the racks of hosts 470 and 480.

The network controllers 410 and 420 perform similar functions as the network controllers 210 and 220, which described above by reference to FIG. 2, and also are for managing edge switching elements. In this example, the managed switching element 430 and the OVSs running on the hosts in the racks of hosts 470 and 480 are edge switching elements because they are the last switching elements before end machines in the network. In particular, the network controller 410 manages the TOR switching element 410 and the OVSs that are running on the hosts in the rack of hosts 460, and the network controller 420 manage the OVSs that are running on the hosts in the rack of hosts 480.

Figure 5:
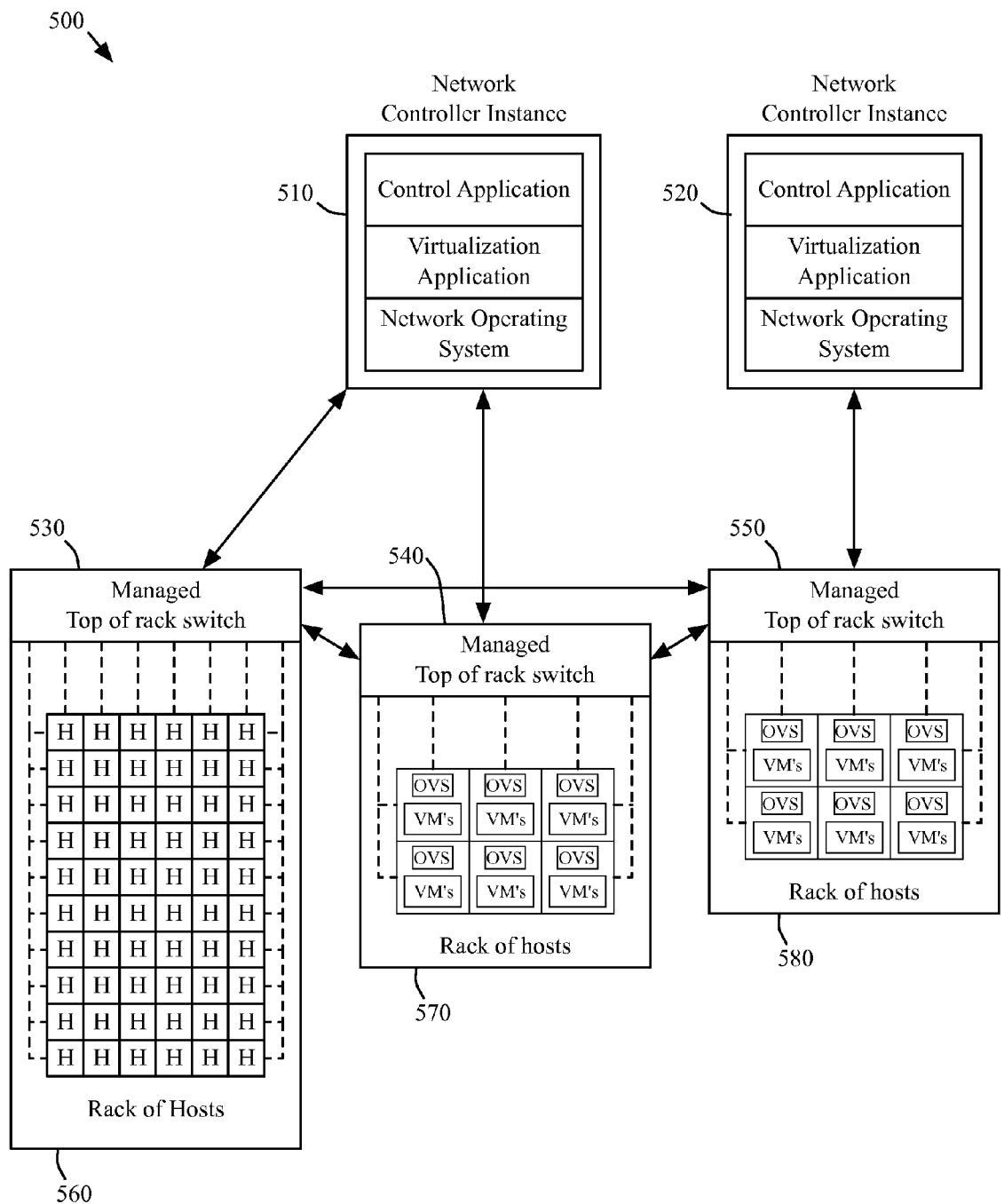
FIG. 5 conceptually illustrates a network control system of some embodiments for managing edge switching elements and non-edge switching elements.

The above figures illustrate examples of network controllers that control edge switching elements in a network. However, in some embodiments, the network controllers can control non-edge switching elements as well. FIG. 5 illustrates a network control system that includes such network controllers. In particular, FIG. 5 conceptually illustrates a network control system 500 of some embodiments for managing TOR switching elements 530-550 and OVS running on hosts in the racks of hosts 570 and 580.

As shown in FIG. 5, the network controllers 510 and 520 manage edge switching elements and non-edge switching elements. Specifically, the network controller 510 manages the TOR switching elements 530 and 540, and the OVSs running on the hosts in the rack of hosts 570. The network controller 520 manages TOR switching element 580 and the OVSs running on the hosts in the rack of hosts 580. In this example, the TOR switching element 530 and the OVSs running on the hosts in the racks of hosts 570 and 580 are edge switching elements, and the TOR switching elements 540 and 550 are non-edge switching elements. The network controllers 510 and 520 perform similar functions as the network controllers 210 and 220, which are described above by reference to FIG. 2.

II. Network Constructs

The following section describes several network constructs. Different embodiments described in this application may utilize one or more of these network constructs to facilitate some or all of the functionalities of the different embodiments.

Figure 6:
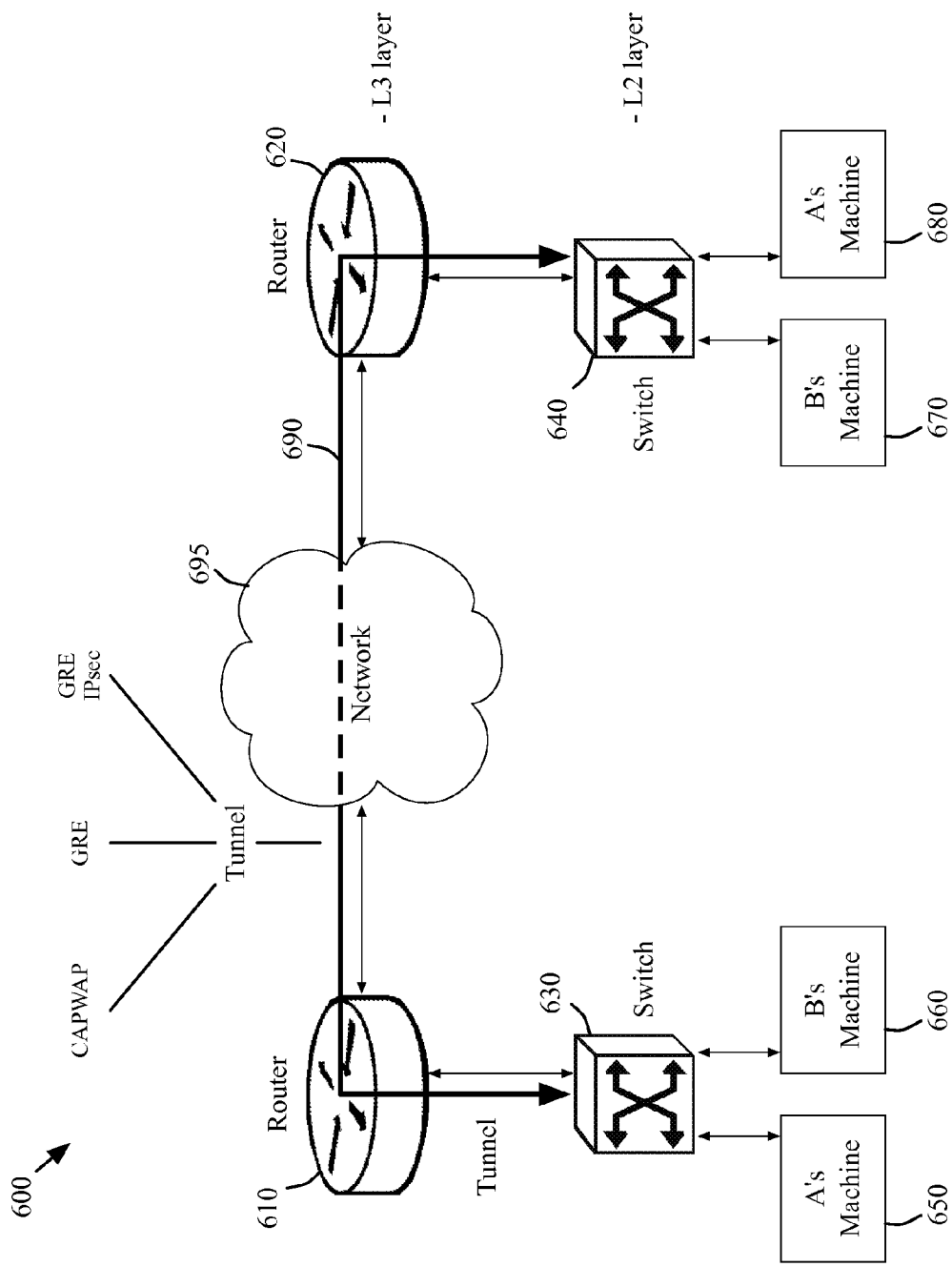
FIG. 6 conceptually illustrates an example of a tunnel provided by a tunneling protocol.

FIG. 6 conceptually illustrates an example of a tunnel provided by a tunneling protocol. As shown in FIG. 6, a network 600 includes routers 610 and 620, switching elements 630 and 640, and machines 650-680. The machines 650-680 are similar to the machines 155-185 described above.

The machines 650-680 of some embodiments are network hosts that are each assigned a set of network layer host addresses (e.g., a MAC address for network layer 2, an IP address for network layer 3, etc.). The machines 650-680 may also be referred to as end machines. Similar to the machines 155-185 described above, each of the machines 650-680 can be a desktop computer, a laptop computer, a smartphone, a virtual machine (VM) running on a computing device, a terminal, or any other type of network host. In addition, the machines 650-680 may belong to different tenants (e.g., in a data center environment). As illustrated in FIG. 6, each of the machines 650-680 belongs to either tenant A or tenant B.

The switching elements 630 and 640 are network switching elements that route (e.g., forwards) network data at the data link layer (also referred to as layer 2 or L2 layer) based on protocols such as the Ethernet protocol. The switching elements 630 and 640 may also be referred to as network bridges in some embodiments. As shown, the switching element 630 routes network data at the data link layer between the machines 650 and 660 and the router 610, and the switching element 640 routes network data at the data link layer between the machines 670 and 680 and the router 620.

To route network data at the data link layer, some embodiments of the switching elements 630 and 640 use a media access control (MAC) address of a network host's network interface card (NIC) to determine where to route network data (e.g., packets, frames, etc.). The switching elements 630 and 640 are implemented differently in different embodiments. For instance, each of the switching elements 630 and 640 can be implemented as a hardware switching element, a software switching element, a virtual switching element, some types of network interface card (NIC), or any other type of network element that can route network data at the data link layer.

Furthermore, the switching elements 630 and 640 support any number of different types of tunneling protocols in different embodiments. As shown, examples of tunneling protocols include control and provisioning of wireless access points (CAPWAP), generic route encapsulation (GRE), GRE Internet Protocol Security (IPsec), among other types of tunneling protocols.

The routers 610 and 620 are network routers that route network data at the network layer (also referred to as the layer 3 or L3 layer) based on protocols such as the Internet Protocol (IP). As illustrated in FIG. 6, the router 610 routes network data at the network layer between the router 620 and the switching element 630, and the router 620 routes network data at the network layer between the router 610 and the switching element 640.

In order to route network data at the network layer, the routers 610 and 620 of some embodiments use an IP address assigned to a network host to determine where to route network data (e.g., packets). Moreover, the routers 610 and 620 of some embodiments may provide other functions as well, such as security functions, quality of service (QoS) functions, checksum functions, flow accounting functions, or any other type of router functions.

Different embodiments of the routers 610 and 620 can be implemented differently. For example, each of the routers 610 and 620 can be implemented as a hardware router, a software router, a virtual router, or any other type of network element that can route network data at the network layer.

As mentioned above, the switching elements 630 and 640 of some embodiments can support tunneling protocols. In some embodiments, a tunneling protocol allows network data to be sent along a path between two points in a network where the tunneling protocol used by the network elements along the path in the network is different than the payload protocol used by the destination network element In some embodiments, a tunneling protocol is a network protocol (e.g., a delivery protocol) that encapsulates another protocol (e.g., a payload protocol). A tunneling protocol can be used, for example, to transmit network data over an incompatible delivery-network. For instance, in this example, a tunneling protocol may provide a tunnel over a layer 3 network through which layer 2 network data is transmitted. As such, from the perspective of the machines 650-680, the machines 650-680 are communicating over an L2 network. In other words, a tunneling protocol facilitates the communication of layer 2 network data between network hosts separated by a layer 3 network.

FIG. 6 illustrates a tunnel 690 that has been established between the switching element 630 and the switching element 640. As shown, the tunnel 690 is established over a layer 3 network 695 (e.g., the Internet). The tunnel 690 allows layer 2 network data to be transmitted between the machines 650-680 by encapsulating the layer 2 network data with a layer 3 header and transmitting the network data through the tunnel 690 that is established over the layer 3 network 695.

As shown in FIG. 6, a single tunnel 690 is established between the switching elements 630 and 640. However, in some embodiments multiple tunnels using the same or different tunneling protocols may be established between the switching elements 630 and 640. For example, the tunnel 690 shown in FIG. 6 is a bidirectional tunnel, as indicated by an arrow at each end of the tunnel 690. However, some embodiments may provide unidirectional tunnels. In such cases, a tunnel is established for each direction of communication between two points in the network. Referring to FIG. 6 as an example, when one of the machines 650 and 660 wishes to communicate with one of the machines 670 and 680, a tunnel is established that allows network data to be transmitted only from the switching element 630 to the switching element 640. Conversely, when one of the machines 670 and 680 wishes to communicate with one of the machines 650 and 660, a tunnel is established that allows network data to be transmitted from only the switching element 640 to the switching element 630.

Although FIG. 6 illustrates routers and switching elements as separate components, the functions described above for the router and switching elements may be performed by a single component in some embodiments. For instance, some embodiments combine the functions of the router 610 and the switching element 630 into one component and/or combine the functions of the router 620 and the switching element 640 into another component.

Figure 7:
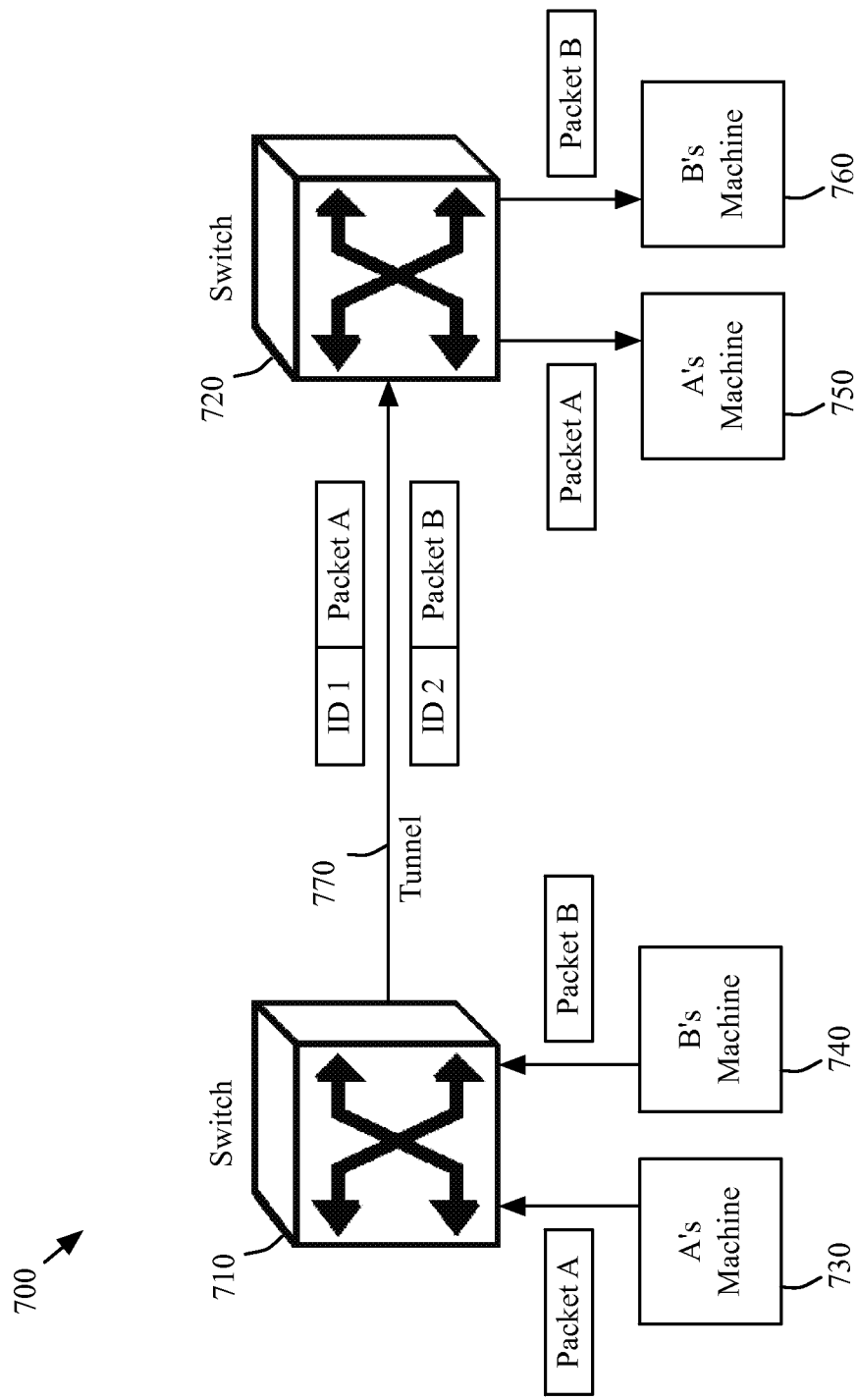
FIG. 7 illustrates the transmission of network data through a tunnel according to some embodiments of the invention.

FIG. 7 illustrates the transmission of network data through a tunnel according to some embodiments of the invention. Specifically, FIG. 7 conceptually illustrates multiplexing network data that belongs to different tenants through a tunnel 770. As shown, this figure illustrates a network 700 that includes switching elements 710 and 720 and machines 730-760. The machines 730-760 are similar to the machines 155-185 described above.

As illustrated in FIG. 7, the tunnel 770 is established between the switching element 710 and the switching element 720. For this example, the tunnel 770 is a unidirectional tunnel, as indicated by an arrow, that allows network data to be transmitted from the switching element 710 to the switching element 720. As described above, different tunneling protocols (e.g., CAPWAP, GRE, etc.) can be used to establish the tunnel 770 in different embodiments.

When transmitting network data through the tunnel 770, some embodiments include an identifier (ID) tag with the network data when the network data is transmitted through the tunnel 770. In some embodiments, an ID tag is a unique identifier for identifying a tenant to which the network data is associated. In this manner, switching elements can identify the tenant to which the network data belongs. This enables network data for different tenants to be transmitted through a single tunnel. In some embodiments, an ID tag allows machines of different tenants to have overlapping network identifiers (e.g., logical MAC addresses or logical IP addresses). For example, in a layer 2 network where some machines of different tenants each has the same MAC address, an ID tag can be used to differentiate between the machines of the different tenants and the network data directed at the different tenants. Similarly, an ID tag may be used to differentiate between machines of different tenants where some of the machines of the different tenants each has the same IP address.

The following will describe an example of transmitting network data belonging to different tenants that have overlapping network identifiers through a single tunnel by reference to FIG. 7. In this example, an ID tag "ID 1" is associated with tenant A and an ID tag "ID 2" is associated with tenant B. As such, the switching elements 710 and 720 are configured with this ID tag information (e.g., stored in a lookup table). In addition, tenant A's machines and tenant B's machines have overlapping network identifiers (e.g., they have the same MAC addresses or are use the same private IP address space).

When the machine 730 sends packet A to machine 750, the packet A is transmitted to the switching element 710. When the switching element 710 receives the packet A, the switching element 710 determines that the packet A originated from a machine that belongs to tenant A (e.g., based on the packet A's source MAC address and/or the port through which the packet A is received). Then, the switching element 710 identifies the ID tag (e.g., by performing a lookup on a lookup table) that is associated with tenant A (ID 1 in this example) and includes the ID tag in the packet A before the packet is transmitted to the switching element 720 through the tunnel 770. Since tenant A's machine (machine 750) and tenant B's machine (machine 760) have overlapping network identifiers (e.g., the machine 750 and 760 each has the same MAC address or use the same private IP address space), the switching element 720 would not be able to differentiate between tenant A's machines and tenant B's machines based only on the machines' network identifiers. However, the ID tag allows the switching element 720 to differentiate between tenant A's machines and tenant B's machines. Therefore, when the switching element 720 receives the packet A from the switching element 710 through the tunnel 770, the switching element 720 examines the ID tag included in the packet A and determines the tenant to which the packet A belongs (e.g., by performing a lookup on a lookup table). After determining the tenant to which the packet A belongs, the switching element 720 removes the ID tag from the packet A and transmits to the packet A to the machine 750, the intended recipient of the packet A in this example.

When the machine 740 sends packet B to machine 760, the switching elements 710 and 720 perform similar functions as those performed for the packet A described above. That is, the switching element 710 determines the tenant to which the packet B belongs, identifies the ID tag associated with the tenant, and includes the ID tag in the packet B. Then, the switching element 710 transmits the packet B to the switching element 720 through the tunnel 770. When the switching element 720 receives the packet B from the switching element 710 through the tunnel 770, the switching element 720 determines the tenant to which the packet B belongs by examining the ID tag included in the packet, removes the ID tag from the packet B, and transmits the packet B to the machine 760. As explained, the ID tag allows network data for tenants A's machines and tenant B's machines, which have overlapping network identifiers, to be transmitted through a single tunnel 770.

As mentioned above, the managed switching elements of some embodiments can be configured to route network data based on different routing criteria. In this manner, the flow of network data through switching elements in a network can be controlled in order to implement multiple logical switching elements across the switching elements.

Figure 8:
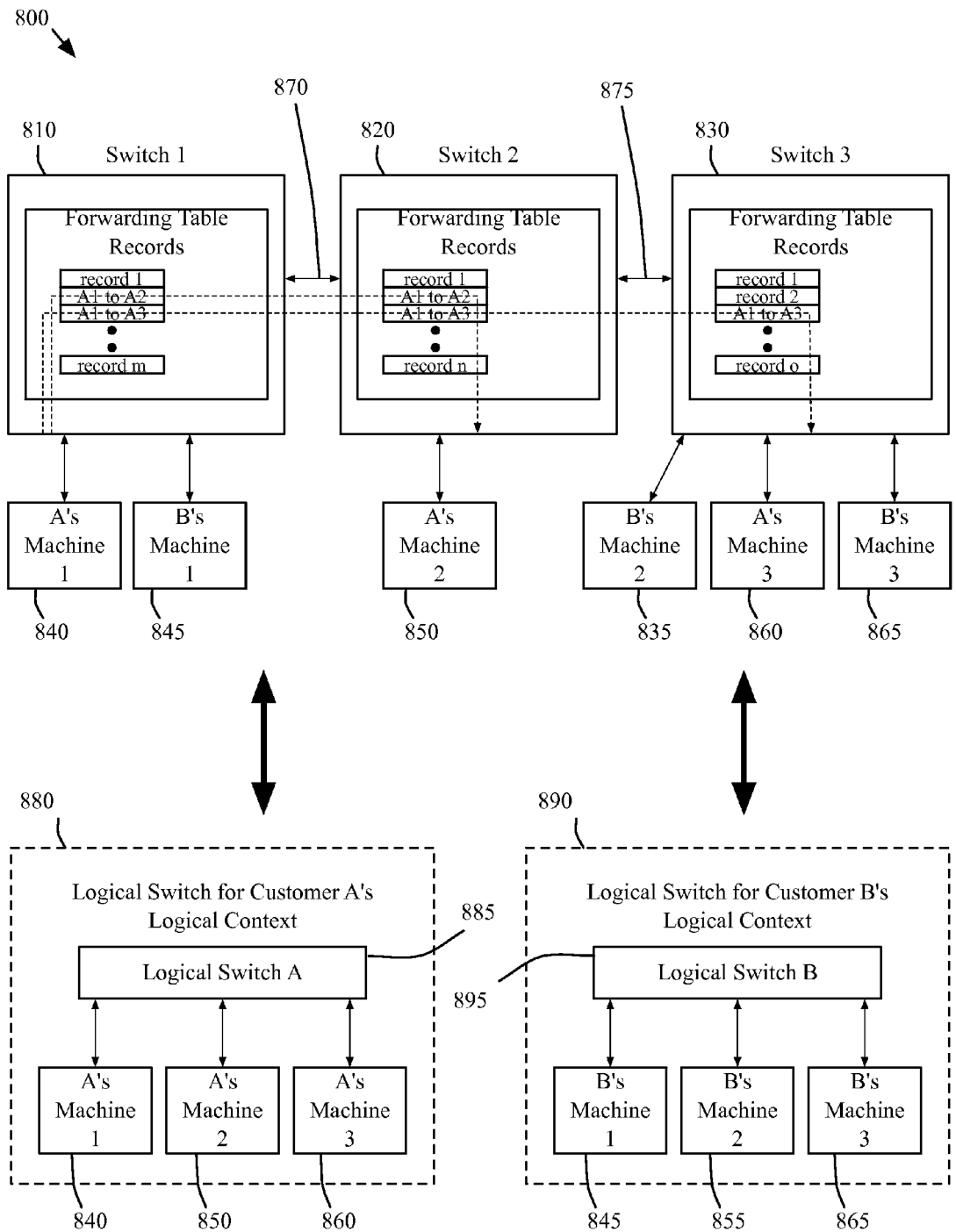
FIG. 8 illustrates an example of multiple logical switching elements implemented across a set of switching elements.

FIG. 8 illustrates an example of multiple logical switching elements implemented across a set of switching elements. In particular, FIG. 8 conceptually illustrates logical switching elements 870 and 880 implemented across switching elements 810-830. As shown in FIG. 8, a network 800 includes switching elements 810-830 and machines 840-865. The machines 840-865 are similar to the machines 155-185 described above. As indicated in this figure, the machines 840, 850, and 860 belong to tenant A and the machines 845, 855, and 865 belong to tenant B.

The switching elements 810-830 of some embodiments route network data (e.g., packets, frames, etc.) between network elements in the network that are coupled to the switching elements 810-830. As shown, the switching element 810 routes network data between the machines 840 and 845 and the switching element 820. Similarly, the switching element 810 routes network data between the machine 850 and the switching elements 810 and 820, and the switching element 830 routes network data between the machines 855-865 and the switching element 820.

Moreover, each of the switching elements 810-830 routes network data based on the switch's forwarding tables. In some embodiments, a forwarding table determines where to route network data (e.g., a port on the switch) according to routing criteria. For instance, a forwarding table of a layer 2 switching element may determine where to route network data based on MAC addresses (e.g., source MAC address and/or destination MAC address). As another example, a forwarding table of a layer 3 switching element may determine where to route network data based on IP addresses (e.g., source IP address and/or destination IP address). Many other types of routing criteria are possible.

As shown in FIG. 8, the forwarding table in each of the switching elements 810-830 includes several records. In some embodiments, each of the records specifies operations for routing network data based on routing criteria. The records may be referred to as flow entries in some embodiments as the records control the "flow" of data through the switching elements 810-830.

FIG. 8 also illustrates conceptual representations of each tenant's logical network. As shown, the logical network 880 of tenant A includes a logical switching element 885 to which tenant A's machines 840, 850, and 860 are coupled. Tenant B's logical network 890 includes a logical switching element 895 to which tenant B's machines 845, 855, and 865 are coupled. As such, from the perspective of tenant A, tenant A has a switching element to which only tenant A's machines are coupled, and, from the perspective of tenant B, tenant B has a switching element to which only tenant B's machines are coupled. In other words, to each tenant, the tenant has its own network that includes only the tenant's machines.

The following will describe the conceptual flow entries for implementing the flow of network data originating from the machine 840 and destined for the machine 850 and originating from the machine 840 and destined for the machine 860. First, the flow entries for routing network data originating from the machine 840 and destined for the machine 850 will be described followed by the flow entries for routing network data originating from the machine 840 and destined for the machine 860.

The flow entry "A1 to A2" in the switching element 810's forwarding table instructs the switching element 810 to route network data that originates from machine 810 and is destined for the machine 850 to the switching element 820. The flow entry "A1 to A2" in the forwarding table of the switching element 820 instructs the switching element 820 to route network data that originates from machine 810 and is destined for the machine 850 to the machine 850. Therefore, when the machine 840 sends network data that is destined for the machine 850, the switching elements 810 and 820 route the network data along datapath 870 based on the corresponding records in the switching elements' forwarding tables.

Furthermore, the flow entry "A1 to A3" in the switching element 810's forwarding table instructs the switching element 810 to route network data that originates from machine 810 and is destined for the machine 850 to the switching element 820. The flow entry "A1 to A3" in the forwarding table of the switching element 820 instructs the switching element 820 to route network data that originates from machine 810 and is destined for the machine 860 to the switching element 830. The flow entry "A1 to A3" in the forwarding table of the switching element 830 instructs the switching element 830 to route network data that originates from machine 810 and is destined for the machine 860 to the machine 860. Thus, when the machine 840 sends network data that is destined for the machine 860, the switching elements 810-830 route the network data along datapath 875 based on the corresponding records in the switching elements' forwarding tables.

While conceptual flow entries for routing network data originating from the machine 840 and destined for the machine 850 and originating from the machine 840 and destined for the machine 860 are described above, similar flow entries would be included in the forwarding tables of the switching elements 810-830 for routing network data between other machines in tenant A's logical network 880. Moreover, similar flow entries would be included in the forwarding tables of the switching elements 810-830 for routing network data between the machines in tenant B's logical network 890.

In some embodiments, tunnels provided by tunneling protocols described above may be used to facilitate the implementation of the logical switching elements 885 and 895 across the switching elements 810-830. The tunnels may be viewed as the "logical wires" that connect machines in the network in order to implement the logical switching elements 880 and 890. In some embodiments, unidirectional tunnels are used. For instance, a unidirectional tunnel between the switching element 810 and the switching element 820 may be established and through which network data originating from the machine 840 and destined for the machine 850 is transmitted. Similarly, a unidirectional tunnel between the switching element 810 and the switching element 830 may be established and through which network data originating from the machine 840 and destined for the machine 860 is transmitted. In some embodiments, a unidirectional tunnel is established for each direction of network data flow between two machines in the network.

Alternatively, or in conjunction with unidirectional tunnels, bidirectional tunnels can be used in some embodiments. For instance, in some of these embodiments, only one bidirectional tunnel is established between two switching elements. Referring to FIG. 8 as an example, a tunnel would be established between the switching elements 810 and 820, a tunnel would be established between the switching elements 820 and 830, and a tunnel would be established between the switching elements 810 and 830. In some embodiments, ID tags are utilized to distinguish between the network data of different tenants (e.g., tenants A and B in FIG. 8), as described above by reference to FIG. 7.

Configuring the switching elements in the various ways described above to implement multiple logical switching elements across a set of switching elements allows multiple tenants, from the perspective of each tenant, to each have a separate network and/or switching element while the tenants are in fact sharing some or all of the same set of switching elements and/or connections between the set of switching elements (e.g., tunnels, physical wires).

Figure 9:
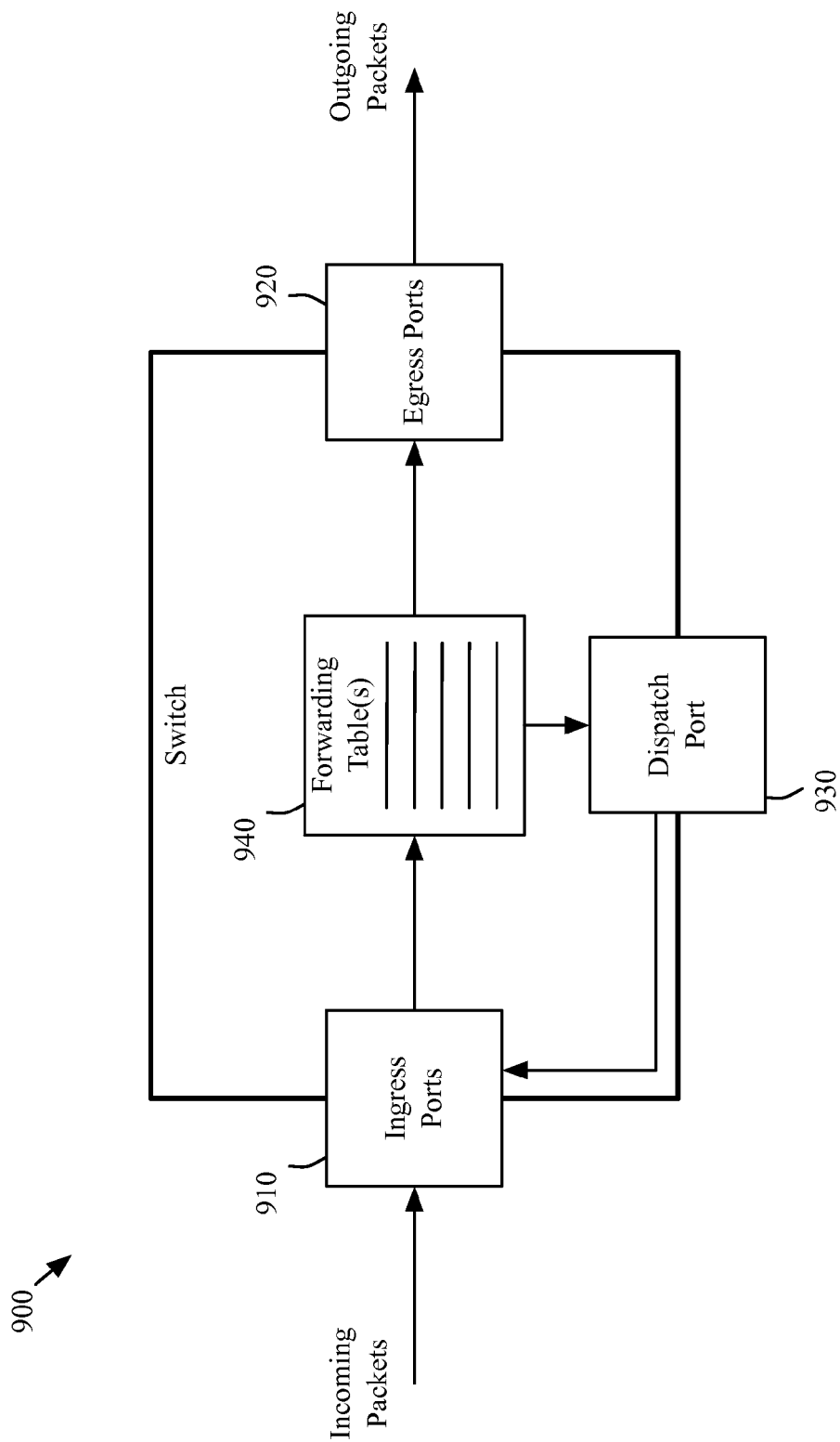
FIG. 9 conceptually illustrates a block diagram of a switching element of some embodiments.

FIG. 9 conceptually illustrates a block diagram of a switching element 900 of some embodiments. Many of the switching elements illustrated in the figures throughout this application may be the same or similar to the switching element 900 as described below. As illustrated in this figure, the switching element 900 includes ingress ports 910, egress ports 920, dispatch port 930, and a forwarding table 940.

The ingress ports 910 conceptually represent a set of ports through which the switching element 900 receives network data. The ingress ports 910 may include different amounts of ingress ports in different embodiments. As shown, the ingress ports 910 can receive network data that is external to the switching element 900, which is indicated as incoming packets in this example. The ingress ports 910 can also receive network data (e.g., packets) within the switching element 900 from the dispatch port 930. When the ingress ports 910 receive network data, the ingress ports 910 forwards the network data to the forwarding tables 940.

The forwarding tables 940 conceptually represent a set of forwarding tables for routing and modifying network data received from the ingress ports 910. In some embodiments, the forwarding tables 940 include a set of records (or rules) that instruct the switching element 900 to route and/or modify network data and send the network data to the egress ports 920 and/or the dispatch port 930 based on defined routing criteria. As noted above, examples of routing criteria include source media access control (MAC) address, destination MAC, packet type, source Internet Protocol (IP) address, destination IP address, source port, destination port, and/or virtual local area network (VLAN) identifier, among other routing criteria. In some embodiments, the switching element 900 routes network data to a particular egress port according to the routing criteria.

The egress ports 920 conceptually represent a set of ports through which the switching element 900 sends network data out of the switching element 900. The egress ports 920 may include different amounts of egress ports in different embodiments. In some embodiments, some or all of the egress ports 920 may overlap with some or all of the ingress ports 910. For instance, in some such embodiments, the set of ports of the egress ports 920 is the same set of ports as the set of ports of ingress ports 910. As illustrated in FIG. 9, the egress ports 920 receive network data after the switching element 900 processes the network data based on the forwarding tables 940. When the egress ports 910 receive network data (e.g., packets), the switching element 900 sends the network data out of the egress ports 920, which is indicated as outgoing packets in this example, based on the routing criteria in the forwarding tables 940.

In some embodiments, the dispatch port 930 allows packets to be reprocessed by the forwarding tables 940. In some cases, the forwarding tables 940 are implemented as a single table (e.g., due to the switching element 900s hardware and/or software limitations). However, some embodiments of the forwarding tables 940 may logically need more than one table. Therefore, in order to implement multiple forwarding tables in a single table, the dispatch port 930 may be used. For example, when the forwarding tables 940 processes a packet, the packet may be tagged (e.g., modifying a context tag of the packet or a header field of the packet) and sent to the dispatch port 930 for the forwarding tables 940 to process again. Based on the tag, the forwarding tables 940 processes the packet using a different set of records. So logically, a different forwarding table is processing the packet.

The dispatch port 930 receives after the switching element 900 processes the network data according to the forwarding tables 940. As noted above, the switching element 900 might route the network data to the dispatch port 930 according to routing criteria defined the forwarding tables 940. When the dispatch port 930 receives network data, the dispatch port 930 sends the network data to the ingress ports 910 to be further processed by the forwarding tables 940. For example, the switching element 900 might modify the network data based on the forwarding tables 940 and send the modified network data to the dispatch port 930 for further processing by the forwarding tables 940.

Figure 10:
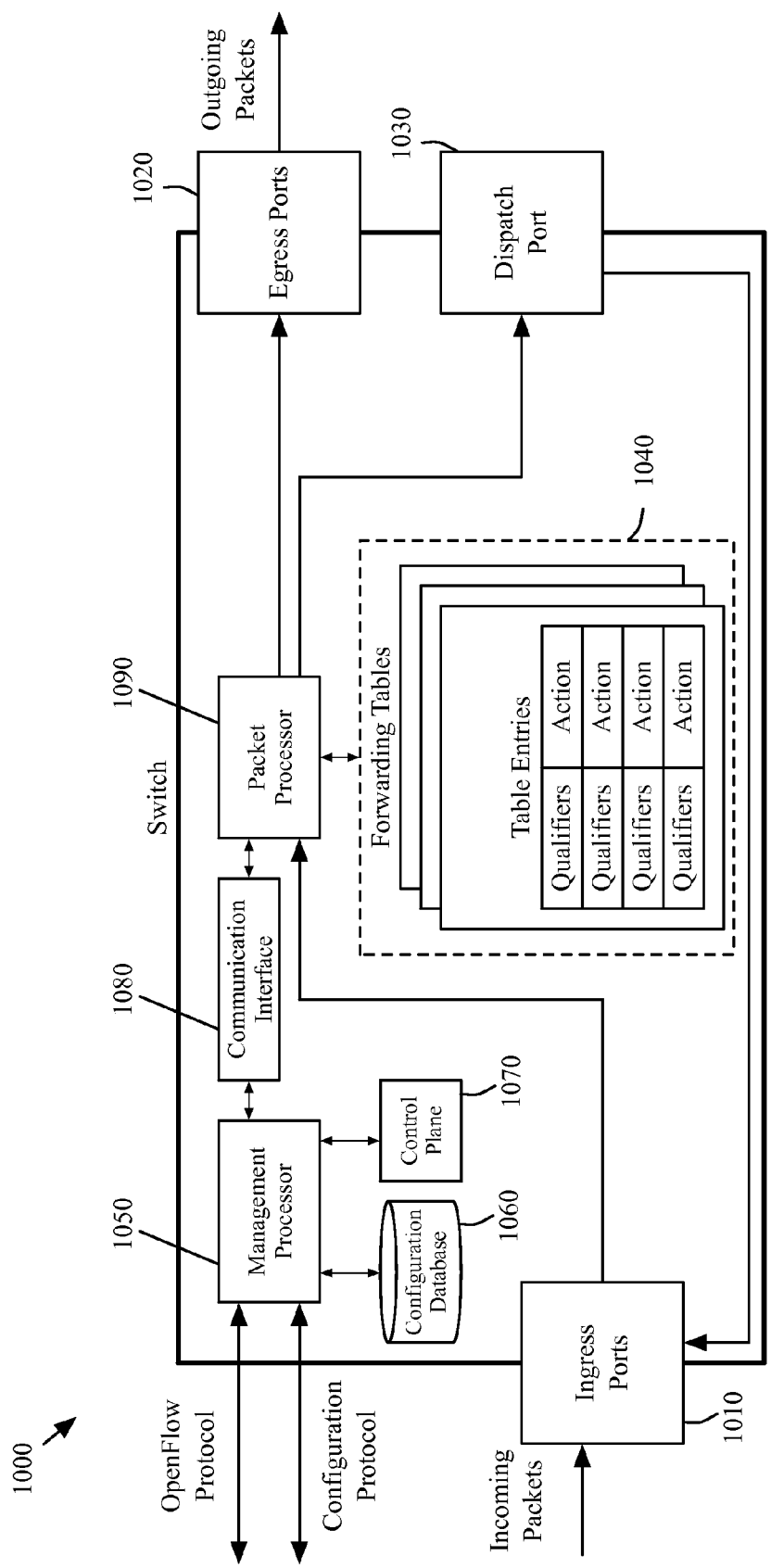
FIG. 10 conceptually illustrates an architectural diagram of a hardware switching element of some embodiments.

FIG. 10 conceptually illustrates an architectural diagram of a hardware switching element 1000 of some embodiments. As illustrated in this figure, the switching element 1000 includes ingress ports 1010, egress ports 1020, dispatch port 1030, forwarding tables 1040, management processor 1050, configuration database 1060, control plane 1070, communication interface 1080, and packet processor 1090.

The ingress ports 1010 are similar to the ingress ports 910 illustrated in FIG. 9 except the ingress ports 1010 send network data to the packet processor 1090 instead of forwarding tables. The egress ports 1020 are similar to the ingress ports 1020 illustrated in FIG. 07 except the egress ports 1020 receive network data from the packet processor 1090 instead of forwarding tables. Similarly, the dispatch port 1030 is similar to the dispatch port 930 of FIG. 9 except the dispatch port 1030 receives network data from the packet processor 1090 instead of forwarding tables.

The management processor 1050 controls the operations and functions of the switching element 1000. As shown in FIG. 10, the management processor 1050 of some embodiments receives commands for controlling the switching element 1000 through a switching control protocol. One example of a switching control protocol is the Openflow protocol. The Openflow protocol, in some embodiments, is a communication protocol for controlling the forwarding plane (e.g., forwarding tables) of a switching element. For instance, the Openflow protocol provides commands for adding flow entries to, removing flow entries from, and modifying flow entries in the switching element 1000.

The management processor 1050 also receives configuration information through a configuration protocol. When the management processor 1050 receives configuration information, the management processor 1050 sends the configuration information to the configuration database 1060 for the configuration database 1060 to store. In some embodiments, configuration information includes information for configuring the switching element 1000, such as information for configuring ingress ports, egress ports, QoS configurations for ports, etc.

When the management processor 1050 of some embodiments receives switching control commands and the configuration commands, the management processor 1050 translates such commands into equivalent commands for configuring the switching element 1000 to implement the functionalities of the commands. For instance, when the management processor 1050 receives a command to add a flow entry, the management processor 1050 translates the flow entry into equivalent commands that configure the switching element 1000 to perform functions equivalent to the flow entry. In some embodiments, the management processor 1050 might request configuration information from the configuration database 1060 in order to perform translation operations.

Some embodiments of the management processor 1050 are implemented as electronic circuitry while other embodiments of the management processor 1050 are implemented as an embedded central processing unit (CPU) that executes switching element management software (e.g., OVS) that performs some or all of the functions described above.

The configuration database 1060 of some embodiments stores configuration information that the configuration database 1060 receives from the management processor 1050. In addition, when the management processor 1050 sends requests for configuration information to the configuration database 1060, the configuration database 1060 retrieves the appropriate configuration information and sends the requested configuration information to the management processor 1050.

In some embodiments, the control plane 1070 stores a set of flow tables that each includes a set of flow entries (also referred to collectively as configured flow entries). The control plane 1070 of some embodiments receives flow entries from the management processor 1050 to add to the set of flow tables, and receives requests from the management processor 1050 to remove and modify flow entries in the set of flow tables. In addition, some embodiments of the control plane 1070 might receive requests from the management processor 1050 for flow tables and/or flow entries. In such instances, the control plane 1070 retrieves the requested flow tables and/or flow entries and sends the flow tables and/or flow entries to the management processor 1050.

In addition, the control plane 1070 of some embodiments stores different flow tables and/or flow entries that serve different purposes. For instance, as mentioned above, a switching element may be one of several switching elements in a network across which multiple logical switching elements are implemented. In some such embodiments, the control plane 1070 stores flow tables and/or flow entries for operating in the physical domain (i.e., physical context) and stores flow tables and/or flow entries for operating in the logical domain (i.e., logical context). In other words, the control plane 1070 of these embodiments stores flow tables and/or flow entries for processing network data (e.g., packets) through logical switching elements and flow tables and/or flow entries for processing network the data through physical switching elements in order to implement the logical switching elements. In this manner, the control plane 1070 allows the switching element 1000 to facilitate implementing logical switching elements across the switching element 1000 (and other switching elements in the managed network).

In some embodiments, the flow tables and/or flow entries for operating in the physical domain process packets based on a set of fields in the packets' header (e.g., source MAC address, destination MAC address, source IP address, destination IP address, source port number, destination port number) and the flow tables and/or flow entries for operating in the logical domain process packets based on the packets' logical context ID (e.g., as described above by reference to FIG. 8) or a logical context tag (e.g., as described below by reference to FIGS. 14, 15, 40, 41, and 44).

Some embodiments of the communication interface 1080 facilitate communication between management processor 1050 and packet processor 1090. For instance, when the communication interface 1080 receives messages (e.g., commands) from the management processor 1050, the communication interface 1080 forwards the messages to the packet processor 1090 and when the communication interface 1080 receives messages from the packet processor 1090, the communication interface 1080 forwards the messages to the management processor 1050. In some embodiments, the communication interface 1080 translates the messages such that the recipient of the message can understand the message before sending the message to the recipient. The communication interface 1080 can be implemented as a peripheral component interconnect (PCI) or PCI express bus in some embodiments. However, the communication interface 1080 may be implemented as other types of busses in other embodiments.

In some embodiments, the forwarding tables 1040 store active flow tables and/or flow entries that are used to determine operations for routing or modifying network data (e.g., packets). In some embodiments, active tables and/or flow entries are a subset of the flow tables and/or entries stored in the control plane 1070 that the forwarding tables 1040 is currently using or was recently using to process and route network data.

In this example, each flow entry is includes a qualifier and an action. The qualifier defines a set of fields to match against the network data. Examples of fields for matching network data include ingress port, source MAC address, destination MAC address, Ethernet type, VLAN ID, VLAN priority, multiprotocol label switching (MPLS) label, MPLS traffic class, source IP address, destination IP address, transport control protocol (TCP)/user datagram protocol (UDP)/stream control transmission protocol (SCTP) source port, and/or TCP/UDP/SCTP destination port. Other types of packet header fields are possible as well in other embodiments. The action of a flow entry defines operations for processing the network data when the network data matches the qualifier of the flow entry. Examples of actions include modify the network data and route the network data to a particular port or ports. Other embodiments provide additional and/or other actions to apply to the network data.

In some embodiments, the packet processor 1090 processes network data (e.g., packets) that the packet processor 1090 receives from the ingress ports 1010. Specifically, the packet processor 1090 processes (e.g., route, modify, etc.) the network data based on flow entries in the forwarding tables 1040. In order to process the network data, the packet processor 1090 accesses the flow entries in the forwarding tables 1040. As mentioned above, the forwarding tables 1040 include a subset of flow tables and/or flow entries stored in the control plane 1070. When the packet processor 1090 needs a flow table and/or flow entries that is not in the forwarding tables 1040, the packet processor 1090 requests the desired flow table and/or flow entries, which are stored in the control plane 1070, from the management processor 1050 through the communication interface 1080.

Based on the flow entries in the forwarding tables 1040, the packet processor 1090 sends the network data to one or more ports of the egress ports 1020 or the dispatch port 1030. In some embodiments, the network data may match multiple flow entries in the forwarding tables 1040. In such cases, the packet processor 1090 might process the network data based on the first flow entry that has a qualifier that matches the network data.

In some embodiments, the packet processor 1090 is an application-specific integrated circuit (ASIC) that performs some or all of the functions described above. In other embodiments, the packet processor 1090 is an embedded CPU that executes packet processing software that performs some or all of the functions described above.

Different embodiments of the switching element 1000 may implement the packet processor 1090 and forwarding tables 1040 differently. For instance, in some embodiments, the packet processor 1090 and forwarding tables 1040 are implemented as a multi-stage processing pipeline. In these embodiments, each flow entry in the forwarding tables 1040 are implemented as one or more operations along one or more stages of the multi-stage packet processing pipeline. As explained above, the management processor 1050 of some embodiments translates flow entries into equivalent commands that configure the switching element 1000 to perform functions equivalent to the flow entry. Accordingly, the management processor 1050 would configure the multi-stage packet processing pipeline to perform the functions equivalent to the flow entries in the forwarding tables.

Figure 11:
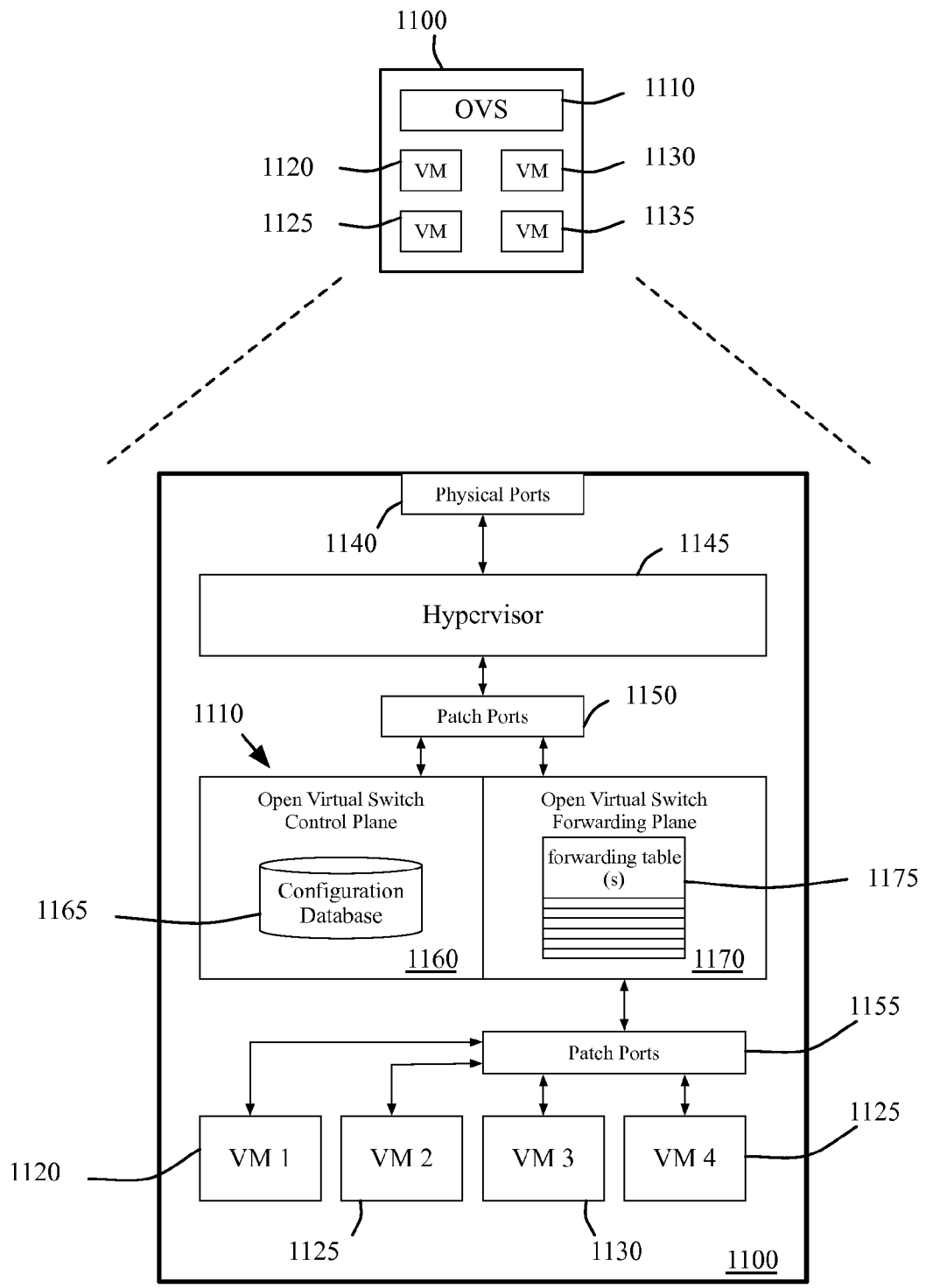
FIG. 11 conceptually illustrates an architectural diagram of a computing device that includes a software switching element of some embodiments.

FIG. 11 conceptually illustrates an architectural diagram of a physical host 1100 that includes a software switching element 1110 (e.g., an OVS) of some embodiments. The top portion of FIG. 11 illustrates the physical host 1100, which includes the software switching element 1110 and four VMs 1120-1135. In some embodiments, the physical host 1100 is the same or similar as the hosts that are running software switching elements in FIGS. 3-5. Different embodiments of the physical host 1100 can be a desktop computer, a server computer, a laptop, or any other type of computing device. The bottom portion of FIG. 11 illustrates the physical host 1100 in more detail. As shown, the physical host 1100 includes physical ports 1140, a hypervisor 1145, patch ports 1150, the software switching element 1110, patch ports 1155, and the VMs 1120-1135.

In some embodiments, the physical ports 1140 of the physical host 1100 are a set of network interface controllers (NICs) that are for receiving network data and sending network data outside the physical host 1100. In some embodiments, the physical ports 1140 are a set of wireless NICs. The physical ports 1140 of other embodiments are a combination of NICs and wireless NICs.

The hypervisor 1145 (also referred to as a virtual machine monitor (VMM)) of some embodiments is a virtualization application that manages multiple operating systems (e.g., VMs) on the physical host 1100. That is, the hypervisor 1145 provides a virtualization layer in which other operating systems can run with the appearance of full access to the underlying system hardware (not shown) of the physical host 1100 except such access is actually under the control of the hypervisor 1145. In this example, the hypervisor 1145 manages the VMs 1120-1135 running on the physical host 1100.

In some embodiments, the hypervisor 245 manages system resources, such as memory, processors (or processing units), persistent storage, or any other type of system resource, for each of the operating systems that the hypervisor 1145 manages. For this example, the hypervisor 1145 manages the physical ports 1140, the network resources of the physical host 1100. In particular, the hypervisor 1145 manages and controls network data flowing through the physical ports 1140 and the patch ports 1150 by, for example, mapping each port of the patch ports 1150 to a corresponding port of the physical ports 1140.

Different embodiments use different hypervisors. In some embodiments, the hypervisor 1145 is a Xen hypervisor is used while, in other embodiments, the hypervisor 1145 is a VMware hypervisor. Other hypervisors can be used in other embodiments.

The patch ports 1150 are a set of virtual ports (e.g., virtual network interfaces (VIFs)). To the software switching element 1110 and the hypervisor 1145, the patch ports 1150 appear and behave similar to physical ports on a hardware switching element. For instance, the software switching element 1110 and the hypervisor 1145 may send and receive network data through the patch ports 1150. In some embodiments, the patch ports 1150 are provided by the hypervisor 1145 to the software switching element 1110 while, in other embodiments, the patch ports 1150 are provided by the software switching element 1110 to the hypervisor 1145.

The patch ports 1155 are a set of virtual ports that are similar to the patch ports 250. That is, to the software switching element 1110 and the VMs 1120-1135, the patch ports 1155 appear and behave similar to physical ports on a hardware switching element. As such, the software switching element 1110 and the VMs 1120-1135 may send and receive network data through the patch ports 1155. In some embodiments, the patch ports 1155 are provided by the software switching element 1110 to the VMs 1120-1135 while, in other embodiments, the patch ports 1155 are provided by the VMs 1120-1135 to the software switching element 1110.

As shown, the software switching element 1110 includes a control plane 1160, a configuration database 1165, a forwarding plane 1170, and forwarding tables 1175. The control plane 1160 of some embodiments is similar to the control plane 1070 of FIG. 10 in that the control plane 1160 also stores configured flow entries (i.e., a set of flow tables that each includes a set of flow entries). Also, the configuration database 1165 is similar to the configuration database 1060 of FIG. 10. That is, the configuration database 1165 stores configuration information for configuring the software switching element 1110. (e.g., information for configuring ingress ports, egress ports, QoS configurations for ports, etc.)

In some embodiments, the forwarding plane 1170 and the forwarding tables 1175 performs functions similar to ones performed by packet processor 1090 and the forwarding tables 1040 described above by reference to FIG. 10. The forwarding plane 1170 of some embodiments processes network data (e.g., packets) that the forwarding plane 1170 receives from the patch ports 1150 and the patch ports 1155. In some embodiments, the forwarding plane 1170 processes the network data by accessing the flow entries in the forwarding tables 1175. When the forwarding plane 1170 needs a flow table and/or flow entries that is not in the forwarding tables 1175, the forwarding plane 1170 of some embodiments requests the desired flow table and/or flow entries from the control plane 1070.

Based on the flow entries in the forwarding tables 1175, the forwarding plane 1170 sends the network data to one or more ports of the patch ports 1150 and/or one or more ports of the patch ports 1155. In some embodiments, the network data may match multiple flow entries in the forwarding tables 1175. In these instances, the forwarding plane 1170 might process the network data based on the first flow entry that has a qualifier that matches the network data.

Figure 12:
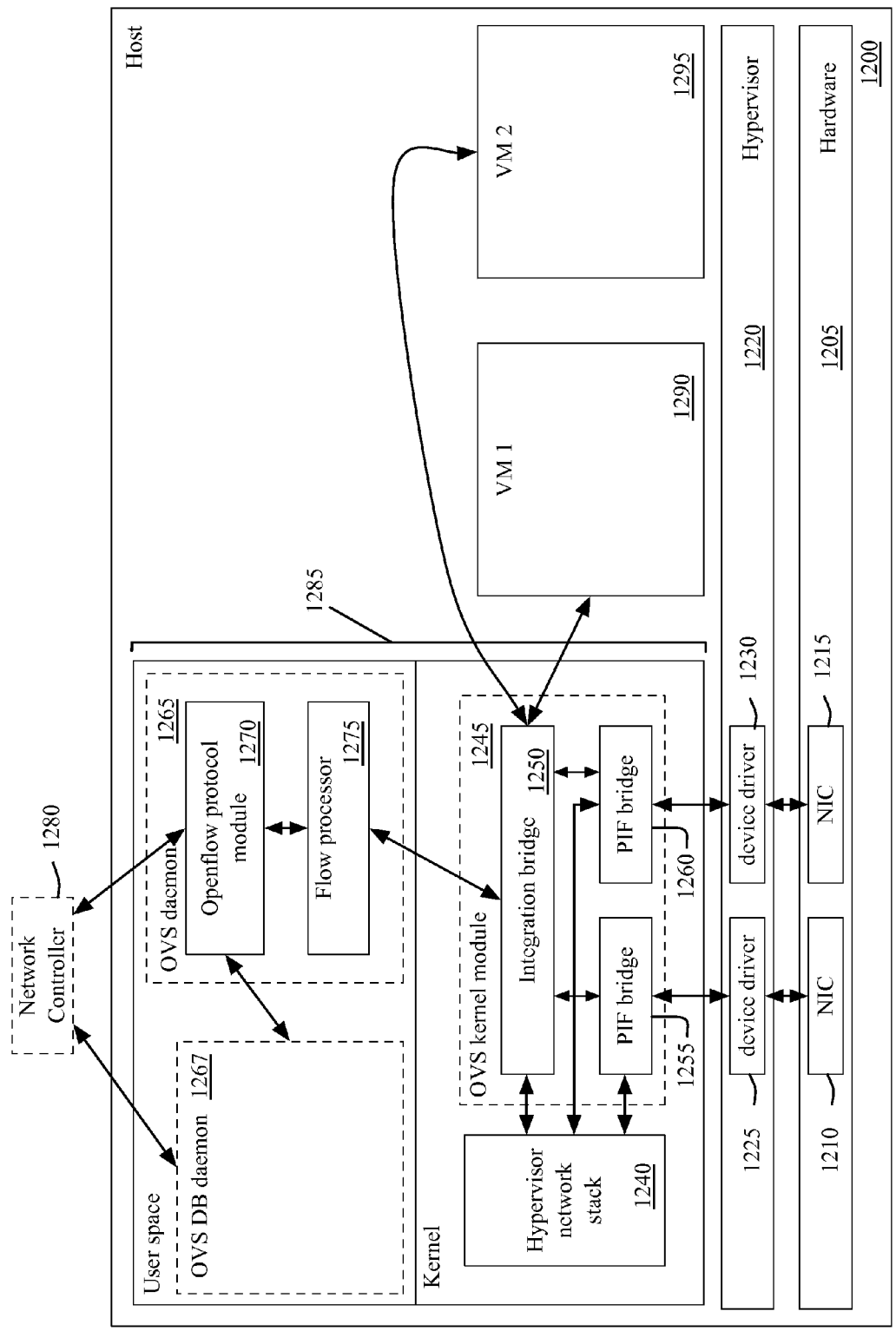
FIG. 12 conceptually illustrates an architectural diagram of a software switching element of some embodiments.

FIG. 12 conceptually illustrates an architectural diagram of a software switching element of some embodiments that is implemented in a host 1200. In this example, the software switching element includes three components—an OVS kernel module 1245, which runs in the kernel of the VM 1285, and an OVS daemon 1265 and an OVS database (DB) daemon 1267, which run in the user space of the VM 1285. While FIG. 12 illustrates the software switching elements as two components for the purpose of explanation, the OVS kernel module 1245, the OVS daemon 1265, and the OVS DB daemon 1267 collectively form the software switching element running on the VM 1285. Accordingly, the OVS kernel module 1245, the OVS daemon 1265, and the OVS DB daemon 1267 may be referred to as the software switching element and/or the OVS switching element in the description of FIG. 12. In some embodiments, the software switching element can be any of the software switching elements illustrated in FIG. 3-5 and, in such cases, the host 1200 is the host in the rack of hosts in which the software switching element is running.

As illustrated in FIG. 12, the host 1200 includes hardware 1205, hypervisor 1220, and VMs 1285-1295. The hardware 1205 may include typical computer hardware, such as processing units, volatile memory (e.g., random access memory (RAM)), non-volatile memory (e.g., hard disc drives, optical discs, etc.), network adapters, video adapters, or any other type of computer hardware. As shown, the hardware 1205 includes NICs 1210 and 1215, which are typical network interface controllers for connecting a computing device to a network.

The hypervisor 1220 is a software abstraction layer that runs on top of the hardware 1205 and runs below any operation system. The hypervisor 1205 handles various management tasks, such as memory management, processor scheduling, or any other operations for controlling the execution of the VMs 1285-1295. Moreover, the hypervisor 1220 communicates with the VM 1285 to achieve various operations (e.g., setting priorities). In some embodiments, the hypervisor 1220 is a Xen hypervisor while, in other embodiments, the hypervisor 1220 may be any other type of hypervisor for providing hardware virtualization of the hardware 1205 on the host 1200.

As shown, the hypervisor 1220 includes device drivers 1225 and 1230 for the NICs 1210 and 1215, respectively. The device drivers 1225 and 1230 allow an operating system to interact with the hardware of the host 1200. In this example, the device driver 1225 allows the VM 1285 to interact with the NIC 1210. And the device driver 1230 allows the VM 1285 to interact with the NIC 1215. The hypervisor 1220 may include other device drivers (not shown) for allowing the VM 1285 to interact with other hardware (not shown) in the host 1200.

VMs 1285-1295 are virtual machines running on the hypervisor 1220. As such, the VMs 1285-1295 run any number of different operating systems. Examples of such operations systems include Solaris, FreeBSD, or any other type of Unix-based operating system. Other examples include Windows-based operating systems as well.

In some embodiments, the VM 1285 is a unique virtual machine, which includes a modified Linux kernel, running on the hypervisor 1220. In such cases, the VM 1285 may be referred to as domain 0 or dom0 in some embodiments. The VM 1285 of such embodiments is responsible for managing and controlling other VMs running on the hypervisor 1220 (e.g., VMs 1290 and 1295). For instance, the VM 1285 may have special rights to access the hardware 1205 of the host 1200. In such embodiments, other VMs running on the hypervisor 1220 interact with the VM 1285 in order to access the hardware 1205. In addition, the VM 1285 may be responsible for starting and stopping VMs on the hypervisor 1220. The VM 1285 may perform other functions for managing and controlling the VMs running on the hypervisor 1220.

Some embodiments of the VM 1285 may include several daemons (e.g., Linux daemons) for supporting the management and control of other VMs running on the hypervisor 1220. Since the VM 1285 of some embodiments is manages and controls other VMs running on the hypervisor 1220, the VM 1285 may be required to run on the hypervisor 1220 before any other VM is run on the hypervisor 1220.

As shown in FIG. 12, the VM 1285 includes a kernel and a user space. In some embodiments, the kernel is the most basic component of an operating system that runs on a separate memory space and is responsible for managing system resources (e.g., communication between hardware and software resources). In contrast, the user space is a memory space where all user mode applications may run.

As shown, the user space of the VM 1285 includes the OVS daemon 1265 and the OVS DB daemon 1267. Other applications (not shown) may be included in the user space of the VM 1285 as well. The OVS daemon 1265 is an application that runs in the background of the user space of the VM 1285. Some embodiments of the OVS daemon 1265 communicate with a network controller 1280 in order to process and route packets that the VM 1285 receives. For example, the OVS daemon 1265 receives commands from the network controller 1280 regarding operations for processing and routing packets that the VM 1285 receives. The OVS daemon 1265 communicates with the network controller 1280 through the Openflow protocol. In some embodiments, another type of communication protocol is used. Additionally, some embodiments of the OVS daemon 1265 receives configuration information from the OVS DB daemon 1267 to facilitate the processing and routing of packets.

In some embodiments, the OVS DB daemon 1267 is also an application that runs in the background of the user space of the VM 1285. The OVS DB daemon 1267 of some embodiments communicates with the network controller 1280 in order to configure the OVS switching element (e.g., the OVS daemon 1265 and/or the OVS kernel module 1245). For instance, the OVS DB daemon 1267 receives configuration information from the network controller 1280 for configuring ingress ports, egress ports, QoS configurations for ports, etc., and stores the configuration information in a set of databases. In some embodiments, the OVS DB daemon 1267 communicates with the network controller 1280 through a database communication protocol (e.g., a JavaScript Object Notation (JSON) remote procedure call (RPC)-based protocol). In some embodiments, another type of communication protocol is utilized. In some cases, the OVS DB daemon 1267 may receive requests for configuration information from the OVS daemon 1265. The OVS DB daemon 1267, in these cases, retrieves the requested configuration information (e.g., from a set of databases) and sends the configuration information to the OVS daemon 1265.

The network controller 1280 is similar to the various network controllers described in this application, such as the ones described by reference to FIGS. 1-5. That is, the network controller 1280 manages and controls the software switching element running on the VM 1285 of the host 1200.

FIG. 12 also illustrates that the OVS daemon 1265 includes an Openflow protocol module 1270 and a flow processor 1275. The Openflow protocol module 1270 communicates with the network controller 1280 through the Openflow protocol. For example, the Openflow protocol module 1270 receives configuration information from the network controller 1280 for configuring the software switching element. Configuration information may include flows that specify rules (e.g. flow entries) for processing and routing packets. When the Openflow protocol module 1270 receives configuration information from the network controller 1280, the Openflow protocol module 1270 may translate the configuration information into information that the flow processor 1275 can understand. In some embodiments, the Openflow protocol module 1270 is a library that the OVS daemon 1265 accesses for some or all of the functions described above.

The flow processor 1275 manages the rules for processing and routing packets. For instance, the flow processor 1275 stores rules (e.g., in a storage medium, such as a disc drive) that the flow processor 1275 receives from the Openflow protocol module 1270 (which, in some cases, the Openflow protocol module 1270 receives from the network controller 1280). In some embodiments, the rules are stored as a set of flow tables that each includes a set of flow entries (also referred to collectively as configured flow entries). As noted above, flow entries specify operations for processing and/or routing network data (e.g., packets) based on routing criteria. In addition, when the flow processor 1275 receives commands from the Openflow protocol module 1270 to remove rules, the flow processor 1275 removes the rules.

In some embodiments, the flow processor 1275 supports different types of rules. For example, the flow processor 1275 of such embodiments supports wildcard rules and exact match rules. In some embodiments, an exact match rule is defined to match against every possible field of a particular set of protocol stacks. A wildcard rule is defined to match against a subset of the possible fields of the particular set of protocol stacks. As such, different exact match rules and wildcard rules may be defined for different set of protocol stacks.

The flow processor 1275 handles packets for which integration bridge 1250 does not have a matching rule. For example, the flow processor 1275 receives packets from the integration bridge 1250 that does not match any of the rules stored in the integration bridge 1250. In such cases, the flow processor 1275 matches the packets against the rules stored in the flow processor 1275, which include wildcard rules as well as exact match rules. When a packet matches an exact match rule or a wildcard rule, the flow processor 1275 sends the exact match rule or the wildcard rule and the packet to the integration bridge 1250 for the integration bridge 1250 to process.

In some embodiment, when a packet matches a wildcard rule, the flow processor 1275 generates an exact match rule based on the wildcard rule to which the packet matches. As mentioned above, a rule, in some embodiments, specifies an action to perform based on a qualifier. As such, in some embodiments, the generated exact match rule includes the corresponding action specified in the wildcard rule from which the exact match rule is generated.

In other embodiment, when a packet matches a wildcard rule, the flow processor 1275 generates a wildcard rule that is more specific than the wildcard rule to which the packet matches. Thus, in some embodiments, the generated (and more specific) wildcard rule includes the corresponding action specified in the wildcard rule from which the exact match rule is generated.

In some embodiments, the flow processor 1275 may not have a rule to which the packet matches. In such cases, some embodiments of the flow process 1275 send the packet to the network controller 1280 (through the Openflow protocol module 1270). However, in other cases, the flow processor 1275 may have received from the network controller 1280 a catchall rule that drops the packet when a rule to which the packet matches does not exist in the flow processor 1275.

After the flow processor 1275 generates the exact match rule based on the wildcard rule to which the packet originally matched, the flow processor 1275 sends the generated exact match rule and the packet to the integration bridge 1250 for the integration bridge 1250 to process. This way, when the integration bridge 1250 receives a similar packet that matches generated the exact match rule, the packet will be matched against the generated exact match rule in the integration bridge 1250 so the flow processor 1275 does not have to process the packet.

Some embodiments of the flow processor 1275 support rule priorities for specifying the priority for a rule with respect to other rules. For example, when the flow processor 1275 matches a packet against the rules stored in the flow processor 1275, the packet may match more than one rule. In these cases, rule priorities may be used to specify which rule among the rules to which the packet matches that is to be used to match the packet.

The flow processor 1275 of some embodiments is also responsible for managing rules in the integration bridge 1250. As explained in further detail below, the integration bridge 1250 of some embodiments stores only active rules. In these embodiments, the flow processor 1275 monitors the rules stored in the integration bridge 1250 and removes the active rules that have not been access for a defined amount of time (e.g., 1 second, 3 seconds, 5, seconds, 10 seconds, etc.). In this manner, the flow processor 1275 manages the integration bridge 1250 so that the integration bridge 1250 stores rules that are being used or have recently been used.

Although FIG. 12 illustrates one integration bridge, the OVS kernel module 1245 may include multiple integration bridges. For instance, in some embodiments, the OVS kernel module 1245 includes an integration bridge for each logical switching element that is implemented across a managed network to which the software switching element belongs. That is, the OVS kernel module 1245 has a corresponding integration bridge for each logical switching element that is implemented across the managed network.

As illustrated in FIG. 12, the kernel includes a hypervisor network stack 1240 and an OVS kernel module 1245. The hypervisor network stack 1240 is an Internet Protocol (IP) network stack that runs on the VM 1285. The hypervisor network stack 1240 processes and routes IP packets that are received from the OVS kernel module 1245 and the PIF bridges 1255 and 1260. When processing a packet that is destined for a network host external to the host 1200, the hypervisor network stack 1240 determines to which of physical interface (PIF) bridges 1255 and 1260 the packet is to be sent. The hypervisor network stack 1240 may make such determination by examining the destination IP address of the packet and a set of routing tables (not shown). In some embodiments, the hypervisor network stack 1240 is provided by the hypervisor 1220.

The OVS kernel module 1245 processes and routes network data (e.g., packets) between VMs running on the host 1200 and network hosts external to the host 1200 (i.e., network data received through the NICs 1210 and 1215). For example, the OVS kernel module 1245 of some embodiments routes packets between VMs running on the host 1200 and network hosts external to the host 1200 (e.g., when packets are not routed through a tunnel) through a set of patch ports (not shown) that couple the OVS kernel module 1245 to the PIF bridges 1255 and 1260. In several of the figures in this application (e.g., FIG. 11), forwarding tables are illustrated as part of a forwarding plane of a software switching element. However, the forwarding tables may be conceptual representations and may be implemented by the OVS kernel module 1245, in some embodiments.

To facilitate the processing and routing of network data, the OVS kernel module 1245 communicates with OVS daemon 1265. For example, the OVS kernel module 1245 receives processing and routing information (e.g., flow entries) from the OVS daemon 1265 that specifies how the OVS kernel module 1245 is to process and route packets when the OVS kernel module 1245 receives packets. Some embodiments of the OVS kernel module 1245 include a bridge interface (not shown) that allows the hypervisor network stack 1240 to send packets to and receiving packets from the OVS kernel module 1245. In other embodiments, the hypervisor 1240 sends packets to and receives packets from the bridges included in OVS kernel module 1245 (e.g., integration bridge 1250 and/or PIF bridges 1255 and 1260).

FIG. 12 illustrates that the OVS kernel module 1245 includes an integration bridge 1250 and the PIF bridges 1255 and 1260. The integration bridge 1250 processes and routes packets received from the hypervisor network stack 1240, the VMs 1290 and 1295 (e.g., through VIFs), and the PIF bridges 1255 and 1260. In some embodiments, a set of patch ports is directly connects two bridges. The integration bridge 1250 of some such embodiments is directly coupled to each of the PIF bridges 1255 and 1260 through a set of patch ports. In some embodiments, the integration bridge 1250 receives packets from the hypervisor network stack 1240 through a default hypervisor bridge (not shown) that handles packet processing and routing. However, in such embodiments, a function pointer (also referred to as a bridge hook) that instructs the hypervisor bridge to pass packets to the integration bridge 1250 is registered with the hypervisor bridge.

In some embodiments, the set of rules that the integration bridge 1250 stores are only exact match rules. The integration bridge 1250 of some such embodiments stores only active exact match rules, which are a subset of the rules stored in the flow processor 1275 (and/or rules derived from rules stored in the flow processor 1275) that the integration bridge 1250 is currently using or was recently using to process and route packets. The integration bridge 1250 of some embodiments stores a set of rules (e.g., flow entries) for performing mapping lookups and logical forwarding lookups, such as the ones described below in further detail by reference to FIGS. 14, 40, 41, 42, and 43. Some embodiments of the integration bridge 1250 may also perform standard layer 2 packet learning and routing.

In some embodiments, the OVS kernel module 1245 includes a PIF bridge for each NIC in the hardware 1205. For instance, if the hardware 1205 includes four NICs, the OVS kernel module 1245 would include four PIF bridges for each of the four NICs in the hardware 1205. In other embodiments, a PIF bridge in the OVS kernel module 1245 may interact with more than one NIC in the hardware 1205.

The PIF bridges 1255 and 1260 route network data between the hypervisor network stack 1240 and network hosts external to the host 1200 (i.e., network data received through the NICs 1210 and 1215). As shown, the PIF bridge 1255 routes network data between the hypervisor network stack 1240 and the NIC 1210 and the PIF bridge 1260 routes network data between the hypervisor network stack 1240 and the NIC 1215. The PIF bridges 1255 and 1260 of some embodiments perform standard layer 2 packet learning and routing. In some embodiments, the PIF bridges 1255 and 1260 performs physical lookups/mapping, such as the ones described below in further detail by reference to FIGS. 14, 40, 42, and 43.

In some embodiments, the VM 1285 provides and controls the PIF bridges 1255 and 1260. However, the network controller 1280 may, in some embodiments, control the PIF bridges 1255 and 1260 (via the OVS daemon 1265) in order to implement various functionalities (e.g., quality of service (QoS)) of the software switching element.

In several of the figures in this application (e.g., FIG. 11), forwarding tables are illustrated as part of a forwarding plane of a software switching element. However, these forwarding tables may be, in some embodiments, conceptual representations that can be implemented by the OVS kernel module 1245. Also, some of the figures in this application (e.g., FIGS. 10, 11, and 13) illustrate a control plane in a switching element. These control planes may similarly be conceptual representations, which can be implemented by the OVS daemon 1265, in some embodiments.

The architectural diagram of the software switching element and the host illustrated in FIG. 12 is one exemplary configuration. One of ordinary skill in the art will recognize that other configurations are possible. For instance, some embodiments may include several integration bridges in the OVS kernel module, additional NICs and corresponding PIF bridges, and additional VMs.

The following will describe an exemplary operation of the OVS switching element illustrated in FIG. 12 according to some embodiments of the invention. Specifically, a packet processing operation performed by the OVS switching element will be described. As described above, the OVS kernel module 1245 processes packets and routes packets. The OVS kernel module 1245 can receive packets in different ways. For instance, the OVS kernel module 1245 can receive a packet from the VM 1290 or the VM 1295 through the VM's VIF. In particular, the OVS kernel module 1245 receives the packet from the VM 1290 or the VM 1295 at the integration bridge 1250.

Furthermore, the OVS kernel module 1245 can receive a packet from a network host external to the host 1200 through one of the NICs 1210 and 1215, the NIC's corresponding PIF bridge (i.e., PIF bridge 1225 or PIF bridge 1230), and the hypervisor network stack 1240. The hypervisor network stack 1240 then sends the packets to the integration bridge 1250 of the OVS kernel bridge 1245. In some cases, the packet is received from a network host external to the host 1200 through a tunnel. In some embodiments, the tunnel terminates at the hypervisor network stack 1240. Thus, when the hypervisor network stack 1240 receives the packet through the tunnel, the hypervisor network stack 1240 unwraps (i.e., decapsulates) the tunnel header and determines, based on the tunnel information (e.g., tunnel ID), which integration bridge of the OVS kernel module 1245 to which to send the unwrapped packet. As mentioned above, the OVS kernel module 1245 of some embodiments may include an integration bridge for each logical switching element that is implemented across the managed network to which the OVS switching element belongs. Accordingly, the hypervisor network stack 1240 determines the logical switching element to which the tunnel belongs, identifies the integration bridge that corresponds to the determined logical switching element, and sends the packet to the identified integration bridge.

In addition, the OVS kernel module 1245 can receive a packet from a network host external to the host 1200 through one of the NICs 1210 and 1215, the NIC's corresponding PIF bridge (i.e., PIF bridge 1225 or PIF bridge 1230), and a set of patch ports (not shown) that couple the PIF bridge to the OVS kernel module 1245. As noted above, the OVS kernel module 1245 of some embodiments may include an integration bridge for each logical switching element that is implemented across the managed network to which the OVS switching element belongs. Accordingly, the NIC's corresponding PIF bridge determines the logical switching element to which the tunnel belongs, identifies the integration bridge that corresponds to the determined logical switching element, and sends the packet to the identified integration bridge.

When the integration bridge 1250 receives a packet in any of the manners described above, the integration bridge 1250 processes the packet and routes the packet. As noted above, some embodiments of the integration bridge 1250 stores only active exact match rules, which are a subset of the rules stored in the flow processor 1275 (and/or rules derived from rules stored in the flow processor 1275) that the integration bridge 1250 is currently using or was recently using to process and route packets. The integration bridge 1250 performs a lookup based on a set of fields in the packet's header (e.g., by applying a hash function to the set of fields). In some embodiments, the set of fields may include a field for storing metadata that describes the packet. If the lookup returns a rule to which the packet matches, the integration bridge 1250 performs the action (e.g., forward the packet, drop the packet, reprocess the packet, etc.) specified in the rule. However, if the lookup does not return a rule, the integration bridge 1250 sends the packet to the flow processor 1275 to process.

As explained above, the flow processor 1275 handles packets for which the integration bridge 1250 does not have a matching rule. When the flow processor 1275 receives the packet from the integration bridge 1250, the flow processor 1275 matches the packet against the rules stored in the flow processor 1275, which include wildcard rules as well as exact match rules. When a packet matches an exact match rule, the flow processor 1275 sends the exact match rule and the packet to the integration bridge 1250 for the integration bridge 1250 to process. When a packet matches a wildcard rule, the flow processor 1275 generates an exact match rule based on the wildcard rule to which the packet matches, and sends the generated exact match rule and the packet to the integration bridge 1250 for the integration bridge 1250 to process.

Although FIG. 12 illustrates the VM 1285 as a virtual machine, different embodiments may implement the VM 1285 differently. For example, some embodiments may implement the VM 1285 as part of the hypervisor 1220. In such embodiments, the VM 1285 performs the same or similar functions as those described above with respect to the VM 1285.

Figure 13:
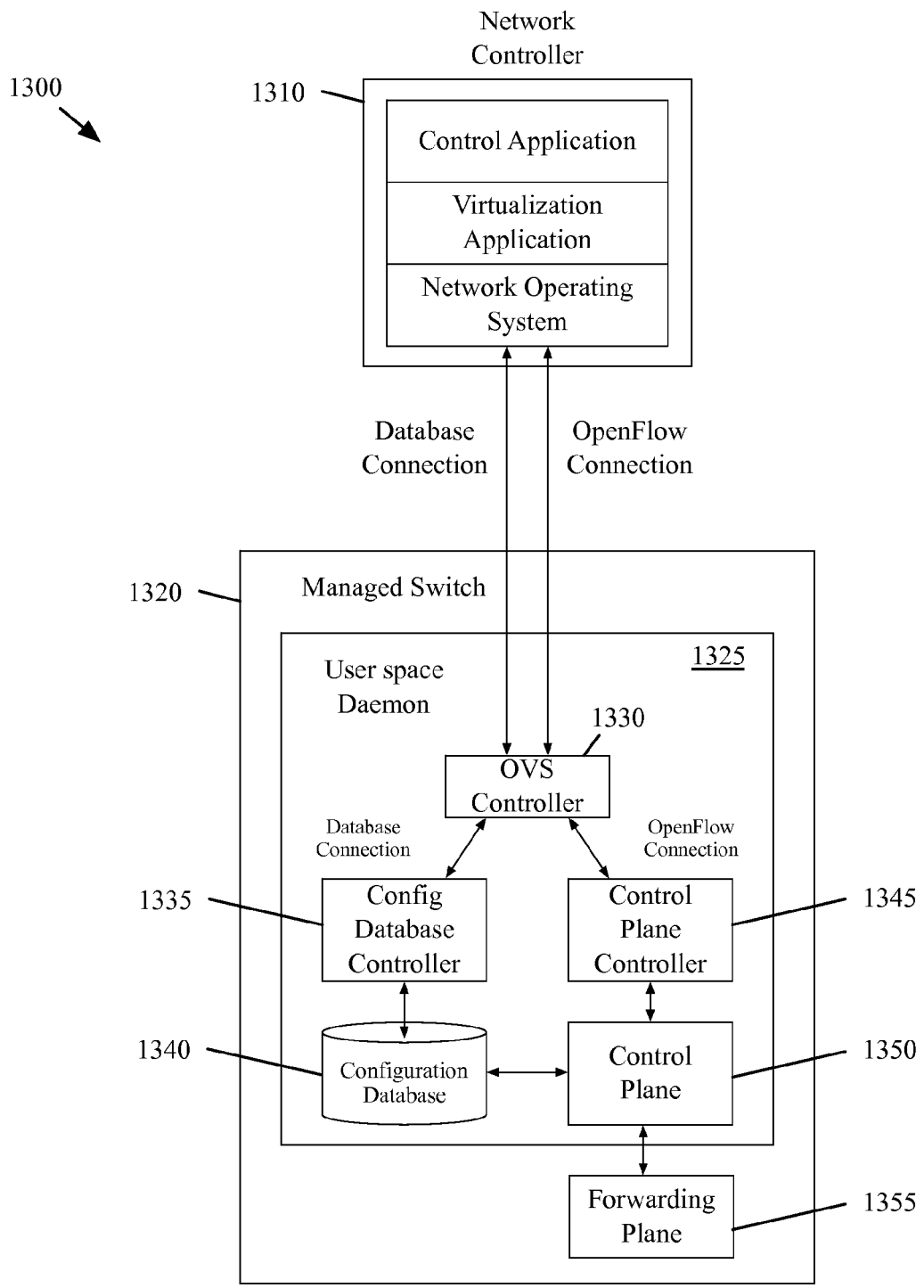
FIG. 13 conceptually illustrates a network control system of some embodiments for managing a switching element.

FIG. 13 conceptually illustrates a network control system 1300 of some embodiments for managing a switching element 1320. Specifically, FIG. 13 conceptually illustrates communication protocols that are employed in order for a network controller 1310 to communicate with and control the switching element 1320. Accordingly, the network control system 1300 may be used to manage and control the switching element 1320 in order to implement logical switching elements across the switching element and other switching elements, which belong to a network managed by the network controller 1300.

The network controller 1310 is similar to the network controllers described above by reference to FIGS. 2-5 except the network controller 1310 communicates with the switching element 1320 through a database connection and an Openflow connection. In some embodiments, a JavaScript Object Notation (JSON) remote procedure call (RPC)-based protocol is used to establish the database connection and to communicate (e.g., updating databases) through the database connection. In other embodiments, any of the many known database connection and communication methods (e.g., Java DataBase Connectivity (JDBC) or Open Database Connectivity (ODBC)) may be used. The Openflow connection uses the Openflow protocol to establish a connection and facilitate communication.

In some embodiments, the switching element 1320 is a software switching element (e.g., the OVS switching element illustrated in FIGS. 11 and 12) while, in other embodiments, the switching element 1320 is a hardware switching elements (e.g., the switching element illustrated in FIG. 10). Therefore, even for a hardware switching element, OVS is executed on the hardware switching element. For example, referring to FIG. 10, which illustrates a hardware switching element, some embodiments of the management processor 1050 are implemented as an embedded central processing unit (CPU) that executes switching element management software. In this example, the switching element management software is OVS.

As shown, the switching element 1320 includes a user space daemon 1325 and a forwarding plane 1355. The user space daemon 1325 includes an OVS connection manager 1330, a configuration database controller 1335, a configuration database 1340, a control plane controller 1345, and a control plane 1350. The OVS connection manager 1330 manages the connection between the network controller 1310 and the configuration database controller 1335, and the connection between the network controller 1310 and the control plane controller 1345 so that communications received over a particular connection is routed to the appropriate controller.

In some embodiments, the OVS connection manager 1330 translates the commands and/or messages into a format that the recipient can understand. For example, when the network controller 1310 sends a command to the switching element 1320 through the database connection, the OVS connection manager 1330 may translate the command so that the configuration database controller 1335 can understand the command. Similarly, when the network controller 1310 sends a command to the switching element 1320 through the Openflow connection, the OVS connection manager 1330 may translate the command so that the control plane controller 1345 can understand the command.

The configuration database controller 1340 of some embodiments manages the configuration database 1340 and receives commands from the OVS connection manager 1330 related to the configuration database 1340. Examples of commands include create a table, delete a table, create a record in a table, modify (i.e., update) a record in a table, delete a record in a table, among other types of database commands. When the configuration database controller 1335 receives a command from the OVS connection manager 1330, the configuration database controller 1335 performs the corresponding action to the configuration database 1340.

The configuration database 1335 is similar to the configuration database 1060, which is described above by reference to FIG. 10. That is, the configuration database 1335 stores configuration information for configuring the switching element 1320. (e.g., information for configuring ingress ports, egress ports, QoS configurations for ports, etc.).

Some embodiments of the control plane controller 1345 manage the Openflow rules stored in the control plane 1350 and receives commands from the OVS connection manager 1330 related to the control plane 1350. Examples of commands include add a rule, modify (i.e., update) a rule, delete a rule, or other types of Openflow commands. When the configuration database controller 1335 receives a command from the OVS connection manager 1330, the configuration database controller 1335 performs the command's corresponding action to the configuration database 1340.

The control plane 1350 is similar to the control plane 1070, which is described above by reference to FIG. 10. Thus, the control plane 1350 stores configured flow entries that are, in some embodiments, a set of flow tables that each includes a set of flow entries. In some of these embodiments, the control plane 1350 also stores flow tables and/or flow entries for operating in the physical domain (i.e., physical context) and stores flow tables and/or flow entries for operating in the logical domain (i.e., logical context) in order to implement logical switching elements. In addition, the control plane 1350 receives flow entries from the network controller 1310 (through the OVS connection manager 1330 and the control plane controller 1345) to add to the configured flow entries, and receives requests from the network controller 1310 (through the OVS connection manager 1330 and the control plane controller 1345) to remove and modify the configured flow entries. The control plane 1350 may manage the flow entries stored in the forwarding plane 1355 in a similar manner that the flow processor 1275 manages rules in the integration bridge 1250. For example, the control plane 1350 monitors the flow entries stored in the forwarding plane 1355 and removes the flow entries that have not been access for a defined amount of time (e.g., 1 second, 3 seconds, 5, seconds, 10 seconds, etc.) so that the control plane 1355 stores flow entries that are being used or have recently been used.

The forwarding plane 1355 is similar to the forwarding plane described above by reference to FIG. 11. That is, the forwarding plane 1355 processes and routes network data (e.g., packets). In some embodiments, the forwarding plane 1355 stores only active rules (e.g., flow entries) that specify operations for processing and routing packets. In some embodiments, the forwarding plane 1355 sends packets to the control plane 1350 that the forwarding plane 1355 cannot process (e.g., the forwarding plane 1355 does not have a flow entry that matches the packets). As mentioned above, the switching element 1320 of some embodiments is a software switching element. In these embodiments, the forwarding plane 1355 is implemented as a software forwarding plane, such as the software forwarding planes described above by reference to FIGS. 11 and 12. Similarly, in some embodiments where the switching element 1320 is a hardware switching elements, the forwarding plane 1355 is implemented, for example, as the hardware forwarding plane described above by reference to FIG. 10.

Figure 14:
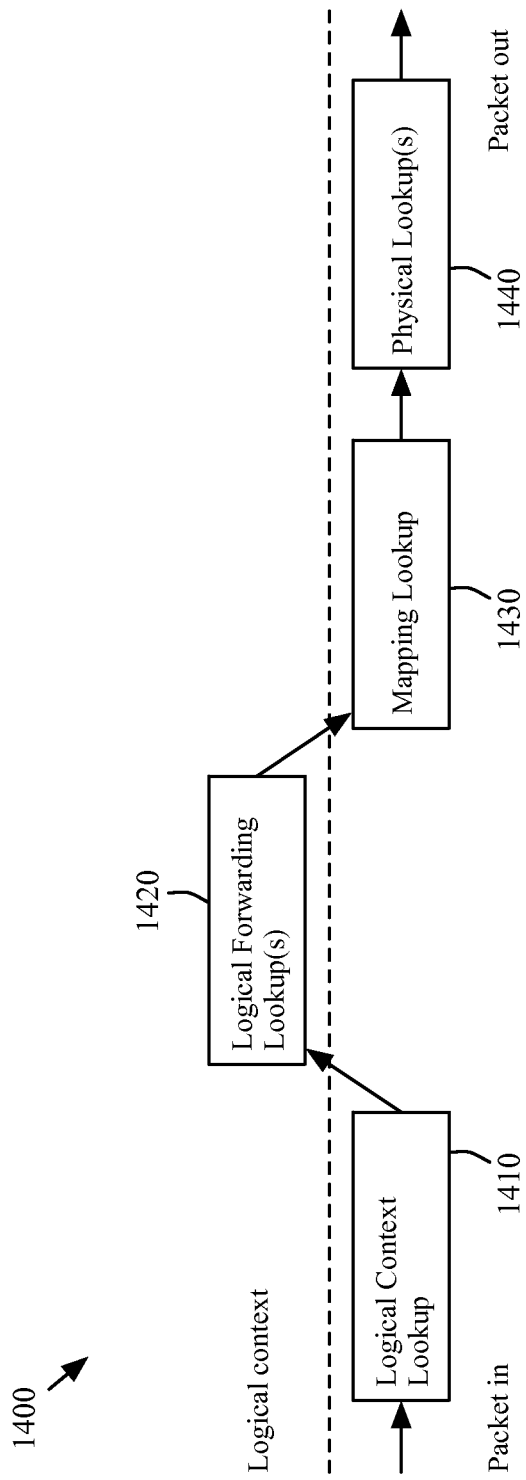
FIG. 14 conceptually illustrates a processing pipeline of some embodiments for processing network data through a logical switching element.

FIG. 14 conceptually illustrates a processing pipeline 1400 of some embodiments for processing network data through a logical switching element. In particular, the processing pipeline 1400 includes four stages 1410-1440 for processing a packet through a logical switching element that is implemented across a set of managed switching elements in a managed network. In some embodiments, each managed switching element in the managed network that receives the packet performs the processing pipeline 1400 when the managed switching element receives the packet.

In some embodiments, a packet includes a header and a payload. The header includes, in some embodiments, a set of fields that contains information used for routing the packet through a network. Switching elements may determine switching decisions based on the contained in the header and may, in some cases, modify some or all of the header fields. As explained above, some embodiments determine switching decisions based on flow entries in the switching elements' forwarding tables.

In some embodiments, the processing pipeline 1400 may be implemented by flow entries in the managed switching elements in the network. For instance, some or all of the flow entries are defined such that the packet is processed against the flow entries based on the logical context tag in the packet's header. Therefore, in some of these embodiments, the managed switching elements are configured (e.g., by a network controller illustrated in FIGS. 1-5) with such flow entries.

In the first stage 1410 of the processing pipeline 1400, a logical context lookup is performed on a packet to determine the logical context of the packet. In some embodiments, the first stage 1410 is performed when the logical switching element receives the packet (e.g., the packet is initially received by a managed switching element in the network that implements the logical switching element).

In some embodiments, a logical context represents the state of the packet with respect to the logical switching element. For example, some embodiments of the logical context may specify the logical switching element to which the packet belongs, the logical port of the logical switching element through which the packet was received, the logical port of the logical switching element through which the packet is to be transmitted, the stage of the logical forwarding plane of the logical switching element the packet is at, etc. Referring to FIG. 8 as an example, the logical context of some embodiments for packets sent from tenant A's machines specify that the packets are to be processed according to the logical switching element 880, which is defined for tenant A (rather than the logical switching element 890, which is defined for tenant B).

Some embodiments determine the logical context of a packet based on the source MAC address of the packet (i.e., the machine from which the packet was sent). Some embodiments perform the logical context lookup based on the source MAC address of the packet and the inport (i.e., ingress port) of the packet (i.e., the port of the managed switching element through which the packet was received). Other embodiments may use other fields in the packet's header (e.g., MPLS header, VLAN id, etc.) for determining the logical context of the packet.

After the logical context of the packet is determined, some embodiments store the information that represents the determined logical context in one or more fields of the packet's header. These fields may also be referred to as a logical context tag or a logical context ID. Furthermore, the logical context tag may coincide with one or more known header fields (e.g., the VLAN id field) in some embodiments. As such, these embodiments do not utilize the known header field or its accompanying features in the manner that the header field is defined to be used.

In the second stage 1420 of the processing pipeline 1400, logical forwarding lookups are performed on the packets to determine where to route the packet based on the logical switching element (e.g., the logical port of the logical switching element of which to send the packet out) through which the packet is being processed. In some embodiment, the logical forwarding lookups include a logical ingress ACL lookup for determining access control when the logical switching element receives the packet, a logical L2 lookup for determining where to route the packet through a layer 2 network, and a logical egress ACL lookup for determining access control before the logical switching element routes the packet out of the logical switching element. Alternatively, or in conjunction with the logical L2 lookup, some embodiments of the logical forwarding lookups include a logical L3 lookup for determining where to route the packet through a layer three network. These logical lookups are performed based on the logical context tag of the packet in some of these embodiments.

In some embodiments, the result of the logical forwarding lookups may include dropping the packet, forwarding the packet to one or more logical egress ports of the logical switching element, or forwarding the packet to a dispatch port of the logical switching element. When the logical forwarding lookups determines that the packet is to be routed to the dispatch port of the logical switching element, some embodiments repeat the logical forwarding lookups until the packet is determined to be either dropped or forwarded to one or more logical egress ports.

Next, the third stage 1430 of the processing pipeline 1400 performs a mapping lookup on the packet. In some embodiments, the mapping lookup is a logical to physical mapping lookup that determines the logical egress port of the logical switching element. That is, the mapping lookup determines one or more ports of one or more managed switching elements that correspond to the logical egress port of the logical switching element through which the packet is to be sent out. For instance, if the packet is a broadcast packet or a multicast packet, the third stage 1430 of some embodiments determines the ports of the managed switching elements that correspond to the logical egress ports of the logical switching element through which the packet is to be broadcasted or multicasted out (i.e., the logical ports to which the intended recipients of the packet is coupled). If the packet is a unicast packet, the third stage 1430 determines a port of a managed switching element that corresponds to the logical egress port of the logical switching element through which the packet is to be sent out (i.e., the logical port to which the intended recipient of the packet is coupled). In some embodiments of the third stage 1430, the mapping lookups are performed based on the logical context tag of the packet.

At the fourth stage 1440 of the processing pipeline 1400, a physical lookup is performed. The physical lookup of some embodiments determines operations for routing the packet to the physical port(s) that corresponds to the logical egress port(s) that was determined in the third stage 1430. For example, the physical lookup of some embodiments determines one or more ports of the managed switching element on which the processing pipeline 1400 is being performed through which to send the packet out in order for the packet to reach the physical port(s) determined in the third stage 1430. This way, the managed switching elements can route the packet along the correct path in the network for the packet to reach the determined physical port(s) that corresponds to the logical egress port(s).

Some embodiments remove the logical context tag after the fourth stage 1440 is completed in order to return the packet to its original state before the packet was processed by the processing pipeline 1400.

As mentioned above, in some embodiments, the processing pipeline 1400 is performed by each managed switching element in the managed network that is used to implement the logical switching element. In some embodiments, some of the managed switching elements perform only a portion of the processing pipeline 1400. For example, in some embodiments, the managed switching element that initially receives the packet may perform the first-fourth stages 1410-1440 and the remaining managed switching elements that subsequently receive the packet only perform the first, third, and fourth stages 1410, 1430, and 1440.

Figure 15:
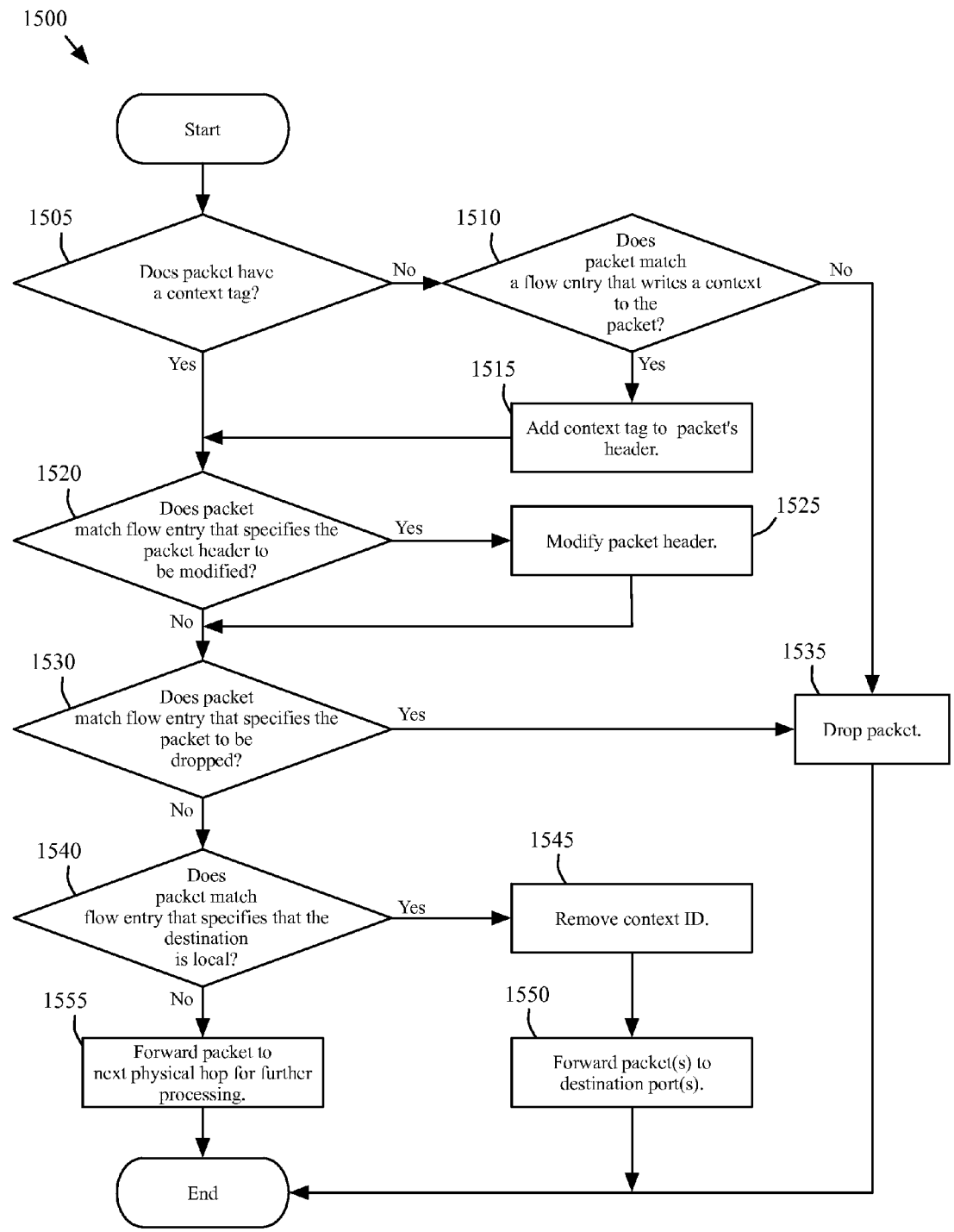
FIG. 15 conceptually illustrates a process of some embodiments for processing network data.

FIG. 15 conceptually illustrates a process 1500 of some embodiments for implementing a processing pipeline, such as the processing pipeline 1400, that is distributed across managed switching elements according to flow entries in the managed switching elements. In some embodiments, the process 1500 is performed by each managed switching element in a managed network in order to process a packet through a logical switching element that is implemented across the managed switching elements.

The process 1500 begins by determining (at 1505) whether the packet has a logical context tag. When the process 1500 determines that the packet does not have a logical context tag, the process 1500 determines (at 1510) whether the packet matches a flow entry that specifies a logical context. In some embodiments, the process 1500 determines the packet's logical context in a similar fashion as that described above by reference to the first stage 1410 of FIG. 14. That is, the process 1500 determines the logical context of the packet based on a defined set of fields in the packet's header (e.g., the source MAC address, inport, etc.).

When the process 1500 determines that the packet does not match a flow entry that specifies a logical context, the process 1500 drops (at 1535) the packet and the process 1500 then ends. When the process 1500 determines that the packet matches a flow entry that specifies a logical context, the process 1500 adds (at 1515) a logical context tag to the header of the packet. After the process 1500 adds the logical context tag to the header of the packet, the process 1500 proceeds to 1520. When the process 1500 determines that the packet does have a logical context tag, the process 1500 proceeds to 1520.

At 1520, the process 1500 determines whether the packet matches a flow entry that specifies the packet's logical context tag to be modified. In some embodiments, the flow entries that the process 1500 matches the packet against are flow entries that implement the logical ingress ACL lookup described above by reference to the second stage 1420 of FIG. 14. When the process 1500 determines that the packet matches a flow entry that specifies the packet's logical context tag to be modified, the process 1500 modifies (at 1525) the packet according to the flow entry against which the packet matches. Then, the process 1500 proceeds to 1530. When the process 1500 determines that the packet does not match a flow entry that specifies the packet's logical context tag to be modified, the process 1500 proceeds to 1530.

Next, the process 1500 determines (at 1530) whether the packet matches a flow entry that specifies the packet to be dropped. In some embodiments, the flow entries that the process 1500 matches the packet against are flow entries that implement the logical L2 lookup described above by reference to the second stage 1420 of FIG. 14. When the process 1500 determines that the packet matches a flow entry that specifies the packet to be dropped, the process 1500 drops (at 1535) the packet and the process 1500 ends.

When the process 1500 determines that the packet does not match a flow entry that specifies the packet to be dropped, the process 1500 determines (at 1540) whether the packet matches a flow entry that specifies the destination of the packet is local. In some embodiments, the destination of the packet is local when the recipient of the packet is coupled to the managed switching element on which the process 1500 is being performed. When the process 1500 determines that the packet matches a flow entry that specifies the destination of the packet is local, the process 1500 removes (at 1545) the logical context tag from the packet's header. Next, the process 1500 forwards (at 1550) the packet to the local destination. In some embodiments, the process 1500 determines the local destination by matching the packet against flow entries that implement the logical L2 lookup described above by reference to the second stage 1420 of FIG. 14. After forwarding the packet to the local destination, the process 1500 ends.

When the process 1500 determines that the packet does not match a flow entry that specifies the destination of the packet is local, the process 1500 forwards (at 1555) the packet to the next managed switching element for further processing. Then, the process 1500 ends.

III. Hierarchical Switching Architecture

Figure 16:
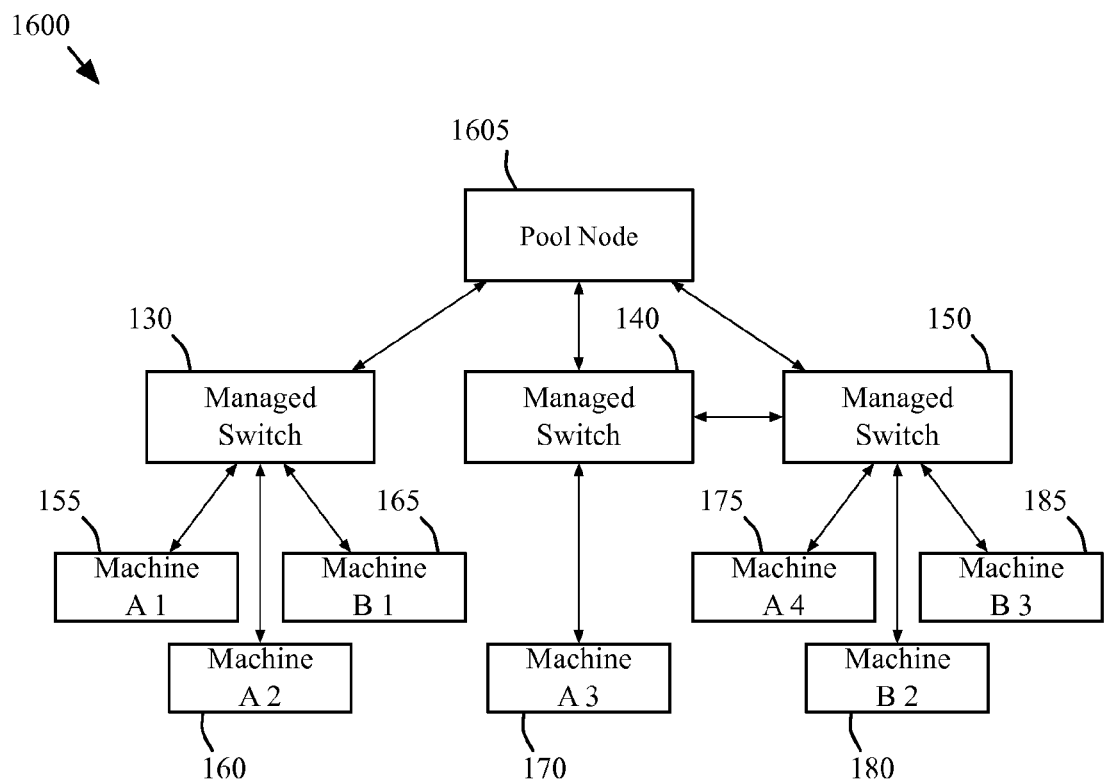
FIG. 16 conceptually illustrates a network architecture of some embodiments that includes a pool node.

FIG. 16 conceptually illustrates a network architecture 1600 of some embodiments that includes a pool node 1605. The network architecture 1600 is similar to the network architecture 100 illustrated in FIG. 1, but the network architecture 1600 also includes the pool node 1605 and the managed switching element 130 is no longer connected to the managed switching element 140. For purposes of explanation and simplicity, the network controllers 110 and 120 are not shown in FIG. 16. In addition, the machines 155, 160, 170, and 175 are indicated as belonging to a tenant A, and the machines 165, 180, and 185 are indicated as belonging to a tenant B.

In some embodiments, the pool node 1605 is a switching element (e.g., a hardware switching element or an OVS) that is coupled to and positioned above the managed switching elements 130-150 in the hierarchy of the network architecture 1600 to assist in the implementation of logical switching elements across the managed switching elements 130-150. The following will describe some of the functions that some embodiments of the pool node 1605 provide.

The pool node 1605 of some embodiments is responsible for processing packets that the managed switching elements 130-150 cannot process. In instances where one of the managed switching elements 130-150 cannot process a packet, the managed switching element sends the packet to the pool node 1605 to process. For instance, the pool nodes 1605 processes packets with destination MAC addresses that are not known to one of the managed switching elements 130-150 (e.g., the managed switching element does not have a flow entry that matches the destination MAC address). In some cases, one of the managed switching elements 130-150 cannot process a packet due to the limited storage capacity of the managed switching element and does not include flow entries for processing the packet. Another example where the managed switching elements 130-150 cannot process a packet is because the packet is destined for a remote network that may not be managed by the network controllers 110 and 120.

In some embodiments, the pool node 1605 serves as a communication bridge between managed switching elements. Referring to FIG. 16 as an example, absent the pool node 1605, the managed switching element 130 cannot communicate with the managed switching elements 140 and 150. Therefore, when the managed switching element 130 wants to send packets, for example, to the managed switching element 140 or the managed switching element 150, the managed switching element 130 sends the packets to the pool node 1605 to forward to the managed switching element 140 or the managed switching element 150. Similarly, when the managed switching element 140 or the managed switching element 150 wants to send packets to the managed switching element 130, the managed switching element 140 or the managed switching element 150 sends the packets to the pool node 1605 to forward to the managed switching element 130.

Some embodiments of the pool node 1605 process packets are that are intended for multiple recipients (e.g., broadcast packets and multicast packets) in the same logical network. For instance, when one of the managed switching elements 130-150 receives a broadcast or multicast packet from one of the machines, the managed switching element sends the broadcast or multicast packet to the pool node 1605 for processing. Referring to FIG. 16 as an example, when the managed switching element 130 receives a broadcast from the machine 155, the managed switching element 130 sends the broadcast packet to the pool node 1605. The pool node 1605 determines that the broadcast is destined for the machines on tenant A's logical network. Accordingly, the pool node 1605 determines that the machines 155, 160, 170, and 175 belong to tenant A and sends the packet to each of those machines. The pool node 1605 processes multicast packets in a similar manner except, for the multicast packet, the pool node 1650 identifies the intended recipients of the multicast packet.

Figure 17:
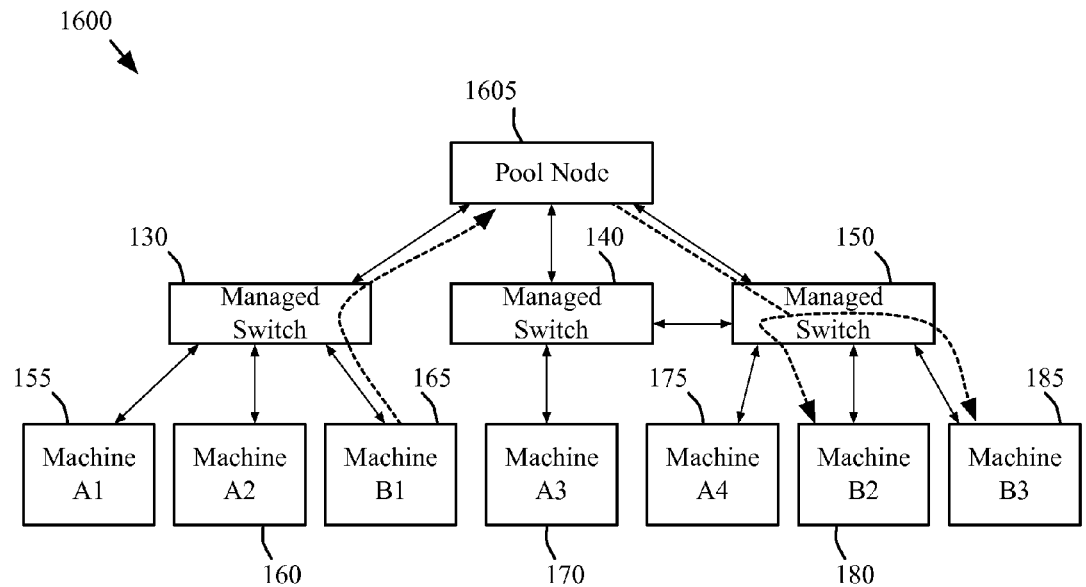
FIG. 17 conceptually illustrates an example multi-recipient packet flow through the network architecture illustrated in FIG. 16 according to some embodiments of the invention FIG. 18 conceptually illustrates another example multi-recipient packet flow through the network architecture illustrated in FIG. 16 according to some embodiments of the invention FIG. 19 conceptually illustrates an example of a pool node configured to assist in processing packets for managed switching elements.

As explained above, the pool node 1605 of some embodiments processes packets that are intended for multiple recipients in the same logical network. FIG. 17 conceptually illustrates an example multi-recipient packet flow through the network architecture 1600 illustrated in FIG. 16 according to some embodiments of the invention. Specifically, FIG. 17 conceptually illustrates a managed switching element performing the replication of packets for the multi-recipient packet.

In this example, tenant B's machine 165 sends a multi-recipient packet (e.g., a broadcast packet or a multicast packet) to the managed switching element 130. In some embodiments, the multi-recipient packet specifies a destination MAC address that is defined (e.g., by a network controller managing) to indicate the packet is a multi-recipient packet. Some embodiments might indicate that the packet is a multi-recipient packet through data stored in a set of fields (e.g., a context tag) in the packet's header. The managed switching element 130 identifies the packet as a multi-recipient packet based on the defined destination MAC address and/or the set of header fields. Since the pool node 1605 is responsible for processing multi-recipient packets, the managed switching element 130 forwards the packet to the pool node 1605 for processing.

When the pool node 1605 receives the packet from the managed switching element 130, the pool node 1605 determines that the packet is a multi-recipient packet by examining the destination MAC address of the packet and/or the set of header fields. In some embodiments, the packet also specifies the logical network to which the packet belongs (e.g., via a context tag). In this example, the packet specifies that the packet belongs to the logical network that includes tenant B's machines (machines 165, 180, and 185 in this example). After the pool node 1605 determines that logical network to which the packet belongs, the pool node 1605 determines the managed switching elements to which to route the multi-recipient packet. Since the managed switching element 140 is not coupled to any of tenant B's machines, the pool node 1605 only forwards the multi-recipient packet to the managed switching element 150.

When the managed switching element 150 receives the packet, the managed switching element 150 determines that the packet is a multi-recipient packet by examining the destination MAC address of the packet. The managed switching element 150 then determines the logical network to which the packet belongs and identifies the machines coupled to the managed switching element 150 that belong to the logical network to which the packet belongs. For this example, the packet belongs to tenant B's logical network. Therefore, the managed switching element 150 identifies the machines 180 and 185 as the machines coupled to the managed switching element 150 that belong to tenant B's logical network. Then, the managed switching element 150 replicates the multi-recipient packet for each identified machine, modifies each replicated packet to specify the MAC address of the corresponding machine as the packet's destination MAC address, and sends the replicated packets to the machines.

Figure 18:
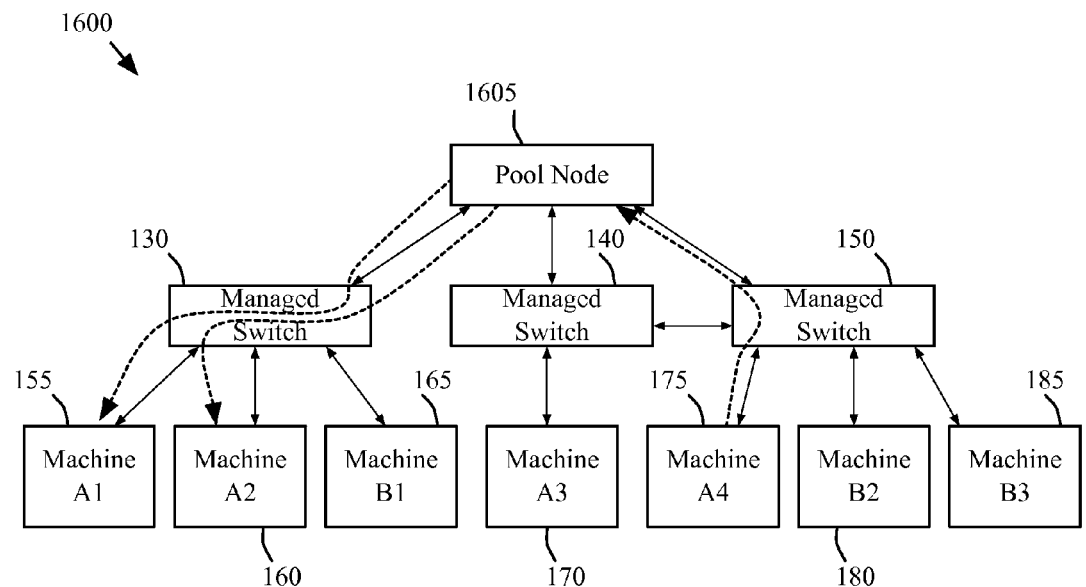

As shown, FIG. 17 illustrates a packet flow of a multi-recipient packet through a network architecture of some embodiments where a managed switching element performs the replication of packets for the multi-recipient packet. However, in some embodiments, the pool node of some embodiments may perform the replication of packets for a multi-recipient packet. FIG. 18 conceptually illustrates such an example multi-recipient packet flow through the network architecture 1600 illustrated in FIG. 16 according to some embodiments of the invention.

For this example, tenant A's machine 175 sends a multi-recipient packet (e.g., a broadcast packet or a multicast packet) to the managed switching element 150 that specifies tenant A's machine 155 and 160 as recipients of the packet. In some embodiments, the multi-recipient packet specifies a destination MAC address that is defined (e.g., by a network controller managing) to indicate the packet is a multi-recipient packet and the recipients of the multi-recipient packet. Some embodiments might indicate that the packet is a multi-recipient packet through data stored in a set of fields (e.g., a context tag) in the packet's header. The managed switching element 130 identifies the packet as a multi-recipient packet based on the defined destination MAC address and/or the set of header fields. As the pool node 1605 is responsible for processing multi-recipient packets, the managed switching element 150 forwards the packet to the pool node 1605 for processing.

When the pool node 1605 receives the packet from the managed switching element 150, the pool node 1605 determines that the packet is a multi-recipient packet by examining the destination MAC address of the packet and/or the set of header fields. In some embodiments, the packet also specifies the logical network to which the packet belongs (e.g., via a context tag). In this example, the packet specifies that the packet belongs to the logical network that includes tenant A's machines (machines 155, 160, 170, and 175 in this example). After the pool node 1605 determines the logical network to which the packet belongs, the pool node 1605 identifies the set of managed switching elements (the managed switching element 130 in this example) to which the intended recipients of the multi-recipient packet (the machines 155 and 160 in this example) are coupled. The pool node 1605 then replicates the multi-recipient packet and sends a copy of the multi-recipient packet to each of the identified set of managed switching elements.

The above description by reference to FIGS. 17 and 18 describes packets that are sent from a managed switching element to a pool node and from a pool node to a managed switching element. In some embodiments, the packets are sent through tunnels in a similar manner that is described above by reference to FIGS. 6 and 7.

Figure 19:
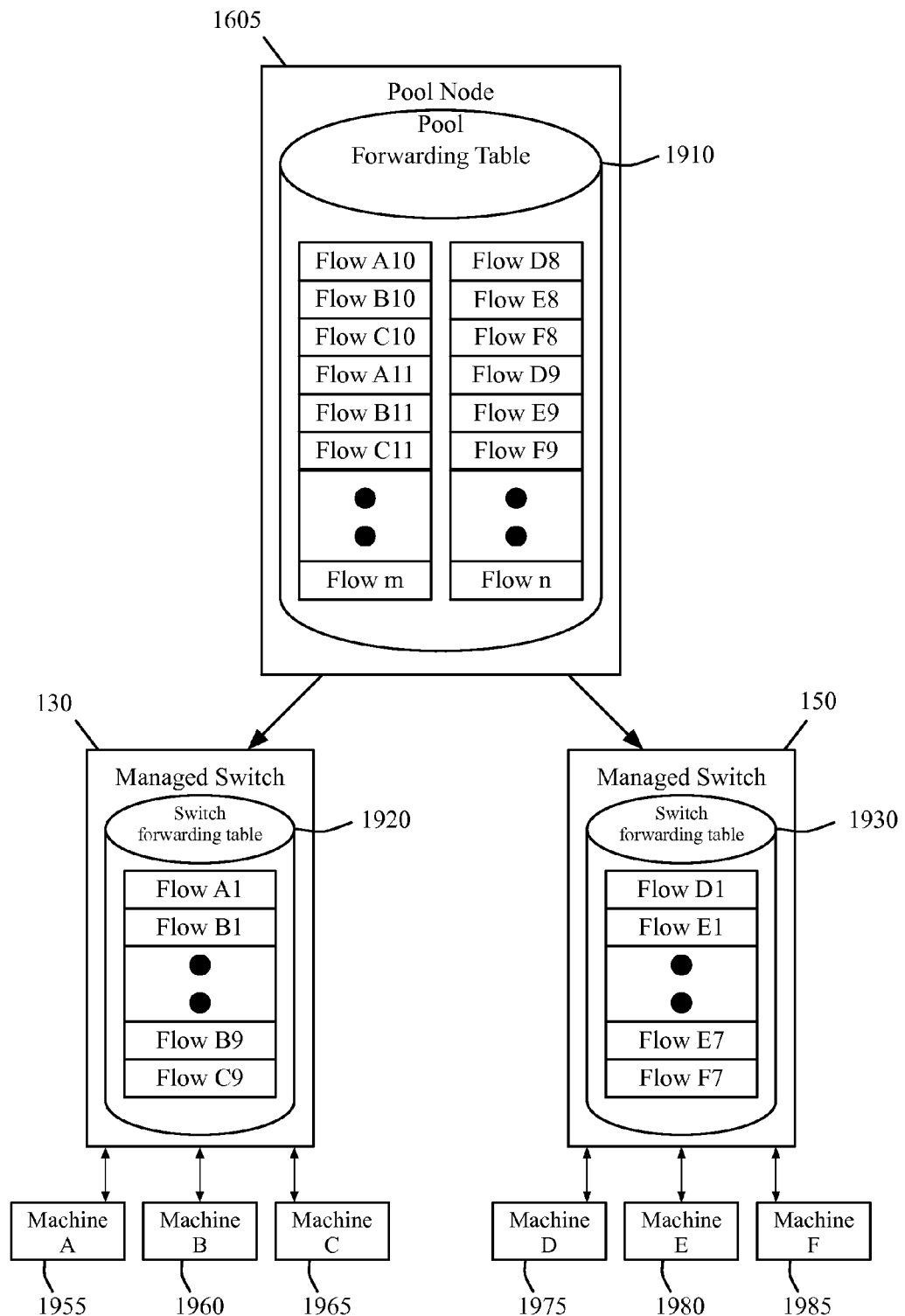

FIG. 19 conceptually illustrates an example of the pool node 1605 configured to assist in processing packets for the managed switching elements 130 and 150. In particular, this figure illustrates the managed switching elements 130 and 150 configured (e.g., by a network controller illustrated in FIGS. 1-5) with flow entries for processing packets and the pool node 1605 configured (e.g., by a network controller illustrated in FIGS. 1-5) with flow entries for processing packets for the managed switching elements 130 and 150.

As shown, the managed switching element 130 includes a forwarding table 1920 and the managed switching element 150 includes a forwarding table 1930. As noted above, the managed switching elements of some embodiments may have limited storage capacity and cannot store all the necessary flow entries to process the different packets in the network. In this example, the managed switching element 130 can only store 27 flow entries (i.e., 9 flow entries for each of the machines 1955-1965) and the managed switching element 150 can only store 21 flow entries (i.e., 7 flow entries for each of the machines 1975-1985). The flow entries in each of the forwarding tables 1920 and 1930 conceptually represent the packets that the managed switching elements 130 and 150 can process.

As described above, the pool node 1605 processes packets that the managed switching elements 130 and 150 cannot process (e.g., unknown destination MAC address, broadcast and multicast packets, etc.). As shown, the pool node 1605 includes a forwarding table 1910 with m+n flow entries. The flow entries in the forwarding table 1910 conceptually represent flow entries for processing packets that the managed switching elements 130 and 150 cannot process.

In some embodiments, a pool node includes all the flow entries that are used to manage the network. For instance, referring to FIG. 19 as an example, the pool node 1605 of such embodiments would include the flow entries in the forwarding tables 1920 and 1930 in addition to the flow entries shown in the forwarding table 1910. Moreover, a pool node of some embodiments includes information (e.g., MAC addresses) related to every machine in the managed network. In some such embodiments, the pool node would include flow entries for forwarding network data from every machine in the managed network to each other. In cases where a managed network includes multiple pool nodes, some embodiments configure each pool node similarly while other embodiments may configure one or more pool nodes differently.

Although FIG. 19 shows forwarding tables with the same number of flow entries for each machine stored in a forwarding table of the managed switching elements and pool node, this figure illustrates an exemplary configuration of the managed switching elements and the pool node. One of ordinary skill will recognize that the managed switching elements and the pool node may include multiple forwarding tables with a different number of flow entries for each of the different machines.

Figure 20:
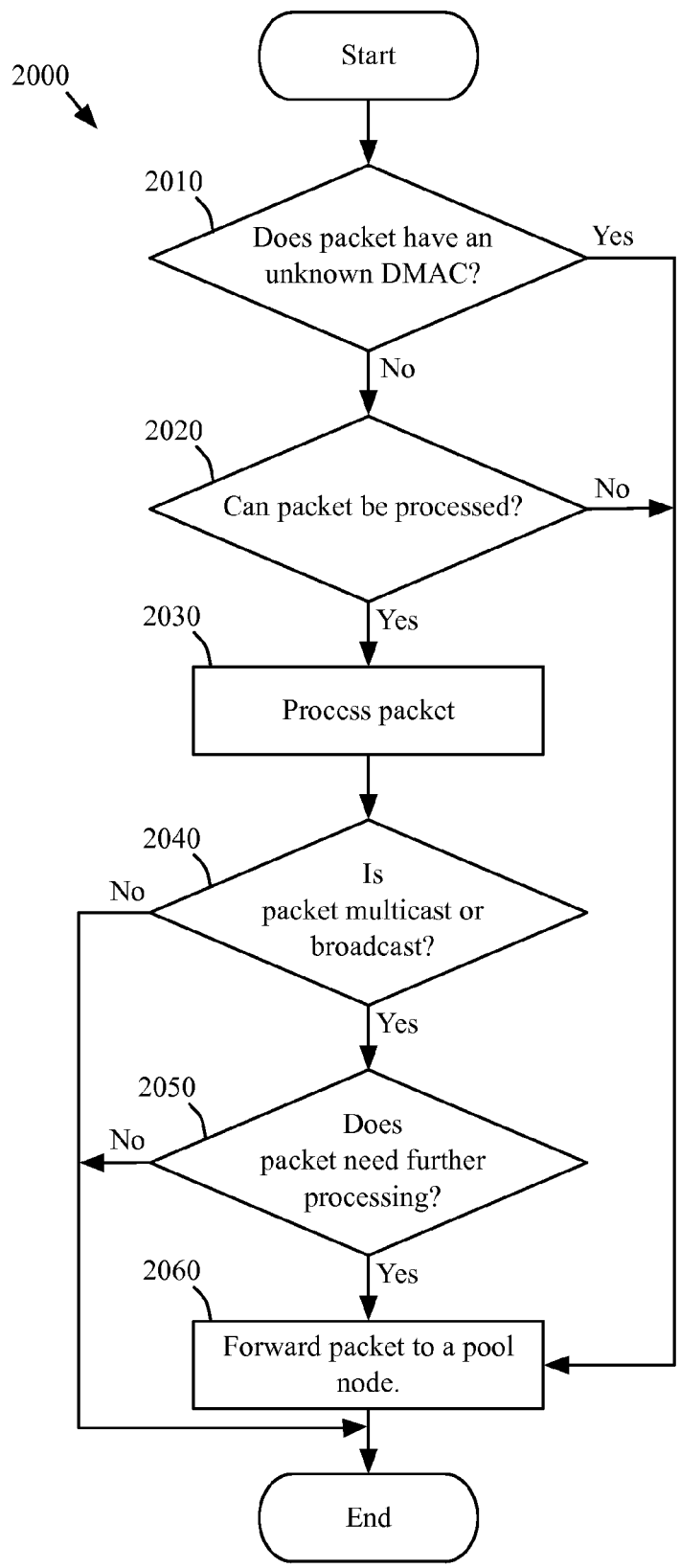
FIG. 20 conceptually illustrates a process of some embodiments for processing packets.

FIG. 20 conceptually illustrates a process 2000 of some embodiments for processing packets. In some embodiments, the process 2000 is performed by each managed switching element in a managed network. Specifically, the managed switching elements of some embodiments perform the process 2000 when performing the second stage 1420 of the processing pipeline 1400, which is described above by reference to FIG. 14.

The process 2000 starts by determining (at 2010) whether the packet has an unknown destination MAC address. In some embodiments, the destination MAC address of the packet is unknown when the managed switching element that is performing the process 2000 does not have a flow entry that matches the packet's destination MAC address. When the process 2000 determines that the packet does not have an unknown destination MAC address, the process 2000 proceeds to 2020. Otherwise, the process 2000 forwards (at 2060) the packet to a pool node and then the process 2000 ends.

Next, the process 2000 determines (at 2020) whether the packet can be processed. In some embodiments, the packet can be processed when the managed switching element on which the process 2000 is being performed has a flow entry that matches the packet. When the process 2000 determines that the packet cannot be processed, the process 2000 forwards (at 2060) the packet to a pool node and then the process 2000 ends.

When the process 2000 determines that the packet can be processed, the process 2000 processes (at 2030) the packet. The process 2000 of some embodiments processes the packet by performing the action specified in the flow entry that matches the packet. After processing the packet, the process 2000 proceeds to 2040.

At 2040, the process 2000 determines whether the packet is a multicast or broadcast packet. Some embodiments define a multicast or broadcast packet as a packet with defined values in a set of header fields (e.g., destination MAC address, inport, etc.). When the process 2000 determines that the packet is not a multicast or broadcast packet, the process 2000 ends. Otherwise, the process 2000 determines (at 2050) whether the packet needs further processing. A packet may need further processing when the packet is a multicast or broadcast packet and one or more of the recipients of the multicast or broadcast packet are unknown (e.g., the recipients are not coupled to the managed switching element that is performing the process 2000).

When the process 2000 determines that the packet needs further processing, the process 2000 forwards (at 2060) the packet to a pool node and then the process 2000 ends. When the process 2000 determines that the packet does not need further processing, the process 2000 ends.

In some embodiments, some or all of the operations in the process 2000 is implemented by flow entries in the managed switching element on which the process 2000 is performed. For instance, the managed switching element may include a set of flow entries that define a broadcast or multicast packet in some such embodiments. In such cases, the managed switching element performs a lookup on the set of flow entries to determine whether a packet is a broadcast or multicast packet (i.e., whether the packet matches against the set of flow entries).

Figure 21:
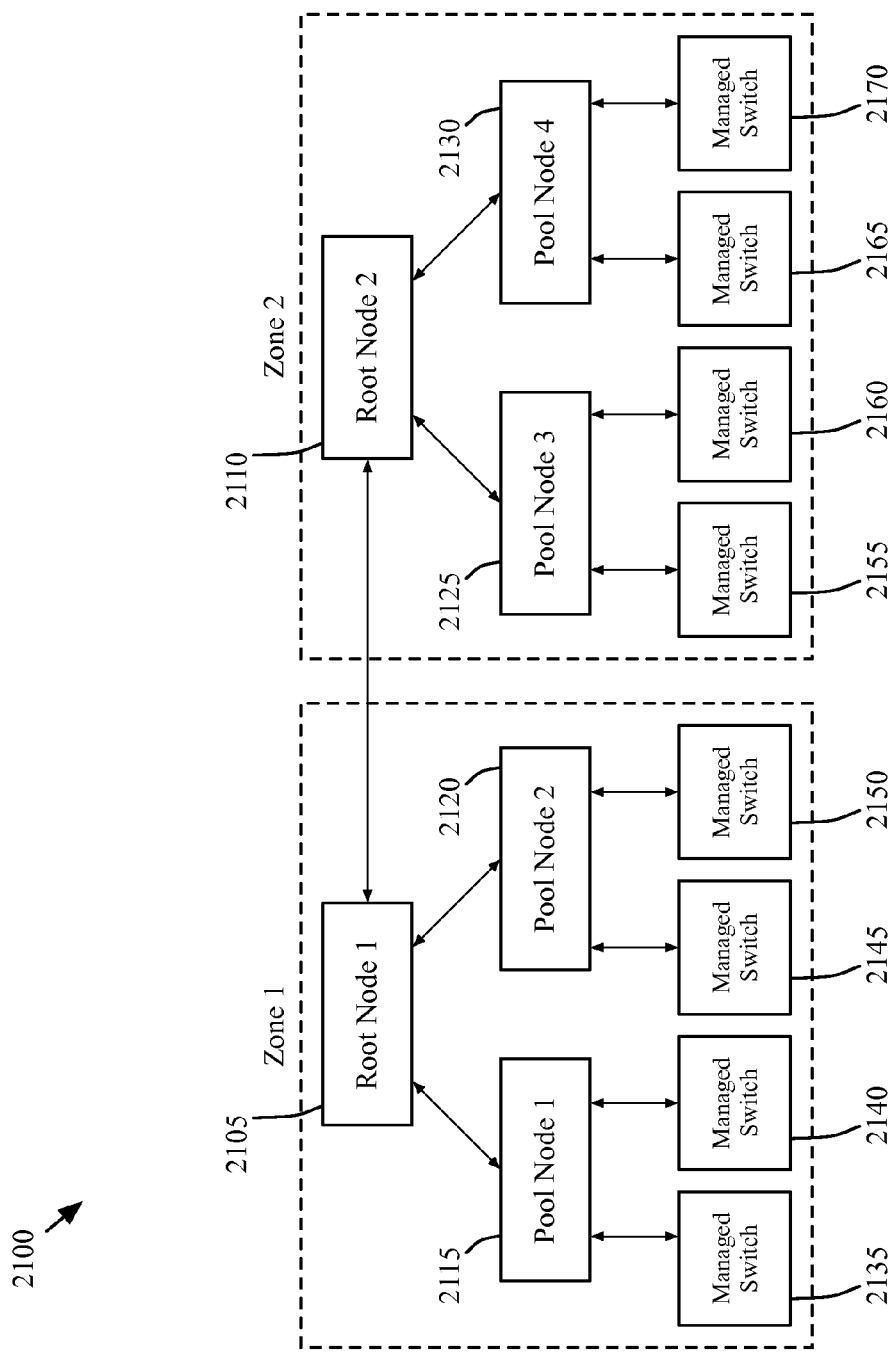
FIG. 21 conceptually illustrates a network architecture of some embodiments that includes root nodes.

FIG. 21 conceptually illustrates a network architecture 2100 of some embodiments that includes root nodes 2105 and 2110. As shown, the network architecture 2100 includes the root nodes 2105 and 2110, pool nodes 2115-2130, and managed switching elements 2135-2170. FIG. 21 also shows that each zone include a root node. In some embodiments, each zone in the network includes only one root node while, in other embodiments, each zone in the network can include several root nodes. In this application, a root node may also be referred to as a root bridge.

In some embodiments, a root node is similar to a pool node in that the root node is a switching element (e.g., a hardware switching element or an OVS) that is for assisting in the implementation of logical switching elements across managed switching elements. However, the root node provides different functions than a pool node and is positioned at a different level in the network hierarchy. The following will describe some functions that the root node of some embodiments provides.

Some embodiments of the root nodes 2105 and 2110 provide a communication bridge between zones in the network. In some embodiments, a zone is a defined group of machines in a network. A zone may be defined any number of different ways in different embodiments. For instance, a zone may be defined as a group of machines in an office, a group of machines in a section of a data center, a group of machines in a building. As shown, zone 1 of the network architecture includes the pool nodes 2115 and 2120 and the managed switching elements 2135-2150 and the zone 2 of the network architecture includes the pool nodes 2125 and 2130 and the managed switching elements 2155-2170.

As shown in FIG. 21, the network elements in zone 1 of the network cannot communicate with the network elements in zone 2 of the network. When a network element in one of the zones wants to communicate with a network element in the other zone, such communications are forwarded to the corresponding root node in the zone. For instance, if the managed switching element 2135 wants to send a packet to the managed switching element 2170, the managed switching element 2135 sends the packets to the pool node 2115, which sends the packet to the root node 2105. The root node 2105 of zone 1 then forwards the packet to the root node 2110 of zone 2 to forward to the managed switching element 2170 through the pool node 2130.

In some embodiments, the root nodes 2105 and 2110 perform logical context learning. Logical context learning, in some embodiments, is a process of identifying the network element(s) to which packets are forwarded so that the packets can reach the packets' intended destination. Referring to FIG. 21 as an example, if the root node 2105 receives from the pool node 2115 a packet from a new machine (e.g., the packet includes an unknown source MAC address or IP address) that has recently been connected to the managed switching element 2135, the root node 2105 "learns" that the root node 2105 should forward packets destined for the new machine to the pool node 2115 (as opposed to forwarding the packets to the pool node 2120 or the root node 2110). By performing logical context learning, the root nodes 2105 and 2110 of some embodiments is indirectly aware of the location of all the network elements in the network and can thus forward packets to the correct network element in order for packets to reach their intended destinations. Thus, when the pool nodes 2115-2130 do not know or cannot determine the logical context of a packet, the packet is sent to the corresponding root node in the pool node's zone for processing (e.g., to forward to the packet's intended destination).

As described above, FIG. 21 shows root nodes as separate components at the top of a network architecture hierarchy. However, in some embodiments, a similar network architecture may be implemented with pool nodes, which include some or all of the functions described above by reference to the root nodes in FIG. 21, in place of root nodes at the top of the network architecture hierarchy. In other embodiments, the some or all of the root node functions are implemented by each of the pool nodes. In addition, while FIG. 21 illustrates one level of pool nodes in the hierarchy of a network architecture, different embodiments of different network architectures may include different numbers of levels of pool nodes in the hierarchy of the network architecture as well as any number pool nodes at each level in the hierarchy of the network architecture.

Figure 22:
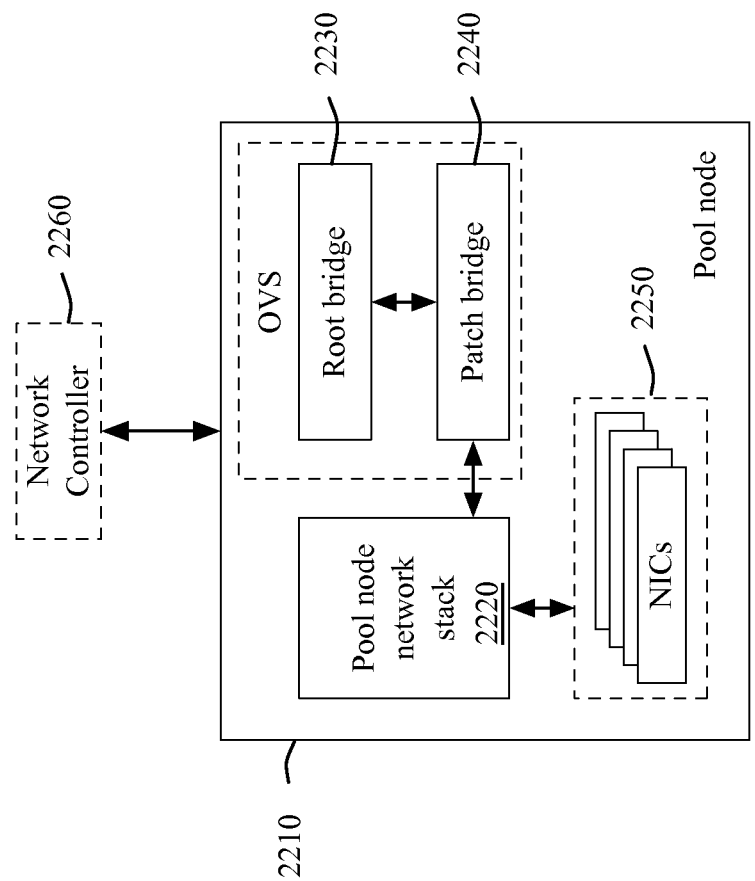
FIG. 22 conceptually illustrates an architectural diagram of a pool node of some embodiments.

FIG. 22 conceptually illustrates an architectural diagram of a pool node 2210 of some embodiments. In particular, FIG. 22 conceptually illustrates an example of a root node 2230 (i.e., root bridge) that is included in the pool node 2210. In some embodiments, the pool node 2210 is general computing device (e.g., an x86 computing device) that runs an operating system, such as a Unix-based operating system.

As shown, the pool node 2210 includes pool node network stack 2220, the root bridge 2230, patch bridge 2240, and a set of NICs 2250. In some embodiments, each NIC in the set of NICs 2250 is typical network interface controllers for connecting a computing device to one or more networks and sending and receiving network data (e.g., packets) over such networks. In addition, the set of NICs 2250 sends and receives network data from the pool node network stack 2220.

The pool node network stack 2220 is similar to the hypervisor network stack described above by reference to FIG. 12. The pool node network stack 2220 is an IP network stack that runs on the pool node 2210. Also, the pool node network stack 2220 processes and routes IP packets that are received from the patch bridge 2240 and the set of NICs 2250, by utilizing a set of routing tables (not shown) to route the packets.

In some embodiments, the patch bridge 2240 stores a set of rules (e.g., flow entries) that specify operations for processing and routing packets. The patch bridge 2240 communicates with a network controller 2260 in order to process and route packets that the patch bridge 2240 receives. For instance, the patch bridge 2240 receives commands from the network controller 2260 related to processing and routing of packets that the pool node 2210 receives. In some embodiments, the patch bridge 2240 communicates with the network controller 2260 through the Openflow protocol while, in other embodiments, another type of communication protocol may be used. The network controller 2260 is similar to the various network controllers described in this application, such as the ones described by reference to FIGS. 1-5. The network controller 2260 manages and controls the switching element (OVS in this example) that is running on the pool node 2210.

As explained above, a pool node of some embodiments is responsible for processing packets that managed switching elements in a managed network cannot process. In this example, the patch bridge 2240 processes and routes such packets. The patch bridge 2240 receives packets from managed switching elements through the set of NICs 2250 and the pool node network stack 2220. When the patch bridge 2240 receives a packet, the patch bridge 2240 processes and routes the packet according to the set of rules stored in the patch bridge 2240. In some cases, the patch bridge 2240 cannot process a packet (e.g., the patch bridge 2240 does not have a rule to which the packet matches). In these cases, the patch bridge 2240 sends the packet to the root bridge 2230 for processing.

Some embodiments of the root bridge 2230 are responsible for a learning function. The root bridge 2230 of some embodiments stores a set of tables of learned MAC addresses (unlike the pool nodes and managed switches of some embodiments, which are controlled by a network controller). The root bridge 2230 learns MAC addresses in the typical manner that layer 2 switches learn MAC addresses. For instance, when the root bridge 2230 does not know a MAC address (i.e., a destination MAC address of a packet is not included in the set of tables of learned MAC addresses), the root bridge 2230 floods all of the ports of the root bridge 2230 and records the MAC address of the packet that responds to the flood in the set of tables. As another example, when the root bridge 2230 receives a packet that includes a destination MAC address that the root bridge 2230 does not know (i.e., the destination MAC address of the packet is not included in the set of tables of learned MAC addresses), the root bridge 2230 records the source MAC address of the packet in the set of tables of learned MAC addresses. When the root bridge 2230 knows the MAC address of a packet (i.e., the MAC address is included in the set of tables of learned MAC addresses), the root bridge 2230 sends the packet to the patch bridge 2240 to forward to the appropriate NIC in the set of NICs 2250 in order for the packet to reach the packet's destination. In some embodiments, the root bridge 2230 and the patch bridge 2240 communicate through a set of patch ports, which are for connecting two bridges directly together. In some embodiments, the root bridge 2230 may be directly connected to one or more extenders. In some of these embodiments, a tunnel is established between the root bridge 2230 and each of the extenders in order for the root bridge 2230 and the extenders to communicate.

Although FIG. 22 illustrates a pool node that includes a root bridge, some embodiments may not include a root bridge. In some of these embodiments, the functions described above are implemented in the patch bridge of the pool node.

Figure 23:
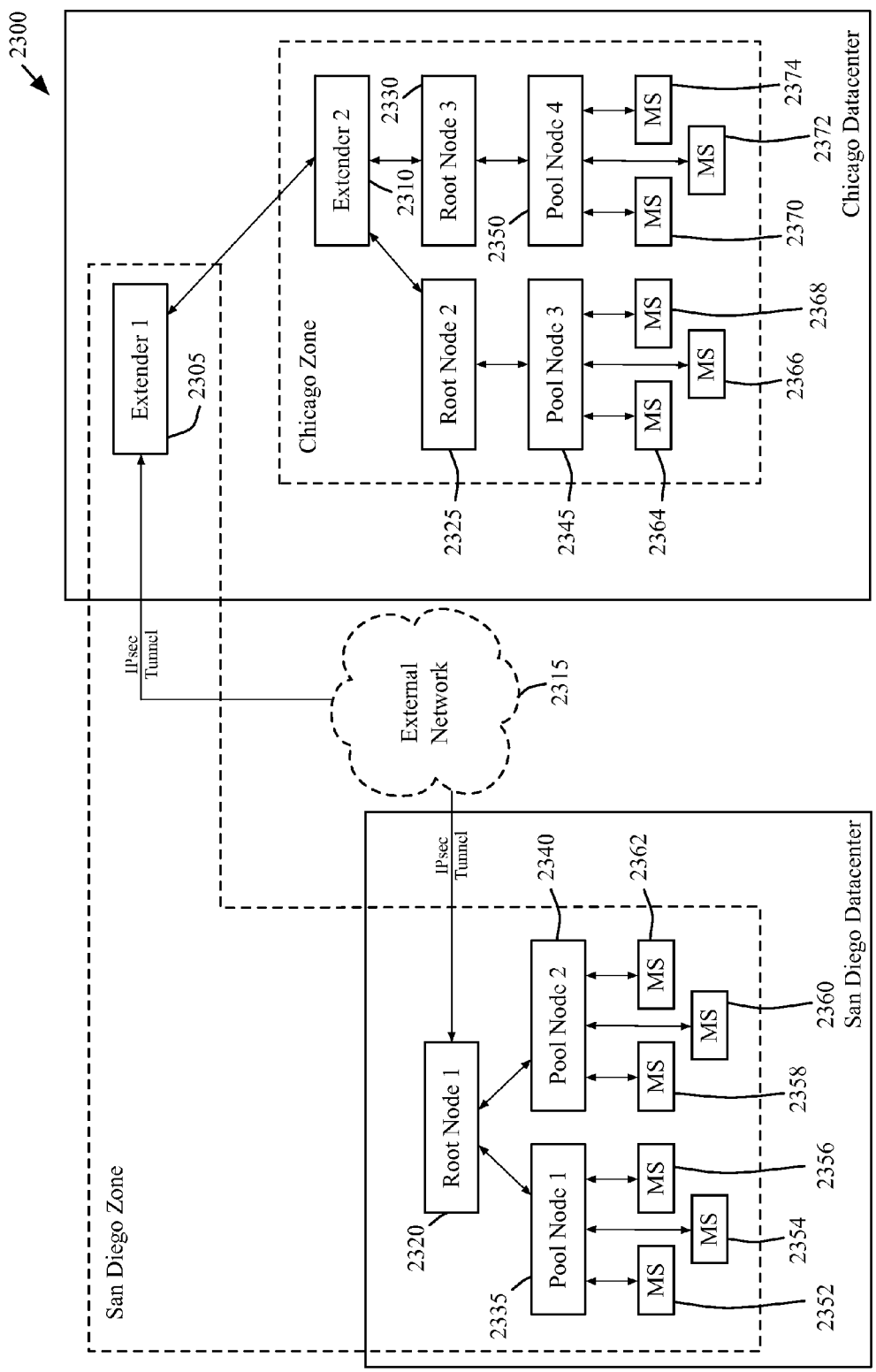
FIG. 23 conceptually illustrates a network architecture of some embodiments that includes extenders.

FIG. 23 conceptually illustrates a network architecture 2300 of some embodiments that includes extenders 2305 and 2310. This figure shows the network architecture 2300 that includes two managed networks, a San Diego zone and a Chicago zone. In this example, the San Diego zone and the Chicago zone are each controlled by a network controller (or control clusters). As shown, the San Diego zone includes the extender 2305, a router 2376, a root node 2320, pool nodes 2335 and 2340, and managed switching elements 2352-2362, and the router 2376, the root node 2320, the pool nodes 2335 and 2340, and managed switching elements 2352-2362 are physically located in a datacenter in San Diego. The Chicago zone includes the extender 2310, a router 2378, root nodes 2325 and 2330, pool nodes 2345 and 2350, and the managed switching elements 2364-2374. Also, the extenders 2305 and 2310, the router 2378, the root nodes 2325 and 2330, the pool nodes 2345 and 2350, and the managed switching elements 2364-2374 are physically located in a datacenter in Chicago.

In some embodiments, an extender is a switching element (e.g., a hardware switching element or an OVS) for communicatively bridging remote managed networks that are separated by one or more other networks. As shown in FIG. 23, the San Diego zone and the Chicago zone are separated by external network 2315. To allow communication between the two zones, the extender 2305, which is physically located in the Chicago datacenter, and the extender 2310 provide a communication bridge between the San Diego zone and the Chicago zone. In this example, the communication bridge between the two zones is partially provided by a tunnel, which is established using any of the tunneling protocols described above by reference to FIGS. 6 and 7, between the extender 2305 and the root node 2320. In addition, the tunnel in FIG. 23 is a secure tunnel that is secured using Internet Protocol Security (IPsec) since communications are sent between the two zones through the external network 2315, which may be unsecure.

The above FIG. 23 describes extenders that are used to bridge managed networks that are separately by an external network. However, the extenders of some embodiments can be used to bridge a managed network with an unmanaged network. An unmanaged network is a network that is not managed by a network controller, in some embodiments. The following FIG. 24 conceptually illustrates an example of extenders used for such a purpose.

Figure 24:
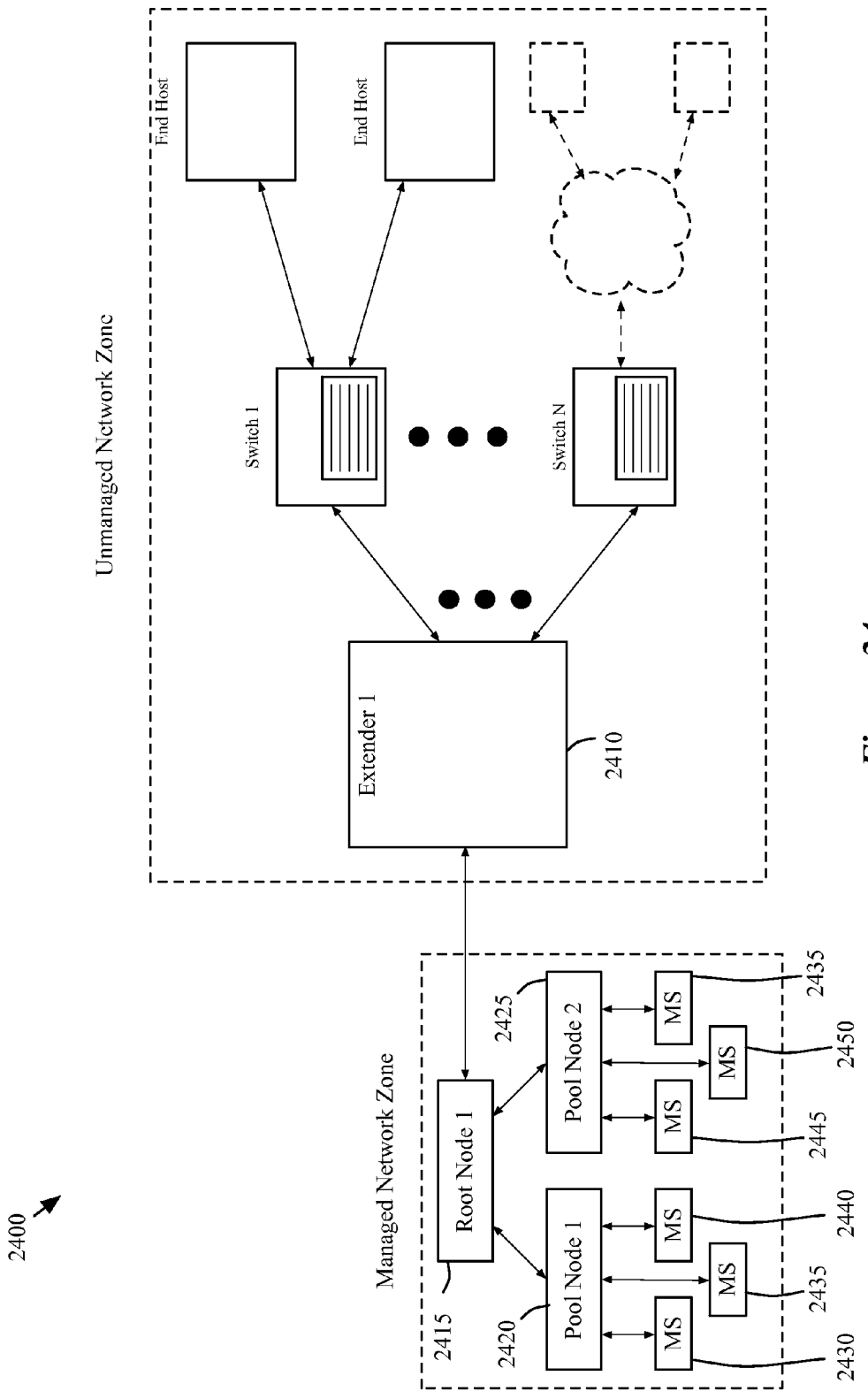
FIG. 24 conceptually illustrates a network architecture that includes a managed network zone and an unmanaged network zone.

FIG. 24 conceptually illustrates a network architecture 2400 that includes a managed network zone and an unmanaged network zone. As shown, the managed network zone includes a root node 2415, pool nodes 2420 and 2425, and managed switching elements 2430-2455. These network elements may be implemented by different embodiments of corresponding network elements that are described in this application. For example, the root node 2415 may be implemented by the root nodes described above by reference to FIG. 21, the pool nodes 2420 and 2425 may be implemented by the pool nodes described above by reference to FIG. 16, and the managed switching elements 2430-2455 may be implemented by the switching element described above by reference to FIG. 12.

The unmanaged network zone includes an extender 2410, switching elements 1-$n$, and multiple end hosts. One of ordinary skill in the art will realize that the unmanaged network zone may include any number of different networks and end hosts, as indicated by dashed lines in FIG. 24. In some embodiments, the extender 2410 in the unmanaged network zone is configured before deploying the extender in the unmanaged network zone. For example, some embodiments require an IP address of a network controller (or a network controller of a control cluster) that is will be controlling the extender 2410 to be specified (e.g., through a command line interface provided by the extender 2410).

Since the network elements (e.g., switching elements 1-$n$) in the unmanaged network zone are not used to implement logical switching elements (i.e., not controlled by a network controller), the network elements in the unmanaged network zone will not recognize logical context tags defined for the managed network. Accordingly, some embodiments of the extenders 2405 and 2410 remove the logical context tag from packets before sending the packets to the network elements of the unmanaged network zone. In some embodiments, the extender 2405 removes the logical context tag from packets to be forwarded to the extender 2410 while, in other embodiments, the extender 2410 removes the logical context tag from packets that the extender 2410 receives from the extender 2405 and that are to be forwarded to network elements in the unmanaged network zone.

Conversely, some embodiments of the extenders 2405 and 2410 add logical context tags to packets that are received from network elements in the unmanaged network zone and destined for the managed network zone. For instance, the extender 2410 of some embodiments may add a logical context tag to a packet that the extender 2410 receives from one of the network elements (e.g., switching elements 1-$n$). The logical context tag may, in some embodiments, indicate that the packet belongs to a generic logical context representing packets that originate from an unmanaged network that are destined for the managed network zone. In some embodiments, the extender 2410 adds the logical context tag to the packet when the extender 2410 receives the packets from network elements in the unmanaged network zone while, in other embodiments, the extender 2405 adds the logical context tag to the packet when the extender 2405 receives the packets from the extender 2410.

Figure 25:
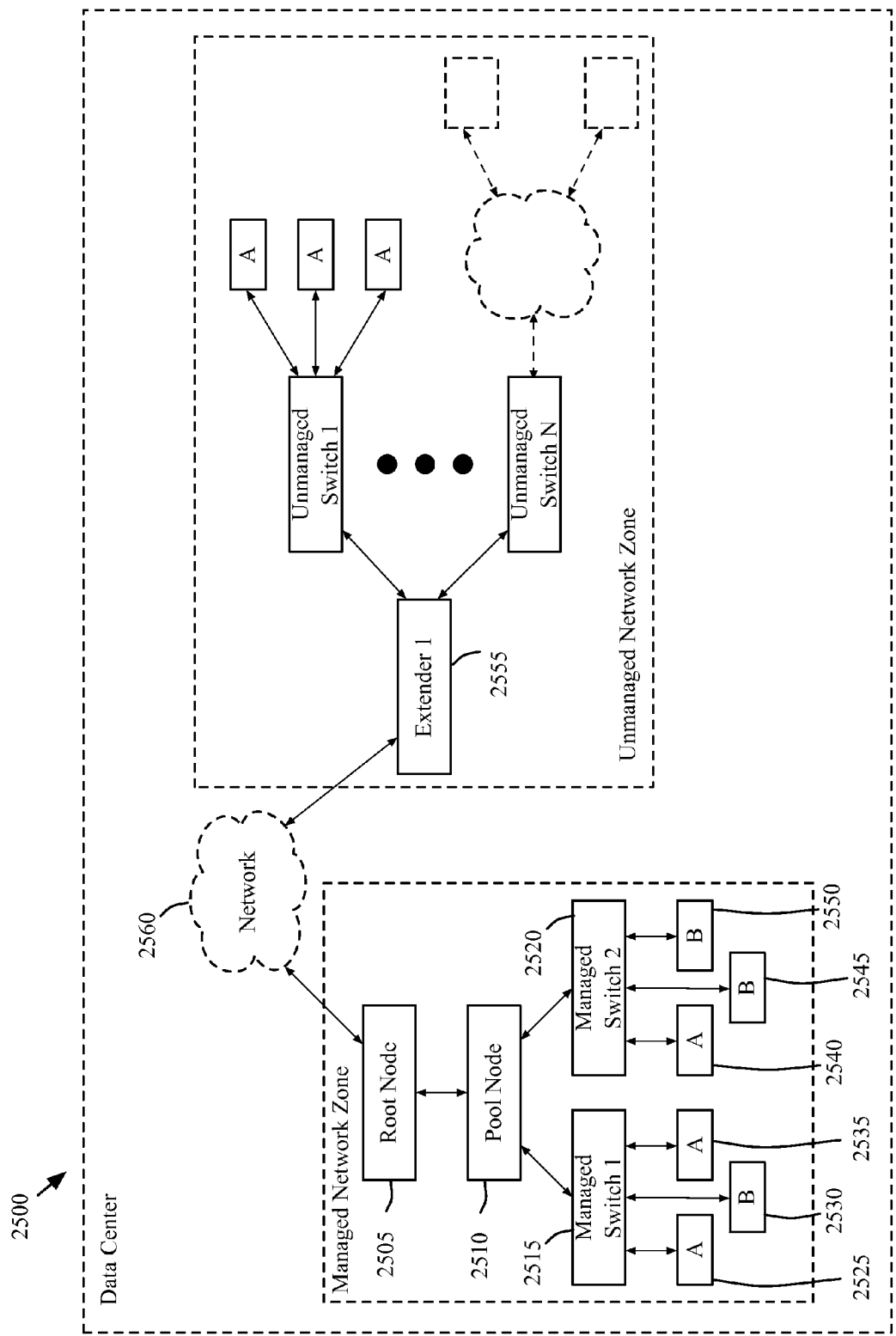
FIG. 25 conceptually illustrates a network architecture that includes a managed network zone and an unmanaged network zone, which are part of a data center.

FIG. 25 conceptually illustrates a network architecture 2500 that includes a managed network zone and an unmanaged network zone, which are part of a data center. In particular, FIG. 25 conceptually illustrates the use of an extender to facilitate the implementation of a logical switching element that logically connects a tenant's machines that are spread across a managed network zone and an unmanaged network zone.

As illustrated in FIG. 25, the managed network zone includes a root node 2505, a pool node 2510, managed switching elements 2515 and 2520, and machines 2525-2550. These network elements may be implemented by different embodiments of corresponding network elements that are described in this application. For instance, the root node 2505 may be implemented by the root nodes described above by reference to FIG. 21, the pool node 2510 may be implemented by the pool nodes described above by reference to FIG. 16, the managed switching elements 2515 and 2520 may be implemented by the switching element described above by reference to FIG. 12, and the machines may be implemented by the machines describe above by reference to FIG. 1.

The unmanaged network zone includes an extender 2555, switching elements 1-$n$, and multiple machines. One of ordinary skill in the will realize that the unmanaged network zone may include any number of different networks and end hosts, as indicated by dashed lines. In addition, FIG. 25 illustrates that the managed network zone and the unmanaged network are coupled to each other through network 2560. Specifically, the root node 2505 of the managed network zone and the extender 2555 of the unmanaged network zone are coupled to each other through the network 2560. The network 2560 may be a layer 2 network (e.g., a local area network (LAN)) in some embodiments while the network 2560 may be a layer 3 network.

In some embodiments, the extender 2555 in the unmanaged network zone is configured before deploying the extender in the unmanaged network zone. For example, some embodiments require an IP address of a network controller (or a network controller of a control cluster) that is will be controlling the extender 2555 to be specified (e.g., through a command line interface provided by the extender 2555).

Because the network elements (e.g., switching elements 1-n) in the unmanaged network zone are not used to implement logical switching elements (i.e., not controlled by a network controller), the network elements in the unmanaged network zone will not recognize logical context tags defined for the managed network. Therefore, some embodiments of the extender 2555 removes the logical context tag from packets before sending the packets to the network elements of the unmanaged network zone through the network 2560. In addition, the extender 2555 of some embodiments adds logical context tags to packets that are received from network elements in the unmanaged network zone and destined for the managed network. For instance, the extender 2555 of some embodiments may add a logical context tag to a packet that the extender 2555 receives from one of the network elements (e.g., switching elements 1-n). The logical context tag may, in some embodiments, indicate that the packet belongs to a generic logical context representing packets that originate from an unmanaged network. In some embodiments, the extender 2555 adds the logical context tag to the packet when the extender 2555 receives the packets from network elements in the unmanaged network zone that are destined for the managed network zone.

Although FIG. 25 shows a managed network zone coupled to an unmanaged network through a root node in the managed network zone and an extender in the unmanaged network zone, some embodiments may utilize an extender in the managed network zone to couple the managed network zone to the unmanaged network, similar to the managed network zone illustrated in FIG. 24. Furthermore, FIG. 25 illustrates the use of an extender to facilitate the implementation of a logical switching element that logically connects one tenant's machines that are spread across a managed network zone and an unmanaged network zone. However, the extender may utilized to facilitate the implementation of different logical switching elements that logically connects different tenant's machines that are spread across a managed network zone and an unmanaged network zone.

Figure 26:
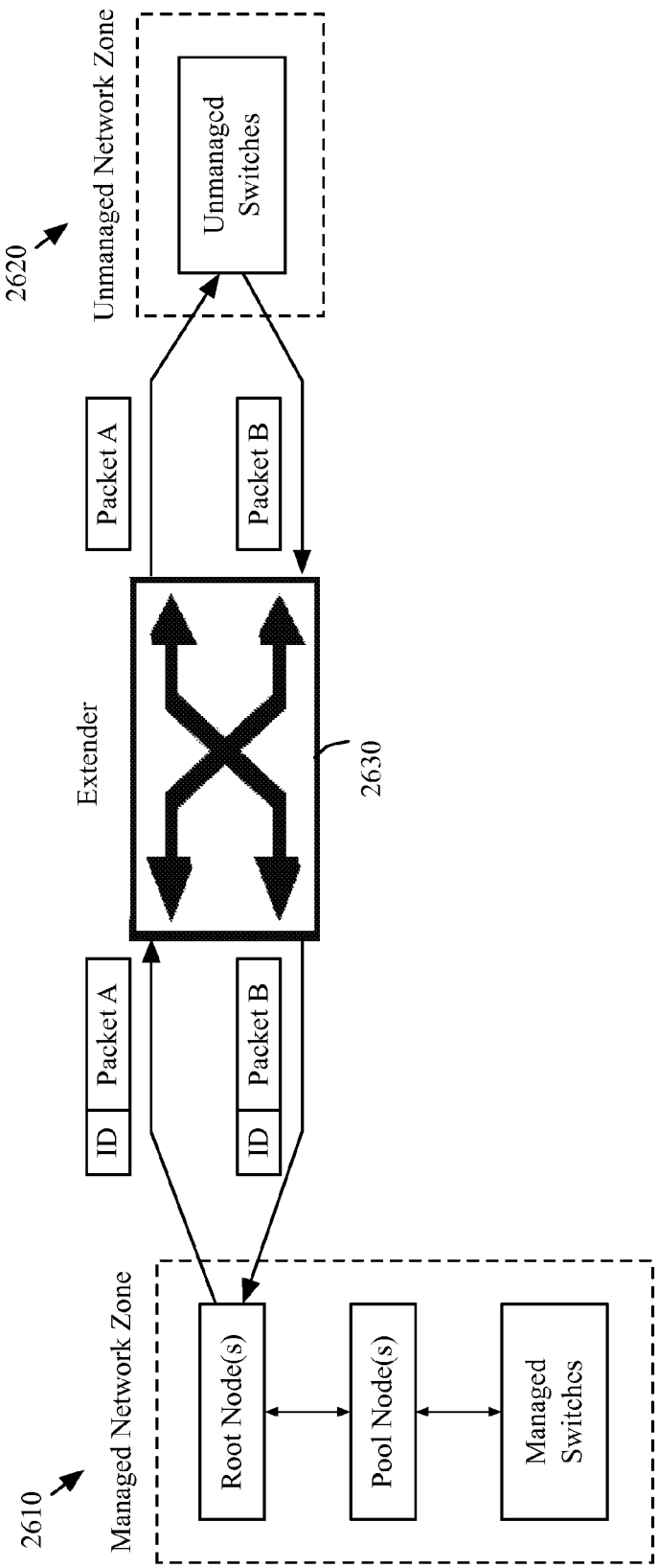
FIG. 26 conceptually illustrates an example of mapping logical context tags between managed networks and unmanaged networks.

FIG. 26 conceptually illustrates an example of mapping logical context tags between managed networks and unmanaged networks. As mentioned above, some embodiments of extenders add logical context tags to packets and/or remove logical context tags from packets. FIG. 26 conceptually illustrates examples of such mappings. As shown, an extender 2630 provides a communication bridge between a managed network zone and an unmanaged network zone. The managed network zone includes a set of root nodes, a set of pool nodes, and a set of managed switching elements. The unmanaged network zone includes a set of unmanaged switching elements.

In some embodiments, the extender 2630 receives packet from the managed network zone that includes a logical context tag. Referring to FIG. 26 as an example, packet A includes a logical context tag, as indicated by an "ID" in the packet's header. When the extender 2630 receives the packet A, the extender 2630 removes the logical context tag from the packet A. As shown, when the extender 2630 sends the packet A to the unmanaged network zone, the packet A no longer has the "ID" logical context tag.

The extender 2630 of some embodiments maps packets from the unmanaged network zone to the managed network zone. In some of these embodiments, the extender 2630 identifies a logical context for the packets and adds a logical context tag that represents the identified logical context. Referring to FIG. 26 as an example, when packet B is sent to the extender 2630, the packet B does not have a logical context tag. When the extender 2630 receives the packet B, the extender 2630 identifies a logical context for the packet B (e.g., by matching the packet B against flow entries) and adds a logical context tag that represents the identified logical context of the packet B. As noted above, the logical context tag may, in some embodiments, indicate that the packet B belongs to a generic logical context representing packets that originate from an unmanaged network. Then, the extender 2630 sends the packet B to the managed network zone.

While FIG. 26 illustrates mapping of logical context tags between managed networks and unmanaged networks by an extender, some embodiments implement such functionality in a different network element. For instance, a root node to which the extender is connected may perform logical context tag mapping between managed networks and unmanaged networks, in some embodiments.

Figure 27:
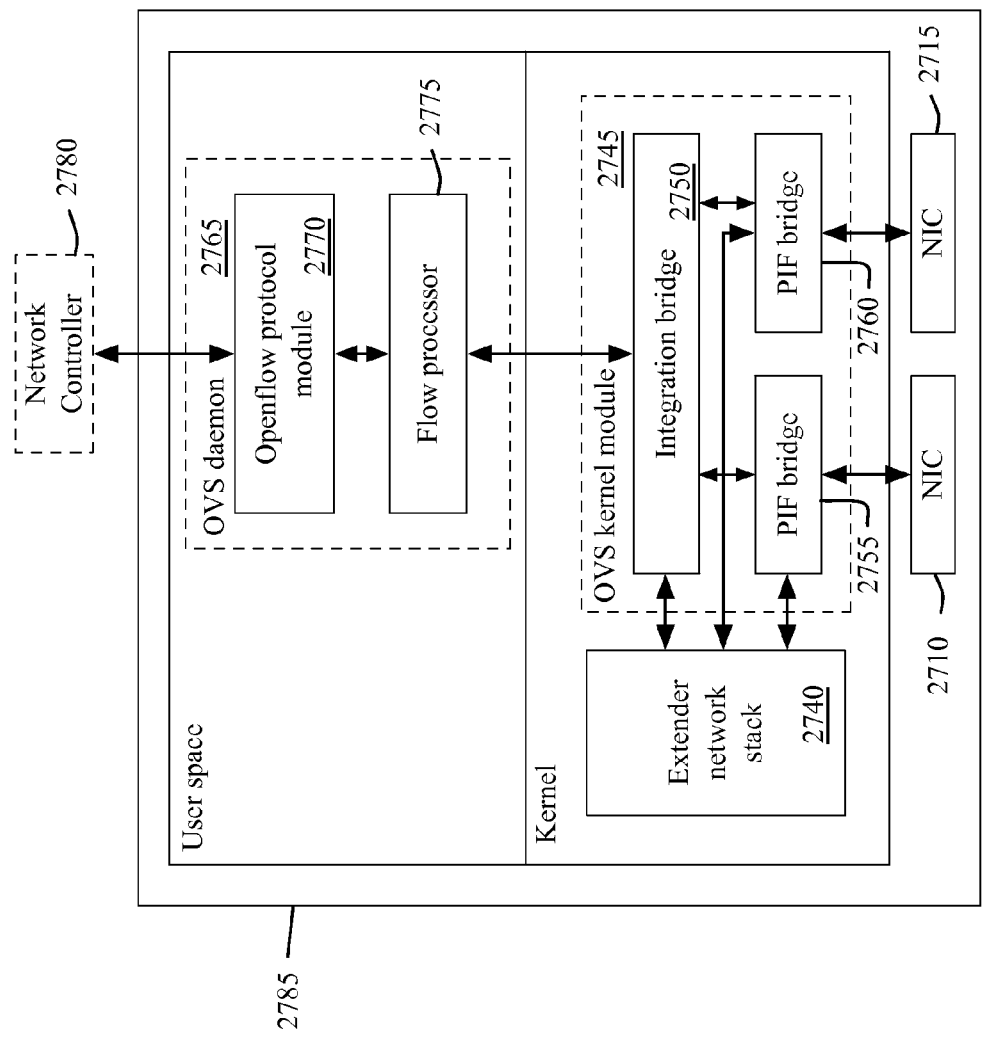
FIG. 27 conceptually illustrates an architectural diagram of an extender of some embodiments.

FIG. 27 conceptually illustrates an architectural diagram of an extender 2785 of some embodiments. As shown, the extender 2785 is similar to the VM 1285, which is described above by reference to FIG. 12, except the extender 2785 is running on the extender 2785's own computing device (e.g., a x86 computing device) instead of a VM that is running on a hypervisor along with other VMs in a single host.

The extender 2785 essentially functions similar to the VM 1285, as explained above. Thus, NICs 2710 and 2715 function similar to the NICs 1210 and 1215, extender network stack 2740 functions similar to the hypervisor network stack 1240, PIF bridges 2755 and 2760 function similar to the PIF bridges 1255 and 1260, integration bridge 2750 functions similar to the integration bridge 1250, flow processor 2775 functions similar to the flow processor 1275, and Openflow protocol module 2770 functions similar to the Openflow protocol module 1270. However, the extender 2785 of some embodiments serves different purposes in a managed network, as noted above, and, thus, may be configured differently by a network controller of the managed network.

Figure 28:
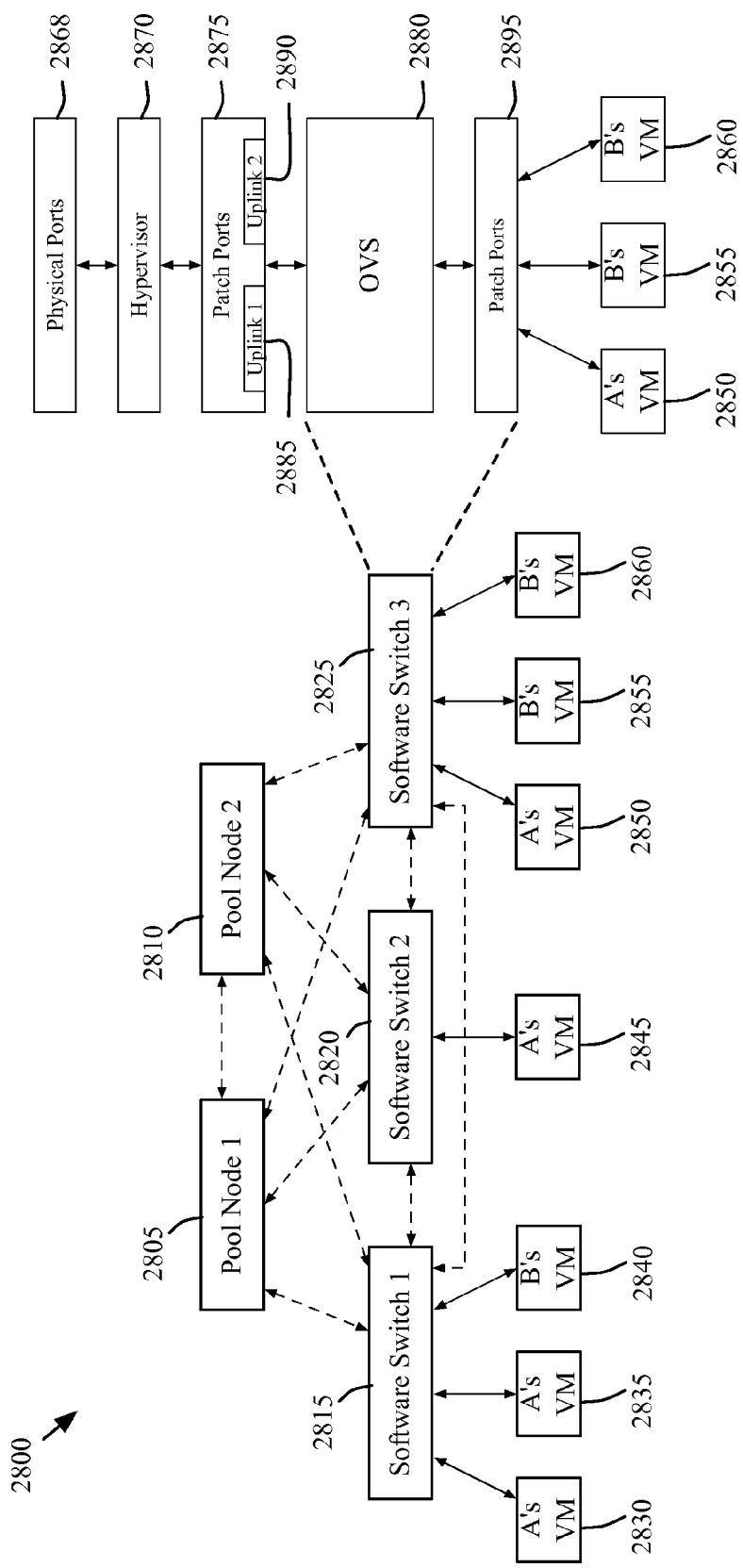
FIG. 28 conceptually illustrates a network architecture for distributing packet processing between pool nodes.

FIG. 28 conceptually illustrates a network architecture 2800 for distributing packet processing between pool nodes 2805 and 2810. This figure shows the network architecture 2800 that includes the pool nodes 2805 and 2810, software switching elements 2815-2825, and VMs 2830-2860. In this example, the software switching elements 2815-2825 are managed switching elements and the VMs 2830-2860 run on the same host as the corresponding software switching element. That is, VMs 2830-2840 are running on the same host as the software switching element 2815, the VM 2845 is running on the same host as the software switching element 2820, and the VMs 2850-2860 are running on the same host as the software switching element 2825.

As described above, a software switching element may be an OVS that runs on a physical host in some embodiments. In this example, the software switching elements 2815-2825 are OVSs that each runs a physical host. On the right side of FIG. 28, a block diagram of the software switching element 2825 and the physical host on which the software switching element 2825 runs is shown. The physical host includes physical ports 2865, hypervisor 2870, patch ports 2875, OVS 2880, patch ports 2895, and the VMs 2850-2860. The physical ports 2865, hypervisor 2870, patch ports 2875, OVS 2880, patch ports 2895, and the VMs 2850-2860 are similar to the corresponding components illustrated in FIG. 11.

To distribute packet processing between the pool nodes 2805 and 2810, each of the pool nodes 2805 and 2810 needs to be able to process a given packet. As such, the pool nodes 2805 and 2810 each include the same set of flow entries, in some embodiments. This way, either the pool node 2805 or the pool node 2810 can process a given packet.

Moreover, each of the software switching elements 2815-2825 needs to be able to access both of the pool nodes 2805 and 2810 in some embodiments. As such, some embodiments couple the software switching elements 2815-2825 to the pool nodes 2805 and 2810 using tunnels that are provided by tunneling protocols that are described above by reference to FIGS. 6 and 7. As shown in FIG. 28, each of the software switching elements 2815-2825 is coupled to each of the pool nodes 2805 and 2810 through a tunnel. In addition, each of the software switching elements 2815-2825 is also coupled to each of the other software switching elements 2815-2825 through a tunnel (e.g., a layer 3 tunnel), and, thus, can each communicate with one another. These tunnels are indicated by dashed arrows. This way, each of the software switching elements 2815-2825 is aware of the interface (e.g., VIF) through which each VM is coupled, and, thus, has access to the MAC address associated with each of the interfaces through which the VMs are coupled. The tunnel configuration between the pool nodes 2805 and 2810 and the software switching elements 2815-2825 illustrated in FIG. 28 is referred to as a full tunnel mesh in some embodiments.

In some embodiments, software switching elements 2815-2825 send packets to the pool nodes 2805 and 2810 through designated ports. The designated ports are referred to as uplink ports in some embodiments. As shown in FIG. 28, the patch ports 2875 include uplink ports 2885 and 2890. The uplink port 2885 corresponds to the pool node 2805 and the uplink port 2890 corresponds to the pool node 2810. Therefore, when the software switching element 2825 wants to send packet to the pool node 2805, the software switching element 2825 sends the packet to the uplink port 2885 and when the software switching element 2825 wants to send packet to the pool node 2810, the software switching element 2825 sends the packet to the uplink port 2890. The hypervisor 2870 of some embodiments manages the uplink ports 2885 and 2890 such that the uplink ports 2885 and 2890 correspond to the correct physical ports 2865 for the packets to reach the pool nodes 2805 and 2810.

As mentioned above, FIG. 28 illustrates a full tunnel mesh configuration between software switching elements and pool nodes in a managed network. However, different embodiments may use different tunnel configurations between the software switching elements and the pool nodes. For example, some embodiments might implement a partial tunnel mesh configuration. In some such embodiments, the pool nodes are divided into subsets of pool nodes and each subset of pool nodes handles a portion of the packet processing load.

Figure 29:
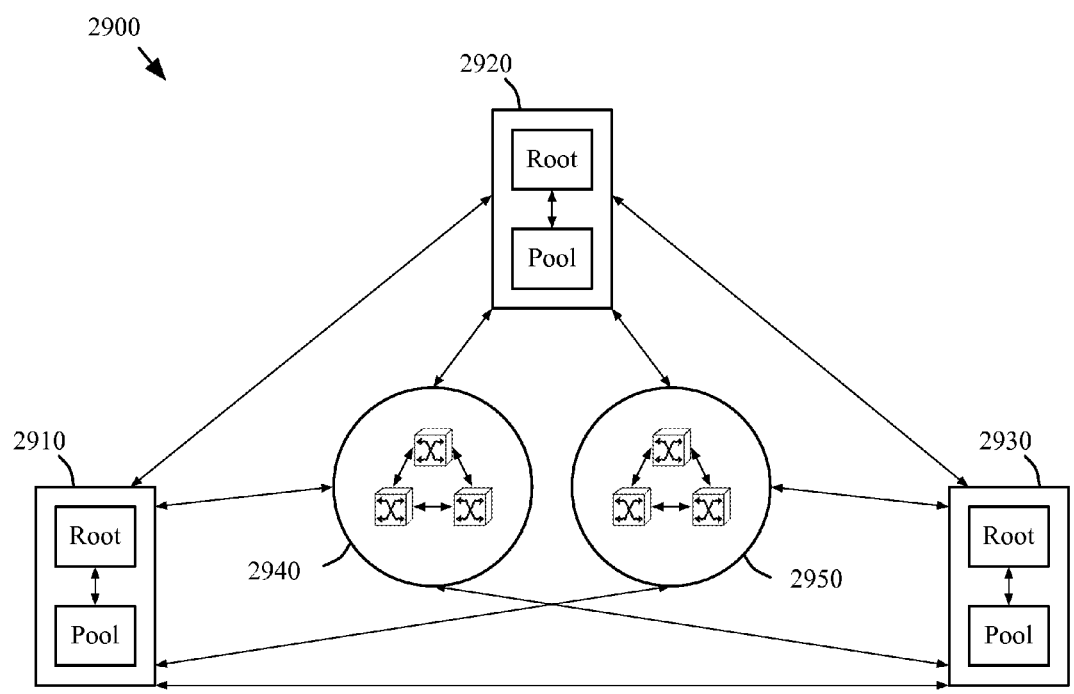
FIG. 29 conceptually illustrates an example tunnel configuration of some embodiments.

As the number of pool nodes, root nodes, and/or managed switching elements increases in a manage network utilizing a full tunnel mesh configuration, the complexity of the configuration can increase and the resources for establishing tunnels can decrease. FIG. 29 conceptually illustrates a tunnel configuration for reducing the number of tunnels between the pool nodes, root nodes, and/or managed switching elements in the managed network while providing all the managed switching elements access to the pool node and root nodes.

As illustrated in FIG. 29, a managed network 2900 includes pool and root nodes 2910-2930 and cliques 2940 and 2950. For this example, a pool and root node is a physical host (e.g., a server computer) on which an OVS runs as a pool node and an OVS runs as a root node. In some embodiments, a clique includes two or more managed switching elements that are coupled to each other in a full tunnel mesh configuration.

Referring to FIG. 29, the managed switching elements in the clique 2940 are each coupled to each other through tunnels. Similarly, the managed switching elements in the clique 2950 also are each coupled to each other through tunnels. However, none of the managed switching elements in the clique 2940 are coupled to any of the managed switching elements in the clique 2950. Thus, a lower number of tunnels are utilized than the number of tunnels that would be required if the managed switching elements in the cliques 2940 and 2950 were all configure in a full tunnel mesh configuration. Furthermore, each managed switching element in the cliques 2940 and 2950 are coupled to each of the pool and root nodes 2910-2930 through a tunnel. Although only a single arrow is shown between the cliques 2940 and 2950 and each of the pool and root nodes 2910-2930, these arrows actually represent the tunnels (three tunnels in this example) from each of the managed switching elements in the cliques 2940 and 2950 and the pool and root nodes 2910-2930.

Figure 30:
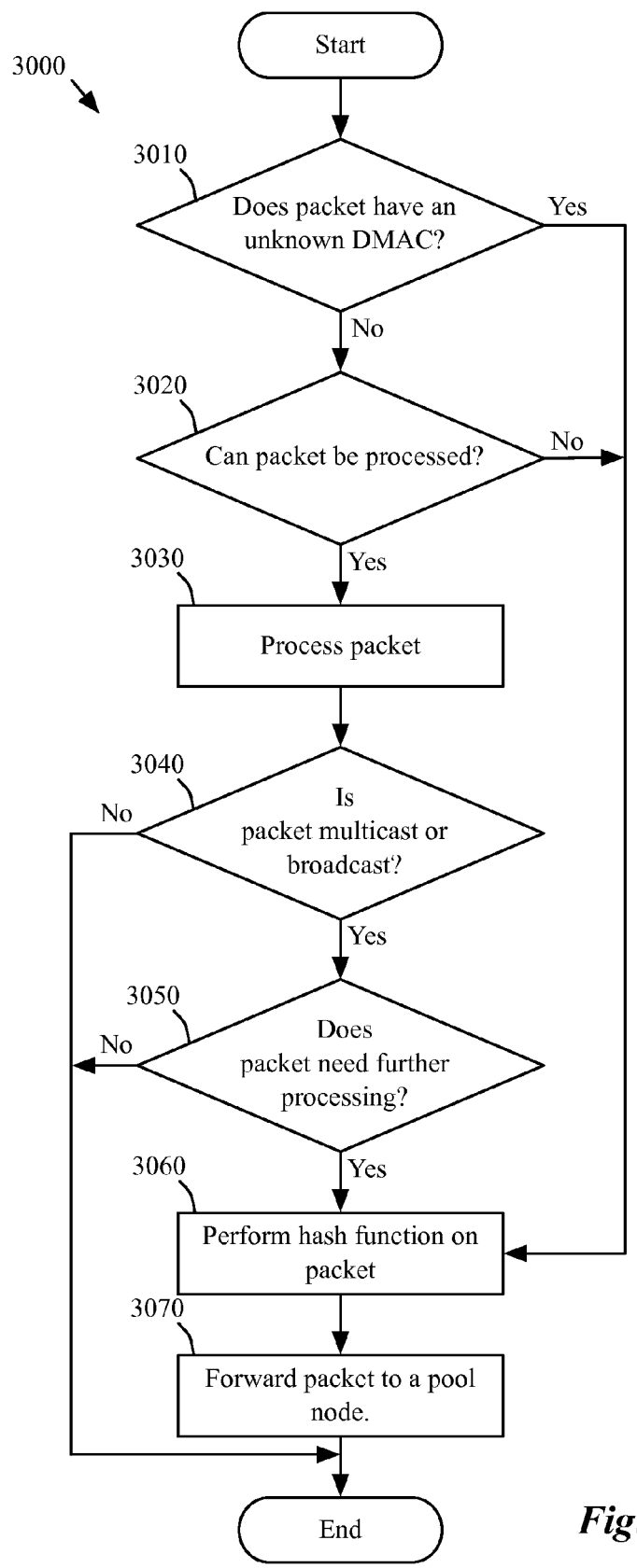
FIG. 30 conceptually illustrates a process of some embodiments for processing packets.

FIG. 30 conceptually illustrates a process 3000 of some embodiments for processing packets. In some embodiments, the process 3000 is performed by each managed switching element in a managed network that employs the pool node distribution technique described above by reference to FIG. 28. That is, the pool nodes in the managed network each include the same set of flow entries and each of the managed switching elements can access each of the pool nodes. In some embodiments, each of the managed switching elements perform the process 3000 when performing the second stage 1420 of the processing pipeline 1400, which is described above by reference to FIG. 14.

The process 3000 is similar in many respects to the process 2000 described above by reference to FIG. 20. However, the process 3000 includes an additional operation for determining a hash value to determine a pool node to which to send the packet.

The operations 3010-3050 of the process 3000 are the same as the operations 2010-2050 of the process 2000. That is, the process 3000 determines (at 3010) whether the packet has an unknown destination MAC address. If the packet has an unknown destination MAC address, the process 3000 continues to 3060. Otherwise, the process 3000 determines (at 3020) whether the packet can be processed. If the packet cannot be processed, the process 3000 proceeds to 3060. If the process 3000 determines that the packet can be processed, the process 3000 processes (at 3030) the packet and then the process 3000 determines (at 3040) whether the packet is a multicast or broadcast packet.

If the process 3000 determines that the packet is not a multicast or broadcast packet, the process 3000 ends. Otherwise, the process 3000 determines (at 3050) whether the packet needs further processing. If the packet does not need further processing, the process 3000 ends. Otherwise, the process 3000 proceeds to 3060.

At 3060, the process 3000 applies a hash function on a set of fields of the packet. Different embodiments of the process 3000 apply a hash function on different sets of fields of the packet. For instance, some embodiments apply a hash function on the source MAC address of the packet while other embodiments apply a hash function on the source IP address of the packet. In some embodiments, a hash function is applied on the destination MAC address of the packet. Some embodiments may apply a hash function on both the source MAC address and the source IP address. Other ways of applying a hash function on the packet are possible in other embodiments.

Finally, the process 3000 forwards (at 3070) the packet to a pool node based on the hash of the packet. In some embodiments, the hash function used to hash the packet may be defined based on the number of pool nodes from which to choose in the managed network. For instance, referring to FIG. 29 as an example, some embodiments may define a hash function that hashes to three different values that each correspond to each of the pool and root nodes 2910-2930. This way, a hash of a packet selects one of the pool nodes based on the value of the hash of the packet. After the process 3000 forwards the packet to the pool node, the process 3000 ends.

Figure 31:
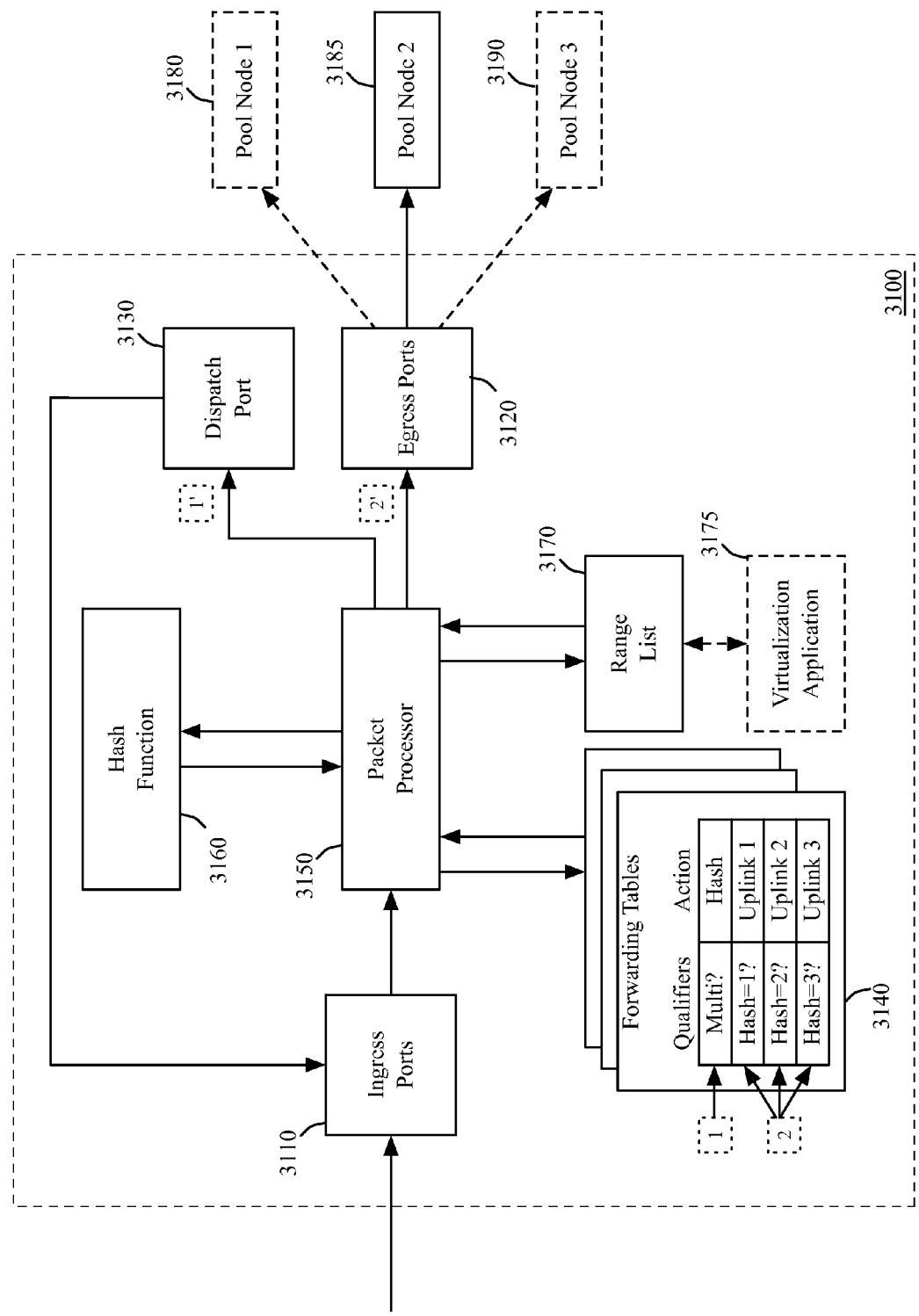
FIG. 31 conceptually illustrates a block diagram of a switching element of some embodiments that processes packets to determine a pool node to which to send the packet.

FIG. 31 conceptually illustrates a block diagram of a switching element 3100 of some embodiments that processes packets to determine a pool node to which to send the packet. As shown, the switching element 3100 includes ingress ports 3110, egress ports 3120, a dispatch port 3130, forwarding tables 3140, a packet processor 3150, a hash function module 3160, a range list module 3170, a virtualization application 3175, and pool nodes 3180-3190.

The ingress ports 3110, the egress ports 3120, the dispatch port 3130, and the forwarding tables 3140 are similar to the ingress ports 910, the egress ports 920, the dispatch port 930, and the forwarding tables 940, which are described above by reference to FIG. 9. However, the forwarding tables 3140 include a set of flow entries for processing packets to determine a pool node to which to send the packet. Specifically, the forwarding tables 3140 includes a flow entry that specifies a hash function to be performed on packet when the packet is identified as a multicast packet, and flow entries that specify one of the pool node 3180-3190 to which to sent the packet based on a hash value.

In some embodiments, the packet processor 3150 is similar to the packet processor 1090, which is described above by reference to FIG. 10. That is, the packet processor 3150 processes network data (e.g., packets) that the packet processor 3150 receives from the ingress ports 3110 based on flow entries in the forwarding tables 3140. When the packet processor 3150 wants to apply a hash function to a packet, the packet processor 3150 sends a copy of the packet to the hash function module 3160 and, in return, receives a hash value. In some cases, the packet processor 3150 sends the hash value to the range list module 3170, and, in return, receives a value that corresponds to a pool node in the managed network.

In some embodiments, the hash function module 3160 performs a hash function on the packet and returns a hash value. As mentioned above, different embodiments define different types of hash functions that can be applied on different sets of fields of the packet (e.g., the source MAC address, the source IP address, etc.). The hash function module 3160 of some embodiments receives hash functions from the virtualization application 3175.

The range list module 3170 of some embodiments restricts the hash values of the hash functions to a defined range of values. The range of values corresponds to the number of pool nodes in the managed network from which a pool node can be selected. Some embodiments of the range list module 3170 restrict the hash values of the hash function to the defined range of values by mapping hash values to a corresponding value in the defined range of values.

In some embodiments, the virtualization application 3175 is similar to the virtualization applications described above by reference to FIGS. 2-5. In addition, the virtualization application 3175 of some embodiments defines a range of values for the range list module 3170. When a pool node is added or removed from the managed network, the virtualization application 3175 of some embodiments dynamically redefines the range of values to reflect the number of pool nodes currently in managed network from which to select and provides the redefined range of values to the range list module 3170.

Further, the virtualization application 3175 sends defined hash functions to the hash function module 3160, in some embodiments. When a pool node is added or removed (e.g., the pool node fails) from the managed network, some embodiments of the virtualization application 3175 alternatively, or in conjunction with redefining a range of values for the range list module 3170, redefine a hash function and provide the redefined hash function to the hash function module 3160.

The following will describe an example packet processing operation to determine a pool node to which to send a packet. When the switching element 3100 receives a packet through a port of the ingress ports 3110, the packet is forwarded to the packet processor 3150 to process. The packet processor 3150 matches the packet against the flow entries in the forwarding tables 3140 to process the packet. In this example, the packet is a multicast packet and needs to be processed by a pool node in the managed network. As such, the packet processor 3150 determines that the packet matches the first flow entry illustrated in the forwarding tables 3140. The first flow entry specifies to apply a hash function on the packet in order to select a pool node from the pool nodes 3180-3190 to which to sent the packet for processing.

The packet processor 3150 sends a copy of the packet to the hash function module 3160. The hash function module 3160 applies the defined hash function on the copy of the packet and returns a hash value to the packet processor 3150. Then, the packet processor 3150 sends the hash value to the range list module 3170 to receive a value that corresponds to one of the pool nodes 3180-3190. When the range list module 3170 receives the hash value from the packet processor 3150, the range list module 3170 identifies a value in a defined set of values to which the hash value maps and returns the identified value to the packet processor 3150. For this example, the identified value is 2.

Next, the packet processor 3150 stores the value that the packet processor 3150 receives from the range list module 3170 in the packet (e.g., in a logical context tag or another field in the packet header). The packet processor 3150 then sends the packet to the dispatch port 3130 for further processing. When the dispatch port 3130 receives the packet, the packet is sent back to a port of the ingress ports 3110. The packet is then forwarded back to the packet processor 3150 for processing.

Alternatively, some embodiments of the packet processor 3150 store the value that the packet processor 3150 receives from the range list module 3170 as metadata that is associated with (instead of stored in the packet itself) and passed along with the packet. In some of these embodiments, the packet processor 3150 sends the packet and the associated metadata to the dispatch port 3130 for further processing. When the dispatch port 3130 receives the packet and the associated metadata, the packet and the associated metadata is sent back to a port of the ingress ports 3110. The packet and the associated metadata is then forwarded back to the packet processor 3150 for processing.

The packet processor 3150 again matches the packet against the flow entries in the forwarding tables 3140 to process the packet. This time, the packet processor 3150 determines that the packet matches the third flow entry illustrated in the forwarding tables 3140. The third flow entry specifies that the packet be sent to uplink port 2, which corresponds to the pool node 3185 in this example. Accordingly, the packet processor 3150 sends the packet to the port of the egress ports 3120 that corresponds to the uplink port 2. In some embodiments, the packet processor 3150 removes the value ("2" in this example) resulting from the hash operation from the packet's header before sending the packet to the egress ports 3120.

IV. Defining Switching Infrastructures

The following section will describe several examples of operations that are performed when a managed network is operating. Some of the operations relate to pool node creation, root node creation, hash function updating, and network controller creation, among other operations.

Figure 32:
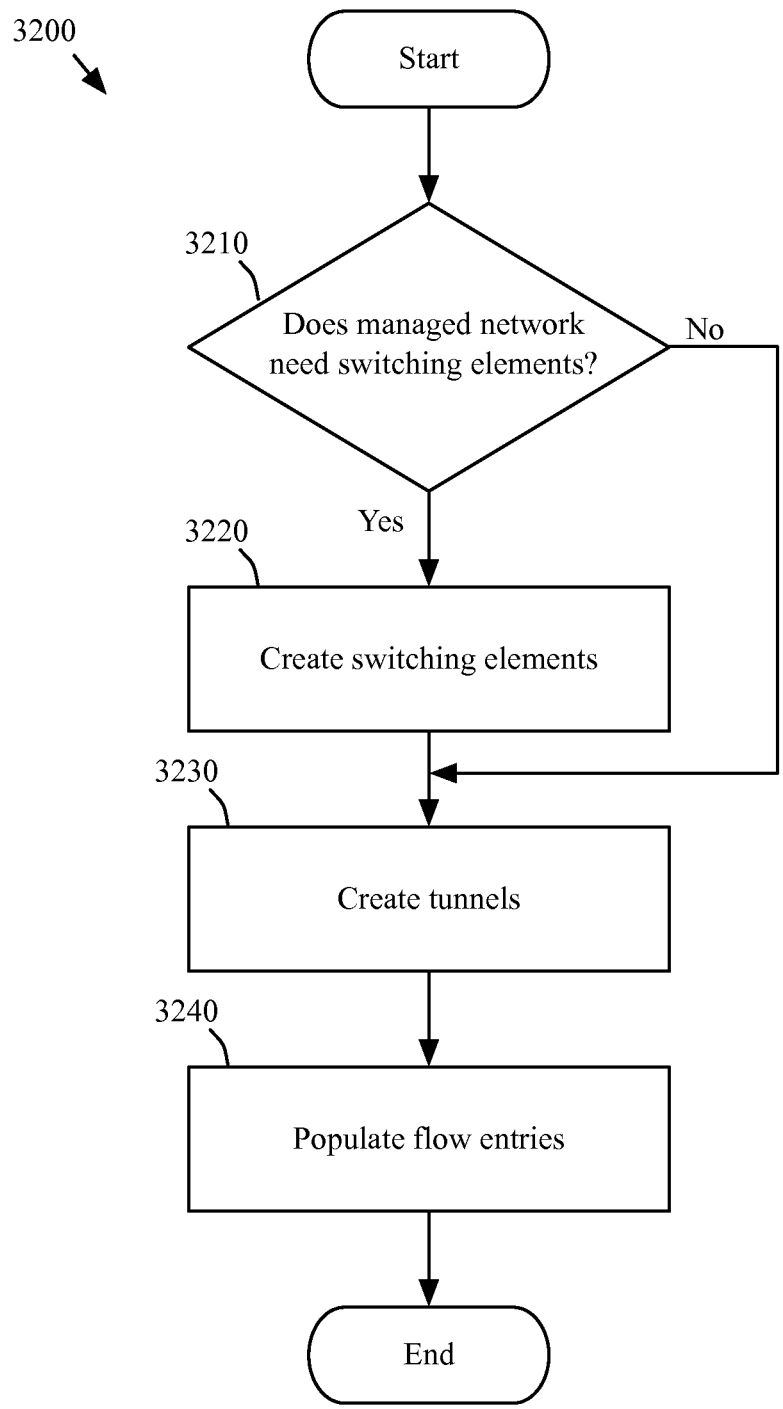
FIG. 32 conceptually illustrates a process of some embodiments for creating a managed network.

FIG. 32 conceptually illustrates a process 3200 of some embodiments for creating a managed network. In some embodiments, the process 3200 is performed by a network controller, such as the ones described above by reference to FIGS. 2-5, that is controlling a managed network. The network controller performs the process 3200 when the network controller first starts up, in some embodiments. In some embodiments, the virtualization application layer of the network controller performs the process 3200.

The process 3200 begins by determining (at 3210) whether the managed network needs switching elements. In some embodiments, switching elements include pool nodes, root nodes, and extenders. The process 3200 of some embodiments can determine whether the managed network needs switching elements based on several factors. Examples of such factors include the number of machines, VMs, hosts, and any other type of network host in the managed network, the number of managed switching elements in the managed network, the attributes of the managed switching elements (e.g., hardware switching element or software switching element, amount of memory, amount of processing power, etc.) in the managed networks, the number of tenants in the managed network, etc. When the process 3200 determines that the managed network does not need switching elements, the process 3200 proceeds to 3230.

When the process 3200 determines that the managed network needs switching elements, the process 3200 creates (at 3220) a set of switching elements for the managed network. Some embodiments of the process 3200 determine the number of switching elements to create based on the same or similar factors listed above for the operation 3210.

Next, the process 3200 creates (at 3230) tunnels in the managed network. As described in various sections above, different embodiments create tunnels for different purposes and in different situations. For instance, some embodiments use tunnels to connect pool nodes and managed switching elements in a full tunnel mesh configuration in order to distribute packet processing between the pool nodes. Some embodiments use tunnels to form cliques of managed switching elements.

Finally, the process 3200 populates (at 3240) flow entries in the managed switching elements and switching elements in the managed network. Flow entries specify operations for processing packets as the packets flow through the various managed switching elements and switching elements in the managed network. As such, the process 3200 of some embodiments determines and defines flow entries for each managed switching element and switching element in the managed network. In some embodiments, flow entries are determined and defined based on the same factors used in the operation 3210 described above. Some embodiments also take into account the switching elements, if any, that were created at the operation 3220 and the tunnels that were created at the operation 3230 in determining and defining the flow entries. After the process 3200 determines and defines all the flow entries, the process 3200 populates the flow entries into the respective managed switching elements and switching elements (e.g., through a switching control protocol, such as the Openflow protocol). The process 3200 then ends.

At any given time while a managed network is operating, changes to the managed network (e.g., machines added, machines removed, switching elements added, switching elements removed, etc.) may occur. In some embodiments, the managed network may be reconfigured (e.g., by a network controller managing the managed network) in response to a change. For instance, additions of machines to the managed network might require additional switching elements (e.g., managed switching elements, pool nodes, root nodes, etc.). Conversely, when machines are removed from the managed network, switching elements might be removed from the managed network as well. Different embodiments consider any number of different factors in determine when and in what manner to respond to a change in the managed switching element. Several of the following figures illustrate examples of how a managed network may respond to changes that occur to the managed network.

Figure 33:
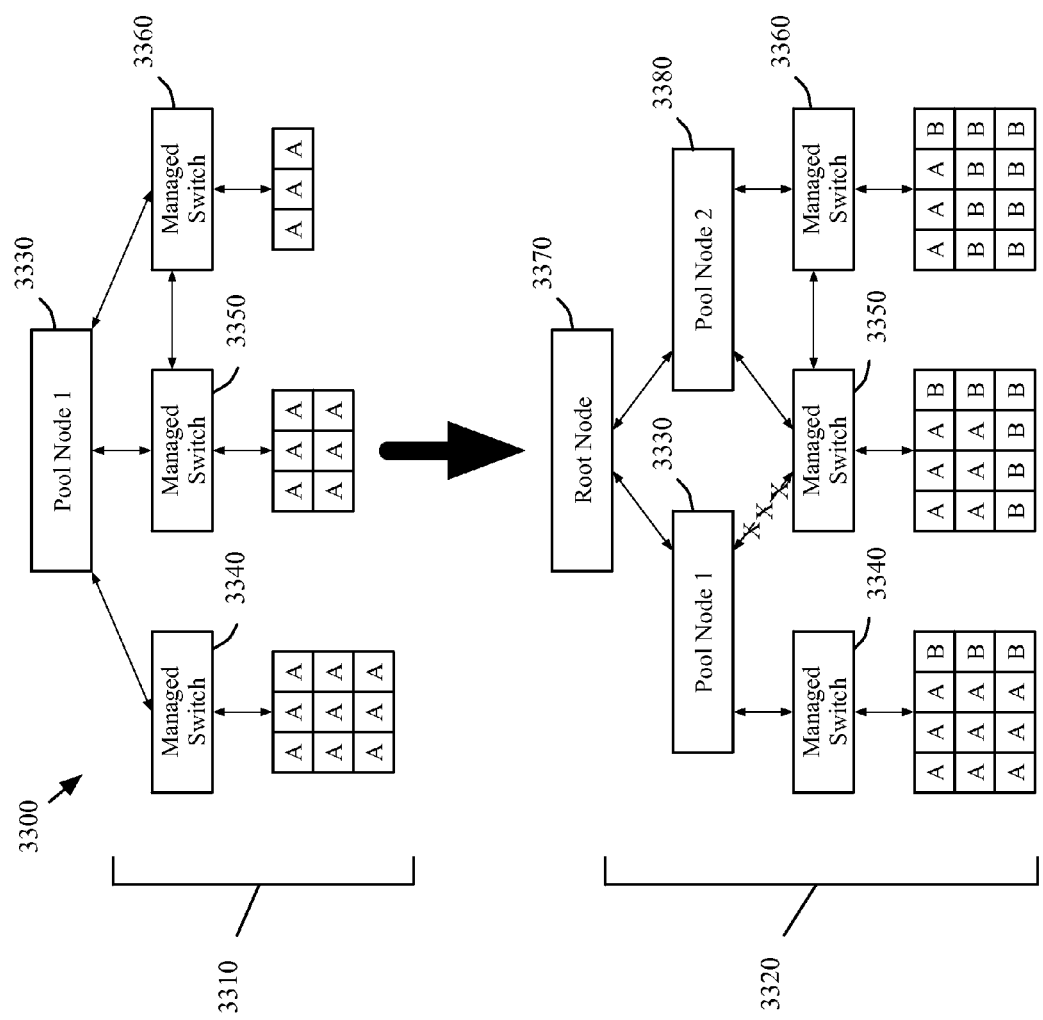
FIG. 33 conceptually illustrates the creation of additional switching elements to a managed network according to some embodiments of the invention.

FIG. 33 conceptually illustrates the creation of additional switching elements in a managed network 3300 according to some embodiments of the invention. In particular, FIG. 33 conceptually illustrates the creation of additional switching elements in the managed network 3300 at two stages 3310 and 3320 of the operation of the managed network 3300 in response to an increase in the number of machines in the managed network 3300.

The first stage 3310 illustrates that the managed network 3300 includes a pool node 3330, managed switching elements 3340-3360, and machines belonging to a tenant A that are coupled to each of the managed switching elements 3340-3360. In addition, the first stage 3310 illustrates that tunnel is established between the each of the managed switching elements 3340-3360 and the pool node 3330, and between the managed switching element 3350 and the managed switching element 3360.

In the second stage 3320 of the managed network 3300, additional machines have been added to the managed network 3300. Specifically, machines that belong to a tenant B are now coupled to each of the managed switching elements 3340-3360. In this example, the pool node 3330 cannot handle processing load with the addition of tenant B's machines. Therefore, a set of network controllers (not shown) that are managing the managed network 3300 determined that the managed network 3300 requires another pool node 3380 to lessen the load on the pool node 3330.

In this example, only one pool node can support each of the managed switching elements 3340-3360. Therefore, the set of network controllers also determined that the pool node 3380 will support the managed switching element 3350. In response, the tunnel between the managed switching element 3350 and the pool node 3330 is torn down and a tunnel between the managed switching element 3350 and the pool node 3380 is established. As a result, the pool node 3330 and the managed switching element 3340 will not be able to communicate with the pool node 3380 and the managed switching elements 3350 and 3360. In addition, since there are multiple tenants in the managed network 3300, logical context learning needs to be performed. Thus, the set of network controllers determined to create a root node 3370 to provide a communication bridge between the pool nodes 3330 and 3380 and to perform logical context learning. As shown, tunnels between the pool nodes 3330 and 3380 and the root node 3370 are established.

Figure 34:
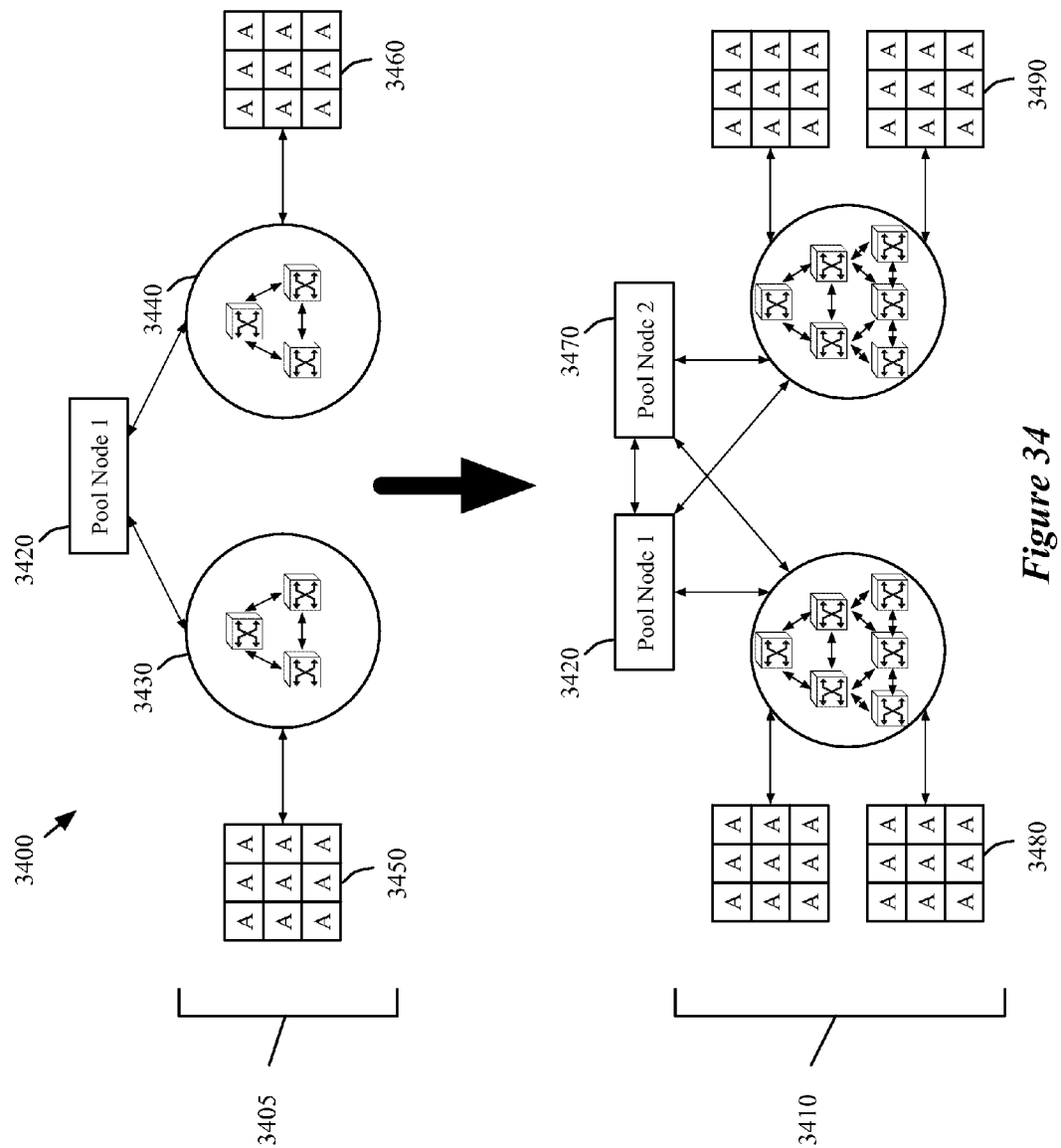
FIG. 34 conceptually illustrates the addition of managed switching elements and the creation of additional switching elements to a managed network according to some embodiments of the invention.

FIG. 34 conceptually illustrates the addition of managed switching elements and the creation of additional switching elements to a managed network 3400 according to some embodiments of the invention. Specifically, FIG. 34 conceptually illustrates the addition of managed switching elements to and the creation of additional switching elements in the managed network 3400 at two stages 3405 and 3410 of the operation of the managed network 3400 in response to an increase in the number of machines in the managed network 3400.

As shown in the first stage 3405, the managed network 3400 includes a pool node 3420, cliques 3430 and 3440, and groups of machines 3450 and 3460, which to a tenant A. Each of the cliques 3430 and 3440 includes three managed switching elements that are coupled to each other with tunnels in a full tunnel mesh configuration. In addition, for each of the cliques 3430 and 3440, the managed switching elements each include the same set of flow entries (not shown). As shown, the machines 3450 are coupled to the clique 3430 and the machines 3460 are coupled to the clique 3440.

In this example, the pool node 3420 processes packets that the managed switching elements in the cliques 3430 and 3440 cannot process. As such, the cliques 3430 and 3440 are each coupled to the pool node 3420 through tunnels. That is, a tunnel is established between each of the managed switching elements in the cliques 3430 and 3440 and the pool node 3420.

The second stage 3410 illustrates that additional groups of machines 3480 and 3490 have been added to the managed network 3400. As shown, the machines 3480 are coupled to the managed switching elements in the clique 3430 and the machines 3490 are coupled to the managed switching elements in the clique 3440. In some embodiments, the addition of the machines 3480 and 3490 increases the load on the three managed switching elements in the cliques 3430 and 3440 that are illustrated in the first stage 3405. As a result, a set of network controllers (not shown) that are managing the managed network 3400 determined that the managed network 3400 requires additional managed switching elements. As illustrated in the second stage 3410 of FIG. 34, the cliques 3430 and 3440 now each include six managed switching elements in order to handle the additional load of processing packets from the machines 3450, 3460, 3480, and 3490. The six managed switching elements in the cliques 3430 and 3440 are coupled to each other in a full tunnel mesh configuration (not shown) in some embodiments.

In some embodiments, the addition of the machines 3480 and 3490 and the managed switching elements to the cliques 3430 and 3440 also increases the load on the pool node 3420. The pool nodes 3420 may not have sufficient resources (e.g., memory or data storage) to handle all the packets that the managed switching elements in the cliques 3430 and 3440 cannot handle. Thus, the set of network controllers has also determined that the managed network 3400 needs another pool node 3470. As shown in the second stage 3410, the pool node 3470 has been created and added to the managed network 3400. In this example, the packet processing distribution technique described above by reference to FIG. 28 is utilized. Accordingly, as shown in FIG. 34, the cliques 3430 and 3440 are coupled to each of the pool nodes 3420 and 3470 (i.e., each of the managed switching elements cliques 3430 and 3440 are coupled to each of the pool nodes 3420 and 3470). That way, the packet processing load is distributed between the pool nodes 3420 and 3470.

FIGS. 33 and 34 illustrate example scenarios in which pool nodes and/or root nodes are added to a managed network. In some embodiments, the pool nodes and/or root nodes are added to the managed network through manual deployment. For example, the pool nodes and/or root nodes may require a user to power up and manually issue commands to specify the network controller or control cluster that is managing the managed network in order to add the pool nodes and/or root nodes to the managed network. In other embodiments, the pool nodes and/or root nodes are automatically deployed and added (e.g., by the network controller or control cluster) to the managed network.

Figure 35:
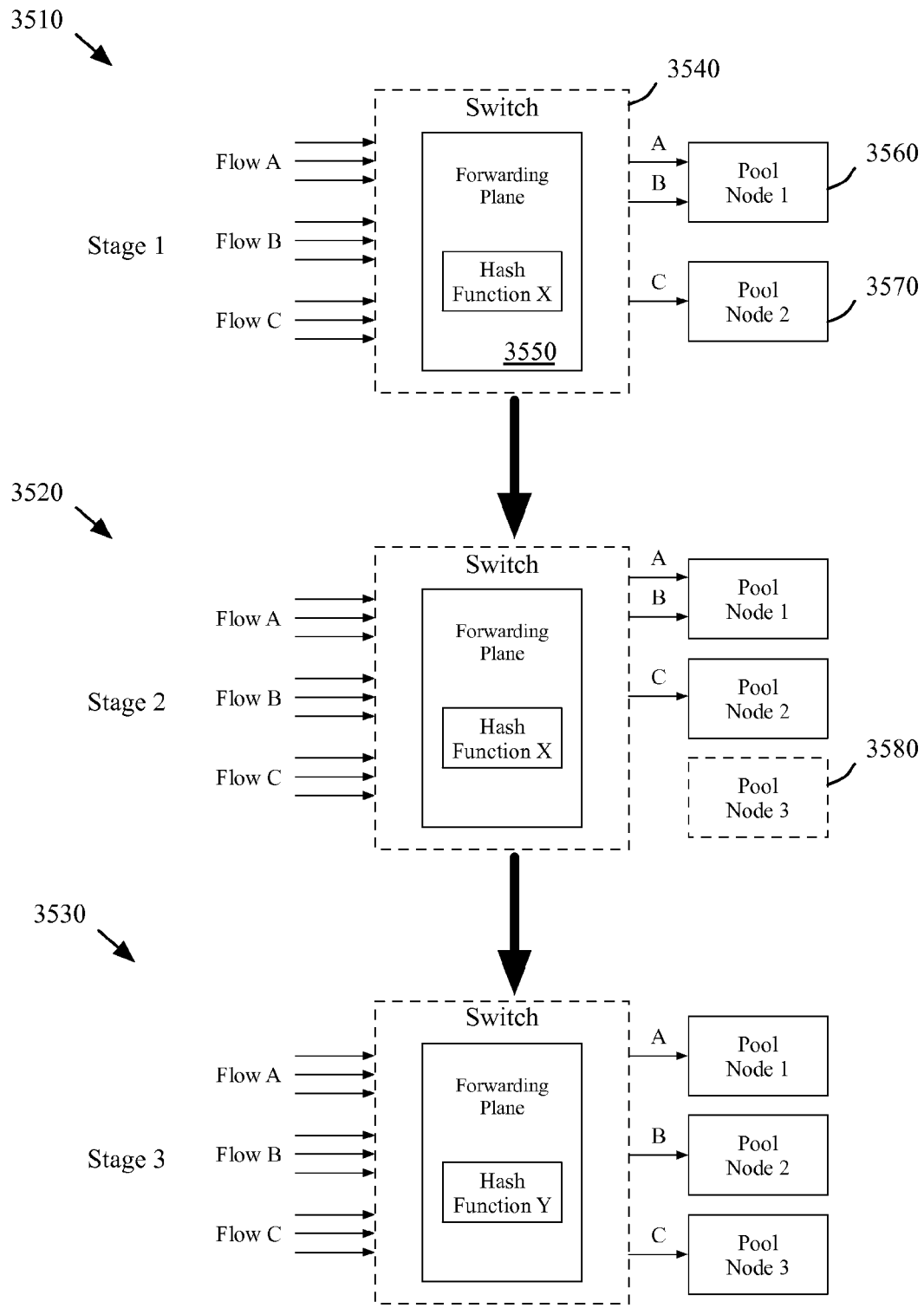
FIG. 35 conceptually illustrates an example of updating hash functions when a pool node is added to a managed network.

As explained above, some embodiments use a hashing technique to distribute packet processing that managed switching elements cannot handle across several pool nodes in a managed network. FIG. 35 conceptually illustrates an example of updating a hash function when a pool node is added to a managed network. In particular, FIG. 35 conceptually illustrates a switching element 3540 at three different stages 3510-3530 of a hash function update operation. In some embodiments, the switching element 3540 is a software switching element (e.g., an OVS switch) while, in other embodiments, the switching element 3540 is a hardware switching element. In other embodiments, the switching element 3540 may be any other type of network element that can route network data.

The first stage 3510 illustrates that the managed network includes the switching element 3540 and pool nodes 3560 and 3570. As shown, the switching element 3540 includes a forwarding plane 3550. The forwarding plane 3550 of some embodiments is similar to the forwarding plane 1170 described above by reference to FIG. 11. That is, in these embodiments, the forwarding plane 3550 processes network data that the switching element 3540 receives and determines where to route the network data. Since the packet processing is distributed between the pool nodes 3560 and 3570, the pool nodes 3560 and 3570 include the same set of flow entries.

In addition, the forwarding plane 3550 includes a hash function X. The hash function X represents is a hash function that the forwarding plane 3550 uses to select one of the pool nodes 3560 and 3570 when the forwarding plane 3550 wants to send a packet to a pool node for processing. In this example, packet processing is distributed based on logical datapaths. Therefore, different logical datapaths in a logical datapath set may be distributed to different pool nodes. The hash function X may be applied to data in the packet (e.g., a header field, such as a logical context tag) that represents the logical datapath to which the packet belongs, in some embodiments. The first stage 3510 shows that the hash function X is defined to map packets that belong to the logical datapath of flow A to the pool node 3560, map packets that belong to the logical datapath of flow B to the pool node 3560, and map packets that belong to the logical datapath of flow C to the pool node 3570.

In the second stage 3520, another pool node 3580 is added to the managed network, as indicated by a box with dashed lines. The pool node 3580 includes the same set of flow entries as the pool nodes 3560 and 3580. At this stage 3520, the hash function for selecting a pool node is still hash function X. As shown, packets that belong to the logical datapath of flow A are still mapped to the pool node 3560, packets that belong to the logical datapath of flow B are still mapped to the pool node 3560, and packets that belong to the logical datapath of flow C are still mapped to the pool node 3570.

The third stage 3530 illustrates the switching element 3540 after the hash function X has been updated to a hash function Y in response to the addition of the pool node 3580. In some embodiments, the hash function Y is provided to the switching element 3540 by a network controller that manages the switching element 3540. The hash function Y is defined to evenly distribute packets that belong to the logical datapaths A, B, and C. For this example, the hash function Y maps packets that belong to the logical datapath of flow A to the pool node 3560, maps packets that belong to the logical datapath of flow B to the pool node 3570, and maps packets that belong to the logical datapath of flow C to the pool node 3580.

While FIG. 35 illustrates the update of a hash function for selecting a pool node from a group of pool nodes, this method may be similarly used in other embodiment as well. For instance, the hash function in the hash function module 3160 may also be updated (e.g., by the virtualization application 3175) in a similar manner as described above.

Figure 36:
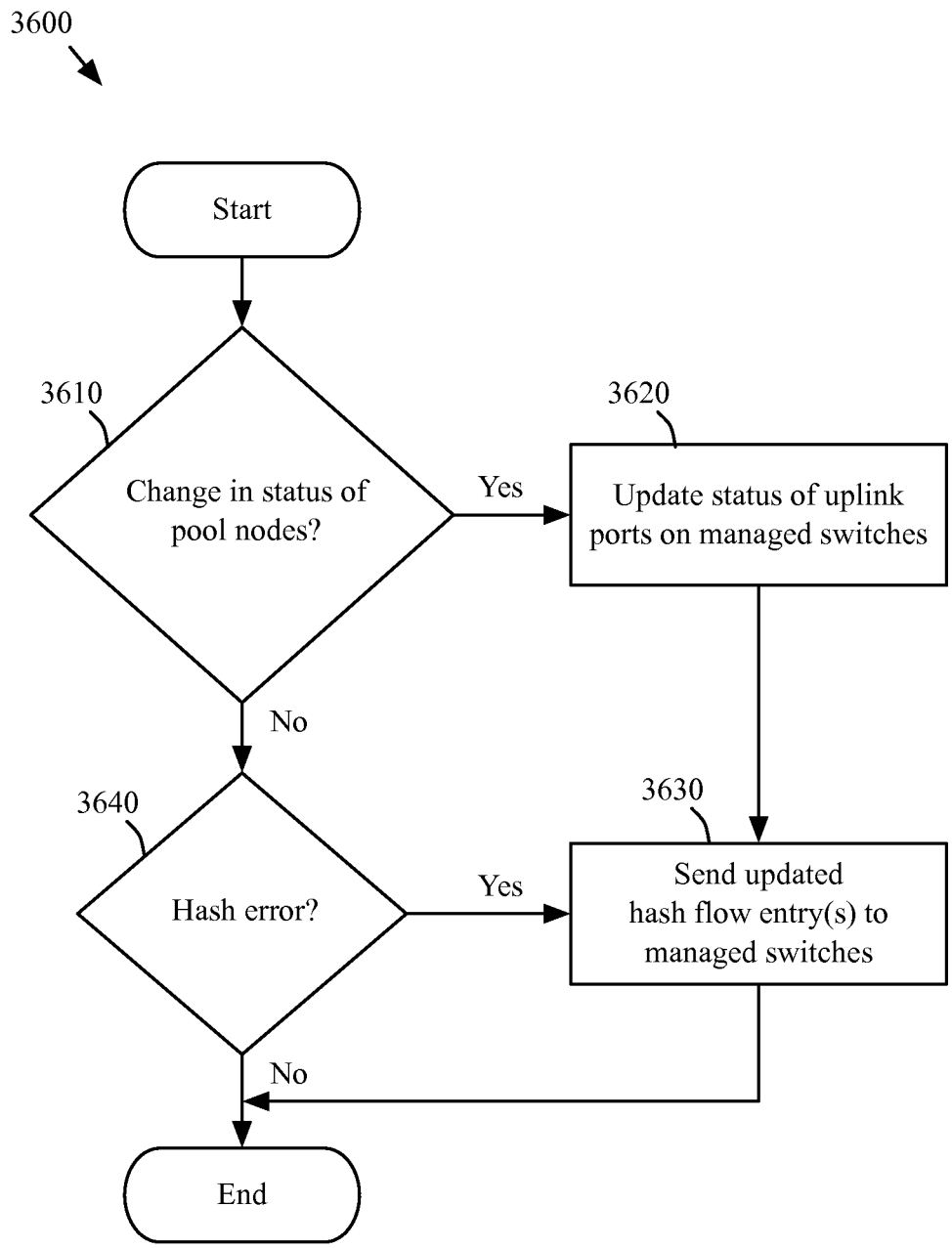
FIG. 36 conceptually illustrates a process of some embodiments for updating a hash function.

FIG. 36 conceptually illustrates a process 3600 of some embodiments for updating a hash function. In some embodiments, the process 3600 is performed by a network controller that manages managed switching elements in a managed network that employs a packet processing distribution technique, such as the one described above by reference to FIG. 28.

The process 3600 begins by determining (at 3610) whether a change in the status of pool nodes in the managed network has occurred. In some embodiments, a change in the status of the pool nodes includes a pool node is added to the managed network, a pool node is removed from the managed network, or a pool node in the managed network is not functioning. A change in the status of pool nodes in the managed network may include additional and/or other types of events in other embodiments.

When the process 3600 determines that a change in the status of the pool nodes has occurred, the process 3600 updates (at 3620) the status of uplink ports on the managed switching elements in the managed network. For instance, when a pool node is added to the managed network, the process 3600 of some embodiments updates the status of the uplink ports on the managed switching elements to include another uplink port for the newly added pool node. Conversely, when a pool node is removed from the managed network, some embodiments of the process 3600 updates the status of the uplink ports on the managed switching elements to remove an uplink port. Next, the process 3600 sends (at 3630) an updated hash flow entry to the managed switching elements. In some embodiments, the hash flow entry specifies the hash function for the managed switching elements to select a pool node in the managed network to which to send packets that the managed switching elements cannot process. The process 3600 then ends.

When the process 3600 determines that a change in the status of the pool nodes has not occurred, the process 3600 continues to 3640, the process 3600 determines (at 3640) whether a hash error has occurred on one of the managed switching elements in the managed network. Examples of hash errors include hash value collisions, hash values that are outside a defined range, etc. When the process 3600 determines that a hash error has occurred on one of the managed switching elements in the managed network, the process 3600 sends (at 3630) an updated hash flow entry to the managed switching elements. As noted above, some embodiments sends a hash flow entry that specifies a hash function for the managed switching elements to select a pool node in the managed network to which to send packets that the managed switching elements cannot process. Specifically, the process 3600 sends a hash flow entry that corrects the hash error. Then, the process 3600 ends.

In some embodiments, the process 3600 is constantly repeated while the network controller is managing the managed switching elements in the managed network in order to continue checking for changes in the status of pool nodes in the managed network and updating the hash flow entries in the managed switching elements accordingly. In other embodiments, the process 3600 is repeated at defined intervals (e.g., 1 minute, 5 minutes, 30 minutes, 1 hour, etc.).

The above description of FIGS. 35 and 36 relate to updating hash functions when a pool node is added or removed to a managed network. In some instances, a pool node is removed from a managed network because the pool node has failed. FIG. 37 conceptually illustrates an example of pool node failure handling according to some embodiments of the invention. As shown, a network architecture 3700 includes managed switching elements 3705 and 3710, and pool nodes A-C. In this example, each of the arrows in FIG. 37 represents a tunnel.

Some embodiments utilize tunnel "bundling" as a pool node fault tolerance technique. In some such embodiments, each pool node in the network is designated a failover pool node so that packets destined for the failed pool node may quickly continue to be processed by the network architecture. In some embodiments, the failover pool node is referred to as a secondary pool node and the pool node for which the failover pool node is designated is referred to as a primary pool node.

Figure 37A:
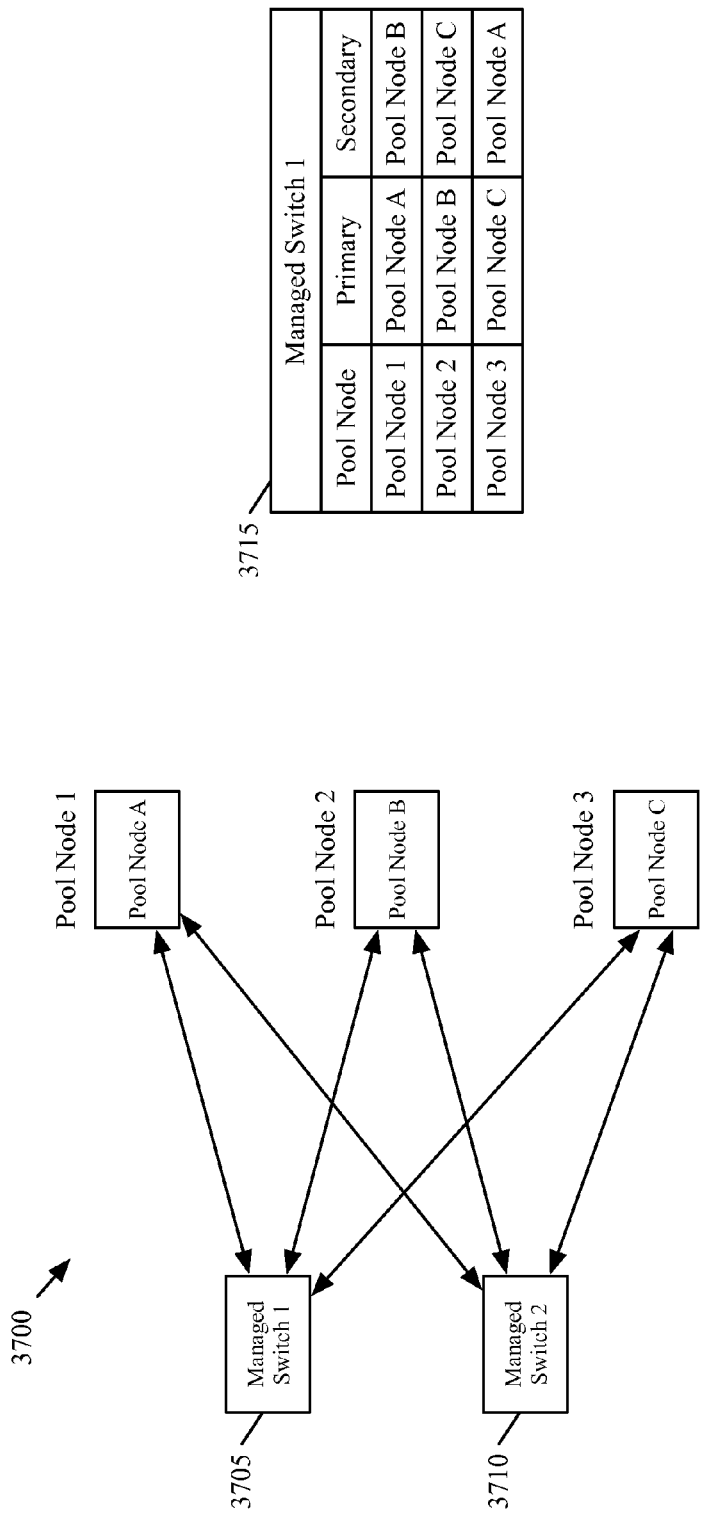
FIGS. 37A-F conceptually illustrate examples of pool node failure handling according to some embodiments of the invention.

Different embodiments designate secondary pool nodes for the primary pool nodes in the network differently. For instance, some embodiments specify, for a particular primary pool node, another primary pool node in the network as a secondary pool node. FIG. 37A conceptually illustrates such an example. Specifically, FIG. 37A illustrates a hierarchy traversal table 3715 of the managed switching element 3705. As shown, the primary pool node for the pool node 1 is the pool node A, the primary pool node for the pool node 2 is the pool node B, and the primary pool node for the pool node 3 is the pool node C. Additionally, the hierarchy traversal table 3715 specifies the secondary pool nodes for each of the primary pool nodes 1-3. In particular, the secondary pool node for the pool node 1 is the pool node B, the primary pool node for the pool node 2 is the pool node C, and the primary pool node for the pool node 3 is the pool node A. In this example, the managed switching elements 3705 and 3710 monitor the pool nodes 1-3 in order to detect when one of the pool nodes 1-3 fails.

Figure 37B:
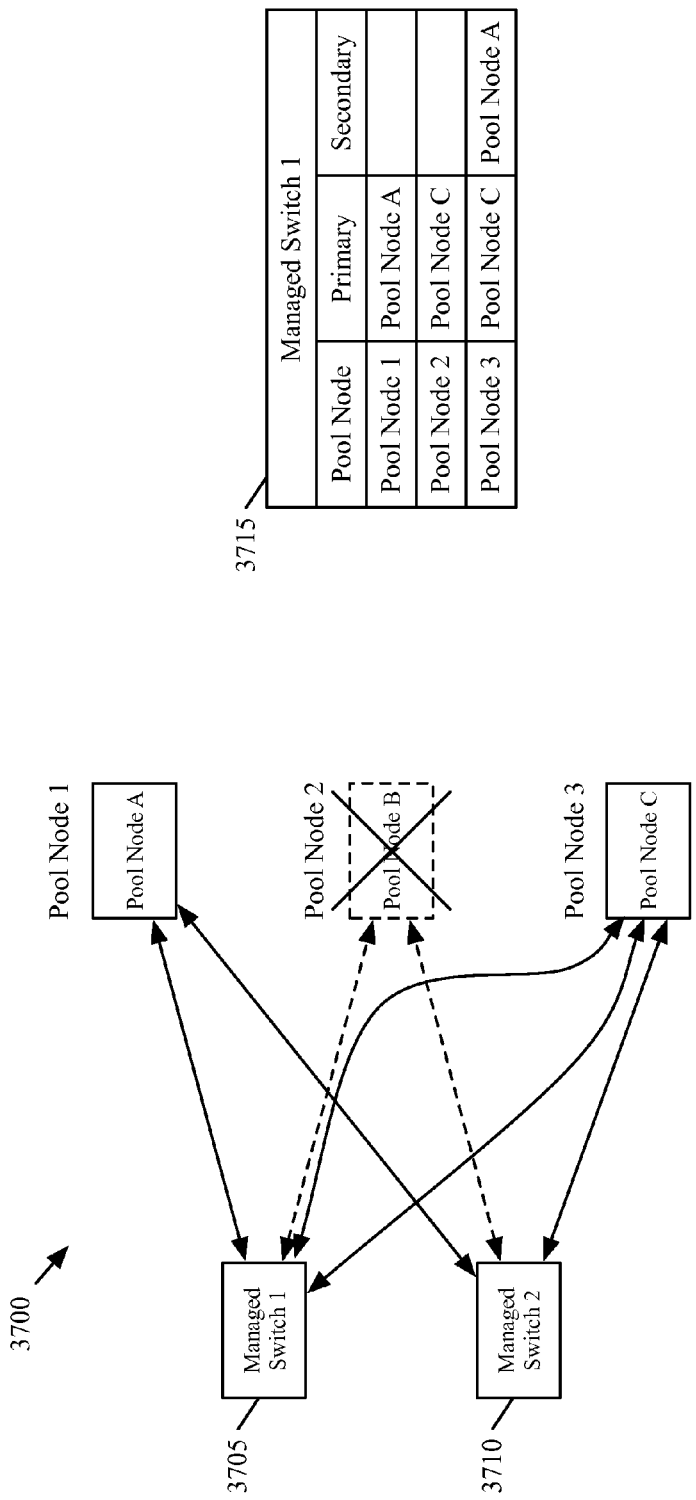

FIG. 37B conceptually illustrates the network architecture 3700 after the managed switching element 3705 has detected that a pool node has failed. In particular, the managed switching element 3705 has detected that the primary pool node for the pool node 2 (pool node B in this example) has failed. FIG. 37B also illustrates the hierarchy traversal table 3715 of the managed switching element 3705 after the managed switching element 3705 has modified the hierarchy traversal table 3715 in response to the detected failure of the pool node 2. As shown, the primary pool node for the pool node 2 is now pool node C, which was previously the secondary pool node for the pool node 2. Thus, when the managed switching element 3705 determines that a packet is to be sent to the pool node 2 for processing, the managed switching element 3705 sends the packet to the pool node C.

In addition, since the pool node B was designated as the secondary pool node for the pool node 1, the managed switching element 3705 has modified the hierarchy traversal table 3715 to no longer specify a secondary pool node for the pool node 1. However, in some embodiments, the managed switching element 3705 automatically designates new secondary pool nodes when a pool node fails. The managed switching element 3705, for example, may designate the pool node C as the secondary pool node for the pool node 1 and designate the pool node A as the secondary pool node for the pool node 2.

Figure 37C:
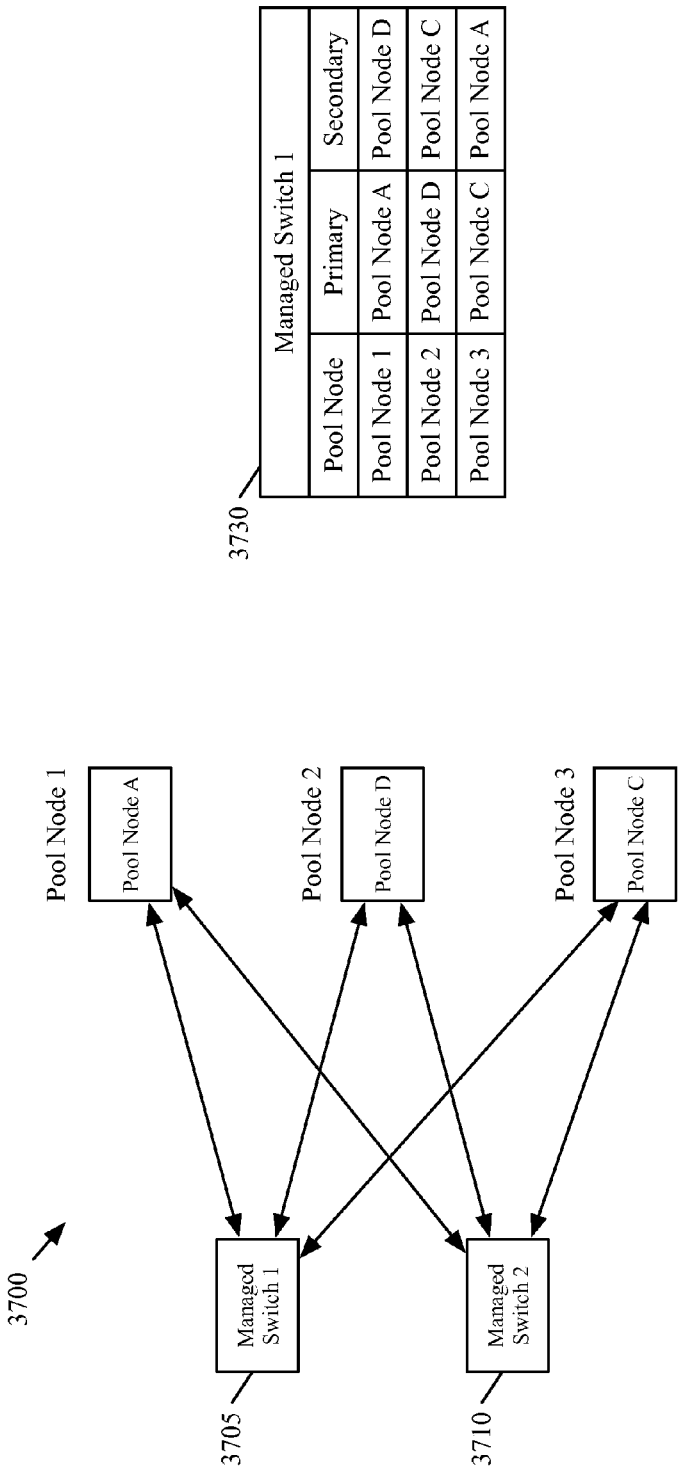

FIG. 37C conceptually illustrates the network architecture 3700 after a new pool node D has been inserted into the network architecture 3700. More specifically, the pool node D is specified as the primary pool node for the pool node 2, as illustrated by the hierarchy traversal table 3715. FIG. 37C also illustrates that the managed switching element 3705 has specified secondary pool nodes for the pool node 1 and the pool node 2 upon detection of the addition of the pool node D. As shown in the hierarchy traversal table 3715, the pool node D is designated as the secondary pool node for the pool node 1 and the pool node C is designated as the secondary pool node for the pool node 2.

Figure 37D:
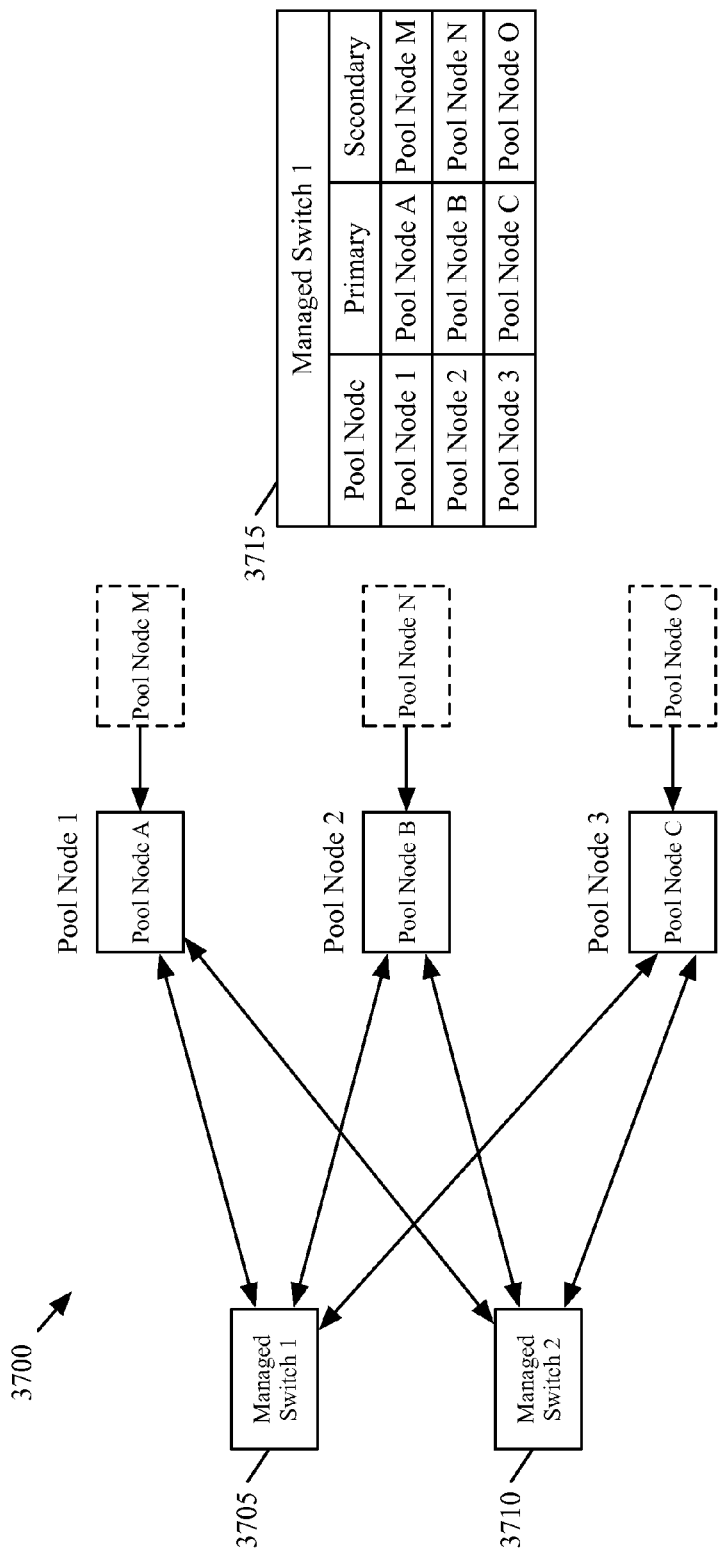

Instead of specifying one of the primary pool nodes in the network as a secondary pool node of a particular primary pool node, some embodiments may provide backup pool nodes as secondary pool nodes. The backup pool nodes of some embodiments are configured to stand by and replace a primary pool node when the primary pool node fails. FIG. 37D conceptually illustrates an example of the network architecture 3700 that employs backup pool nodes. As shown, FIG. 37D illustrates the hierarchy traversal table 3715. For this example, the hierarchy traversal table 3715 specifies the primary pool node for the pool node 1 as the pool node A, the primary pool node for the pool node 2 as the pool node B, and the primary pool node for the pool node 3 as the pool node C. In additional, the hierarchy traversal table 3715 specifies the secondary pool node for pool node 1 as the pool node B, the primary pool node for pool node 2 as the pool node C, and the primary pool node for pool node 3 as the pool node A.

Figure 37E:
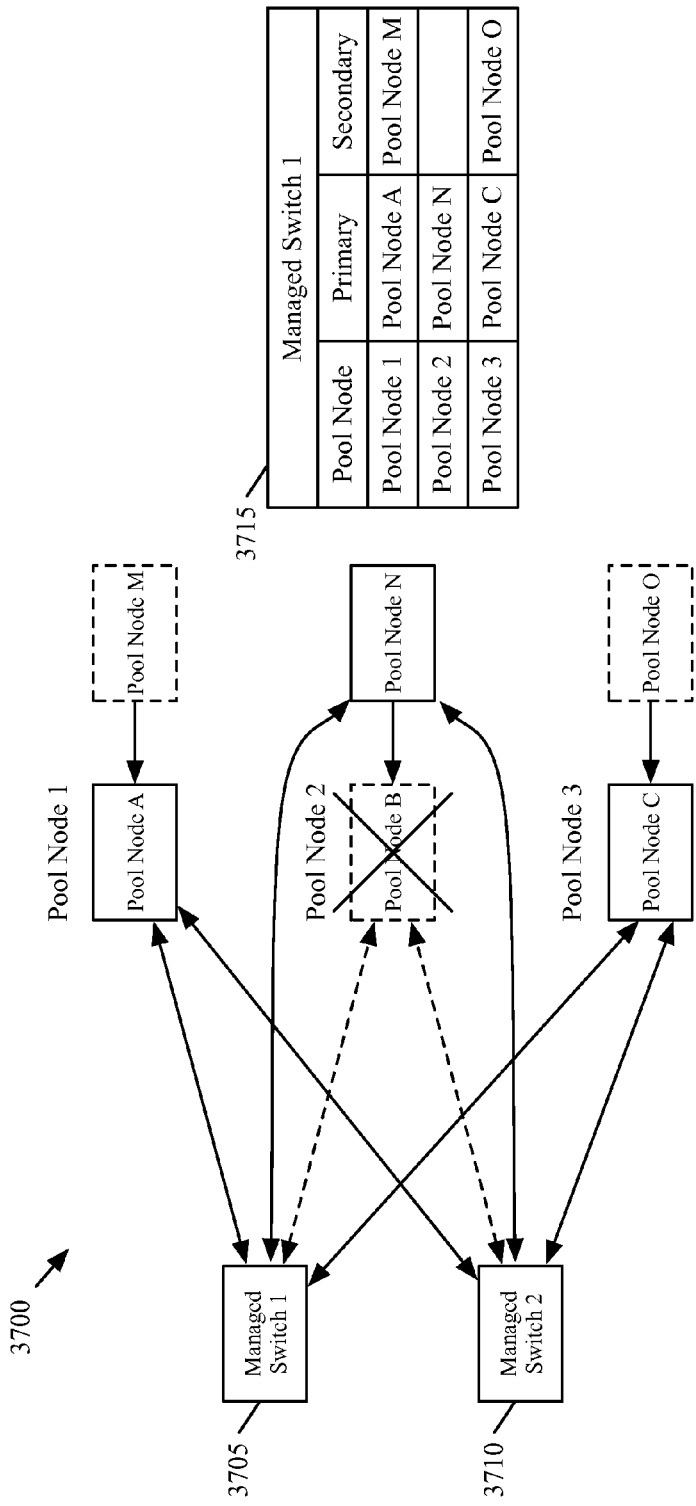

FIG. 37E conceptually illustrates the network architecture 3700 after the managed switching element 3705 has detected that a pool node has failed. In this example, the managed switching element 3705 has detected that the primary pool node for the pool node 2 (pool node B in this example) has failed. FIG. 37E further shows the hierarchy traversal table 3715 of the managed switching element 3705 after the managed switching element 3705 has modified the hierarchy traversal table 3715 in response to the detected failure of the pool node 2. As shown, the primary pool node for the pool node 2 is now pool node N, which was previously the secondary pool node for the pool node 2. Thus, when the managed switching element 3705 determines that a packet is to be sent to the pool node 2 for processing, the managed switching element 3705 sends the packet to the pool node N.

Figure 37F:
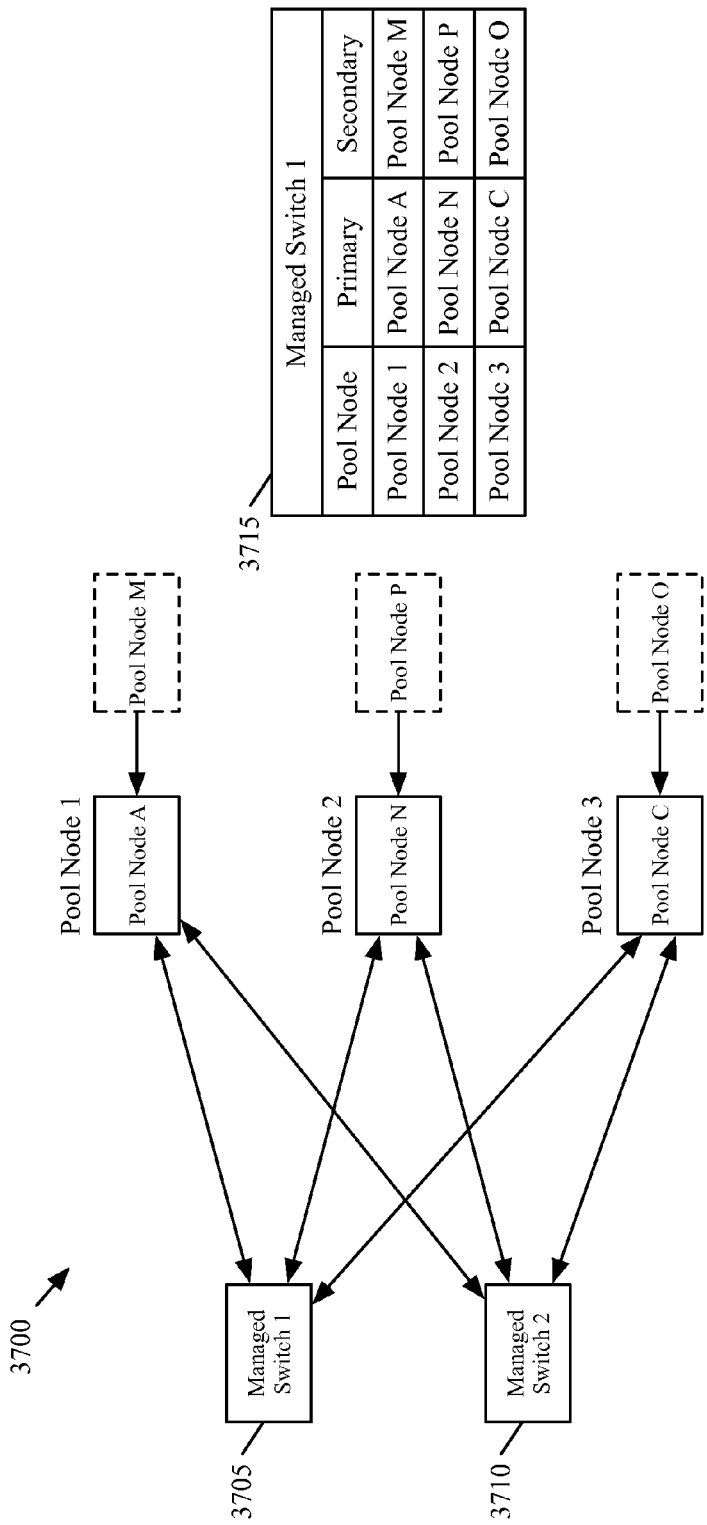

FIG. 37F conceptually illustrates the network architecture 3700 after a new pool node P has been inserted into the network architecture 3700. As shown, a pool node P has been inserted into the network architecture 3700. More specifically, the pool node P is specified as the secondary pool node for the pool node 2, as illustrated by the hierarchy traversal table 3715. In some embodiments, the managed switching element 3705 may specify the newly added pool node, the pool node P, as the primary pool node for the pool node 2 and designate the pool node N back to the pool node N's previously role as the secondary pool node for the pool node 2.

Moreover, by utilizing a tunnel bundling technique, the tunnels to the pool nodes and the pool nodes may be viewed as a single entity (a "bundle" of tunnels) from the perspective of the network controllers in the network. Specifically, the network controllers view the managed switching element as coupled to a single pool node through a single tunnel. In some such embodiments, the network controllers may send flow entries that only specify that packets be sent to a pool node instead of having to determine the number of pool nodes in the network and to specify pool node to which the packet be sent. In other words, the managed switching elements are responsible for selecting a pool node when a packet to be sent to a pool node for processing.

By having the managed switching elements 3705 and 3710 handle pool node failures, the network controller or control cluster managing the managed network does not need to specify new flow entries to the managed switching elements 3705 and 3710 each time a pool node fails. In addition, the response time to a pool node failure is faster by implementing this functionality in the managed switching elements 3705 and 3710 instead of the network controller or control cluster.

Figure 38A:
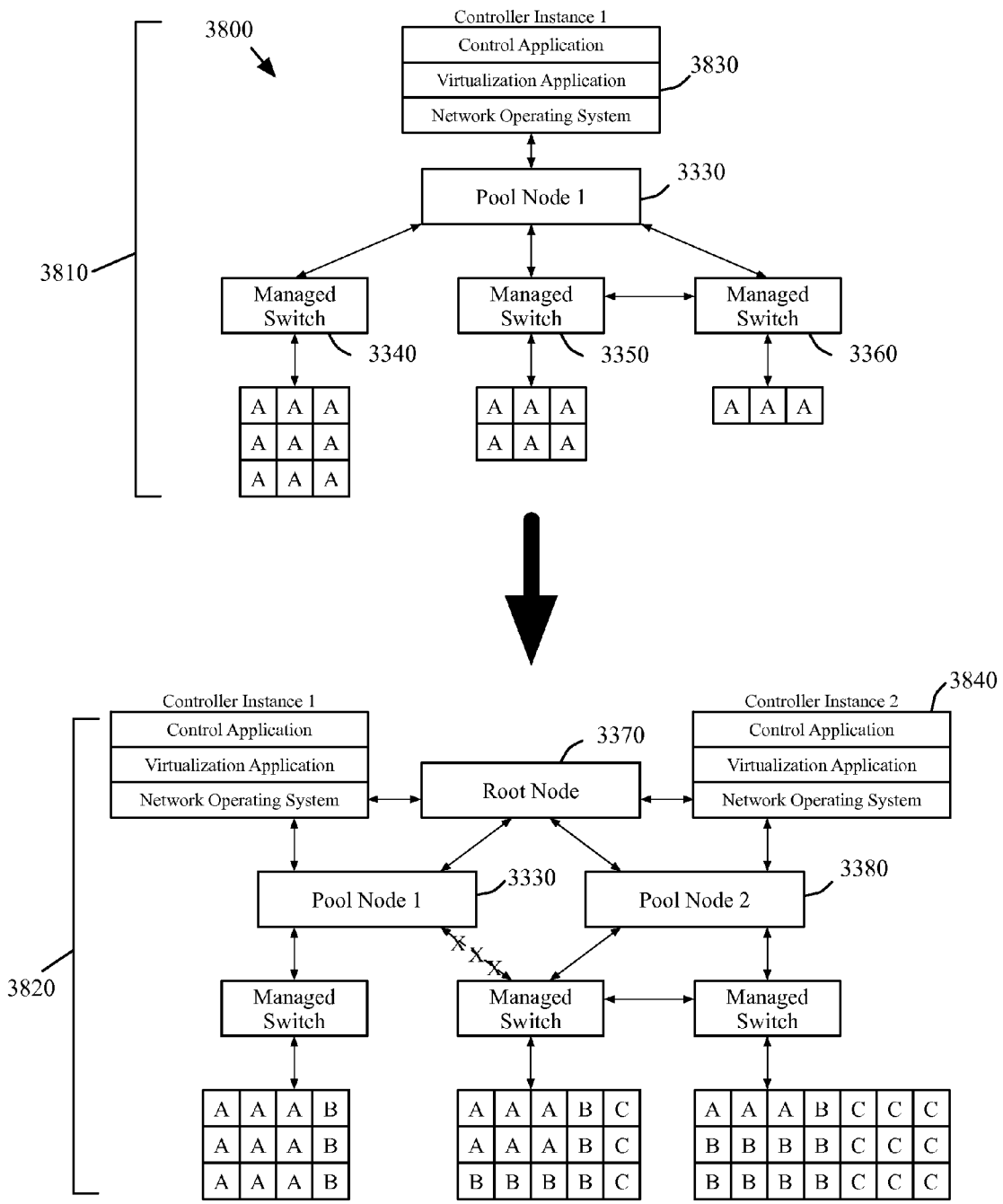
FIG. 38 conceptually illustrates the creation of additional network controllers to manage a managed network according to some embodiments of the invention.

FIG. 38 conceptually illustrates the creation of additional network controllers to a control cluster for managing a managed network 3800 according to some embodiments of the invention. Specifically, FIG. 38A conceptually illustrates an example of creating additional network controllers in the control cluster for the managed network 3800 at two stages 3810 and 3820 of the operation of the managed network 3800 in response to an increase in the number of machines in the managed network 3800.

The first stage 3810 of FIG. 38A illustrates the managed network 3800. The managed network 3800 is similar to the managed network 3300 illustrated in FIG. 33 except managed network 3800 also includes a network controller 3830. The network controller 3830 is similar to the network controllers described above by reference to FIGS. 2-5. At this stage 3810, the network controller 3830 manages the pool node 3330 and the managed switching elements 3340-3360.

The second stage 3820 of FIG. 38A is similar to the second stage 3320 that is described above by reference to FIG. 33, but the second stage 3820 of the managed network 3800 shows additional machines added to the managed network 3800 that belong to a tenant C. As shown machines that belong to tenant C are now coupled to each of the managed switching elements 3350 and 3360.

Similar to the second stage 3320, the pool node 3330, at the second stage 3820, cannot handle processing load with the addition of tenant B's and tenant C's machines. Therefore, the network controller 3830 determined that the managed network 3800 requires another pool node 3380 to lessen the load on the pool node 3330. As a result, the tunnel between the managed switching element 3350 and the pool node 3330 is torn down, a tunnel between the managed switching element 3350 and the pool node 3380 is established, and a root node 3380 is created to provide a communication bridge between the pool nodes 3330 and 3380 and to perform logical context learning.

In addition, the second stage 3820 illustrates that another network controller 3840 has been added to the control cluster. In some embodiments, the computation demands of a network controller 3830 increases as the number of tenants increases in the managed network 3800 since the network controller would have to implement a logical switching element for each additional tenant across the managed switching elements in the managed network. Similarly, an increase in the number of machines and/or switching elements in the managed network 3800 would increase the computational demands of the network controller 3830.

In this example, the network controller cannot handle the load of managing managed network 3800 due to the addition of tenant B's and tenant C's machines to the managed network 3800. For instance, the network controller 3830 would have to define logical datapath sets for each of the tenants B and C in order to implement corresponding logical switching elements for the tenants across the managed switching elements 3340-3360 in the managed network 3800. Therefore, the network controller 3830 determined to add the network controller 3840 to assist in the management of the managed network 3800.

As shown, FIG. 38A illustrates a simple case of creating additional network controllers to a control cluster for managing a managed network. However, the addition of one network controller to the control cluster in this example may be problematic from a reliability point of view. For example, some embodiments employ a majority/minority technique for maintaining reliability of a control cluster. In some such embodiments, the network controllers communicate with each other and the control cluster continues to operate as long as a majority (i.e., greater than half) of the network controllers in the control cluster can communicate with each other. Therefore, the control cluster can withstand a minority (i.e., less than half) of the network controllers in the control cluster failing before the control cluster fails.

Referring to the example illustrated in FIG. 38A, the addition of one network controller to the control cluster is thus problematic under the majority/minority technique. Specifically, while the addition of the one network controller to the control cluster increases the compute capacity of the control cluster, the reliability of the control cluster is reduced because the number of points of failure in the control cluster is increased to two (i.e., a failure of any one of the two network controllers causes the control cluster to fail) without an increase in the number of failures that the control cluster can withstand (one in this example).

Thus, in order to maximize reliability of the control cluster, additions of network controllers to the control clusters are constrained to numbers that maximizes the size of the minority of network controllers in the control cluster. FIG. 38B conceptually illustrates such an example of creating additional network controllers in the control cluster for the managed network 3800 at two stages 3850 and 3860 of the operation of the managed network 3800 in response to an increase in the number of machines in the managed network 3800.

The first stage 3850 of FIG. 38B is similar to the first stage 3810 illustrated in FIG. 38A. At this stage 3850, the network controller 3830 manages the pool node 3330 and the managed switching elements 3340-3360.

The second stage 3860 of FIG. 38B is similar to the second stage 3820 of FIG. 38A except the second stage 3860 of the managed network 3800 shows two network controllers 3840 and 3870 added to the control cluster due to the increased computation demands of the network controller 3830. In this example, utilizing majority/minority technique, the addition of the two network controllers 3840 and 3870 increases the compute capacity of the control cluster and increases the minority (from zero to one in this example) of the network controllers 3830, 3840, and 3870 in the control cluster failing before the control cluster fails.

FIG. 38B shows one example of adding a number of network controllers to a control cluster in a manner that maximizes the reliability of the control cluster, one of ordinary skill in the art will realize that different numbers of network controllers may be added to the control cluster so that the reliability of the control cluster is maximized. For example, network controllers may be added to the control cluster so that the control cluster has an odd number of network controllers.

While some factors for determining whether to add a network controller to a managed network have been described above, other embodiments may consider additional and/or other factors as well in such a determination.

FIG. 38 illustrates an example scenario in which a network controller is added to a managed network. In some embodiments, the network controller is added to the managed network through manual deployment. For example, the network controller may require a user to power up and manually issue commands to specify the network controller or control cluster that is managing the managed network in order to add the network controller to the managed network. In other embodiments, the network controller is automatically deployment and added (e.g., by the existing network controller) to the managed network.

Some embodiments may provide a network controller fault tolerance method for handling the failure of a network controller. In some embodiments, a logical switching element is managed by only one network controller (but a network controller may manage more than one logical switching elements). Thus, some of these embodiments specify, for a particular network controller, another network controller as a failover network controller in the event the particular network controller fails. In some embodiments, the failover network controller is referred to as a secondary network controller and the network controller for which the failover network controller is specified is referred to as a primary network controller.

FIG. 47 conceptually illustrates an example of network controller failure handling according to some embodiments of the invention. As shown, a network architecture 4700 includes logical switching elements 1 and 2, network controllers A-C, and managed network 4705. In addition, FIG. 47 illustrates a logical switching element master table 4710. In some embodiments, each of the network controllers A-C stores the logical switching element master table 4710 and communicates with each other to synchronize the contents of the logical switching element master table 4710.

Figure 47A:
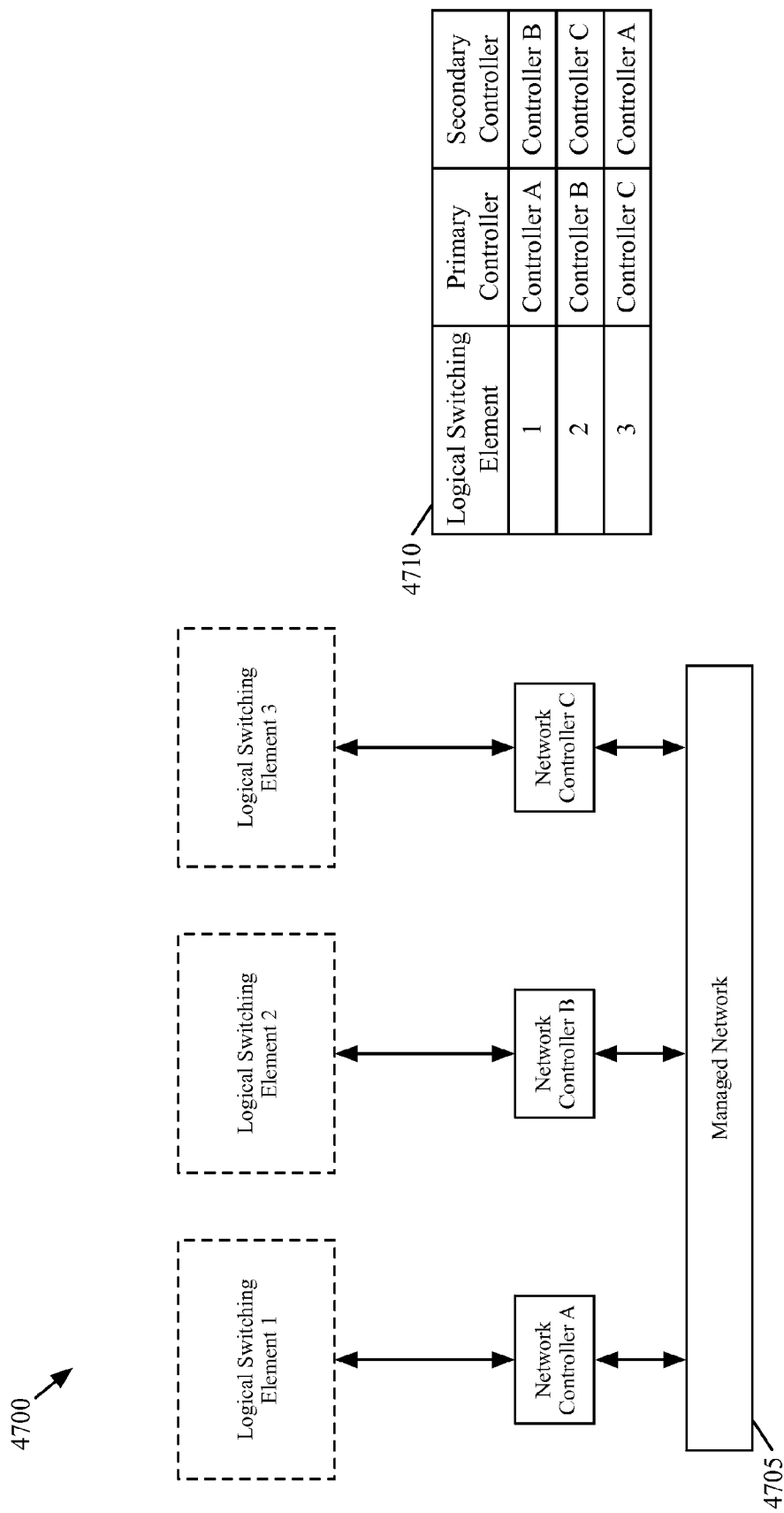
FIGS. 47A-C conceptually illustrate an example of network controller failure handling according to some embodiments of the invention.

In FIG. 47A, the logical switching element master table 4710 specifies that the primary network controller for the logical switching element 1 is the network controller A, the primary network controller for the logical switching element 2 is the network controller B, and the primary network controller for the logical switching element 3 is the network controller C. In additional, the logical switching element master table 4710 specifies that the secondary network controller for the logical switching element 1 is the network controller B, the secondary network controller for the logical switching element 2 is the network controller C, and the secondary network controller for the logical switching element 3 is the network controller A. For this example, the network controllers A-C communicate with each other in order to detect when one of the network controllers A-C fails.

Figure 47B:
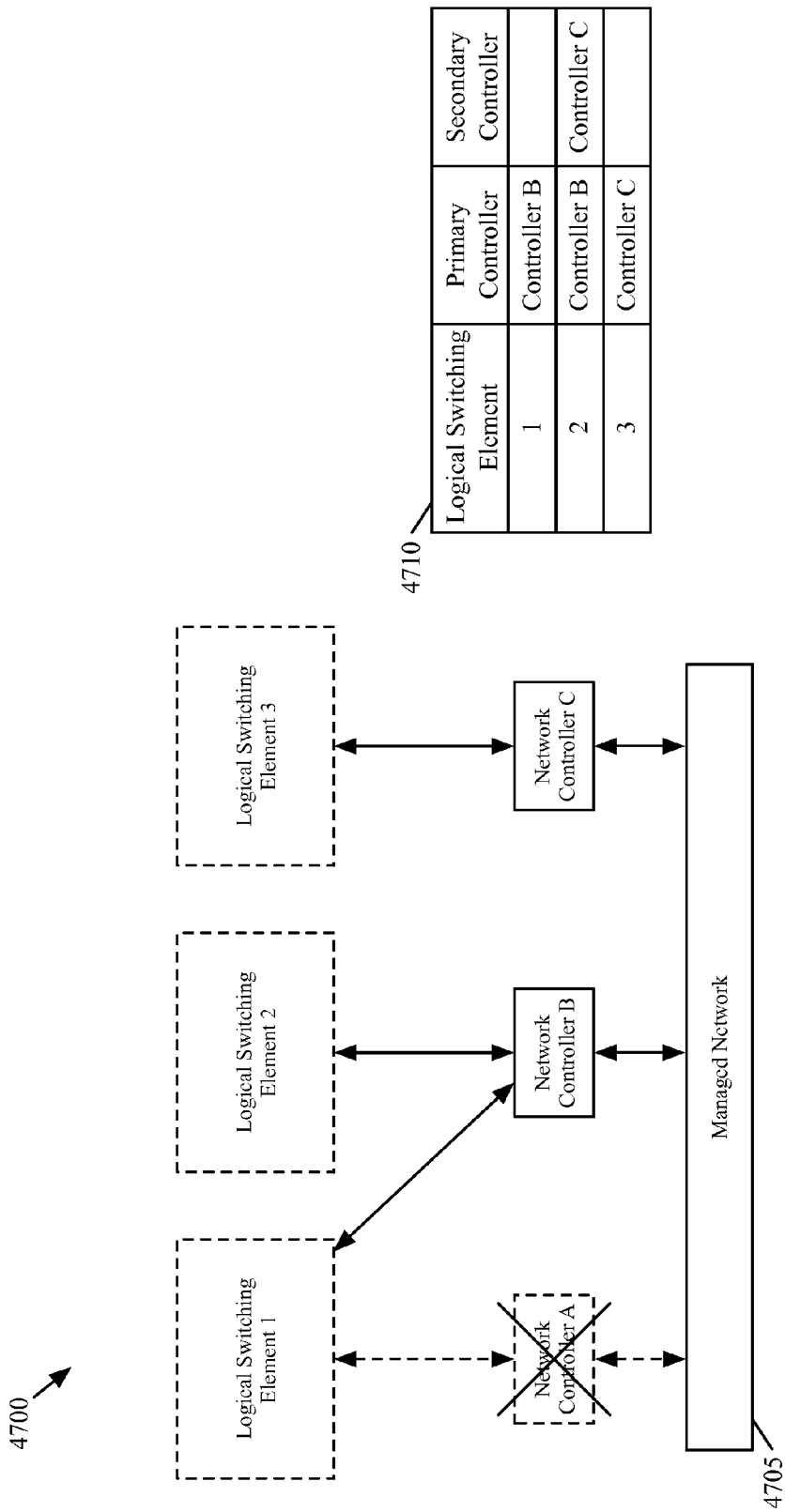

FIG. 47B conceptually illustrates the network architecture 4700 after the network controllers B and C have detected that the network controller A has failed. FIG. 47B also illustrates the logical switching element master table 4710 after the network controllers B and C have modified the logical switching element master table 4710 in response to the detected failure of the network controller A. As shown, the primary network controller for the logical switching element 1 is now the network controller B, which was previously the secondary network controller for the logical switching element 1. As such, the network controller B now manages the logical switching element 1.

Additionally, since the network controller A was designated as the secondary network controller for the logical switching element 3, the network controllers B and C have modified the logical switching element master table 4710 to no longer specify a secondary network controller for the logical switching element 3. However, in some embodiments, the network controllers B and C may automatically designate new secondary network controllers when a network controller fails. For instance, the network controllers B and C may specify the network controller C as the secondary network controller for the logical switching element 1 and specify the network controller B as the secondary network controller for the logical switching element 3.

Figure 47C:
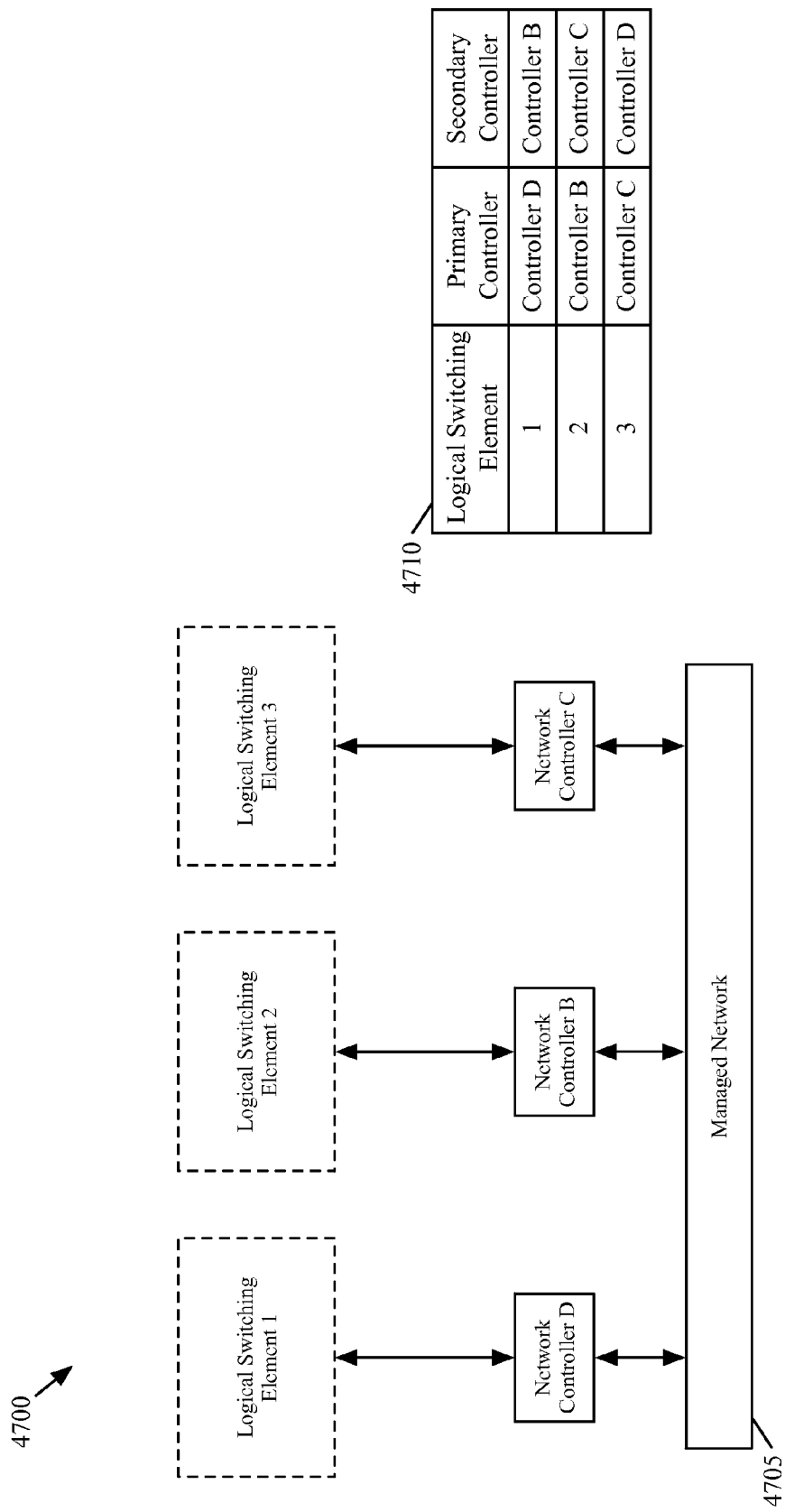

FIG. 47C conceptually illustrates the network architecture 4700 after a new network controller D has been added to the network architecture 4700. In particular, the network controller D is specified as the primary network controller for the logical switching element 1, as illustrated by the logical switching element master table 4710. FIG. 47C also illustrates that the network controllers B and C have specified secondary network controllers for the logical switching element 1 and the logical switching element 3 upon detection of the addition of the network controller D. As shown in the logical switching element master table 4710, the network controller B is designated as the secondary network controller for the logical switching element 1 and the network controller D is designated as the secondary network controller for the logical switching element 3.

Although FIGS. 47A-C illustrate failure handling of a network controller that manages a logical switching element, some embodiments also provide failure handling of a network controller of a managed switching element. In some cases, a managed switching element of some embodiments is managed by only one network controller (but a network controller may manage more than one managed switching elements). As such, some embodiments specify, for a particular network controller, another network controller as a secondary network controller in the event the particular network controller fails.

FIG. 48 conceptually illustrates another example of network controller failure handling according to some embodiments of the invention. As shown, a network architecture 4800 includes logical switching element 4805, network controllers A-C, and managed switching elements 1-3. In addition, FIG. 48 illustrates a managed switching element master table 4810. In some embodiments, each of the network controllers A-C stores the managed switching element master table 4810 and communicates with each other to synchronize the contents of the logical switching element master table 4810.

Figure 48A:
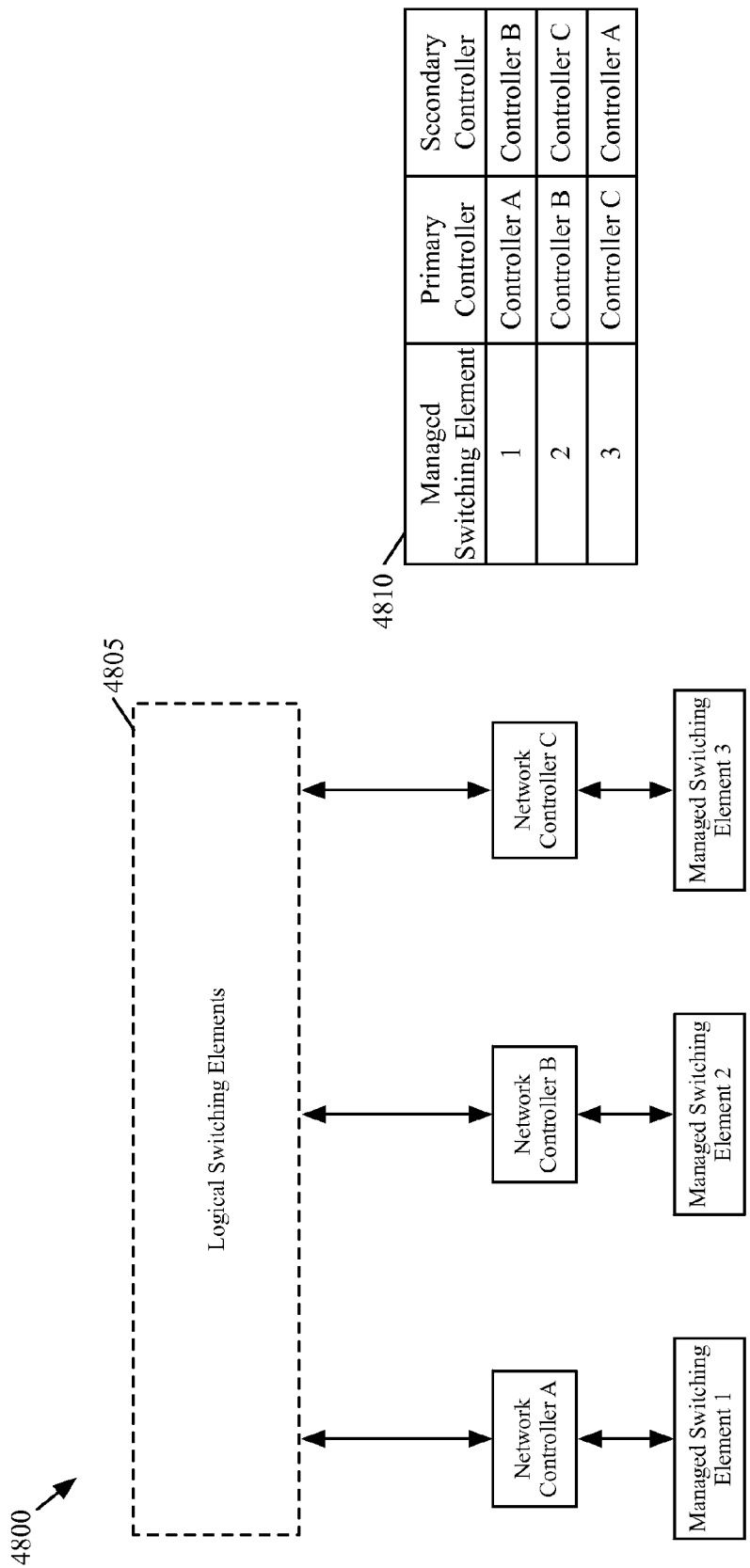
FIGS. 48A-C conceptually illustrate another example of network controller failure handling according to some embodiments of the invention.

In FIG. 48A, the managed switching element master table 4810 specifies that the primary network controller for the managed switching element 1 is the network controller A, the primary network controller for the managed switching element 2 is the network controller B, and the primary network controller for the managed switching element 3 is the network controller C. Additionally, the managed switching element master table 4810 specifies that the secondary network controller for the managed switching element 1 is the network controller B, the secondary network controller for the managed switching element 2 is the network controller C, and the secondary network controller for the managed switching element 3 is the network controller A. In this example, the network controllers A-C communicate with each other in order to detect when one of the network controllers A-C fails.

Figure 48B:
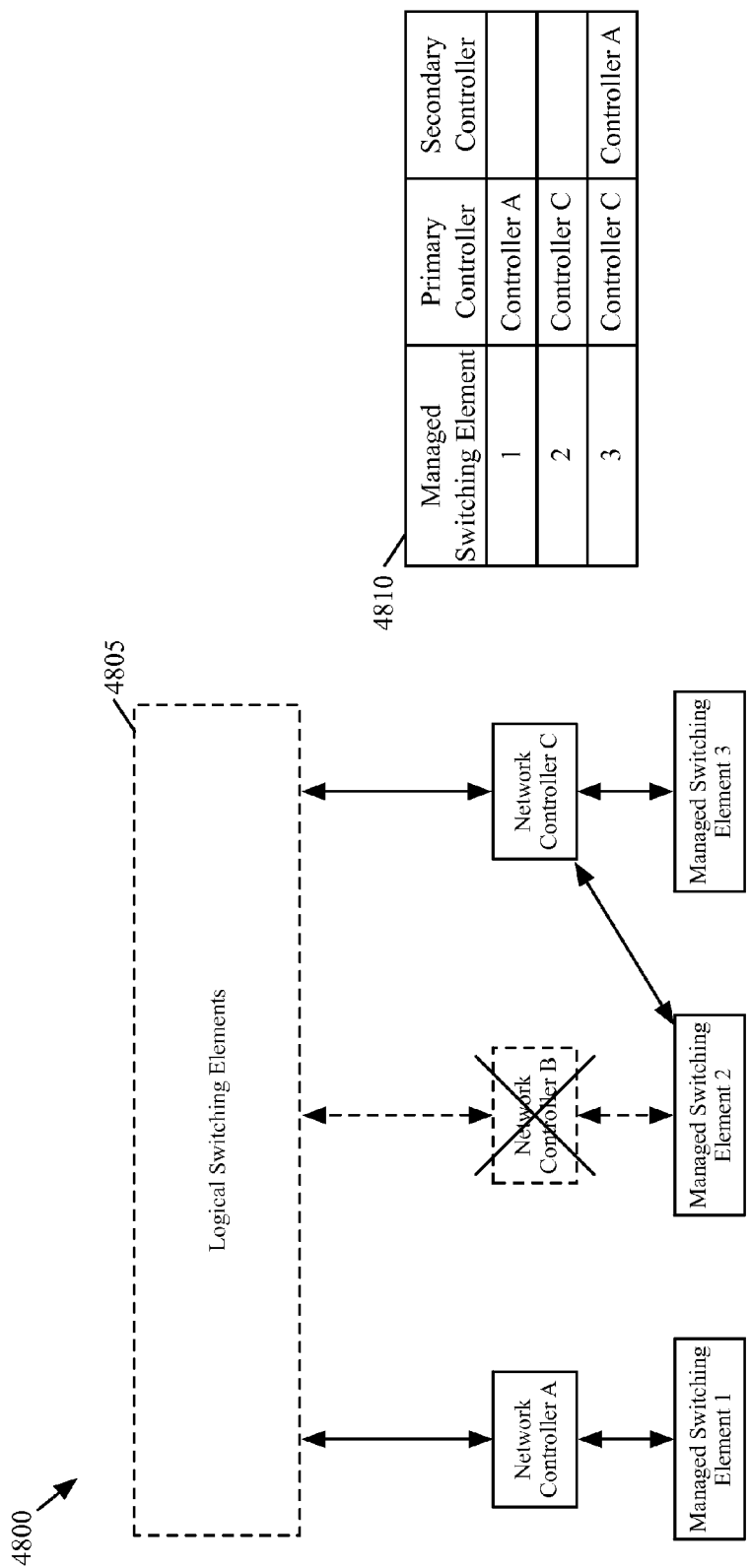

FIG. 48B conceptually illustrates the network architecture 4800 after the network controllers A and C have detected that the network controller B has failed. Also, FIG. 48B illustrates the managed switching element master table 4810 after the network controllers A and C have modified the managed switching element master table 4810 in response to the detected failure of the network controller B. As shown, the primary network controller for the managed switching element 2 is now the network controller C, which was previously the secondary network controller for the managed switching element 2. Accordingly, the network controller C now manages the managed switching element 2.

Furthermore, since the network controller B was designated as the secondary network controller for the managed switching element 1, the network controllers A and C have modified the managed switching element master table 4810 to no longer specify a secondary network controller for the managed switching element 1. However, the network controllers A and C of some embodiments may automatically specify new secondary network controllers when a network controller fails. For instance, the network controllers A and C may specify the network controller C as the secondary network controller for the managed switching element 1 and specify the network controller A as the secondary network controller for the logical switching element 2.

Figure 48C:
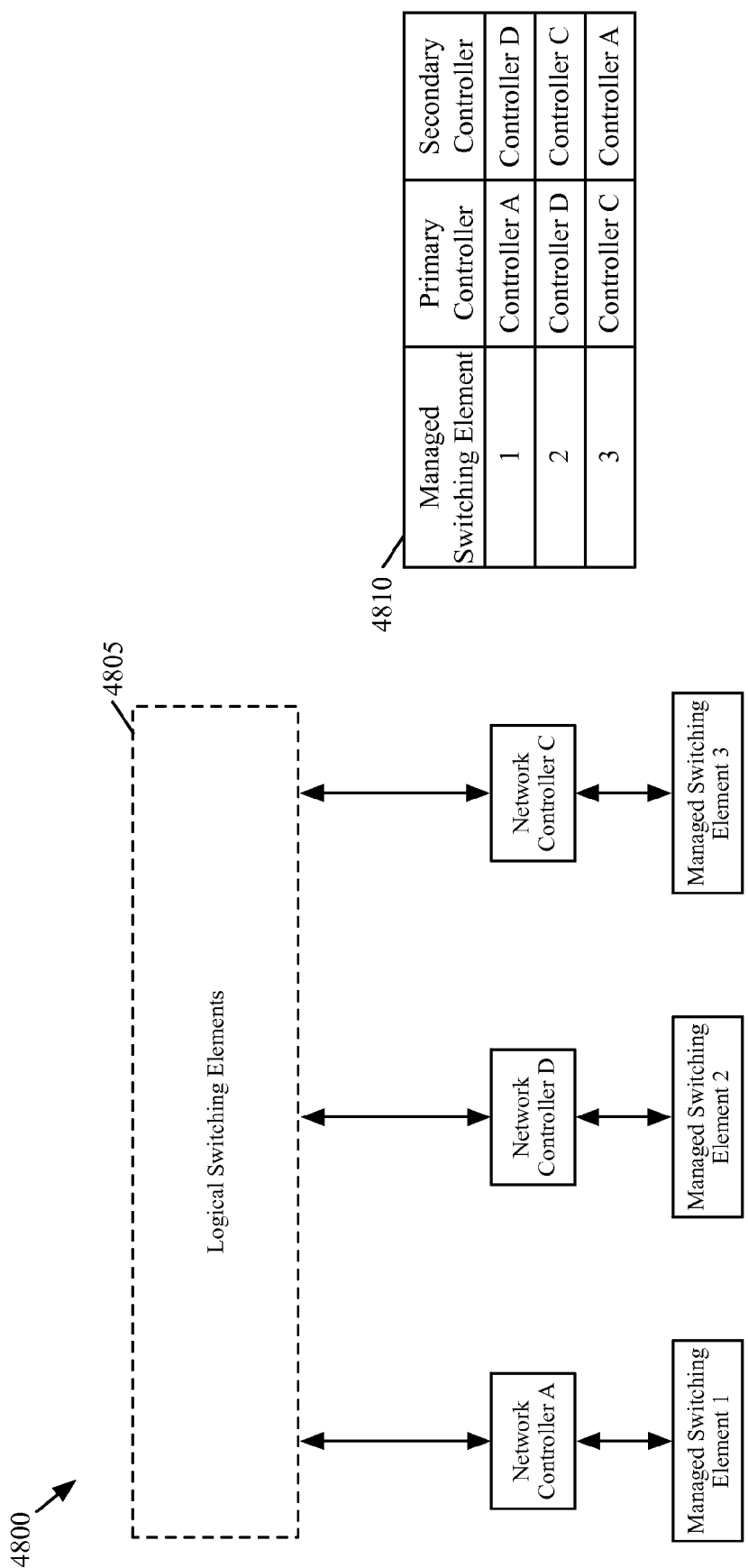

FIG. 48C conceptually illustrates the network architecture 4800 after a new network controller D has been added to the network architecture 4800. In particular, the network controller D is specified as the primary network controller for the managed switching element 2, as illustrated by the managed switching element master table 4810. FIG. 48C also illustrates that the network controllers A and C have specified secondary network controllers for the managed switching element 1 and the managed switching element 2 upon detection of the addition of the network controller D. As shown in the managed switching element master table 4810, the network controller D is designated as the secondary network controller for the managed switching element 1 and the network controller C is designated as the secondary network controller for the managed switching element 2.

V. Logical Processing

Figure 39:
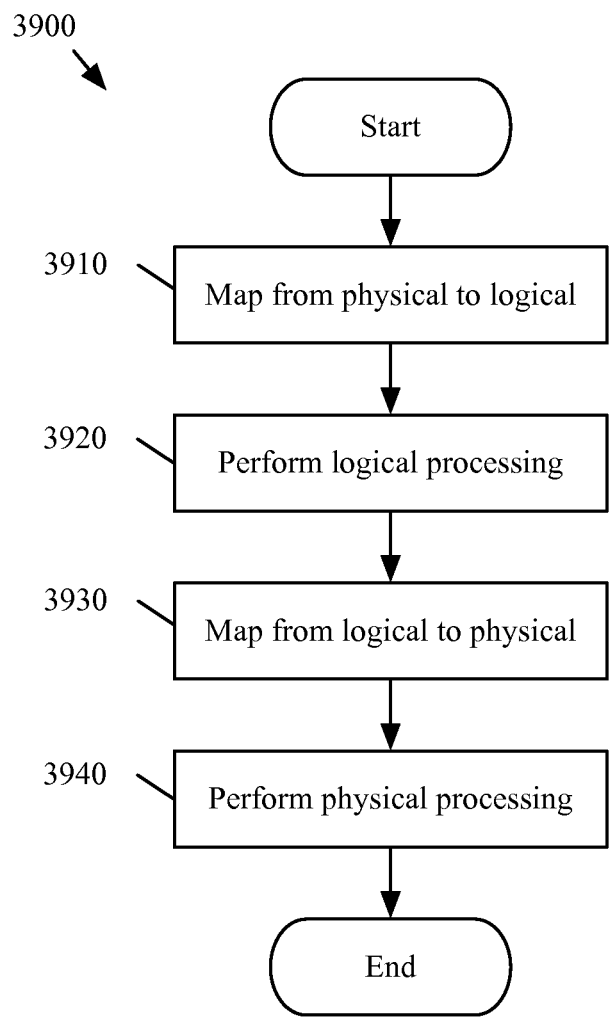
FIG. 39 conceptually illustrates a process of some embodiments for processing a packet through a logical switching element that is implemented across a set of managed switching elements in a managed network.

FIG. 39 conceptually illustrates a process 3900 of some embodiments for processing a packet through a logical switching element that is implemented across a set of managed switching elements in a managed network. In some embodiments, each managed switching element in the managed network performs the process 3900 when the managed switching element receives a packet.

The process 3900 starts by mapping (at 3910) the packet to a logical context. As noted above, a logical context of some embodiments represents the state of the packet with respect to a logical switching element. The process 3900 maps the packet to the packet's logical context in order to identify the stage in the logical switching element the packet is at.

Next, the process 3900 performs (at 3920) logical processing on the packet. Different embodiments perform logical processing on the packet differently. For example, the logical switching element may be implemented as a layer 2 switching element. In these cases, the logical processing includes performing logical layer 2 operations on the packet, such as performing a logical layer 2 lookup on the packet to determine the logical egress port of the logical switching element through which to send the packet.

In some cases, the process 3900 performs only a portion of the logical processing on the packet. For example, the process 3900 may start performing the logical processing on the packet, but the process 3900 does not complete the logical processing. Rather than waste the logical processing that has already been performed on the packet, the process 3900 modifies the logical context of the packet to indicate the stage in the logical processing that the packet is at so that logical processing on the packet can resume where the logical processing left off the next time the logical processing is performed on the packet (e.g., by the managed switching element that receives the packet next).

Other instances where the process 3900 performs only a portion of the logical processing on the packet is when a portion of the logical processing has already been performed on the packet (e.g., by a previous managed switching element). In these instances, the logical context of the packet, which was identified by the mapping of the packet to a logical context in the operation 3910, indicates the stage in the logical processing that the packet is at. Accordingly, the process 3900 resumes performing the logical processing on the packet at this point in the logical processing.

After the process 3900 performs the logical processing (or a portion of the logical processing) on the packet, the process 3900 maps (at 3930) the result of the logical processing of the packet a corresponding physical result. For example, when the result of the logical processing of the packet determines a logical port of the logical switching element through which to send the packet, the process 3900 maps the logical port(s) to a corresponding physical port(s) (e.g., a port of a managed switching element that is used to implement the logical switching element) through which to send the packet. In some embodiments, the physical port may be a physical port of a managed switching element that is different from the managed switching element that is performing the process 3900.

Finally, the process 3900 performs (at 3940) physical processing on the packet to determine the physical port of the managed switching element that is performing the process 3900 through which to send the packet so the packet reaches the physical port(s) determined at the operation 3930.

Figure 40:
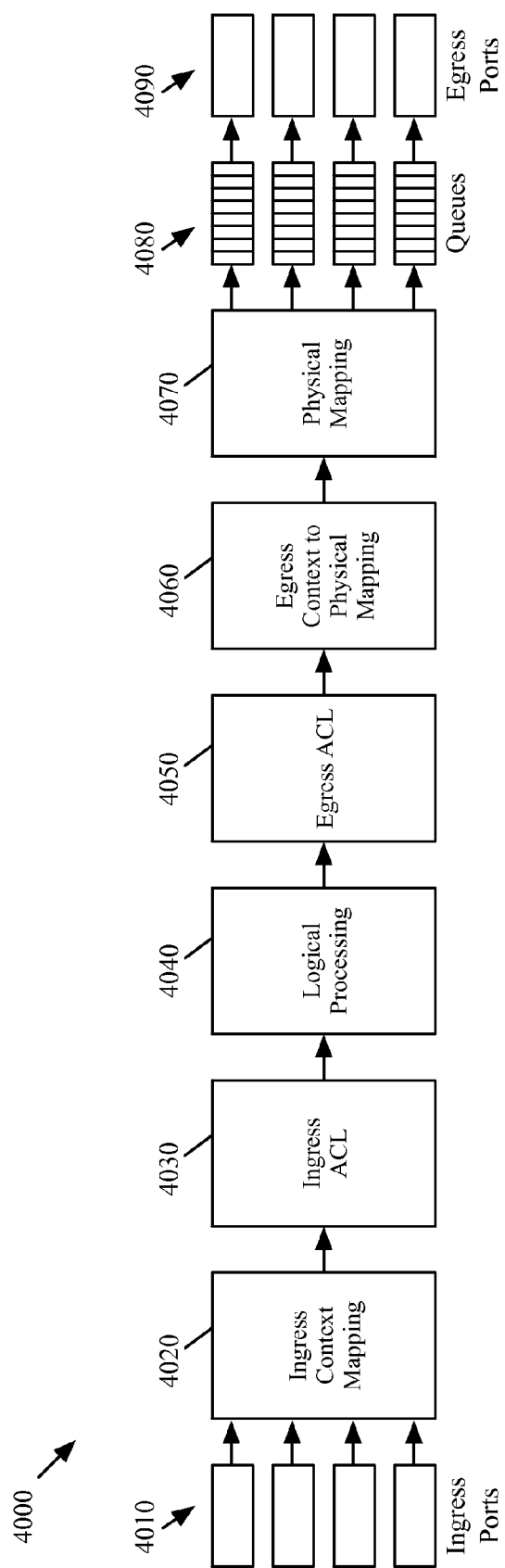
FIG. 40 conceptually illustrates a processing pipeline of some embodiments for processing a packet through a logical switching element.

FIG. 40 conceptually illustrates a processing pipeline 4000 of some embodiments for processing a packet through a logical switching element. Specifically, the processing pipeline 4000 includes six stages 4020-4070 for processing a packet through a logical switching element that is implemented across a set of managed switching elements in a managed network. In some embodiments, each managed switching element in the managed network that receives the packet performs the processing pipeline 4000 when the managed switching element receives the packet.

In some embodiments, a packet includes a header and a payload. The header includes, in some embodiments, a set of fields that contains information used for routing the packet through a network. Switching elements may determine switching decisions based on the contained in the header and may, in some cases, modify some or all of the header fields. As explained above, some embodiments determine switching decisions based on flow entries in the switching elements' forwarding tables.

In some embodiments, the processing pipeline 4000 may be implemented by flow entries in the managed switching elements in the network. For instance, some or all of the flow entries are defined such that the packet is processed against the flow entries based on the logical context tag in the packet's header. Therefore, in some of these embodiments, the managed switching elements are configured (e.g., by a network controller illustrated in FIGS. 1-5) with such flow entries.

As shown, FIG. 40 illustrates a set of ingress ports 4010, a set of queues 4080, and a set of egress ports 4090. The set of ingress ports 4010 conceptually represent a set of ports (e.g., a tunnel port, NICs, VIFs, PIFs) of the managed switching element that is performing the processing pipeline 4000. The ingress ports 4010 are ports through which the managed switching element receives packets. The set of queues 4080 conceptually represents a set of queues of the managed switching element that is performing the processing pipeline 4000. In some embodiments, the set of queues 4080 are for implementing resource control mechanisms, such as quality of service (QoS). The set of egress ports 4090 conceptually represent a set of ports (e.g., a tunnel port, NICs, VIFs, PIFs) of the managed switching element that is performing the processing pipeline 4000. The egress ports 4090 are ports through which the managed switching element sends packets.

In some embodiments, at least one port in the set of ingress ports 4010 is also a port in the set of egress ports 4090. In some embodiments, the set of ingress ports 4010 and the set of egress ports 4090 are the same set of ports. That is, the managed switching element includes a set of ports that are used both to receive packets and to send packets.

The first stage 4020 is similar to the first stage 1410 of the processing pipeline 1400, which is described above by reference to FIG. 14. At the stage 4020, ingress context mapping is performed on a packet to determine the logical context of the packet. In some embodiments, the first stage 4020 is performed when the logical switching element receives the packet (e.g., the packet is initially received by a managed switching element in the network that implements the logical switching elements). As noted above, a logical context, in some embodiments, represents the state of the packet with respect to the logical switching element. The logical context may, for example, specify the logical switching element to which the packet belongs, the logical port of the logical switching element through which the packet was received, the logical port of the logical switching element through which the packet is to be transmitted, the stage of the logical forwarding plane of the logical switching element the packet is at, etc.

Some embodiments determine the logical context of a packet based on the source MAC address of the packet (i.e., the machine from which the packet was sent). Some embodiments perform the logical context lookup based on the source MAC address of the packet and the inport (i.e., ingress port) of the packet (i.e., the port of the managed switching element through which the packet was received). Other embodiments may use other fields in the packet's header (e.g., MPLS header, VLAN id, etc.) for determining the logical context of the packet.

After the first stage 4020 is performed, some embodiments store the information that represents the logical context in one or more fields of the packet's header. These fields may also be referred to as a logical context tag or a logical context ID. Furthermore, the logical context tag may coincide with one or more known header fields (e.g., the VLAN id field) in some embodiments. As such, these embodiments do not utilize the known header field or its accompanying features in the manner that the header field is defined to be used. Alternatively, some embodiments store the information that represents the logical context as metadata that is associated with (instead of stored in the packet itself) and passed along with the packet.

In some embodiments, the second stage 4030 is defined for the logical switching element. In some such embodiments, the second stage 4030 operates on the packet's logical context to determine ingress access control of the packet with respect to the logical switching element. For example, an ingress ACL is applied to the packet to control the packet's access to the logical switching element when the logical switching element receives the packet. The ingress ACL may be defined to implement other ACL functionalities, such as counters, port security (e.g., allow packets received through a port that originated only from a particular machine(s)), and machine isolation (e.g., allow broadcast/multicast packets received from a particular machine to be sent to only machines that belong to the same tenant or logical switching element), among other ACL functionalities. Based on the ingress ACL defined for the logical switching element, the packet may be further processed (e.g., by the third stage 4040) or the packet may be dropped, for example.

In the third stage 4040 of the processing pipeline 4000, logical processing is performed on the packet in the context of the logical switching element. In some embodiments, the third stage 4040 operates on the packet's logical context to process and route the packet with respect to the logical switching element. Different embodiments define logical processing for the logical switching element differently. For instance, some embodiments define a logical layer 2 table for processing the packet at layer 2 of the logical network. Alternatively, or in conjunction with the logical layer 2 table, some embodiments define a logical layer 3 table for processing the packet at layer 3 of the logical network. Other embodiments may define other logical process for the packet at the stage 4040.

The fourth stage 4050 of some embodiments is defined for the logical switching element. The fourth stage 4050 of some such embodiments operates on the packet's logical context to determine egress access control of the packet with respect to the logical switching element. For instance, an egress ACL may be applied to the packet to control the packet's access out of the logical switching element after logical processing has been performed on the packet. Based on the egress ACL defined for the logical switching element, the packet may be further processed (e.g., sent out of a logical port of the logical switching element or sent to a dispatch port for further processing) or the packet may be dropped, for example.

In the fifth stage 4060 of the processing pipeline 4000 is similar to the third stage 1430 of the processing pipeline 1400, which is described above by reference to FIG. 14. At the fifth stage 4050, egress context mapping is performed to identify a physical result that corresponds to the result of the logical processing of the packet. For example, the logical processing of the packet may specify that the packet is to be sent out of one or more logical ports (e.g., a logical egress port) of the logical switching element. As such, the egress context mapping operation identifies a physical port(s) of one or more of the managed switching elements that corresponds to the particular logical port of the logical switching element.

The sixth stage 4070 of the processing pipeline 4000 performs a physical mapping based on the egress context mapping performed at the fifth stage 4060. In some embodiments, the physical mapping determines operations for routing the packet to the physical port that was determined in the fifth stage 4060. For example, the physical mapping of some embodiments determines one or more queues in the set of queues 4080 associated with one or more ports of the set of ports 4080 of the managed switching elements that is performing the processing pipeline 4000 through which to send the packet in order for the packet to reach the physical port(s) determined in the fifth stage 4060. This way, the managed switching elements can route the packet along the correct path in the network for the packet to reach the determined physical port(s). Also, some embodiments remove the logical context tag after the sixth stage 4070 is completed in order to return the packet to its original state before the packet was processed by the processing pipeline 4000.

As mentioned above, in some embodiments, the processing pipeline 4000 is performed by each managed switching element in the managed network that is used to implement the logical switching element. The processing pipeline 4000 of some embodiments may be distributed across the managed switching elements in the managed network. For example, in some embodiments, the second-fourth stages 4030-4050 are distributed across the managed switching elements in the managed network. In some of these embodiments, the managed switching element that initially receives the packet may perform the first-sixth stages 4020-4070 and the remaining managed switching elements that subsequently receive the packet only perform the first, fifth, and sixth stages 4020, 4060, and 4070.

Figure 41:
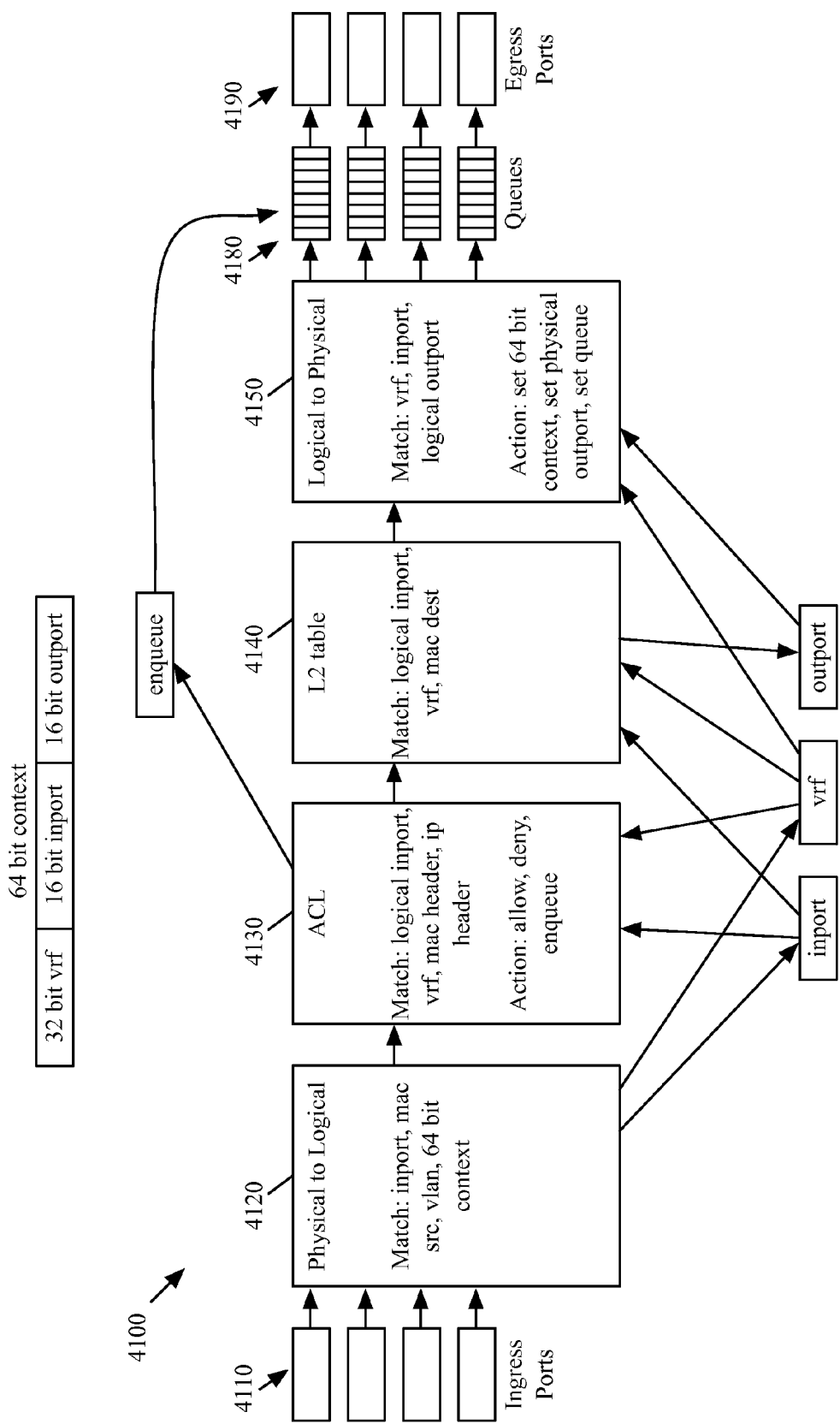
FIG. 41 conceptually illustrates a processing pipeline of some embodiments for processing a packet through a logical switching element.

FIG. 41 conceptually illustrates a processing pipeline 4100 of some embodiments for processing a packet through a logical switching element. In particular, the processing pipeline 4100 includes four stages 4120-4150 for processing a packet, by operating on a 64-bit logical context tag of the packet, through a logical switching element that is implemented across a set of managed switching elements in a managed network. In some embodiments, each managed switching element in the managed network that receives the packet performs the processing pipeline 4100 when the managed switching element receives the packet.

As explained above, a packet, in some embodiments, includes a header and a payload. In some embodiments, the header includes a set of fields that contains information used for routing the packet through a network. Switching elements may determine switching decisions based on the fields contained in the header and may, in some cases, modify some or all of the header fields. As explained above, some embodiments determine switching decisions based on flow entries in the switching elements' forwarding tables.

In this example, the 64-bit context tag is a field that is included in the header of a packet. As shown, the 64-bit context tag includes a 32-bit virtual routing function (VRF) field, a 16-bit logical inport field, and a 16-bit logical outport field. The 32-bit VRF field represents the logical switching element to which the packet belongs and the stage of the logical forwarding plane of the logical switching element the packet is at, the 16-bit logical inport field represents the logical port of the logical switching element through which the packet was received, and the 16-bit logical outport field represents the logical port of the logical switching element through which the packet is to be transmitted.

In some embodiments, the processing pipeline 4100 may be implemented by flow entries in the managed switching elements in the network. For instance, some or all of the flow entries are defined such that the packet is processed against the flow entries based on the 64-bit logical context tag in the packet's header. Therefore, in some of these embodiments, the managed switching elements are configured (e.g., by a network controller illustrated in FIGS. 1-5) with such flow entries.

As shown, FIG. 41 illustrates a set of ingress ports 4110, a set of queues 4180, and a set of egress ports 4190. The set of ingress ports 4110, the set of queues 4180, and the set of egress ports 4190 are similar to the set of ingress ports 4010, the set of queues 4080, and the set of egress ports 4090, respectively. The set of ingress ports 4110 conceptually represent a set of ports (e.g., a tunnel port, NICs, VIFs, PIFs) of the managed switching element that is performing the processing pipeline 4100. The ingress ports 4110 are ports through which the managed switching element receives packets. The set of queues 4180 conceptually represents a set of queues of the managed switching element that is performing the processing pipeline 4100. In some embodiments, the set of queues 4180 are for implementing resource control mechanisms, such as quality of service (QoS). The set of egress ports 4190 conceptually represent a set of ports (e.g., a tunnel port, NICs, VIFs, PIFs) of the managed switching element that is performing the processing pipeline 4100. The egress ports 4190 are ports through which the managed switching element sends packets. In some embodiments, at least one port in the set of ingress ports 4110 is also a port in the set of egress ports 4190. In some embodiments, the set of ingress ports 4110 and the set of egress ports 4190 are the same set of ports. That is, the managed switching element includes a set of ports that are used both to receive packets and to send packets.

At the first stage 4120 of the processing pipeline 4100, a physical to logical mapping is performed on a packet to determine the logical context of the packet. In this example, the physical to logical mapping of the first stage 4120 determines the logical switching element to which the packet belongs, the stage of the logical forwarding plane of the logical switching element the packet is at, and the logical port of the logical switching element through which the packet was received. In some embodiments, the first stage 4120 is performed when the logical switching element receives the packet (e.g., the packet is initially received by a managed switching element in the network that implements the logical switching elements).

Different embodiments determine the logical context of a packet based on different fields of the packet's header. For instance, as shown in FIG. 41, some embodiments determine the logical context of a packet based on the source MAC address of the packet (i.e., the machine from which the packet was sent), an inport (i.e., an ingress port in the set of ingress ports 4110) of the packet (i.e., the physical port of the managed switching element through which the packet was received), a VLAN id, the 64-bit context tag, or any combination of the four fields.

After the first stage 4120 is performed, some embodiments store the information that represents the logical context in the packet's 64-bit logical context tag, as illustrated by arrows from the stage 4120 to the corresponding fields below. For example, the logical switching element to which the packet belongs and the stage of the logical forwarding plane of the logical switching element the packet is at is stored in the 32-bit VRF field, and the logical port of the logical switching element through which the packet was received is stored in the 16-bit logical inport field.

In some embodiments, the second stage 4130 is defined for the logical switching element. In this example, the second stage 4130 operates on the packet's 64-bit logical context tag to determine access control of the packet with respect to the logical switching element. As shown by arrows pointing from the fields below to the stage 4130, an ACL operates on the 16-bit logical inport field and the 32-bit VRF field of the packet's 64-bit logical context tag, which results in allowing the packet to be further processed (e.g., by the third stage 4140), denying the packet (i.e., dropping the packet), or enqueuing the packet. In some embodiments, enqueuing the packet involves sending the packet to a queue in the set of queues 4180 that is associated with a port in the set of egress ports 4190 for QoS purposes. In addition, the ACL may be defined to implement other ACL functionalities (not shown), such as counters, port security (e.g., allow packets received through a port that originated only from a particular machine(s)), and machine isolation (e.g., allow broadcast/multicast packets received from a particular machine to be sent to only machines that belong to the same tenant or logical switching element), among ACL functionalities.

In the third stage 4140 of the processing pipeline 4100, the packet is processed against a logical L2 (layer 2) table to determine a logical outport, which corresponds to a logical port of the logical switching element through which the packet is to be sent. As shown by arrows pointing from the fields below to the stage 4140, the L2 table operates on the 16-bit logical inport field and the 32-bit VRF field of the packet's 64-bit logical context tag in addition to the destination MAC address of the packet. After the third stage 4140 is performed, some embodiments store the information that represents the determined logical outport in the 16-bit logical outport field of the packet's 64-bit logical context tag, as illustrated by an arrow from the stage 4140 to the outport field below.

At the fourth stage 4150 of the processing pipeline 4100, a logical to physical mapping is performed to identify one or more physical ports of one or more managed switching elements in the managed network that corresponds to the logical outport, which was determined in the third stage 4140, of the logical switching element. For this example, the fourth stage 4150 operates on the packet's 64-bit logical context tag to identify one or more physical ports in the set of egress ports 4190 through which to send the packet out in order for the packet to reach the determined logical outport. As shown by arrows pointing from the fields below to the stage 4150, the fourth stage 4150 operates on the 16-bit logical outport field and the 32-bit VRF field of the packet's 64-bit logical context tag, which results in setting the 64-bit logical context tag (e.g., saving the stage of the logical switching element that the packet is at, removing the 64-bit logical context tag), setting the one or more queues in the set of queues 4180 associated with the physical ports, and setting the one or more physical ports in the set of egress ports 4190 through which to send the packet out.

As mentioned above, in some embodiments, the processing pipeline 4100 is performed by each managed switching element in the managed network that is used to implement the logical switching element. The processing pipeline 4100 of some embodiments may be distributed across the managed switching elements in the managed network. For example, in some embodiments, the second and third stages 4130 and 4140 are distributed across the managed switching elements in the managed network. In some of these embodiments, the managed switching element that initially receives the packet may perform the first-fourth stages 4120-4150 and the remaining managed switching elements that subsequently receive the packet only perform the first and fourth stages 4120 and 4150.

In the above description of FIGS. 39, 40, and 41, reference to "physical" components (e.g., physical switching element, physical ports, etc.) refers to the managed switching elements in the managed network. As explained above, a managed switching element may be a hardware switching element, a software switching element, or a virtual switching element. Thus, one of ordinary skill in the art will realize that the reference to a physical component is not meant to refer to an actual physical component, but rather the reference is meant to distinguish from logical components (e.g., a logical switching element, a logical port, etc.).

Figure 42:
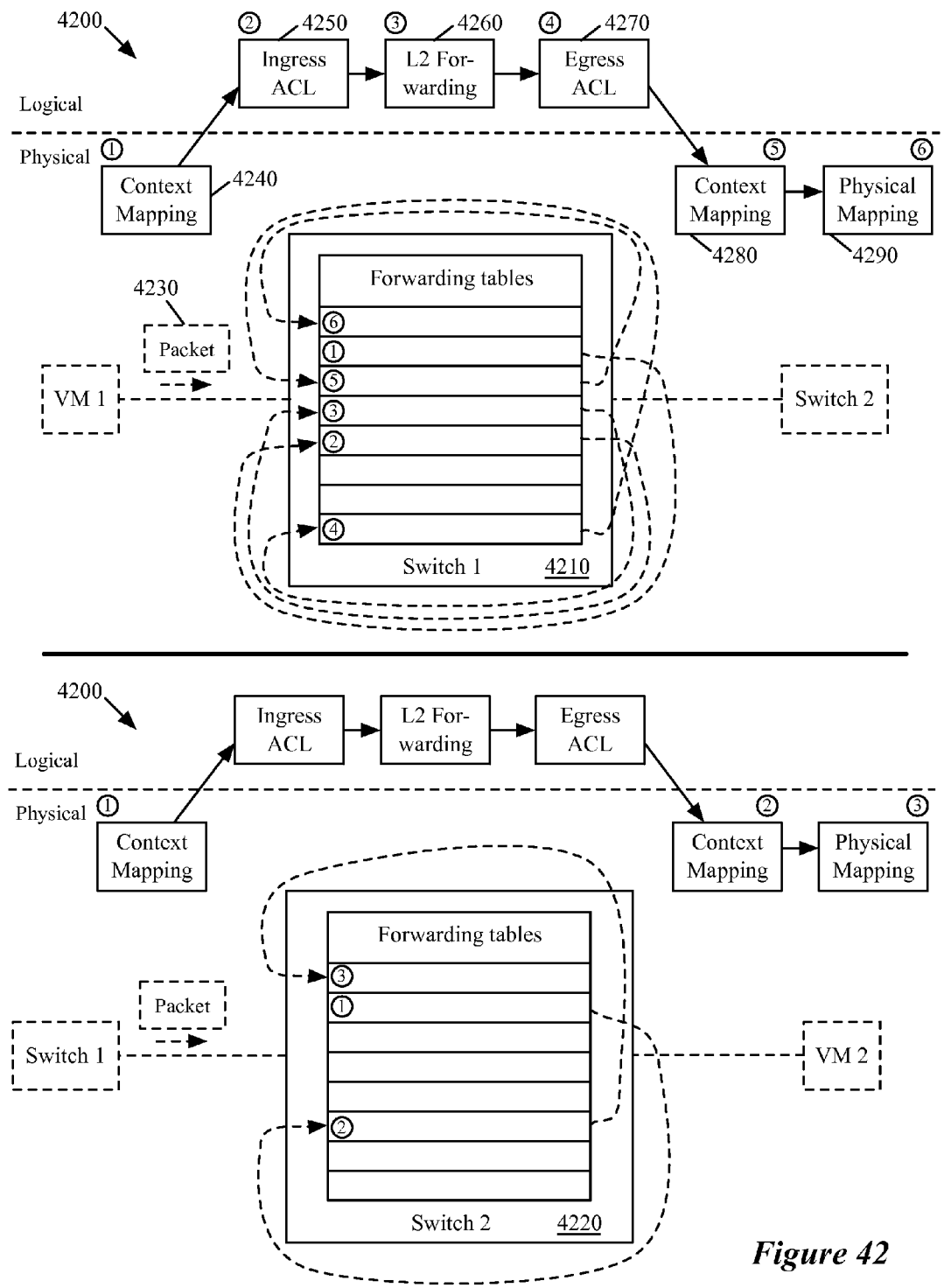
FIG. 42 conceptually illustrates distribution of logical processing across managed switching elements in a managed network according to some embodiments of the invention.

As mentioned above, some embodiments may distribute the processing of a processing pipeline across managed switching elements in a managed network. FIG. 42 conceptually illustrates distribution of logical processing across managed switching elements in a managed network according to some embodiments of the invention. In particular, FIG. 42 conceptually illustrates a processing pipeline 4200 distributed across two managed switching elements 4210 and 4220. The processing pipeline 4200 is similar to the processing pipeline 4000 described above by reference to FIG. 40. Stage 4240 corresponds to the stage 4020, stage 4250 corresponds to the stage 4030, stage 4260 corresponds to the stage 4040, stage 4270 corresponds to the stage 4050, stage 4280 corresponds to the stage 4060, and stage 4290 corresponds to the stage 4070. In addition, FIG. 42 conceptually illustrates forwarding tables in the managed switching elements 4210 and 4220 that are each implemented as a single table and implementing multiple forwarding tables (e.g., using a dispatch port, which is not shown) with the single table.

As illustrated in FIG. 42, VM 1 is coupled to the managed switching element 4210, the managed switching element 4210 is coupled to the managed switching element 4220, and the managed switching element 4220 is coupled to VM 2. In this example, the VM 1 sends a packet 4230 to VM 2 through a logical switching element that is implemented by the managed switching elements 4210 and 4220.

As shown in the top half of FIG. 42, the managed switching element 4210 includes a forwarding table that includes rules (e.g., flow entries) for processing and routing the packet 4230. When the managed switching element 4210 receives the packet 4230 from the VM 1 through a VIF (not shown) of the managed switching element 4210, the managed switching element 4210 begins processing the packet 4230 based on the forwarding tables of the managed switching element 4210. The managed switching element 4210 identifies a record indicated by an encircled 1 (referred to as "record 1") in the forwarding tables that implements the context mapping of the stage 4240. The record 1 identifies the packet 4230's logical context based on the inport, which is the VIF through which the packet 4230 is received from the VM 1. In addition, the record 1 specifies that the managed switching element 4210 store the logical context of the packet 4230 in a set of fields (e.g., a VLAN id field) of the packet 4230's header. The record 1 also specifies the packet 4230 be further processed by the forwarding tables (e.g., by sending the packet 4230 to a dispatch port).

Based on the logical context and/or other fields stored in the packet 4230's header, the managed switching element 4210 identifies a record indicated by an encircled 2 (referred to as "record 2") in the forwarding tables that implements the ingress ACL of the stage 4250. In this example, the record 2 allows the packet 4230 to be further processed and, thus, specifies the packet 4230 be further processed by the forwarding tables (e.g., by sending the packet 4230 to a dispatch port). In addition, the record 2 specifies that the managed switching element 4210 store the logical context (i.e., the packet 4230 has been processed by the second stage 4250 of the processing pipeline 4200) of the packet 4230 in the set of fields of the packet 4230's header.

Next, the managed switching element 4210 identifies, based on the logical context and/or other fields stored in the packet 4230's header, a record indicated by an encircled 3 (referred to as "record 3") in the forwarding tables that implements the logical L2 forwarding of the stage 4260. The record 3 identifies the logical port of the logical switching element, which is implemented by the managed switching elements 4210 and 4220, to which the packet 4230 is to be forwarded. The record 3 also specifies that the packet 4230 be further processed by the forwarding tables (e.g., by sending the packet 4230 to a dispatch port). Also, the record 3 specifies that the managed switching element 4210 store the logical context (i.e., the packet 4230 has been processed by the third stage 4260 of the processing pipeline 4200) in the set of fields of the packet 4230's header.

Based on the logical context and/or other fields stored in the packet 4230's header, the managed switching element 4210 identifies a record indicated by an encircled 4 (referred to as "record 4") in the forwarding tables that implements the egress ACL of the stage 4270. In this example, the record 4 allows the packet 4230 to be further processed and, thus, specifies the packet 4230 be further processed by the forwarding tables (e.g., by sending the packet 4230 to a dispatch port). In addition, the record 4 specifies that the managed switching element 4210 store the logical context (i.e., the packet 4230 has been processed by the fourth stage 4270 of the processing pipeline 4200) of the packet 4230 in the set of fields of the packet 4230's header.

In the fifth stage 4270 of the processing pipeline 4200, the managed switching element 4210 identifies, based on the logical context and/or other fields stored in the packet 4230's header, a record indicated by an encircled 5 (referred to as "record 5") in the forwarding tables that implements the context mapping of the stage 4280. In this example, the record 5 identifies the VIF (not shown) of the managed switching element 4220 to which the VM 2 is coupled as the port that corresponds to the logical port of the logical switching element to which the packet 4230 is to be forwarded. The record 5 additionally specifies that the packet 4230 be further processed by the forwarding tables (e.g., by sending the packet 4230 to a dispatch port).

Based on the logical context and/or other fields stored in the packet 4230's header, the managed switching element 4210 then identifies a record indicated by an encircled 6 (referred to as "record 6") in the forwarding tables that implements the physical mapping of the stage 4290. The record 6 specifies the port of the managed switching element 4210 through which the packet 4230 is to be sent in order for the packet 4230 to reach the VM 2. In this case, the managed switching element 4210 is to send the packet 4230 out of the port (not shown) of managed switching element 4210 that is coupled to the managed switching element 4220.

As shown in the bottom half of FIG. 42, the managed switching element 4220 includes a forwarding table that includes rules (e.g., flow entries) for processing and routing the packet 4230. When the managed switching element 4220 receives the packet 4230 from the managed switching element 4210, the managed switching element 4220 begins processing the packet 4230 based on the forwarding tables of the managed switching element 4220. The managed switching element 4220 identifies a record indicated by an encircled 1 (referred to as "record 1") in the forwarding tables that implements the context mapping of the stage 4240. The record 1 identifies the packet 4230's logical context based on the logical context that is stored in the packet 4230's header. The logical context specifies that the packet 4230 has been processed by the second-fourth stages 4250-4270 of the processing pipeline 4200, which was performed by the managed switching element 4210. As such, the record 1 specifies that the packet 4230 be further processed by the forwarding tables (e.g., by sending the packet 4230 to a dispatch port).

Next, the managed switching element 4220 identifies, based on the logical context and/or other fields stored in the packet 4230's header, a record indicated by an encircled 2 (referred to as "record 2") in the forwarding tables that implements the context mapping of the stage 4280. In this example, the record 2 identifies the VIF (not shown) of the managed switching element 4220 to which the VM 2 is coupled as the port that corresponds to the logical port of the logical switching element (which was determined by the managed switching element 4210) to which the packet 4230 is to be forwarded. The record 2 additionally specifies that the packet 4230 be further processed by the forwarding tables (e.g., by sending the packet 4230 to a dispatch port).

Based on the logical context and/or other fields stored in the packet 4230's header, the managed switching element 4220 identifies a record indicated by an encircled 3 (referred to as "record 3") in the forwarding tables that implements the physical mapping of the stage 4290. The record 3 specifies the port of the managed switching element 4220 through which the packet 4230 is to be sent in order for the packet 4230 to reach the VM 2. In this case, the managed switching element 4220 is to send the packet 4230 out of the VIF (not shown) of managed switching element 4220 that is coupled to the VM 2.

Figure 43:
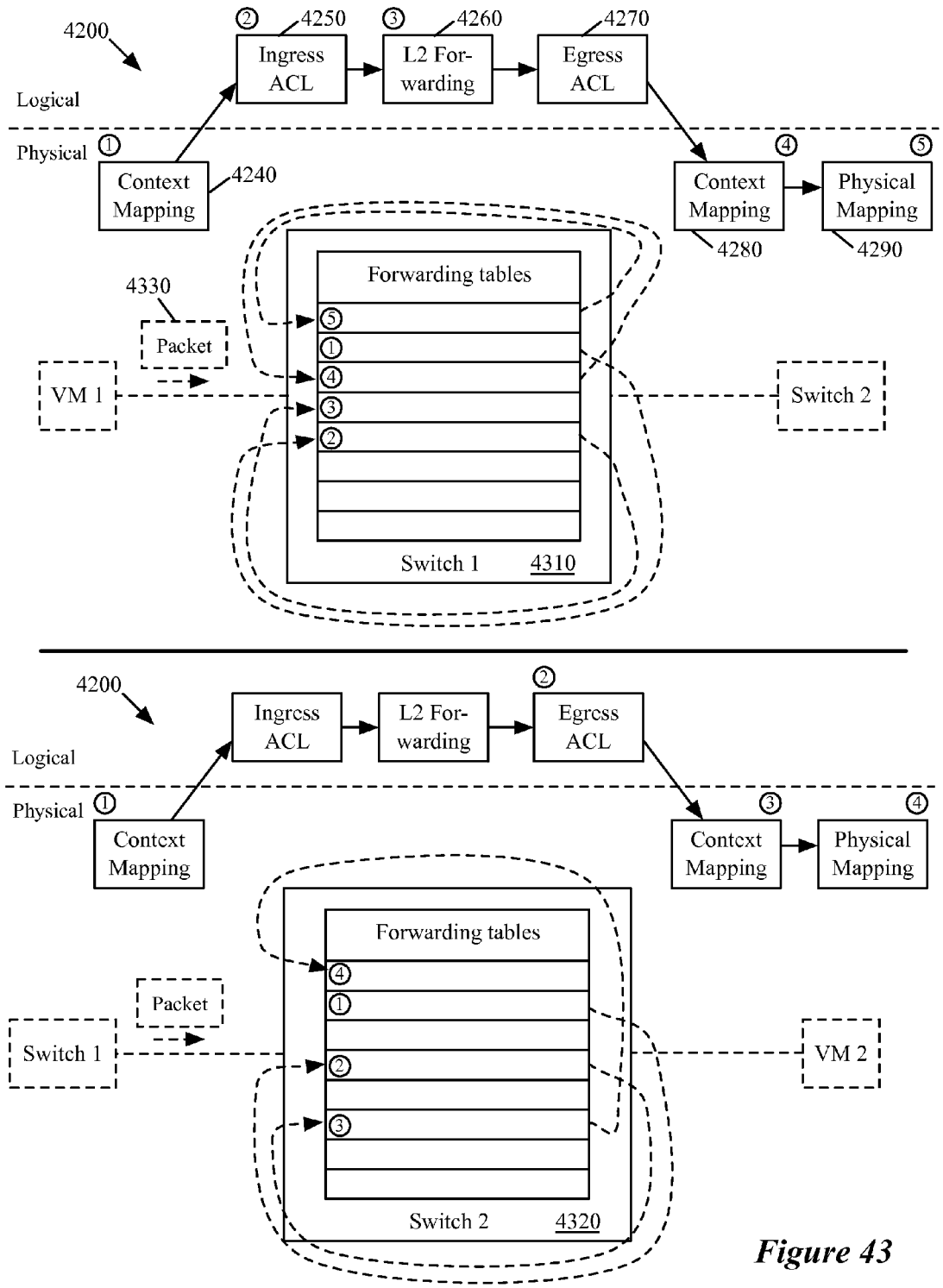
FIG. 43 conceptually illustrates distribution of logical processing across managed switching elements in a managed network according to some embodiments of the invention.

The above description of FIG. 42 illustrates a managed switching element in a managed network that performs an entire logical processing of a processing pipeline of some embodiments. However, some embodiments may distribute the logical processing of a processing pipeline across several managed switching element in a managed network. The following figure conceptually illustrates an example of such an embodiment. FIG. 43 conceptually illustrates the distribution of logical processing across managed switching elements in a managed network according to some embodiments of the invention. Specifically, FIG. 43 conceptually illustrates the processing pipeline 4200 distributed across the two managed switching elements 4210 and 4220.

FIG. 43 is similar to FIG. 42 except FIG. 43 conceptually illustrates that the managed switching element 4210 performs only a portion of the logical processing of the processing pipeline 4200 and the managed switching element 4220 performs the remaining portion of the logical processing of the processing pipeline 4200. As shown in the top half of FIG. 43, the managed switching element 4210 performs the context mapping of the stage 4240, the ingress ACL of the stage 4250, the logical L2 forwarding of the stage 4260, the context mapping of the stage 4280, and the physical mapping of the stage 4290. The managed switching element 4210 does not perform the egress ACL of the stage 4270, which is one of the stages of the logical processing of the processing pipeline 4200. Accordingly, when the managed switching element 4220 sends the packet 4230 to the managed switching element 4220 (at the stage 4290), the logical context stored in the packet 4230's header specifies that the packet 4230 has been processed by the third stage 4260 of the processing pipeline 4200).

As illustrated in the bottom half of FIG. 43, when the managed switching element 4220 receives the packet 4230 from the managed switching element 4210, the managed switching element 4220 begins processing the packet 4230 based on the forwarding tables of the managed switching element 4220. The managed switching element 4220 identifies a record indicated by an encircled 1 (referred to as "record 1") in the forwarding tables that implements the context mapping of the stage 4240. The record 1 identifies the packet 4230's logical context based on the logical context that is stored in the packet 4230's header. The logical context specifies that the packet 4230 has been processed by the second and third stages 4250 and 4260 of the processing pipeline 4200, which was performed by the managed switching element 4210. As such, the record 1 specifies that the packet 4230 be further processed by the forwarding tables (e.g., by sending the packet 4230 to a dispatch port).

Based on the logical context and/or other fields stored in the packet 4230's header, the managed switching element 4220 identifies a record indicated by an encircled 2 (referred to as "record 2") in the forwarding tables that implements the egress ACL of the stage 4270. In this example, the record 2 allows the packet 4230 to be further processed and, thus, specifies the packet 4230 be further processed by the forwarding tables (e.g., by sending the packet 4230 to a dispatch port). In addition, the record 2 specifies that the managed switching element 4220 store the logical context (i.e., the packet 4230 has been processed by the fourth stage 4270 of the processing pipeline 4200) of the packet 4230 in the set of fields of the packet 4230's header.

Finally, the managed switching element 4210 performs the context mapping of the stage 4280 and the physical mapping of the stage 4290 is a similar manner was that described above by reference to FIG. 42.

While FIGS. 42 and 43 show examples of distributing logical processing across managed switching elements in a managed network, in some instance, some or all of the logical processing may need to be processed again. For instance, in some embodiments, a root node does not preserve the logical context of a packet. Thus, when a pool node receives a packet from the root node of such embodiments (e.g., when a patch bridge of a pool node receives a packet from a root bridge, which are illustrated in FIG. 22), the pool node may have to perform the logical processing of the processing pipeline due to the lack of a logical context in the packet.

Figure 45:
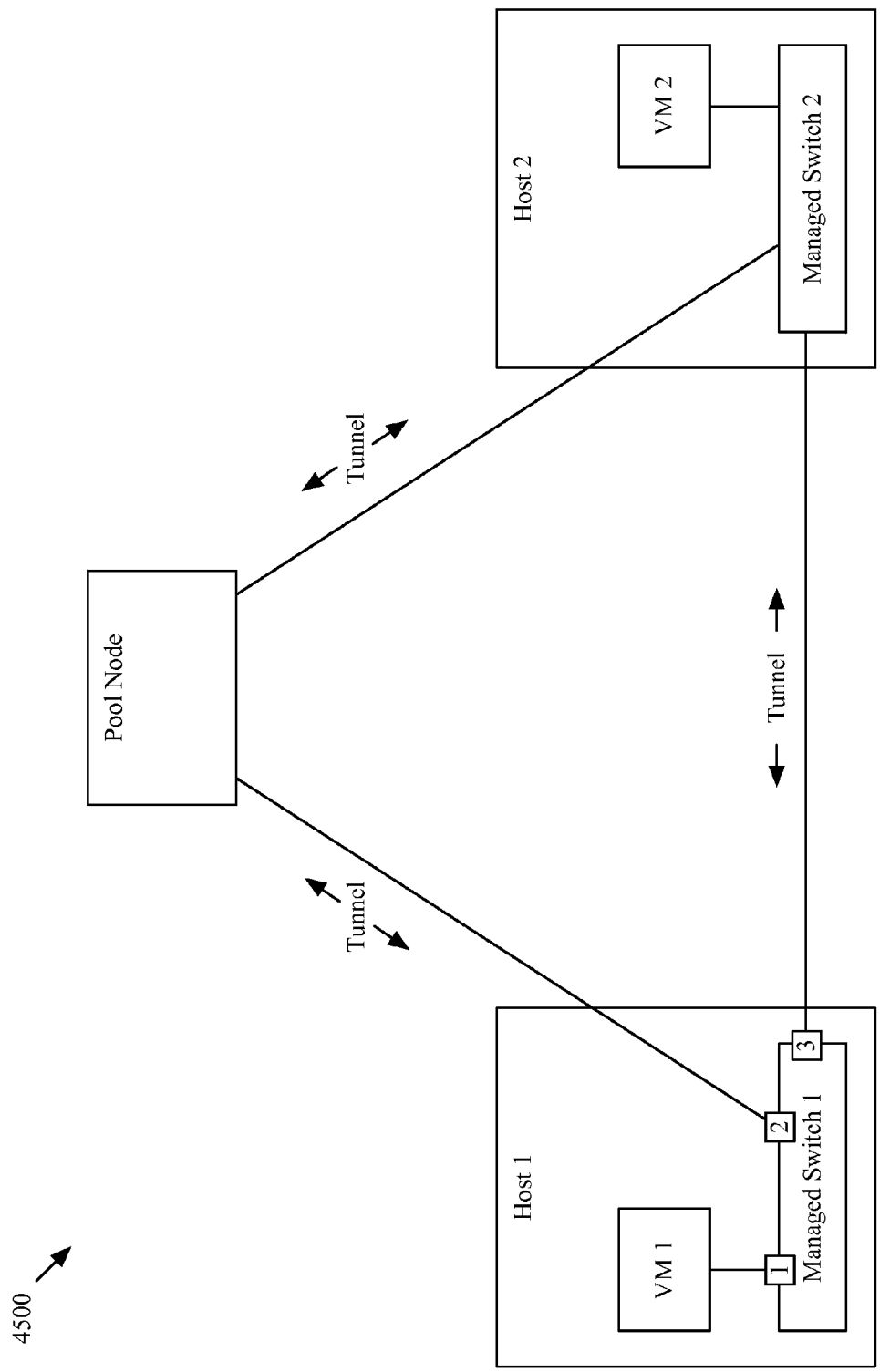
FIG. 45 conceptually illustrates a network architecture of some embodiments.

FIG. 44 illustrates several example flow entries that implement a portion of a processing pipeline of some embodiments. In these example flow entries, a packet's logical context is stored in a VLAN id field of the packet's header. In addition, these examples use port 4000 as the dispatch port to which packets are sent for further processing. Some of the flow entries will be described by reference to FIG. 45, which conceptually illustrates a network architecture 4500 of some embodiments. Specifically, FIG. 45 conceptually illustrates a host 1 that includes a managed switching element 1 to which VM 1 is coupled through a port 1 and a host 2 that includes a managed switching element 2 to which VM 2 is couple through port (not shown) of the managed switching element 2. The host 1 is coupled to the host 2 a tunnel. As shown, the tunnel terminates at port 3 of the managed switching element 1 of the host 1 and a port (not shown) of the managed switching element 2. A pool node is coupled to the host 1 through a tunnel that terminates at a port 2 of the managed switching element 1 and is coupled to the host 2 through a tunnel that terminates at a port (not shown) of the managed switching element 2. In this example, the flow entries are stored in the managed switching element 1, and, thus, are for processing packets that are received by the managed switching element 1.

As shown, flow entry 1 is for performing physical to logical mapping (i.e., ingress context mapping). The flow entry 1 specifies that when a packet is received on port 1, the packet's VLAN id is to be modified to 2057 and the packet is to be submitted to port 4000, which is the dispatch port. The VLAN id of 2057 represents the context of the packet and indicates that the packet has been received on port 1 of the managed switching element 1.

Flow entry 2 is for modifying the packet's context to indicate that the packet is at the start of logical processing (e.g., stages 4250-4270 of the processing pipeline 4200) of the processing pipeline. As shown, the flow entry 2 specifies that when a packet is received on port 4000 and the packet's VLAN id is 2057, the packet's VLAN id is to be modified to 2054 and the packet is to be submitted to port 4000, which is the dispatch port. The VLAN id of 2054 represents the context of the packet and indicates that the packet is at the start of the logical processing of the processing pipeline.

Next, flow entry 3 is for performing an ingress ACL lookup. As shown, the flow entry 3 specifies that when a packet is received on port 4000 and the packet's VLAN id is 2054, the packet's VLAN id is to be modified to 2055 and the packet is to be submitted to port 4000, which is the dispatch port. The VLAN id of 2055 represents the context of the packet and indicates that the packet has been processed by the ingress ACL and allowed through the ingress ACL.

Flow entries 4-6 are for performing logical lookups. The flow entry 4 specifies that when a packet is received on port 4000, the packet's VLAN id is 2055, and the packet's destination MAC address is 00:23:20:01:01:01, the packet's VLAN id is to be modified to 2056 and the packet is to be submitted to port 4000, which is the dispatch port. The VLAN id of 2056 represents the context of the packet and indicates that the packet is to be sent to the VM 1.

The flow entry 5 specifies that when a packet is received on port 4000, the packet's VLAN id is 2055, and the packet's destination MAC address is 00:23:20:03:01:01, the packet's VLAN id is to be modified to 2058 and the packet is to be submitted to port 4000, which is the dispatch port. The VLAN id of 2058 represents the context of the packet and indicates that the packet is to be sent to the VM 2.

The flow entry 6 specifies that when a packet is received on port 4000, the packet's VLAN id is 2055, and the packet's destination MAC address is ff:ff:ff:ff:ff:ff, the packet's VLAN id is to be modified to 2050 and the packet is to be submitted to port 4000, which is the dispatch port. The VLAN id of 2050 represents the context of the packet and indicates that the packet is a broadcast packet.

As shown, flow entry 7 is for performing logical to physical mapping (i.e., egress context mapping). The flow entry 7 specifies that when a packet is received on port 4000, and the packet's VLAN id is 2056, the packet's VLAN id is to be stripped (i.e., removed) and the packet is to be submitted to port 1 which is the port to which VM 1 is coupled. Thus, the flow entry 7 is for sending the packet to VM 1.

Flow entry 8 is for performing logical to physical mapping (i.e., egress context mapping). As illustrated in FIG. 44, the flow entry 8 specifies that when a packet is received on port 4000 and the packet's VLAN id is 2058, the packet's VLAN id is to be modified to 2058 and the packet is to be submitted to port 3, which is the port to the tunnel (i.e., a tunnel port) that couples the managed switching element 1 to the managed switching element 2. As such, the flow entry 8 is for sending the packet to the host 2.

Next, flow entry 9 is for processing a broadcast packet. Specifically, the flow entry 9 specifies that when a packet is received on port 4000 and the packet's VLAN id is 2050, the packet's VLAN id is to be modified to 2056 and the packet is to be submitted to port 4000, which is the dispatch port. In addition, the flow entry 9 specifies that when a packet is received on port 4000 and the packet's VLAN id is 2050, the packet's VLAN id is to be modified to 2056 and a copy of the packet is to be submitted to port 4000. Therefore, the flow entry 9 is for sending a broadcast packet to the VM 1 and to other VMs in the same logical network as the VM 1, which include the VM 2 in this example.

Flow entry 10 is for sending a broadcast packet to the pool node. As shown in FIG. 44, the flow entry 10 specifies that when a packet is received on port 4000 and the packet's VLAN id is 2051, the packet's VLAN id is to be modified to 2050 and the packet is to be submitted to port 2, which is the port to the tunnel (i.e., a tunnel port) that couples the managed switching element 1 to the pool node. As mentioned above, the VLAN id of 2050 represents the context of the packet and indicates that the packet is a broadcast packet.

As shown, flow entry 11 is for performing logical to physical mapping (i.e., egress context mapping). The flow entry 11 specifies that when a packet is received on port 3, which is the tunnel (i.e., a tunnel port) that couples the managed switching element 1 to the managed switching element 2, and the packet's VLAN id is 2056, the packet's VLAN id is to be modified to 2056 and the packet is to be submitted to port 4000, which is the dispatch port. Therefore, the flow entry 11 is for sending the packet, which is received from the managed switching element 2, to the VM 1.

Next, flow entry 12 is for performing logical to physical mapping (i.e., egress context mapping). As illustrated, the flow entry 12 specifies that when a packet is received on port 2, which is the tunnel (i.e., a tunnel port) that couples the managed switching element 1 to the pool node, and the packet's VLAN id is 2056, the packet's VLAN id is to be modified to 2056 and the packet is to be submitted to port 4000, which is the dispatch port. As such, the flow entry 12 is for sending the packet, which is received from the pool node, to the VM 1.

Flow entry 13 is for performing a logical lookup. Specifically, the flow entry 13 is for sending all packets with unknown destination MAC addresses to a pool node via an uplink. As shown in FIG. 44, the flow entry 13 specifies that when a packet is received on port 4000 and the packet's VLAN id is 2055, the packet's VLAN id is to be modified to 2049 and the packet is to be submitted to port 4000, which is the dispatch port. The VLAN id of 2049 represents the context of the packet and indicates that the packet is a packet with an unknown MAC address. In addition, the flow entry 13 includes a priority value that is lower that the flow entries 4-6, which are also for performing logical lookups. Since the priority value of the flow entry 13 is lower than all the other flow entries, the flow entry 13 is evaluated after all the other flow entries have been evaluated against the packet. Thus, the flow entry 13 is for sending a packet with an unknown MAC address to the pool node.

Finally, flow entry 14 is for sending a packet with an unknown MAC address to the pool node. As illustrated in FIG. 44, the flow entry 14 specifies that when a packet is received on port 4000 and the packet's VLAN id is 2049, the packet's VLAN id is to be modified to 2049 and the packet is to be submitted to port 2, which is the port to the tunnel (i.e., a tunnel port) that couples the managed switching element 1 to the pool node. As mentioned above, the VLAN id of 2049 represents the context of the packet and indicates that the packet is a packet with unknown MAC address.

FIG. 44 illustrates that some embodiments may define a context tag for each point in a processing pipeline for processing a packet through a logical switching element that is implemented across a set of managed switching elements in a managed network. However, some such embodiments may not write the context of the packet to the packet after every point in the processing pipeline. For instance, if several stages of the processing pipeline are defined to be performed by a particular managed switching element (e.g., by the managed switching element that initially receives the packet), some embodiments may skip the writing of the context tag until the last stage of the several stages of the processing pipeline has been performed. In this fashion, the managed switching element may function faster by not having to repeatedly read a context tag and write a context tag at every point in the processing pipeline.

VI. Computer System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 46:
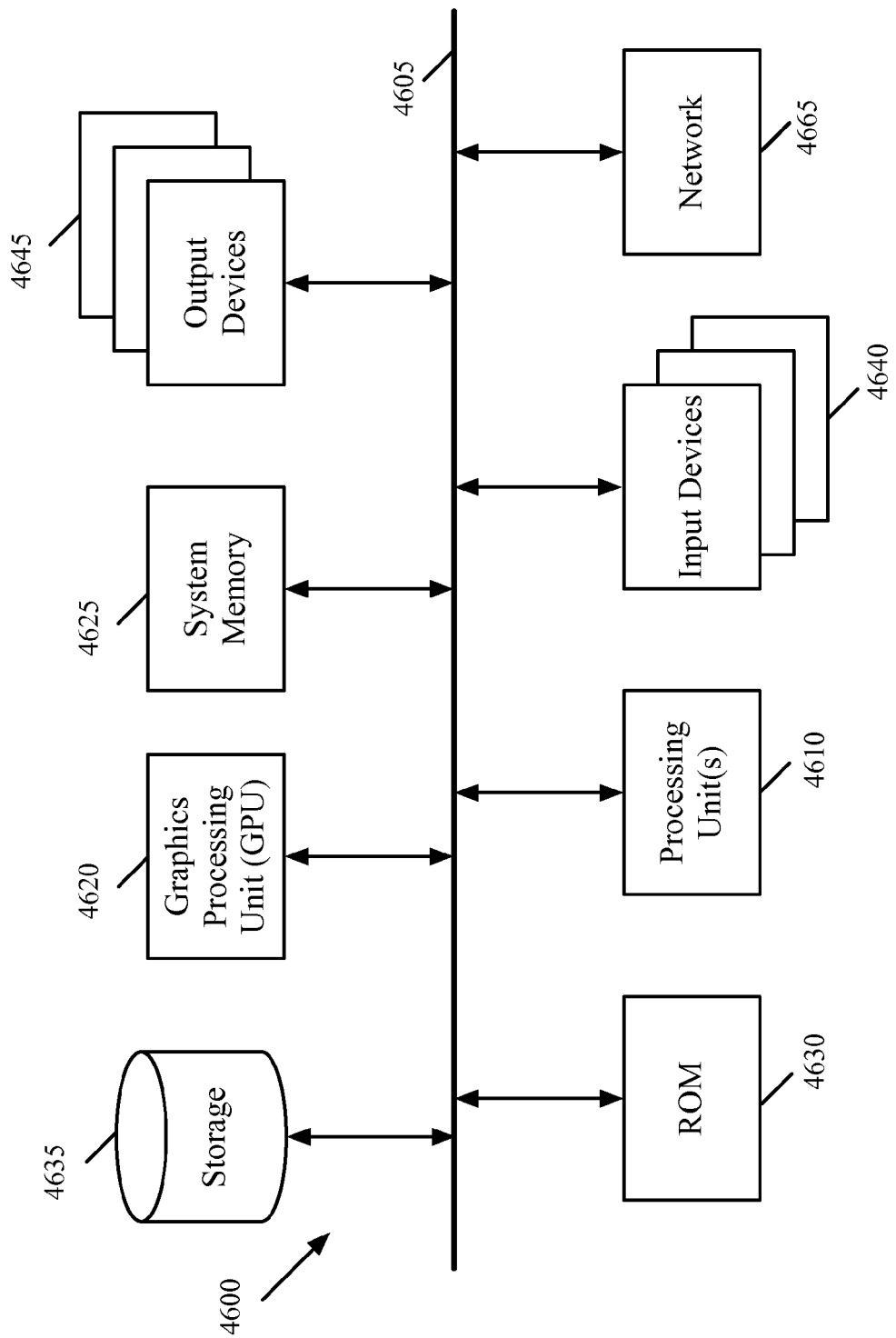
FIG. 46 conceptually illustrates an electronic computer system with which some embodiments of the invention are implemented.

FIG. 46 conceptually illustrates a computer system 4600 with which some embodiments of the invention are implemented. The electronic system 4600 may be a computer, phone, PDA, or any other sort of electronic device. Such an electronic system includes various types of computer readable media and interfaces for various other types of computer readable media. Electronic system 4600 includes a bus 4605, processing unit(s) 4610, a graphics processing unit (GPU) 4620, a system memory 4625, a read-only memory 4630, a permanent storage device 4635, input devices 4640, and output devices 4645.

The bus 4605 collectively represents all system, peripheral, and chipset buses that communicatively connect the numerous internal devices of the electronic system 4600. For instance, the bus 4605 communicatively connects the processing unit(s) 4610 with the read-only memory 4630, the GPU 4620, the system memory 4625, and the permanent storage device 4635.

From these various memory units, the processing unit(s) 4610 retrieve instructions to execute and data to process in order to execute the processes of the invention. The processing unit(s) may be a single processor or a multi-core processor in different embodiments. Some instructions are passed to and executed by the GPU 4620. The GPU 4620 can offload various computations or complement the image processing provided by the processing unit(s) 4610.

The read-only-memory (ROM) 4630 stores static data and instructions that are needed by the processing unit(s) 4610 and other modules of the electronic system. The permanent storage device 4635, on the other hand, is a read-and-write memory device. This device is a non-volatile memory unit that stores instructions and data even when the electronic system 4600 is off. Some embodiments of the invention use a mass-storage device (such as a magnetic or optical disk and its corresponding disk drive) as the permanent storage device 4635.

Other embodiments use a removable storage device (such as a floppy disk, flash drive, or ZIP® disk, and its corresponding disk drive) as the permanent storage device. Like the permanent storage device 4635, the system memory 4625 is a read-and-write memory device. However, unlike storage device 4635, the system memory is a volatile read-and-write memory, such a random access memory. The system memory stores some of the instructions and data that the processor needs at runtime. In some embodiments, the invention's processes are stored in the system memory 4625, the permanent storage device 4635, and/or the read-only memory 4630. For example, the various memory units include instructions for processing multimedia clips in accordance with some embodiments. From these various memory units, the processing unit(s) 4610 retrieve instructions to execute and data to process in order to execute the processes of some embodiments.

The bus 4605 also connects to the input and output devices 4640 and 4645. The input devices enable the user to communicate information and select commands to the electronic system. The input devices 4640 include alphanumeric keyboards and pointing devices (also called "cursor control devices"). The output devices 4645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 46, bus 4605 also couples electronic system 4600 to a network 4665 through a network adapter (not shown). In this manner, the computer can be a part of a network of computers (such as a local area network ("LAN"), a wide area network ("WAN"), or an Intranet, or a network of networks, such as the Internet. Any or all components of electronic system 4600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 15, 20, 30, 32, 36, and 39) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A method of processing a packet at a first managed switching element that implements a logical switching element, along with a plurality of additional managed switching elements, the method comprising:
receiving, at an ingress port of the first managed switching element, a packet for processing through the logical switching element's processing pipeline comprising a physical to logical mapping, logical processing, a logical to physical mapping, and physical processing;
processing the packet through a portion of the logical processing of the processing pipeline of the logical switching element at the first managed switching element, wherein the logical processing comprises processing the packet against a logical Layer 2 (L2) or Layer 3 (L3) forwarding table;
storing context information in the packet that indicates the portion of the processing pipeline through which the packet has been processed in order to prevent the additional managed switching elements from processing the packet through the same portion of the processing pipeline; and
forwarding the packet with the stored context information to a second managed switching element of the plurality of additional managed switching elements.

2. The method of claim 1, wherein processing the packet against the L2 forwarding table comprises performing a lookup on the logical L2 forwarding table based on information in a header of the packet.

3. The method of claim 1, wherein processing the packet against the L3 forwarding table comprises performing a lookup on the L3 layer forwarding table based on information in a header of the packet.

4. The method of claim 1, wherein the logical processing comprises performing a lookup on the logical L2 or L3 forwarding table to identify a logical outport of the logical switching element for the packet based on address information stored in a header of the packet.

5. The method of claim 4, wherein the logical to physical mapping comprises identifying a physical output port that corresponds to the identified logical outport of the logical switching element in order to forward the packet to the second managed switching element.

6. The method of claim 1, wherein the physical to logical mapping comprises identifying that the packet belongs to the logical switching element.

7. The method of claim 6, wherein identifying that the packet belongs to the logical switching element comprises using the ingress port of the first managed switching element at which the packet is received.

8. The method of claim 1, wherein the context information is stored in a set of fields in a header of the packet.

9. The method of claim 8, wherein the set of fields comprises a logical inport field for indicating a port of the logical switching element at which the packet originated.

10. The method of claim 8, wherein the set of fields comprises a logical outport field for indicating a port of the logical switching element to which to send the packet.

11. The method of claim 8, wherein the set of fields comprises a virtual routing and forwarding field for indicating a logical forwarding table with which to process the packet.

12. The method of claim 1, wherein processing the packet through the portion of the logical processing of the processing pipeline comprises generating the context information for storing in the packet.

13. The method of claim 1, wherein the logical processing of the processing pipeline further comprises processing the packet against a logical ingress or egress access control list (ACL).

14. The method of claim 1, wherein the portion of the logical processing of the processing pipeline is a first portion, wherein the second managed switching element is for processing the packet through a second portion based on the stored context information in the packet.

15. The method of claim 14, wherein the logical processing of the processing pipeline further comprises a logical ingress access control list (ACL) decision and a logical egress ACL decision, wherein the logical processing comprises a logical forwarding decision based on the L2 or L3 forwarding table, wherein the first portion comprises the logical ingress ACL decision and the logical forwarding decision, and the second portion comprises the logical egress ACL decision.

16. A non-transitory machine readable medium storing a program which when executed by at least one processing unit processes a packet at a first managed switching element that implements a logical switching element, along with a plurality of additional managed switching elements, the program comprising sets of instructions for:
receiving, at an ingress port of the first managed switching element, a packet for processing through the logical switching element's processing pipeline comprising a physical to logical mapping, logical processing, a logical to physical mapping, and physical processing;
processing the packet through a portion of the logical processing of the processing pipeline of the logical switching element at the first managed switching element, wherein the logical processing comprises processing the packet against a logical Layer 2 (L2) or Layer 3 (L3) forwarding table;
storing context information in the packet that indicates the portion of the processing pipeline through which the packet has been processed in order to prevent the additional managed switching elements from processing the packet through the same portion of the processing pipeline; and
forwarding the packet with the stored context information to a second managed switching element of the plurality of additional managed switching elements.

17. The non-transitory machine readable medium of claim 16, wherein the set of instructions for processing the packet through the portion of the logical processing of the processing pipeline comprises a set of instructions for performing the logical processing by performing a lookup on the logical L2 forwarding table based on a media access control (MAC) address in a header of the packet in order to identify a logical outport on the logical switching element.

18. The non-transitory machine readable medium of claim 17, wherein the set of instructions for processing the packet comprises a set of instructions for performing the logical to physical mapping by identifying a physical output port that corresponds to the identified logical outport of the logical switching element in order to forward the packet to the second managed switching element.

19. The non-transitory machine readable medium of claim 16, wherein the set of instructions for processing the packet through the portion of the logical processing of the processing pipeline comprises a set of instructions for performing the physical to logical mapping by identifying an inport of the logical switching element based on the ingress port of the first managed switching element at which the packet was received.

20. The non-transitory machine readable medium of claim 16, wherein the context information is stored in a header of the packet.

21. The non-transitory machine readable medium of claim 20, wherein the context information stored in the header of the packet comprises at least a logical outport of the logical switching element determined by the processing pipeline.

22. The non-transitory machine readable medium of claim 16, wherein the set of instructions for processing the packet through the portion of the logical processing of the processing pipeline comprises a set of instructions for performing the logical processing by generating the context information to store in the packet.

23. The non-transitory machine readable medium of claim 16, wherein the logical processing of the processing pipeline further comprises processing the packet against a ingress or egress logical access control list (ACL).

24. The non-transitory machine readable medium of claim 16, wherein the program executes on a host device to implement the first managed switching element.

* * * * *